(12) United States Patent
Do et al.

(10) Patent No.: US 7,546,577 B2
(45) Date of Patent: Jun. 9, 2009

(54) METHOD AND APPARATUS FOR PRODUCING SOFTWARE

(75) Inventors: Sung-Hee Do, Lexington, MA (US); Nam Suh, Sudbury, MA (US)

(73) Assignee: Axiomatic Design Software, Inc., Boston, MA (US)

(\*) Notice: Subject to any disclaimer, the term of this patent is extended or adjusted under 35 U.S.C. 154(b) by 0 days.

(21) Appl. No.: 09/731,678

(22) Filed: Dec. 6, 2000

(65) Prior Publication Data

US 2002/0046394 A1    Apr. 18, 2002

Related U.S. Application Data

(60) Provisional application No. 60/169,145, filed on Dec. 6, 1999.

(51) Int. Cl.
*G06F 9/44* (2006.01)
(52) U.S. Cl. ...................................... 717/108
(58) Field of Classification Search ......... 717/101–109, 717/114–117, 120–123; 707/3–4; 700/100, 700/97
See application file for complete search history.

(56) References Cited

U.S. PATENT DOCUMENTS

| 5,159,687 A | * | 10/1992 | Richburg | 717/106 |
| 5,357,440 A | * | 10/1994 | Talbott et al. | 700/97 |
| 6,415,196 B1 | * | 7/2002 | Crampton et al. | 700/100 |
| 6,523,027 B1 | * | 2/2003 | Underwood | 707/4 |

OTHER PUBLICATIONS

Tracz et al., "Domain-Specific Software Architecture Engineering Process Guidelines", 1993, Adage-IBM-92-02, Version 2.0.*

Rudolph S., "On a Mathematical Foundation of axiomatic design", Aug. 22, 1996, ASME Design Engineering Technical Conference and Computers in Engineering Conference.*

Kim et al., "Design of Software Systems based on Axiomatic Design", Robotics & Computer-Integrated Manufacturing, vol. 8., MIT, 1991, pp. 243-255.*

Visual Modeling with Rational Rose and UML, by Grady Booch, ISBN: 0201310163, Apr. 1998, Addison-Wesley, Ch. 3, and 11.*

RequisitePro, Requirements Management, Rational Software Corporation, Apr. 1997, ch 13-15.*

(Continued)

*Primary Examiner*—Tuan Anh Vu
(74) *Attorney, Agent, or Firm*—Wolf, Greenfield & Sacks, P.C.

(57) ABSTRACT

A system and method for producing software code is provided. In particular, a new software design methodology is provided that is based on axiomatic design theory. In one aspect, axiomatic design theory is adapted for use in designing object-oriented software programs. This methodology overcomes the shortcomings of various software design strategies including extensive software development and debugging time and the need for extensive maintenance. Because traditional software design strategies are not heuristic and do not provide basic principles for the development of good software systems, bad design habits produce poor quality software. A design framework using axiomatic design for software overcomes many of the shortcomings of current software design techniques: high maintenance costs, limited reusability, the need for extensive debugging and testing, poor documentation, and limited extensibility of the software, all of which result in high development cost of software.

6 Claims, 127 Drawing Sheets

OTHER PUBLICATIONS

Nam P. Suh, "Axiomatic Design Theory for Systems", Research in Engineering Design, vol. 10: pp. 189-209, MIT, 1998.*

Sung-Hee Do and Nam P. Suh, "Systematic OO Programming with Axiomatic Design", IEEE Computer, vol. 32, No. 10, Oct. 1999, Integrated Engineering, pp. 121-124.*

Kim et al., "Design of Software Systems Based on axiomatic Design", CIRP, 1991, pp. 243-255.*

Albano, Leonard D. and Suh, Nam P., "Axiomatic Approach to Structural Design," *Research in Engineering Design, 1992,* vol. 4, pp. 171-183.

Schach, Stephen R., "Software Life-Cycle Models," *Classical and Object-Oriented Software Engineering,* Chapter 3, pp. 66-65, Fourth edition (1999), WCB McGraw-Hill.

Jacobsen, Ivar et al., "The Unified Process: Use-Case Driven, Architecture-Centric, Iterative, and Incremental," Chapter 1, pp. 3-13 and "An Iterative and Incremental Process," Chapter 5, pp. 85-107, *The Unified Software Development Process,* Fourth printing (1999), Addison-Wesley.

Suh, Nam P., "Design Axioms and Quality Control," *Robotics and Computer-Integrated Manufacturing,* 1992, vol. 9, No. 4/5, pp. 367-376.

Suh, Nam P., "Quality and Reliability of Products Through Proper Design," presented at the *Proceedings of the Quality Through Design Conference,* Bangalore, India, Jun. 1993.

Albano, Leonard D. et al., "A Framework for Performance-Based Design," *Research in Engineering Design, 1993,* vol. 5, pp. 105-119.

Wallace, David R. and Suh, Nam P., "Information-based Design For Environmental Problem Solving," *Annals of the CIRP,* pp. 175-180, 1993, vol. 42, No. 1.

Suh, Nam P., "Manufacturing and Productivity," *Innovations and Materials Processing,* Plenum Publishing Corporation, 1985, pp. 9-81.

Kim, Steven H. and Suh, Nam P., "Application of Symbolic Logic to the Design Axioms," *Robotics and Computer-Integrated Manufacturing,* 1985, vol. 2, No. 1, pp. 55-64.

Kim, Steven H. and Suh, Nam P., "Formulation of the Design Axioms Through Symbolic Logic," presented at the *Second International Conference on the Science, Technology and Systems of the Future,* Sep. 1985.

Kim, Steven H. and Suh, Nam P., "On a Consultive Expert System for Design Axiomatics," presented at *Intelligent Manufacturing Systems: An International Conference,* Budapest, Hungary, Jun. 1986, pp. 2-6.

Kim, Steven H. and Suh, Nam P., "Mathematical Foundations for Manufacturing," *Journal of Engineering for Industry,* Aug. 1987, vol. 109, pp. 213-218.

Suh, Nam P., "A Perspective on Manufacturing," *Robotics and Computer-Integrated Manufacturing, 1988,* vol. 4, No. 3/4, pp. 297-307.

Kim, Steven H. and Suh, Nam P., "On a Expert System for Design and Manufacturing," *Proc. COMPINT'85,* ACM and IEEE/Computer Society, Montreal, Canada, Sep. 1985: 89-95, pp. 1-7.

Kim, Sang-Gook and Suh, Nam P., "Knowledge-Based Synthesis System for Injection Molding," *Roboitcs and Computer-Integrated Manufacturing,* 1987, vol. 3, No. 2, pp. 181-186.

Suh, Nam P., University-Industry Interaction for the Innovation of New Products and Processes: A U.S. Model, *Robotics and Computer-Integrated Manufacturing,* 1990, vol. 7, No. 1/2, pp. 15-25.

Suh, Nam P. and Sekimoto, Shinya, "Design of Thinking Design Machine," *Annals of the CIRP,* 1990, vol. 39, No. 1, p. 145-148.

Kim, Sun-Jae. et al., "Design of Software Systems Based on Axiomatic Designs," *Robotics and Computer-Integrated Manufacturing,* 1991, vol. 8, No. 4, pp. 243-255.

Gebala, David A. and Suh, Nam P., "An Application of Axiomatic Designs," *Research in Engineering Design,* 1992, vol. 3, pp. 149-162.

Suh, Nam P., "Design Axioms and Quality Control," *Robotics and Computer-Integrated Manufacturing,* 1992, vol. 9, No. 4/5, pp. 367-376.

Sullivan, Kevin J. et al, "The Structure and Value of Modularity in Software Design," presented at the *Proceedings of the Joint International Conference on Software Engineering and ACM SIGSOFT Symposium on the Foundations of Software Engineering,* Vienna, Austria, Sep. 2001, pp. 1-10.

Suh, Nam P., "Introduction," Chapter 1, pp. 3-24 and "Design and Design Processes" Chapter 2, pp. 25-45, *The Principles of Design,* 1990, First edition, Oxford University Press, New York.

Suh, Nam P., "Editorial" p. 1 and "The Future of the Factory," pp. 39-49, *Robotics and Computer-Integrated Manufacturing,* 1984, vol. 1, No. 1.

El-Haik, Basem, "The Integration of Axiomatic Design in the Engineering Design Process," presented at the 11th *Annual RMSL Workshop,* May 10-12, 1999 Auburn Hills, Michigan, pp. 1-8.

Suh, Nam P. et al, "On a Axiomatic Approach to Manufacturing and Manufacturing Systems," *Journal of Engineering for Industry,* May 1978, vol. 100, pp. 127-130.

Suh, Nam P. et al, "Design and Operation of Large Systems," *Journal of Manufacturing Systems,* 1995, vol. 14, No. 3, pp. 203-213.

Suh, Nam P., "Designing-in of Quality Through Axiomatic Design," *IEEE Transactions on Reliability,* Jun. 1995, vol. 44, No. 2, pp. 256-264.

Suh, Nam P., "Development of the Science Base for the Manfacturing Field Through the Axiomatic Approach," *Robotics and Computer-Integrated Manufacturing,* 1984, vol. 1, No. 3/4, pp. 397-415.

Nakazawa, Hiromu and Suh, Nam P., "Process Planning Based on Information Concept," *Roboitcs and Computer-Integrated Manufacturing,* 1984, vol. 1, No. 1, pp. 115-123.

Nam P. Suh and James R. Rinderie, "Qualitative and Quantitative Use of Design and Manufacturing Axioms," *Annals of CIRP,* 1982, vol. 31, No. 1.

Suh, Nam P. et al., "Application of Axiomatic Design Techniques to Manufacturing," *The American Society of Mechanical Engineers for presentation at the Winter Annual Meeting,* Dec. 2-7, 1979, New York, NY.

Leonard D. Albano and Suh, Nam P., "Axiomatic Design and Concurrent Engineering," 1994, Butterworth-Heinemann Ltd.

Suh, Nam P., "Axiomatic Design of Mechanical Systems," *Transactions of the ASME,* Jun. 1995, vol. 117, pp. 2-10.

Suh, Nam P.., "Impact of Axiomatic Design," *Keynote Address at the 1996 CIRP Design Workshop,* Tokyo, Japan, 1996, pp. 1-12.

Nordlund, Mats et al., "Growth of Axiomatic Design Through Industrial Practice," *3rd CIRP Workshop on Design and the Implementation of Intelligent Manufacturing Systems,* Jun. 19-21, 1996, Tokyo, Japan, pp. 77-84.

Suh, Nam P., "Manufacturing System Design," *48th General Assembly of CIRP,* 1998, pp. 627-639.

Do, Sung-Hee and Suh, Nam P., "Axiomatic Design of Software," *Axiomatic Design Advances and Applications,* Chapter 5, 1990, Oxford University Press, pp. 239-300.

Rinderie, J.R. and Suh Nam P., "Measures of Functional Coupling in Design," *The American Society of Mechanical Engineers,* Nov. 22, 198, New York, NY, pp. 1-6.

Suh, Nam P. et al., "Optimization of Manufacturing Systems Through Axiomatics," *Annals of the CIRP,* 1978, vol. 27, No. 1, pp. 383-388.

Do, Sung-Hee and Suh, Nam P., "Systematic OO Programming with Axiomatic Design," IEEE Comput. Society, Oct. 1999, vol. 32, No. 10, p. 121-124.

Hartunian, Vigain et al., "Decision Making and Software Tools for Product Development Based on Axiomatic Design," submitted to the 1996 CIRP General Assembly, Aug. 25-31, 1996, pp. 1-7, Como, Italy.

Suh, Nam P., "Axiomatic Design Theory for Systems," Research in Engineering Design, 1998, vol. 10, No. 4, pp. 189-209.

Suh, Nam P., "A UML-Based Object-Oriented Framework Development Methodology," Software Engineering Conference, Dec. 2-4, 1998, pp. 211-218, Taipei, Taiwan.

"An Introduction to the DSM Method," retrieved from the Internet at URL: http://web.mit.edu/dsm/Tutorial/tutorial_intro.htm, pp. 1-2, Feb. 26, 2002.

Axiomatic Design Software, Inc. Acclarao, Software for axiomatic design, User's Guide, 1999.

Suh, Nam P., Massachusetts Institute of Technology, "Axiomatic Design Advances and Applications", 1999, Oxford University Press, Chapters 1-12.

* cited by examiner

FIG. 2

$$\begin{Bmatrix} FR1: \text{ Define Component} \\ FR2: \text{ Set Something} \\ FR3: \text{ Do Something} \end{Bmatrix} = \begin{bmatrix} X & O & O \\ X & X & O \\ X & X & X \end{bmatrix} \begin{Bmatrix} DP1: \text{ Attributes} \\ DP2: \text{ Action A} \\ DP3: \text{ Action B} \end{Bmatrix}$$

⟹ Module Definition

| | DP1: Attributes | | | DP2: Action A | DP3: Action B | |
|---|---|---|---|---|---|---|
| | uPortPinsUp, uPinsUpSensor | uStatus | uTime | | | |
| FR1: Define component | | | | | | |
| FR2: Set something | | | | SetState() | | Module for FR2 |
| FR3: Do something | | | | X | ProcessLoop() | Module for FR3 |

The number of total attributes are 4 for this class.

These two attributes are used by all methods.

This attribute is only used by SetState() method.

ProcessLoop() method calls SetState() method.

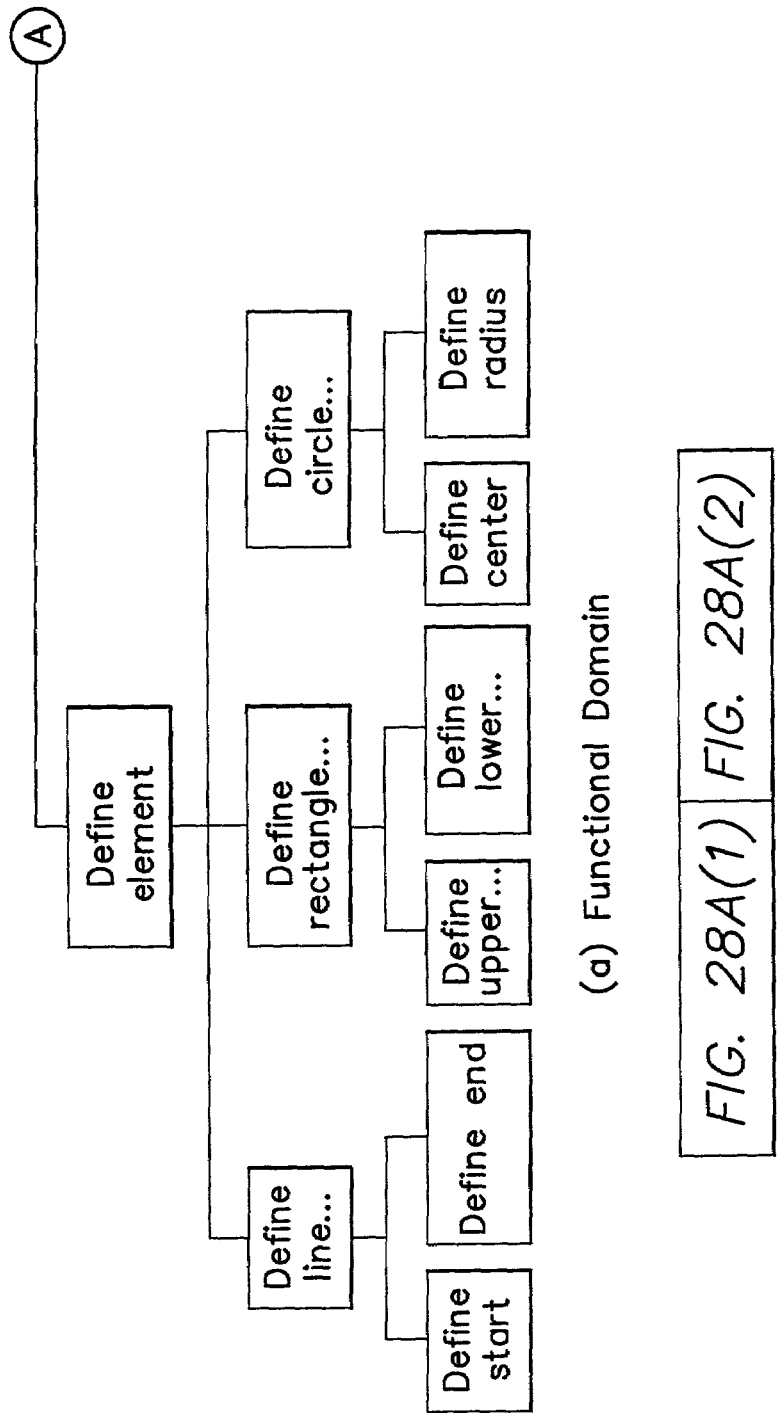
FIG. 28A(1)

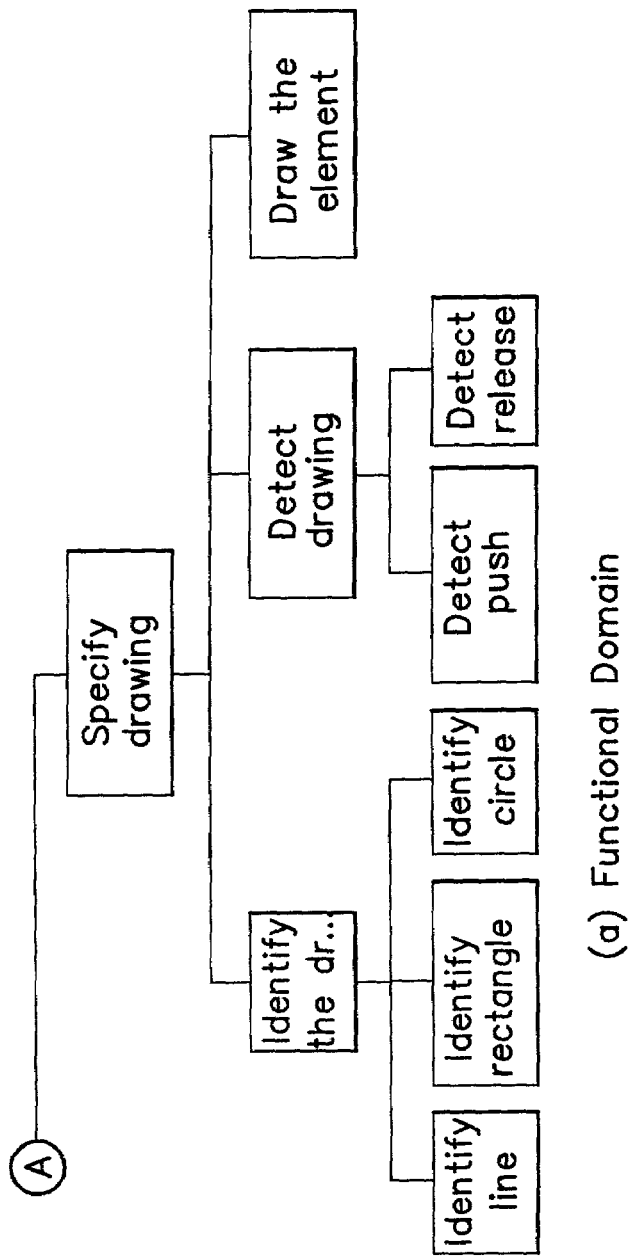
FIG. 28A(2)

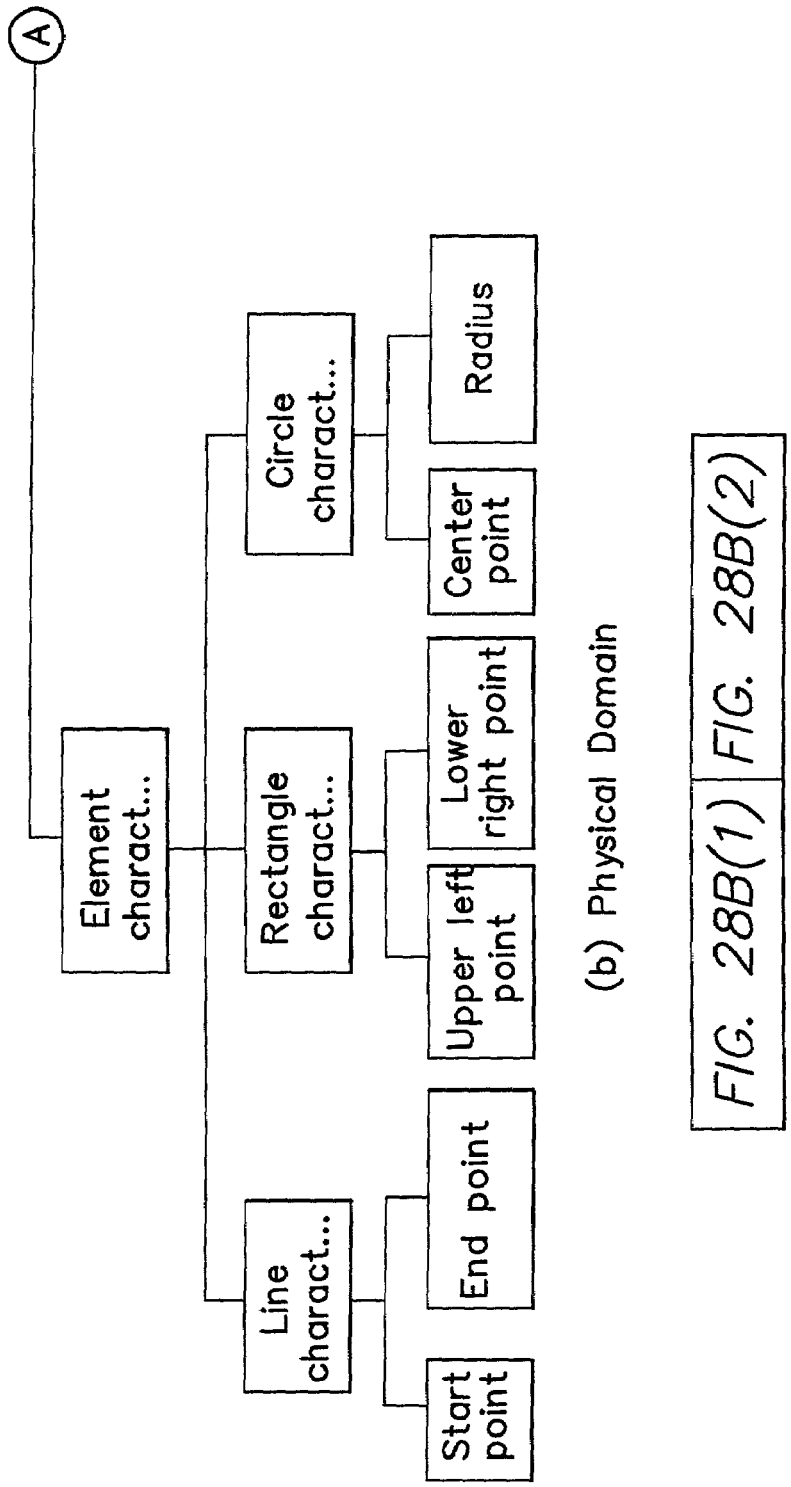
FIG. 28B(1)

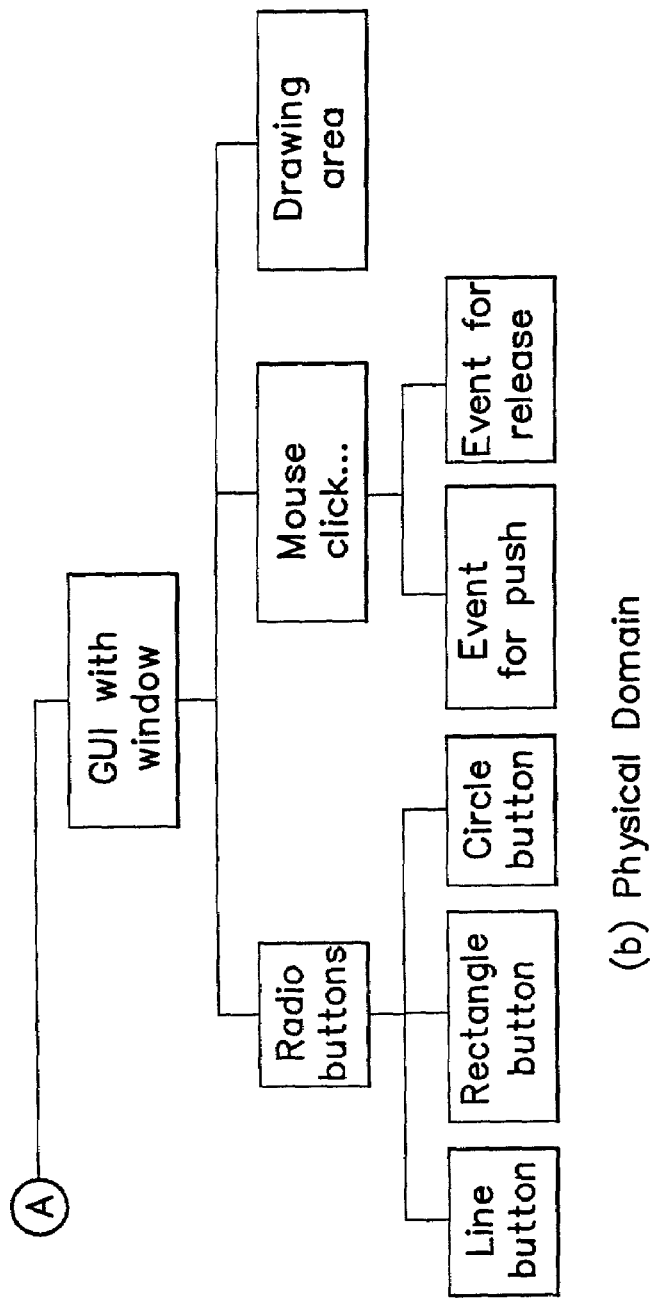
FIG. 28B(2)

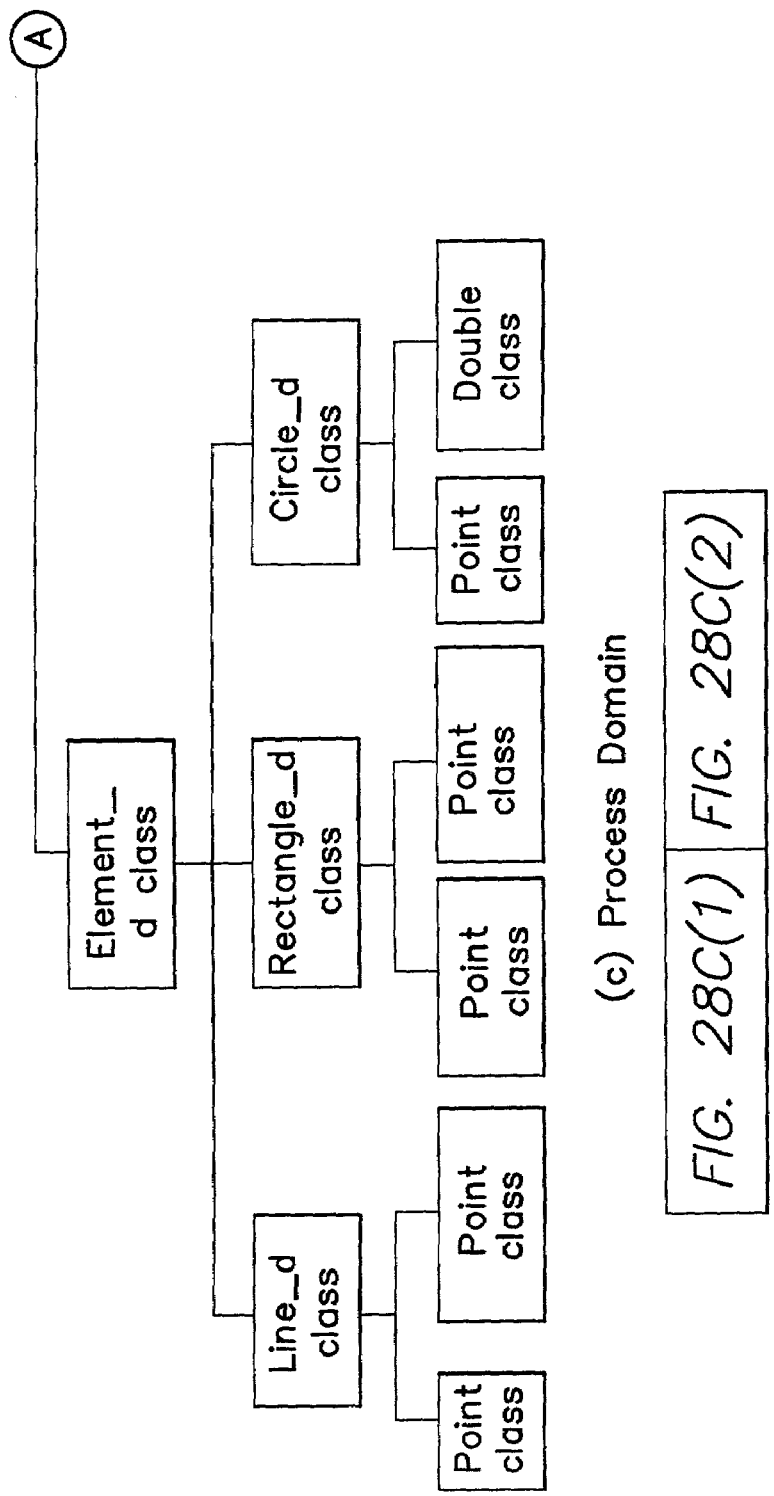
FIG. 28C(1)

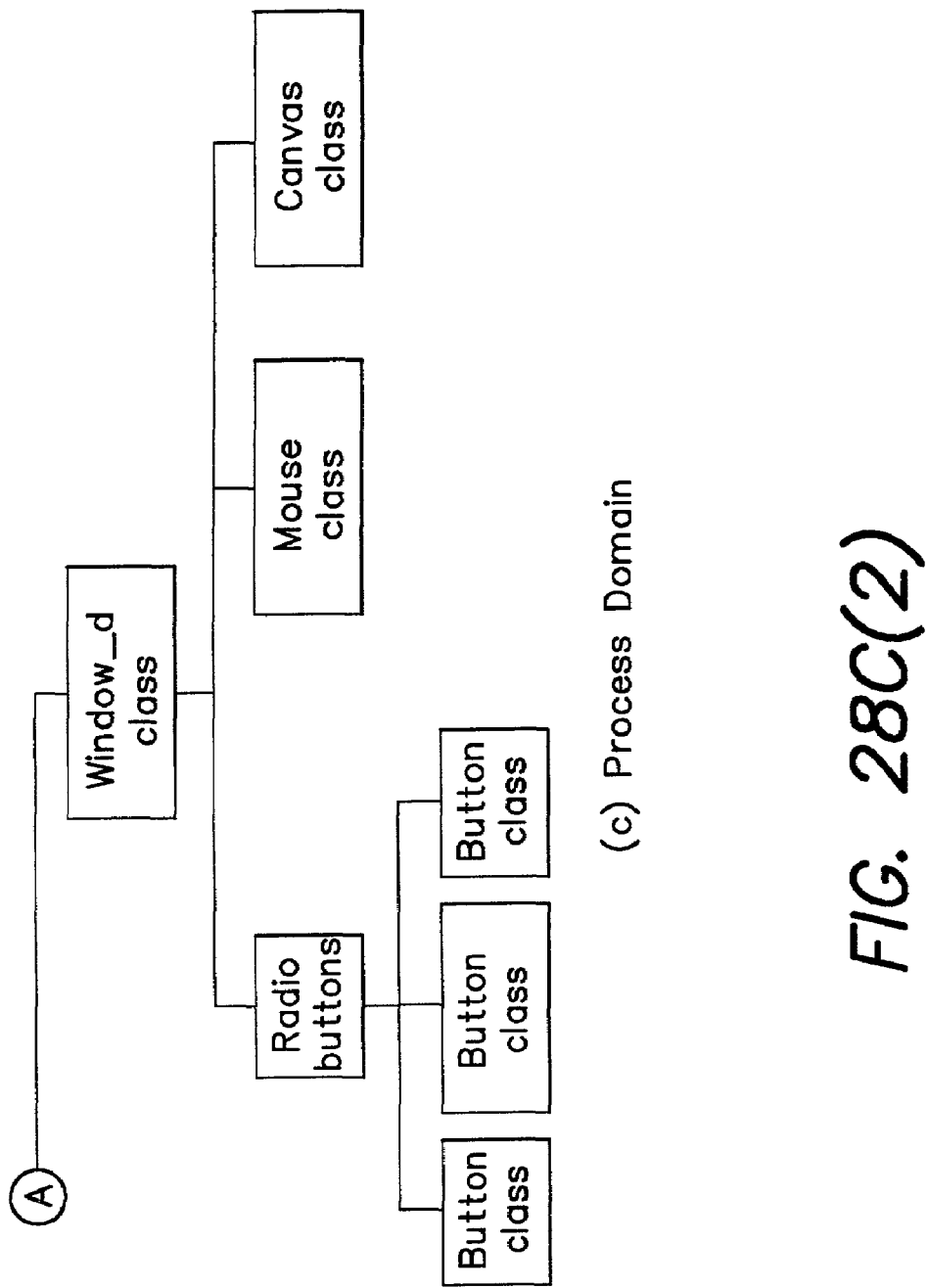
FIG. 28C(2)

| Object | Object 111/112/121/122/131/132 | Object 132 | Object 11 | | Object 12 | | Object 13 | |
|---|---|---|---|---|---|---|---|---|
| Name | Point | Double | Line_d | | Rectangle_d | | Circle_d | |
| Attribute | | | DP111 Point start | DP121 Point upper_left | | DP131 Point center | | |
| | | | DP112 Point end | DP122 Point lower_right | | DP132 Double radius | | |
| Method | | | C Line() | D Rectangle() | | E Center() | | |
| | | | I setStart() | K setULCorner() | | M setCenter() | | |
| | | | J setEnd() | L setLRCorner() | | N setRadius() | | |

FIG. 30A

| FIG. 30A | FIG. 30B |
|---|---|

FIG. 30A

| Object 1 | | Object 2 | | Object 211/212/213 | Object 22 | Object 23 | Object 1* | |
|---|---|---|---|---|---|---|---|---|
| | Element_d | | Window_d | RadioBu | Mouse | Canvas | | Element_* |
| DP11 | Line l | DP211 | Radiobutton line | | | | | |
| DP12 | Rectangle r | DP212 | Radiobutton rectangle | | | | | |
| DP13 | Circle c | DP213 | Radiobutton circle | | | | | |
| | | DP22 | Mouse m | | | | | |
| | | DP23 | Canvas c | | | | | |
| A | Element() | B | Window() | | | | a | Element*() |
| | | F | CreateButtons() | | | | | getStart() |
| | | O | addLine() | | | | | getEnd() |
| | | P | addRectangle() | | | | | getULCorner() |
| | | Q | addCircle() | | | | | getLRCorner() |
| | | G | implement MouseListener | | | | | getCenter() |
| | | R | mousePressed() | | | | | getRadius() |
| | | S | mouseReleased() | | | | | assignLine() |
| | | H | draw() | | | | | assignRectangle() |
| | | b/c | isLineSelected() | | | | | assignCircle() |
| | | b/c | isRectangleSelected() | | | | | |
| | | b/c | isCircleSelected() | | | | | |

```
(object Petal
    version 40)
(object Design "Logical View"
    is_unit          TRUE
    is_loaded        TRUE
    file_name        "SDATA\\demo1.mdl"
    quid             "3353F13A0384"
    defaults         (object defaults
        rightMargin      0.250000
        leftMargin       0.250000
        topMargin        0.250000
        bottomMargin     0.500000
        pageOverlap      0.250000
        clipIconLabels   TRUE
        autoResize       TRUE
        snapToGrid       TRUE
        gridX            16
        gridY            16
        defaultFont      (object Font
            size             9
            face             "helvetica"
            bold             FALSE
            italics          FALSE
            underline        FALSE
            strike           FALSE
            color            0
            default_color    TRUE)
```

| FIG. 39A |
| FIG. 39B |

| Code | Parent | Number | Description | Keyword | Comment | Category | Verification | Leaf |
|---|---|---|---|---|---|---|---|---|
| EX-a | 0 | 1 | Define element | — | — | — | — | FALSE |
| EX-a | 0 | 2 | Specify drawing environment | — | — | — | — | FALSE |
| EX-a | 1 | 1 | Define line element | — | — | — | — | FALSE |
| EX-a | 1 | 2 | Define rectangle element | — | — | — | — | FALSE |
| EX-a | 1 | 3 | Define circle element | — | — | — | — | FALSE |
| EX-a | 1.1 | 1 | Define start | — | — | — | — | TRUE |
| EX-a | 1.1 | 2 | Define end | — | — | — | — | TRUE |
| EX-a | 1.2 | 1 | Define upper left corner | — | — | — | — | TRUE |
| EX-a | 1.2 | 2 | Define lower right corner | — | — | — | — | TRUE |
| EX-a | 1.3 | 1 | Define center | — | — | — | — | TRUE |
| EX-a | 1.3 | 2 | Define radius | — | — | — | — | TRUE |
| EX-a | 2 | 1 | Identify the drawing type | — | — | — | — | FALSE |
| EX-a | 2 | 2 | Detect drawing location | — | — | — | — | FALSE |
| EX-a | 2 | 3 | Draw the element | — | — | — | — | TRUE |
| EX-a | 2.1 | 1 | Identify line | — | — | — | — | TRUE |
| EX-a | 2.1 | 2 | Identify rectangle | — | — | — | — | TRUE |
| EX-a | 2.1 | 3 | Identify circle | — | — | — | — | TRUE |
| EX-a | 2.2 | 1 | Detect mouse push | — | — | — | — | TRUE |
| EX-a | 2.2 | 2 | Detect mouse release | — | — | — | — | TRUE |

FIG. 40

| Code | Parent | Number | Alternative | Description | Keyword | Comment | Category | Verification | Leaf |
|---|---|---|---|---|---|---|---|---|---|
| EX-a | 0 | 1 | 0 | Element characteristics | — | — | — | — | FALSE |
| EX-a | 0 | 2 | 0 | GUI with window | — | — | — | — | FALSE |
| EX-a | 1 | 1 | 0 | Line characteristics | — | — | — | — | FALSE |
| EX-a | 1 | 2 | 0 | Rectangle characteristics | — | — | — | — | FALSE |
| EX-a | 1 | 3 | 0 | Circle characteristics | — | — | — | — | FALSE |
| EX-a | 1.1 | 1 | 0 | Start point | — | — | — | — | TRUE |
| EX-a | 1.1 | 2 | 0 | End point | — | — | — | — | TRUE |
| EX-a | 1.2 | 1 | 0 | Upper left point | — | — | — | — | TRUE |
| EX-a | 1.2 | 2 | 0 | Lower right point | — | — | — | — | TRUE |
| EX-a | 1.3 | 1 | 0 | Center point | — | — | — | — | TRUE |
| EX-a | 1.3 | 2 | 0 | Radius | — | — | — | — | TRUE |
| EX-a | 2 | 1 | 0 | Radio buttons | — | — | — | — | FALSE |
| EX-a | 2 | 2 | 0 | Mouse click information | — | — | — | — | FALSE |
| EX-a | 2 | 3 | 0 | Drawing area | — | — | — | — | TRUE |
| EX-a | 2.1 | 1 | 0 | Line button | — | — | — | — | TRUE |
| EX-a | 2.1 | 2 | 0 | Rectangle button | — | — | — | — | TRUE |
| EX-a | 2.1 | 3 | 0 | Circle button | — | — | — | — | TRUE |
| EX-a | 2.2 | 1 | 0 | Event for push | — | — | — | — | TRUE |
| EX-a | 2.2 | 2 | 0 | Event for release | — | — | — | — | TRUE |

DP Table

FIG. 41A

| FIG. 41A | FIG. 41B |
|---|---|

FIG. 41A

| Code1 | Code2 | Value | Comment | Name | Method | Type | Description |
|---|---|---|---|---|---|---|---|
| Ex-a.0.1 | Ex-a.0.1.0 | A | — | Line_d | Line_d() | Line_d | — |
| Ex-a.0.2 | Ex-a.0.1.0 | a | — | Line_d | setStart() | void | — |
| Ex-a.0.2 | Ex-a.0.2.0 | B | — | Line_d | setEnd() | void | — |
| Ex-a.1.1 | Ex-a.1.1.0 | C | — | Rectangle_d | Rectangle_d() | Rectangle_d | — |
| Ex-a.1.2 | Ex-a.1.2.0 | D | — | Rectangle_d | setULCorner() | void | — |
| Ex-a.1.3 | Ex-a.1.3.0 | E | — | Rectangle_d | setLRCorner() | void | — |
| Ex-a.2.1 | Ex-a.2.1.0 | F | — | Circle_d | Circle_d() | Circle_d | — |
| Ex-a.2.2 | Ex-a.2.1.0 | b | — | Circle_d | setCenter() | void | — |
| Ex-a.2.2 | Ex-a.2.2.0 | G | — | Circle_d | setRadius() | void | — |
| Ex-a.2.3 | Ex-a.2.1.0 | c | — | Element_d | Element_d() | Element_d | — |
| Ex-a.2.3 | Ex-a.2.3.0 | H | — | Window_d | Window_d() | Window_d | — |
| Ex-a.1.1.1 | Ex-a.1.1.1.0 | I | — | Window_d | CreateButtons() | void | — |
| Ex-a.1.1.2 | Ex-a.1.1.2.0 | J | — | Window_d | addLine() | void | — |
| Ex-a.1.2.1 | Ex-a.1.2.1.0 | K | — | Window_d | addRectangle() | void | — |
| Ex-a.1.2.2 | Ex-a.1.2.2.0 | L | — | Window_d | addCircle() | void | — |
| Ex-a.1.3.1 | Ex-a.1.3.1.0 | M | — | Window_d | MouseListener() | void | — |
| Ex-a.1.3.2 | Ex-a.1.3.2.0 | N | — | Window_d | mousePressed() | Point | — |
| Ex-a.2.1.1 | Ex-a.1.3.2.0 | O | — | Window_d | mouseReleased() | Point | — |
| Ex-a.2.1.2 | Ex-a.2.1.1.0 | P | — | Window_d | draw() | void | — |
| Ex-a.2.1.3 | Ex-a.2.1.2.0 | Q | — | Window_d | isLineSelected() | boolean | — |
| Ex-a.2.2.1 | Ex-a.2.1.3.0 | R | — | Window_d | isRectangleSelected() | boolean | — |
| Ex-a.2.2.2 | Ex-a.2.2.1.0 | S | — | Window_d | isCircleSelected() | boolean | — |
| | Ex-a.2.2.2.0 | | | | | | |

```
/*
Comments for class:
   File Name
   FR description
   DP description
      ...
*/
```

```
/*
Coments for class:
 File Name: Window_d.java
   FR2: Specify drawing environment
   DP2: GUI with window
     FR2=a*DP1(Element
     characteristic)+B*DP2(GUI
     with window)
*/
```

Reference for import or include → `import javax.swing.*;`
`import java.awt.*;`

```
Package PackageName

ClassType ClassName {
```

`public class window_d { /*DP2*/`

```
/*
Comments for attributes
   FR description
   DP description
      ...
*/
   AttributeType AttributeName;
   AttributeType AttributeName;
   AttributeType AttributeName;
```

```
/* Comments for attributes:
FR211: Identify line
DP211: Line button */
Radiobutton line; /*DP211*/

/* Comments for attributes:
FR212: Identify rectangle
DP212: Rectangle button */
Radiobutton rectangle; /*DP212*/
   ...
```

| FIG. 44A |
| FIG. 44B |
| FIG. 44C |

FIG. 44A

| FR Information: | |
|---|---|
| Number | Description |
| FR#.1 | Provide security |
| FR#.2 | Assign tasks |
| FR#.3 | Manage schedule |
| FR#.4 | Construct design h... |
| FR#.5 | Facilitate changes... |

| DP Information: | |
|---|---|
| Num... | Description |
| DP#.1 | Login privilege |
| DP#.2 | Resource of desig... |
| DP#.3 | Schedule-manage... |
| DP#.4 | Data structure for... |
| DP#.5 | ECO handling tool |

*FIG. 45A*

| | FR | DP |
|---|---|---|
| 1 | FR 1 description | DP 1 description |
| 2 | FR 2 description | DP 2 description |
| 3 | FR 3 description | DP 3 description |

*FIG. 45B*

| FR Information: | | DP Information: | |
| --- | --- | --- | --- |
| Number | Description | Number | Description |
| FR#.1 | Control the water fl... | DP#.1 | Angle for flow ra... |
| FR#.2 | Control the temper... | DP#.1(1) | Angle of hot wat... |
| | | DP#.2 | Angle for tempe... |
| | | DP#.2(1) | Connecting rod... |
| | | DP#.2(2) | Angle of cold w... |

*FIG. 46A*

| | FR | DP |
| --- | --- | --- |
| 1 | FR 1 description | DP 1 description |
| 2 | FR 2 description | Alternative DP 2(a) |
| | | Alternative DP 2(b) |
| | | Alternative DP 2(c) |
| 3 | FR 3 description | DP 3 description |

*FIG. 46B*

| Parent Information: | |
|---|---|
| Number | Description |
| FR 1.1 | Manage design workflow |
| DP 1.1 | Management roadmap |

| FR Information: | | DP Information: | |
|---|---|---|---|
| Number | Description | Number | Description |
| FR#.1 | Provide security | DP#.1 | Login privilege |
| FR#.2 | Assign tasks | DP#.2 | Resource of de... |
| FR#.3 | Manage schedule | DP#.3 | Schedule-mana... |
| FR#.4 | Construct design h... | DP#.4 | Data structure f... |
| FR#.5 | Facilitate changes... | DP#.5 | ECO handling t... |

*FIG. 47A*

| | FR | DP |
|---|---|---|
| Parent | Parent FR description | Parent DP description |
| 1 | FR 1 description | DP 1 description |
| 2 | FR 2 description | Alternative DP 2(a) |
| | | Alternative DP 2(b) |
| | | Alternative DP 2(c) |
| 3 | FR 3 description | DP 3 description |

*FIG. 47B*

| | Parent Information: | |
|---|---|---|
| Number | Description | |
| FR 1.1 | Manage design workflow | |
| DP 1.1 | Management roadmap | |

| FR Information: | | DP Information: | |
|---|---|---|---|
| Number | Description | Number | Description |
| FR#.1 | Provide security | DP#.1 | Login privilege |
| FR#.2 | Assign tasks | DP#.2 | Resource of de... |
| FR#.3 | Manage schedule | DP#.3 | Schedule-mana... |
| FR#.4 | Construct design h... | DP#.4 | Data structure f... |
| FR#.5 | Facilitate changes... | DP#.5 | ECO handling t... |

*FIG. 48A*

| #: 1.2.3 | FR | DP |
|---|---|---|
| Parent | Parent FR description | Parent DP description |
| #.1 | FR 1 description | DP 1 description |
| #.2 | FR 2 description | Alternative DP 2(a) |
| | | Alternative DP 2(b) |
| | | Alternative DP 2(c) |
| #.3 | FR 3 description | DP 3 description |

Constraint Information:

| Num... | Descr... | FR#.1 | FR#.2 | FR#.3 | FR#.4 | FR#.5 |
|---|---|---|---|---|---|---|
| C#.1 | Make... | X | X | X | X | X |
| C#.2 | Supp... | X | X | X | X | X |
| C#.3 | Elimi... | X | X | X | X | X |
| C#.4 | Facilit... | X |   |   | X | X |
| C#.5 | Funct... |   |   | X | X |   |
| C#.6 | Obje... |   |   |   |   |   |

FIG. 49B

Constraints — Robust Design — Analysis

Information

| Constraints | Type | Comments | Operator | Target value | |
|---|---|---|---|---|---|
| | | | | Target | Calculated |
| Weight | Marke | ☑ | Less than (<+) | 300lb | |
| Cost | Field | ☐ | More than (>=) | $500 | |
| Volume | Manu | ☑ | Exact (=+/−) | 10cu | |

Mapping — Constraints

| Index # | Category | C#.1 | C#.2 | C#.3 | CA's |
|---|---|---|---|---|---|
| 1 | Critical |   |   |   | ☑ |
| 2 | Interface |   | X | X | ☐ |
| 3 | Project |   | X | X | ☑ |

| | C#.1 | C#.2 | C#.3 |
|---|---|---|---|
| FR#.1 | X |   |   |
| FR#.2 | X |   |   |
| FR#.3 | X |   |   |
| FR#.4 | X |   |   |

| Index | | Information | | Target Value | | |
|---|---|---|---|---|---|---|
| # | Category | Type | Constraints | Comments | Operator | Target | Calculated |
| 1 | Critical | Marke | Weight | ☑ | Less than (<+) | 300lb | |
| 2 | Interface | Field | Cost | ☐ | More than(>=) | $500 | |
| 3 | Project | Manu | Volume | ☑ | Exact (=+/-) | 10cu | |
| | | | | | | | |

*FIG. 51*

Edit Functional Requirements

The Current Functional Requirement is:

Please start with VERB for description.

Data Input

Description:
Support user friendliness of the software

Keyword:
User friendly

Comment:
The GUI is one of the most important features of the AD software.
The design of the GUI will be discussed later.

Template: Process    Verification: Testing

Insert   Append   Change   Delete   Cancel

☑ Clean

Parent Information

| Nu... | Description | Comment |
|---|---|---|
| FR 1 | Make a decision-making tool whi... | A software tool for decision maki... |
| DP 1 | Computerized system with the A... | Software for Axiomatic Design. |

FR Information:

| Num... | Description | Comment |
|---|---|---|
| FR#.1 | Manage desi... | The design a... |
| FR#.2 | Provide decis... | The FR deal... |
| FR#.3 | Support user... | The GUI is a... |
| FR#.4 | Provide effici... | All kinds of d... |
| FR#.5 | Provide utility... | The fundam... |

DP Information:

| Num... | Description | Comm... |
|---|---|---|
| DP#.1 | Management ro... | |
| DP#.2 | Decision-maki... | |
| DP#.3 | Graphical User... | |
| DP#.4 | Data-managing... | |
| DP#.5 | Plug-in software | |

FIG. 52C

| Index | | Information | | Comment | | App. Link |
|---|---|---|---|---|---|---|
| # | Template | FR | DP | FR | DP | |
| Parent | | Control the FR/DP domain | FR/DP window | ☑ | ☐ | |
| 1 | | Control the mapping | Mapping tab | ☑ | ☑ | |
| 2 | | Assign constraints | Domain tab | ☐ | ☐ | |
| 3 | | Refine the design | Constraints tab | ☑ | ☐ | |
| 4 | | Analyze the design | Robust design tab | ☑ | ☑ | |
| | | | Analysis tab | | | |

| | | | DP1 | | | DP2 | | | | | | |
|---|---|---|---|---|---|---|---|---|---|---|---|---|
| | | | DP11 | | DP12 | | DP13 | | DP21 | | | DP22 | |
| | | | DP111 | DP112 | DP121 | DP122 | DP131 | DP132 | DP211 | DP212 | DP213 | DP221 | DP222 | DP23 |
| FR1 | FR11 | FR111 | X | | | | | | | | | | | |
| | | FR112 | | X | | | | | | | | | | |
| | FR12 | FR121 | | | X | | | | | | | | | |
| | | FR122 | | | | X | | | | | | | | |
| | FR13 | FR131 | | | | | X | | | | | | | |
| | | FR132 | | | | | | X | | | | | | |
| FR2 | FR21 | FR211 | | | | | | | X | | | | | |
| | | FR212 | | | | | | | | X | | | | |
| | | FR213 | | | | | | | | | X | | | |
| | FR22 | FR221 | X | | X | | X | | X | X | X | X | | |
| | | FR222 | | X | | X | | X | X | X | X | | X | |
| | FR23 | | X | X | X | X | X | X | X | X | X | | X | X |

*FIG. 53*

Mapping

| Index # | Template | Information | | Comment | | Analysis |
|---|---|---|---|---|---|---|
| | | FR | DP | FR | DP | App. Link |
| Parent | | Control the FR/DP domain | FR/DP window | ☑ | ☐ | |
| 1 | | Control the mapping | Mapping tab | ☑ | ☑ | |
| 2 | | | Domain tab | ☐ | ☑ | |
| 3 | | Assign constraints | Constraints tab | ☑ | ☐ | |
| 4 | | Refine the design | Robust design tab | ☑ | ☑ | |
| | | Analyze the design | Analysis tab | | | |

| | DP#1 | DP#2(a) | DP#2(b) | DP#3 | DP#4 |
|---|---|---|---|---|---|
| FR#1 | X | | | | |
| FR#2 | X | X | X | | |
| FR#3 | X | | X | X | |
| FR#4 | X | | | | X |

FIG. 54C

| Mapping | | | ⊘ Constraints | ⚠ Robust Design | | ⏱ Analysis | | Design Questions |
|---|---|---|---|---|---|---|---|---|
| Index | | | | Information | Comment | | | |
| # | Parent | Template | FR | DP | FR | DP | App. Link | |
| 1 | | | Control the FR/DP domain | FR/DP window | ☑ | ☐ | | DP3.5.3: To do List |
| 2 | | | Control the mapping | Mapping tab | ☑ | ☑ | | |
| 3 | | | Assign constraints | Constraints tab | ☐ | ☐ | | DP3.5.4: Legend Display |
| 4 | | | Refine the design | Robust design tab | ☑ | ☑ | | |
| | | | Analyze the design | Analysis tab | ☑ | ☑ | | DP3.5.7: Aerial View |

| | DP#.1 | DP#.2(a) | DP#.2(b) | DP#.3 | DP#.4 |
|---|---|---|---|---|---|
| FR#.1 | X | | | | |
| FR#.2 | X | X | X | | |
| FR#.3 | X | | X | X | |
| FR#.4 | X | | | | X |

Measure of Coupling:    Information Contents:

DP3.5.6: Scrolling    Theorem/Corollary

| Control Item | Level 1 Beginner | Level 2 | Level 3 Intermediate | Level 4 | Level 5 Expert |
|---|---|---|---|---|---|
| FR/DP Mapping | ● | ● | ● | | ● |
| Design Matrix | ● | ● | ● | | ● |
| Alternative DP | | ● | ● | ● | ● |
| Analysis–Flow Chart | | ● | ● | ● | ● |
| Constraints | | | ● | ● | ● |
| Comments | | | ● | ● | ● |
| CN | | | ● | ● | ● |
| CN/FR Mapping | | | ● | ● | ● |
| Analysis–Child List | | | ● | ● | ● |
| Analysis–Impact List | | | ● | ● | ● |
| DP/PV Mapping | | | | ● | ● |
| Analysis–Check Consistency | | | | ● | ● |
| Analysis–Check Constraints | | | | ● | ● |
| Templates | | | | ● | ● |
| Verification | | | | ● | ● |
| Application Link | | | | ● | ● |
| Analysis–Audit | | | | ● | ● |
| Nested(Full) Matrix Handling | | | | | ● |
| Robust Design | | | | | ● |
| Project Control | | | | | ● |

Available Features

| Numbering Type | | Default Numbering | Alternative Numbering | Example |
|---|---|---|---|---|
| | Numeric | ☑ | ☐ | 1, 2, 3 |
| | Lower case | ☐ | ☑ | a, b, c |
| | Upper case | ☐ | ☐ | A, B, C |
| Indicator | Alternative connector | ( ) | | Defined by user |
| | Parent index | # | | |
| | Divider | | | |
| Example | | #=1 [FR 1] [FR#.1] [FR#.2]  #=1.2 [FR#.1] [FR#.2] | #=1 [DP 1] [DP#.1] [DP#.2]  [DP#.1(a)]  #=1.2 [DP#.1] [DP#.2] [DP#.2(a)] | |

FIG. 66

|  |  | Legend category | | |
| --- | --- | --- | --- | --- |
|  |  | Color | Font | Line |
| Display | Activated cell |  |  | N/A |
|  | Normal |  |  |  |
|  | Default |  |  | N/A |
|  | Focus | ///// |  | N/A |
|  | Alternative | \\\\\ |  | N/A |
|  | Redundant | \\\\\ |  | N/A |
|  | Constraints |  |  | N/A |
|  | Comments | ///// |  | N/A |
| Design Matrix | Uncoupled | ///// | N/A |  |
|  | Decoupled | \\\\\ | N/A |  |
|  | Coupled | \\\\\ | N/A |  |
|  | Undefined | ///// | N/A |  |
| Template | Process |  |  | — |
|  | Transport |  |  | --- |
|  | ... |  |  |  |

| Child List | Impact List | Inconsistency | Decoupling | |
|---|---|---|---|---|
| Number | FR Description | | | DP Description |
| 1.1 | Manage design workflow | | | Management roadmap |
| 1.1.1 | Provide security | | | Login privilege |
| 1.1.2 | Assign tasks | | | Resource of design activity |
| 1.1.3 | Manage schedule | | | Schedule-managing tool (e.g. MS Project) |
| 1.1.4 | Construct design hierarchy | | | Data structure for Axiomatic Design concept |
| 1.1.5 | Facilitate changes to the design | | | ECO handling tool |
| 1.1.1.1 | Support administrative tool | | | User manager |
| 1.1.1.2 | Restrict the security access level | | | Authority code |
| 1.1.1.1.1 | Define group | | | Group specification |
| 1.1.1.1.2 | Define user | | | User specification |
| 1.1.1.1.3 | Manage authority code | | | Authority code specification |

FIG. 73

Design Matrix Table:

| A1(1.1) | DP#1 | DP#2 | DP#3 | DP#4 | DP#5 |
|---|---|---|---|---|---|
| FR#1 | X | O | | | |
| FR#2 | X | X | O | O | O |
| FR#3 | X | X | X | X | X |
| FR#4 | X | X | O | X | O |
| FR#5 | O | O | O | X | X |

Child List | Impact List | Inconsistency | Decoupling

| Number | FR Description | DP Description |
|---|---|---|
| 1.4.1 | Support data file | File handling |
| 1.4.2 | Support database | Database handling |
| 1.4.2.1 | Provide consistency during data read a... | Data file format |
| 1.4.2.2 | Control error during read/write | Exception handling |
| 1.4.2.3 | Convert data from old version | Data file converter |
| 1.4.2.4 | Read data | Method for read |
| 1.4.2.5 | Write data | Method for write |
| 1.4.2.6 | Provide utility to deal with the program... | Method for utility |
| 1.5 | Provide utility function | Plug-in software |
| 1.5.1 | Handle external applications | Standard interface for external appli... |
| 1.5.2 | Teach the axiomatic design concept | Education software |
| 1.5.3 | Simulate the system architecture | Simulation software |
| 1.5.4 | Draw the Design Parameter figure | CAD Software |
| 1.5.5 | Analyze the system performance | Analysis software(i.e. ANSYS, NAS... |
| 1.3 | Support user friendliness of the software | Graphical User Interface software |

Get data

Display Options
- Number
- Description
- Keyword

Colors
- Uncoupled Design
- Decoupled Design
- Coupled Design
- No Effect
- Has Effect
- Has Comment Help

FIG. 74

Design Matrix Table:

| A1.4.2... | DP#1 | DP#2 | DP#3 | DP#4 | DP#5 | DP#6 |
|---|---|---|---|---|---|---|
| FR#1 | X | O | O | O | O | O |
| FR#2 | O | X | O | O | O | O |
| FR#3 | X | X | X | X | O | X |
| FR#4 | X | X | O | X | O | X |
| FR#5 | X | X | O | O | X | X |
| FR#6 | O | O | O | O | O | X |

Flowchart:

Page Information
Page: 1
Document Format
☑ Customer Needs
☑ FR.DP.PV Table
☐ FR.DP.PV Comment
☑ Constraints
☑ Design Matrix
☐ Design Matrix Comment
○ Default Display
● Full Display
[SET]

Total Design Matrix Information

|        | DP.#1 | DP.#2 | DP.#3 | DP.#4 | DP.#5 |
|--------|-------|-------|-------|-------|-------|
| FR.#1  | X     | O     | O     | O     | O     |
| FR.#2  | X     | X     | O     | O     | O     |
| FR.#3  | X     | X     | X     | X     | X     |
| FR.#4  | X     | X     | O     | X     | O     |
| FR.#5  | O     | O     | O     | X     | X     |

Related Constraints

| No. | Parent | Keyword | Description | Comment | 1 | 2 | 3 | 4 | 5 | Verification |
|-----|--------|---------|-------------|---------|---|---|---|---|---|--------------|
| 1 | Designer | Impact | Make Impacts | | * | * | * | * | * | Testing |
| 2 | Marketing | Speed | Support running as fast as possible | | * | * | * | * | * | Testing |
| 3 | Designer | Bug | Eliminate bugs | | * | * | * | * | * | Testing |
| 4 | Marketing | External Application | Facilitate use with external applications | | * | * | * | * | * | Testing |
| 5 | Marketing | Multi-platform | Functions across platforms | | | | * | * | | Testing |

```
Loop One (int row=0; row<total_row_number; row++) {
   Loop Two (int column=0; column <total_column_number; column++) {
      If(maxtrix[row][column] == "empty")
         return "not defined"

If(row == column) {
         If(matrix[row][column] == "O")
            return "not defined"
      }
   }
}
return "defined"
```

If one of the diagonal element has "O", the design is not defined in terms of the axiomatic design viewpoint

FIG. 83

```
Loop One (int row=0; row<total_row_number; row++) {
   Loop Two (int column=0; column <total_column_number; column++) {
      If(row != column) {
         If(matrix[row][column] == "X")
            return "not uncoupled"
      }
   }
}
return "uncoupled"
```

FIG. 84

METHOD AND APPARATUS FOR PRODUCING SOFTWARE

RELATED APPLICATION

This application claims the benefit under Title 35, U.S.C. § 119(e) of U.S. Provisional Application Ser. No. 60/169,145, filed Dec. 6, 1999, entitled "Method and Apparatus for Producing Software" by Sung-Hee Do, the contents of which are incorporated herein by reference.

FIELD OF THE INVENTION

The invention relates generally to software systems, and more specifically to a system and method for designing and producing software code.

BACKGROUND

There are many different methods for producing software. Generally, software is designed and produced manually by programmers. Programmers design and program the software architecture in some type of programming language such as C, C++, Java, or the like. There are problems with manual methods of software design, in that the quality of manual methods generates flawed code because of human error. Further, software design is not optimized because software design processes are performed by humans using non-optimizing processes. For example, individuals may develop individual modules of code that perform redundant functions, exchange unnecessary information, or depend on other modules in an inefficient manner. Further, when these modules are modified, the software design needs to be retested, as there is typically relationships between modules that have been modified and other modules that access them. Also, individuals may develop certain code modules that cannot be reused in later projects.

Also, the design and production of quality software is a typically a long-term process involving design, coding and testing periods. Because software production cycles must decrease to meet shorter design schedules, it would be beneficial to have a software system and method that produces code in an error-free, efficient, and expedient manner. Also, it would be beneficial to be able to reuse software code between projects. In summary, existing methods for producing software are non-optimal, resulting in increased cost of development, high maintenance costs, limited reusability, the need for extensive debugging and testing, and poor documentation.

SUMMARY

A system and method is provided which allows a programmer to design and generate programs in an error-free and expedient manner, and allows software reuse. According to one embodiment of the invention, a system and method is provided which allows a programmer to apply axiomatic design principles to design and generate software. More specifically, the system and method allows a programmer to define a set of functional requirements (FRs) that describe what the software is to achieve. The system allows the programmer to generate software based on design parameters (DPs) that describe the software system such as inputs, hardware, ASICs (application specific integrated circuits), software, or other aspects of the software system that meet the functional requirements.

A relation between FRs and DPs can be described in a mathematical manner by a design matrix. An uncoupled or decoupled design matrix may describe a system which has no feedback loops, and therefore the software system is more easily changed, because a change in one portion of the software does not have an unknown affect on another portion of the software through feedback. Software code may be automatically generated from the axiomatic design. Because the software system may be described and generated in a systematic manner, software quality is improved. Also, the time for producing the software is decreased because the quality is high, and there is less direct coding by the programmer.

These and other advantages are provided by:

A digital information product comprising a computer-readable medium, and stored on the computer-readable medium, computer program instructions defining a software system that produces software code based on a set of functional requirements provided by a programmer. According to one embodiment of the invention, the computer program instructions, when executed, allow the programmer to define a design matrix describing a relation between the set of functional requirements and the design parameters. According to another embodiment of the invention, the computer program instructions, when executed, allow a programmer to manipulate the design matrix into lower triangular form. According to another embodiment of the invention, the computer program instructions, when executed, allow a programmer to determine an decoupled design matrix. According to another embodiment of the invention, the computer program instructions, when executed, allow a programmer to determine an uncoupled design matrix.

According to another embodiment of the invention, the method comprises defining a design matrix describing a relation between functional requirements of the software system and design parameters; and generating software code based on the design matrix. According to another embodiment of the invention, the method further comprises a step of constructing functions using diagonal elements of the design matrix. According to another embodiment of the invention, the method further comprises a step of defining a flow description that describes a flow of the software system. According to another embodiment of the invention, the method further comprises a step of defining a software module corresponding to at least one functional requirement. According to another embodiment of the invention, the software module is defined based upon the flow description.

According to another embodiment of the invention, the method further comprises a step of defining a plurality of software modules, each of which corresponds to a respective functional requirement. According to another embodiment of the invention, the method further comprises relating the plurality of software modules by junctions. According to another embodiment of the invention, the method further comprises a step of combining the plurality of software modules according to their junctions. According to another embodiment of the invention, at least one of the junctions is selected from a group including a summation junction, a control junction, and a feedback junction.

According to another aspect of the invention, a method for producing software is provided comprising defining a design matrix describing a relation between functional requirements of the software system and design parameters; and generating software code based on the design matrix. According to another embodiment of the invention, the step of defining includes determining a design matrix having a lower triangular form. According to another embodiment of the invention, the step of defining includes determining an uncoupled design matrix. According to another embodiment of the invention, the step of defining includes determining a design matrix having a diagonal form. According to another embodiment of the invention, the step of defining includes determining a decoupled design matrix. According to another embodiment of the invention, the step of generating comprises: generating a plurality of models; and outputting the models to a code generator. According to another embodiment of the invention, the step of generating comprises generating at least one diagram describing an object-oriented object structure. According to another embodiment of the invention, the at least one diagram is in a Unified Modeling Language (UML) format.

According to another embodiment of the invention, the at least one diagram includes at least one of a group of diagrams comprising a use-case diagram; and an entity-relation diagram. According to another embodiment of the invention, the code generated includes object-oriented entities. According to another embodiment of the invention, the method further comprises a step of defining an object-oriented class using at least one functional requirement. According to another embodiment of the invention, the method further comprises a step of defining a child of the object-oriented class using at least one functional requirement. According to another embodiment of the invention, the method further comprises a step of defining a grandchild of the object-oriented class using at least one functional requirement. According to another embodiment of the invention, the grandchild of the object-oriented class defines behavior of the class. According to another embodiment of the invention, at least one functional requirement represents at least one object-oriented software entity. According to another embodiment of the invention, the generated software code is source code.

According to another aspect of the invention, a method for designing software is provided which involves object-oriented software objects, the method comprising defining a design matrix describing a relation between a plurality of functional requirements of the software system and design parameters; representing at least one object-oriented object by at least one of the functional requirements; representing data used by the at least one object-oriented software object by at least one of the design parameters; and representing a method of the at least one object-oriented software object by a product of a portion of the design matrix and the at least one design parameter. According to another embodiment of the invention, the method further comprises defining a plurality of functional requirements and constraints of the software system. According to another embodiment of the invention, the method further comprises a step of decomposing at least one functional requirement into leaf elements. According to another embodiment of the invention, the method further comprises a step of decomposing at least one design parameter into leaf elements. According to another embodiment of the invention, the method further comprises a step of decomposing at least one process variable into leaf elements.

According to another aspect of the invention, a method for designing software is provided comprising defining a software system by defining a design matrix describing a relation between functional requirements of the software system and design parameters implementing the software system; defining at least one object-oriented object; and defining at least one method that may be defined on the at least one object, wherein the at least one object-oriented object and the at least one method are related to the design matrix. According to another embodiment of the invention, the method further comprises defining an object class of the at least one object-oriented object that represents a first level of functional requirements of the design matrix. According to another embodiment of the invention, the method further comprises defining an instance of the object class represented by a second level of functional requirements of the design matrix. According to another embodiment of the invention, the method further comprises defining behavior of the object class as a third level of functional requirements of the design matrix. According to another embodiment of the invention, the first, second, and third levels are successive levels of a functional requirement hierarchy. According to another embodiment of the invention, the method further comprises mapping the functional requirements into a physical implementation domain by defining design parameters.

According to another embodiment of the invention, the method further comprises a step of construction functions using diagonal elements of the design matrix. According to another embodiment of the invention, the step of defining a software system includes determining whether the design matrix is uncoupled. According to another embodiment of the invention, the method further comprises generating a plurality of models and outputting the models to a code generator. According to another embodiment of the invention, the step of generating comprises generating at least one diagram describing an object-oriented system structure. According to another embodiment of the invention, the at least one diagram includes at least one of a group of diagrams including a use-case diagram; and an entity-relation diagram. According to another embodiment of the invention, the at least one diagram is in a Unified Modeling Language format.

According to another aspect of the invention, a database format is provided for designing a software system comprising a software design specification, wherein the design specification defines a design matrix describing a relation between a plurality of functional requirements of the software system and design parameters, wherein the design specification represents at least one software object by at least one of the functional requirements, and wherein the design specification represents data used by the at least one software object by at least one of the design parameters; and software code produced by the design specifications. According to another embodiment of the invention, the software design specification further comprises a design identification identifying the software code. According to another embodiment of the invention, the software design specification further comprises a detailed design description including the design matrix, functional requirements and design parameters. According to another embodiment of the invention, the software design specification further comprises a detailed design description including the design matrix, functional requirements and design parameters. According to another embodiment of the invention, the software design specification further comprises a design identification identifying the software code. According to another embodiment of the invention, the design parameters are arranged in a plurality of levels, and wherein each of the plurality of levels can be referenced by another software system. According to another embodiment of the invention, the database format for designing a software system is used in a software production system, and a user operating the software production system is capable of creating software comprising one or more elements of the software system. According to another embodiment of the invention, the software production system further comprises a user interface and a database implementing the database format, and the software production system is capable of searching through the database to obtain one or more elements of the software system to create a new software system. According to another embodiment of the invention, a new element of the new software system interfaces with one or more elements of the software system, and the software production system is operable to verify that the interface is operable. According to another embodiment of the invention, the software production system is configured to verify a consistency of design of the new software system.

According to another embodiment of the invention, the software production system is configured to search design parameter information, including at least one of description information, keywords associated with the software system, categories in which the software system is assigned, and comments. According to another embodiment of the invention, the software code is in executable form. According to another embodiment of the invention, the software code is source code. According to another embodiment of the invention, the software production system is configured to verify a consistency of design of the new software system by checking a consistency between a first level of design implementing a design parameter from the database and a second level of design of the new software system. According to another embodiment of the invention, the second level of design is a child of the first level of design. According to another embodiment of the invention, a new element of the new software system interfaces with one or more elements of the software system, and the software production system is operable to verify that the interface is operable.

According to another aspect of the invention, a database format for designing a software system is provided comprising design identification information identifying information describing the software system; detailed design description information describing the structure and operating qualities of the software system; and software code information associated with the software system. According to another embodiment of the invention, the detailed design description defines a design matrix describing a relation between a plurality of functional requirements of the software system and design parameters, wherein the design specification represents at least one software object by at least one of the functional requirements, and wherein the detailed design description represents data used by the at least one software object by at least one of the design parameters. According to another embodiment of the invention, the software code information comprises source code.

According to another aspect of the invention, a method is provided for generating software code associated with a software system, the method comprising defining a design matrix describing a relation between functional requirements of the software system and design parameters; and generating software code based on the design matrix. According to another embodiment of the invention, the method further comprises defining a plurality of functional requirements and constraints of the software system. According to another embodiment of the invention, the method further comprises a step of decomposing at least one functional requirement into leaf elements. According to another embodiment of the invention, the method further comprises a step of decomposing at least one design parameter into leaf elements. According to another embodiment of the invention, the method further comprises a step of decomposing at least one process variable into leaf elements. According to another embodiment of the invention, the software code is written in a modeling code language. According to another embodiment of the invention, the software code is executable by a computer system. According to another embodiment of the invention, the modeling code language is the Unified Modeling Language (UML). According to another embodiment of the invention, the software code describes at least one diagram of a group comprising a class diagram; an interaction diagram; a collaboration diagram; a sequence diagram; a state diagram; and an activity diagram.

According to another embodiment of the invention, the method further comprises a step of relating the design matrix to at least one element of the at least one diagram. According to another embodiment of the invention, the system creates a use-case diagram based upon the design matrix. According to another embodiment of the invention, the method further comprises defining a plurality of customer needs, the plurality of needs being arranged in a hierarchical tree having levels, and wherein at least one of the levels relates to a layer of a use-case diagram. According to another embodiment of the invention, the use-case diagram includes a relation layer, a use case layer and an actor layer. According to another embodiment of the invention, the actor layer represents one or more actors.

According to another embodiment of the invention, the use case layer describes customer needs that are attributed to the actor. According to another embodiment of the invention, the relation layer describes a relationship between customer needs in customer needs in the use case layer. According to another embodiment of the invention, the relationship is a semantic connection among model elements. According to another embodiment of the invention, the software code includes a model file which describes the modeling code. According to another embodiment of the invention, the model file is suitable for use as an input file for use by a software production system to create a software system.

According to another aspect of the invention, a computer-readable medium is provided which is encoded with a program that, when executed on a computer system, performs a method for rendering an interface through which a user may interact, the method comprising steps of displaying a software design interface, wherein the interface displays a set of functional requirements upon which a software design is based, and wherein the interface displays a design matrix describing a relation between the set of functional requirements and design parameters implementing the software design. According to another embodiment of the invention, the computer system performs a step of indicating, in association with the displayed design matrix, whether the software design specified by the design matrix is at least one of a group including a decoupled, uncoupled or coupled design.

According to another embodiment of the invention, the design matrix represents a coupled design, and wherein the computer system performs a step of indicating, in association with the displayed design matrix, whether a design parameter associated with the design matrix is coupled. According to another embodiment of the invention, the computer system performs a step of indicating, for the design parameter associated with the design matrix, an alternate rearrangement of the design parameter wherein the design parameter, if rearranged, is uncoupled or decoupled. According to another embodiment of the invention, the computer system performs a step of indicating, for the design matrix, an accuracy of the software design with respect to an optimum design.

According to another embodiment of the invention, the computer system performs a step of indicating, for the design matrix, a range of acceptable inputs over which the design matrix operates. According to another embodiment of the invention, the computer system performs a step of arranging and displaying the functional requirements and design parameters to the user in a hierarchical manner. According to another embodiment of the invention, the computer system performs a step of displaying the functional requirements and design parameters in a hierarchical tree having a plurality of levels. According to another embodiment of the invention, the computer system performs a step of indicating a robustness of the software. According to another embodiment of the invention, the computer system performs a further step of creating, based upon an arrangement of the design parameters, a Gantt chart describing production dependencies of the software design.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears. All references cited herein are expressly incorporated by reference.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings,

Figure 2:
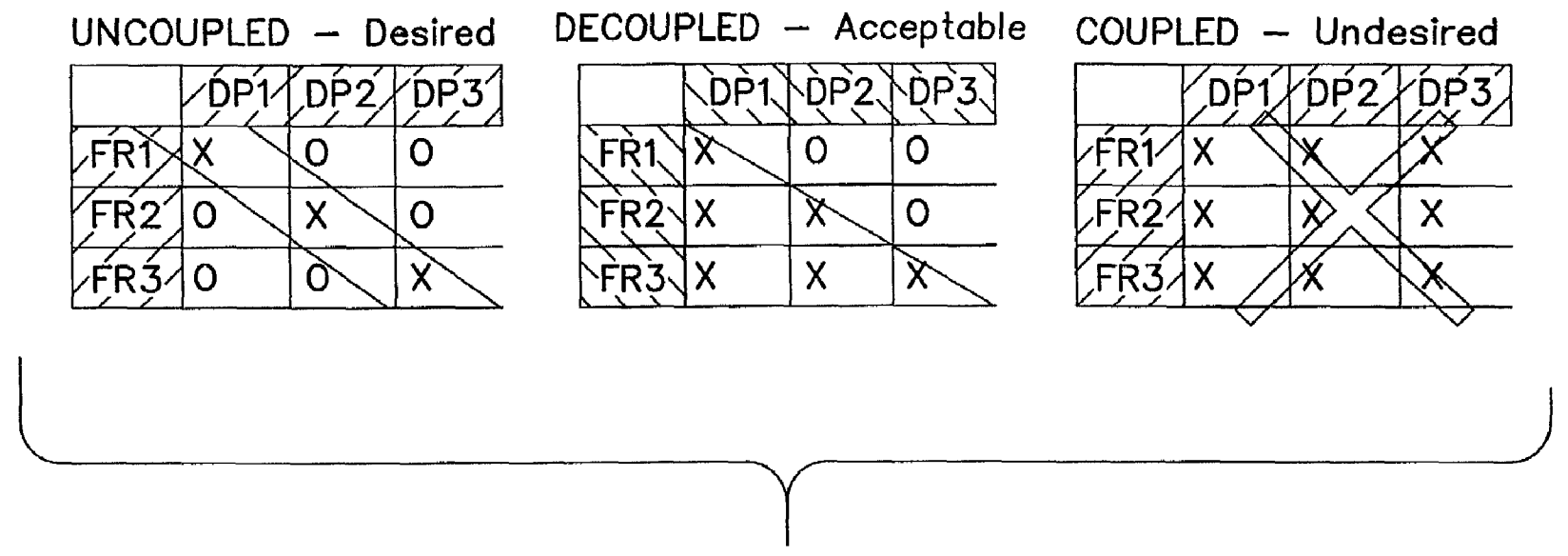

FIG. 2 is a block diagram showing different types of design matrices;

FIG. 12 is a block diagram of an example design matrix according to one embodiment of the invention;

FIG. 26 is a block diagram of an example design matrix according to one embodiment of the invention;

FIG. 28 is a block diagram of example classes according to one embodiment of the invention;

FIG. 30 is a block diagram of class definitions according to one embodiment of the invention;

FIG. 40 is an example functional requirements (FR) table according to one embodiment of the invention;

FIGS. 45A-B shows tables mapping functional requirements (FR) to design parameters (DP);

FIGS. 46A-B are tables showing FRs mapped to multiple alternative DPs;

FIGS. 47A-B show tables relationships between parent FR/DP information and child FR/DP;

FIGS. 48A-B show a parent numbering structure according to one embodiment of the invention;

FIGS. 49A-B show tables mapping FRs and constraints according to one embodiment of the invention;

FIG. 51 is a block diagram showing an interface relating actual restraints to a design according to one embodiment of the invention;

FIGS. 52A-C show alternative user interfaces according to one embodiment of the invention;

FIG. 53 shows an example nested design matrix table according to one embodiment of the invention;

FIGS. 54A-C show alternative user interfaces according to one embodiment of the invention;

FIG. 58 shows an alternative DP toggle button within an FR/DP or DP/PV handling window;

FIG. 62 shows a user interface that automatically displays a resized design matrix based on the number of FRs and DPs;

FIG. 66 shows a user interface through which a user may adjust numbering scheme of the design according to one embodiment of the invention;

FIG. 68 shows an example user interface used to adjust color-coding for legends;

FIG. 72 shows one alternative user interface according to one embodiment of the invention;

FIG. 73 shows a user interface displaying child lists according to one embodiment of the invention;

FIG. 74 shows a user interface displaying an impact list showing effects of a change throughout a design hierarchy in accordance with one embodiment of the invention;

FIG. 75 shows an example flowchart display derived from a design matrix according to one embodiment of the invention;

FIG. 83 shows one process that determines whether elements of the design are undefined according to one embodiment of the invention;

FIG. 84 shows one process that determines whether a design is uncoupled according to one embodiment of the invention;

DETAILED DESCRIPTION

According to one embodiment of the invention, a new software design methodology is provided that is based on axiomatic design theory. In one aspect, axiomatic design theory is adapted for use in designing object-oriented software programs. This methodology overcomes the shortcomings of various software design strategies including extensive software development and debugging time and the need for extensive maintenance. Because traditional software design strategies are not heuristic and do not provide basic principles for the development of good software systems, bad design habits produce poor quality software. A design framework using axiomatic design for software overcomes many of the shortcomings of current software design techniques: high maintenance costs, limited reusability, the need for extensive debugging and testing, poor documentation, and limited extensibility of the software, all of which result in high development cost of software.

Figure 1:
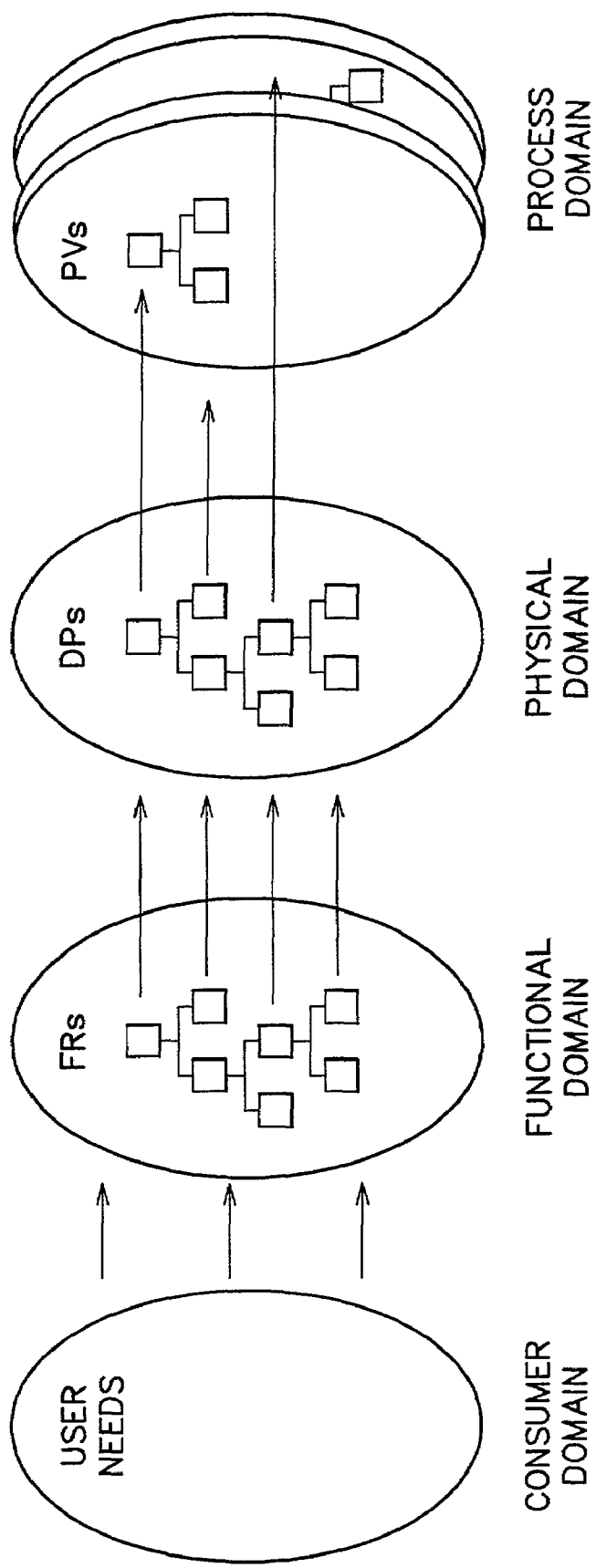
FIG. 1 is a block diagram illustrating concepts of domain, mapping and spaces.

According to one embodiment of the invention, a software designer or developer describes their software based on features which depends on the programming language or software design methodology. Axiomatic design methodology combines the concept of "what we want to achieve" and "how we want to achieve it" and is represented as a single concept in terms of axiomatic design. In particular, axiomatic design defines a concept of domains which isolates representation of the software system. A domain termed the functional domain captures the concept for "what we want to achieve" and indicates as elements of the domain a set of functional requirements (FRs). The physical domain represents "how we want to achieve it" and indicates as elements of the domain a set of design parameters (DRs). Two other domains exist. One is the customer domain which captures customer needs (CNs) defining customer requirements of the software system. The other is a domain termed the process domain that represents process variables (PVs) defining the existing environment in which the software system operates. All these domains are illustrated in FIG. 1. By using FRs and DPs to describe software, a software designer can create a clear description for their software.

The specific nature of CNs, FRs, DPs and PVs of a software design depends upon the specific nature or goals of the software:

CNs: Users' needs or customer attributes which the software program must satisfy.

FRs: Outputs or the specifications or the requirements of a program code or software module or a system.

DPs: (1) Inputs or modules in case of pure algorithms or
(2) Hardware such as sensors, ASICs (application specific integrated circuits), or other hardware that interface with software systems.

PVs: Program code (source code including subroutines, modules, or the like, or machine code) or compilers.

Various advantages of designing software using axiomatic design principles using a software production methods and systems according to various embodiments of the invention include:

Guarantees the quality of software. A design matrix may be used to describe a relation between FRs and DPs. The design matrix can be represented as Equation (1) in mathematical manner. If the design matrix is diagonal, each of the FRs can be satisfied independently by means of one DP. Such a design is called an uncoupled design. If the matrix is triangular, the independence of FRs can be guaranteed if and only if the DPs are changed in a proper sequence. Such a design is called a decoupled or quasi-coupled design. All other cases are referred to as a coupled design. FIG. 2 shows these different types of designs. If the design matrix for the software is uncoupled or decoupled, it guarantees software quality or "goodness".

$$\{FRs\} = [A]\{DPs\}$$

$$[A] = \begin{bmatrix} A11 & A12 & A13 \\ A21 & A22 & A23 \\ A31 & A32 & A33 \end{bmatrix} \quad (1)$$

$$A_{ij} = \frac{\partial FR_i}{\partial DP_j}$$

Improve reusability: The FRs, DPs and PVs are decomposed until the design can be implemented without further decomposition to create a design hierarchy. Decomposition of FRs, DPs, and PVs are not accomplished by determining a solution in a single domain, but rather designs are determined by working recursively between domains, referred to as "zigzagging" between the domains. Decomposition of FRs is generally performed until the design task can be implemented without further decomposition.

The design hierarchy may have a different shape depending on a higher-level design decision, meaning that if a designer selects different DPs for one level to make an uncoupled or decoupled design, the child level information may vary depending on the DP selection. This design feature improves reusability because lower-level details of a program do not require modification if changes are made at a higher level of the design hierarchy. For example, after a company designs their software using axiomatic design principles, they may want to choose previously-designed DPs for their new software project. Decomposition for the previously-designed DPs are not required; only a small amount of modification of the source code which represents the previously-designed DPs and their associated lower level hierarchies to fit the new project may be needed. Therefore, the result of each individual software development project can be stored in a storage structure such as a design database and referred to by a programmer at any time.

Figure 3:
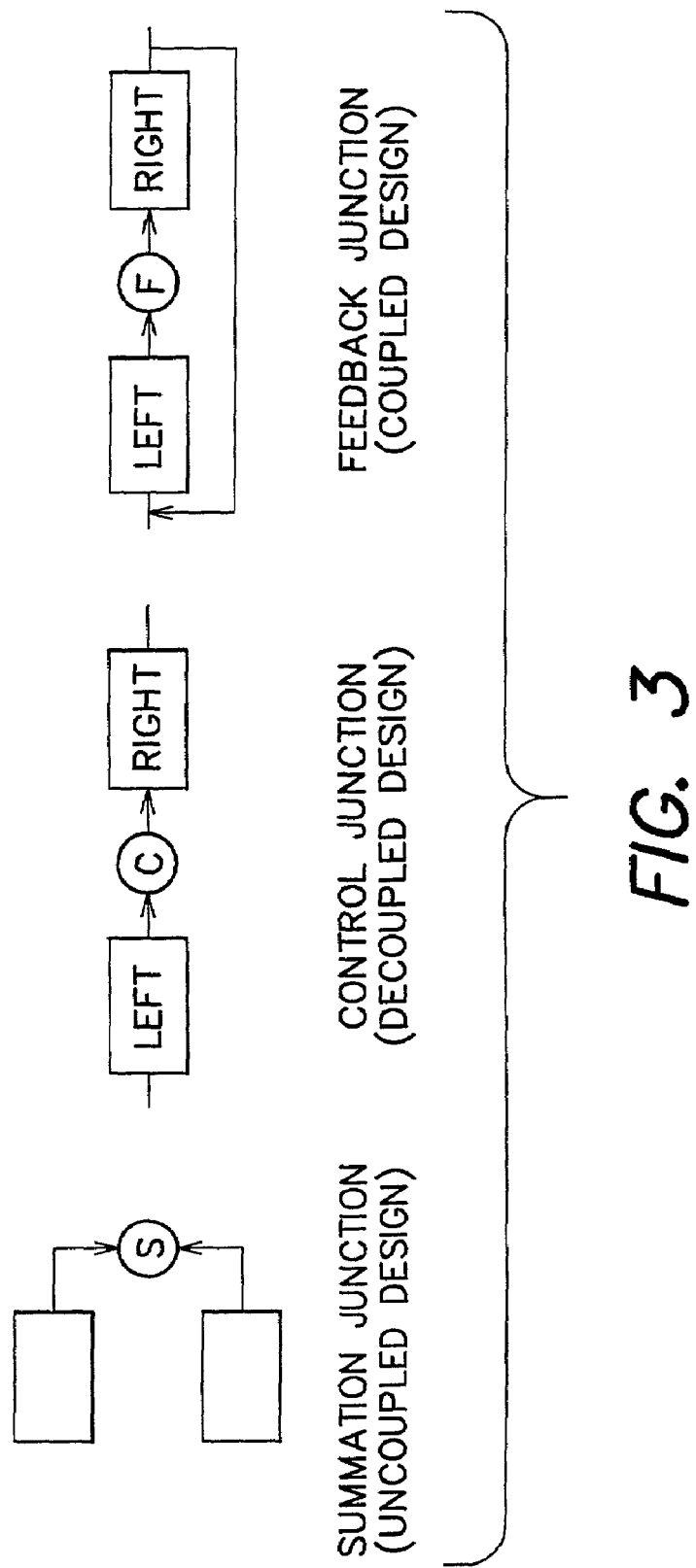
FIG. 3 is a block diagram showing different types of control junctions.
Figure 4:
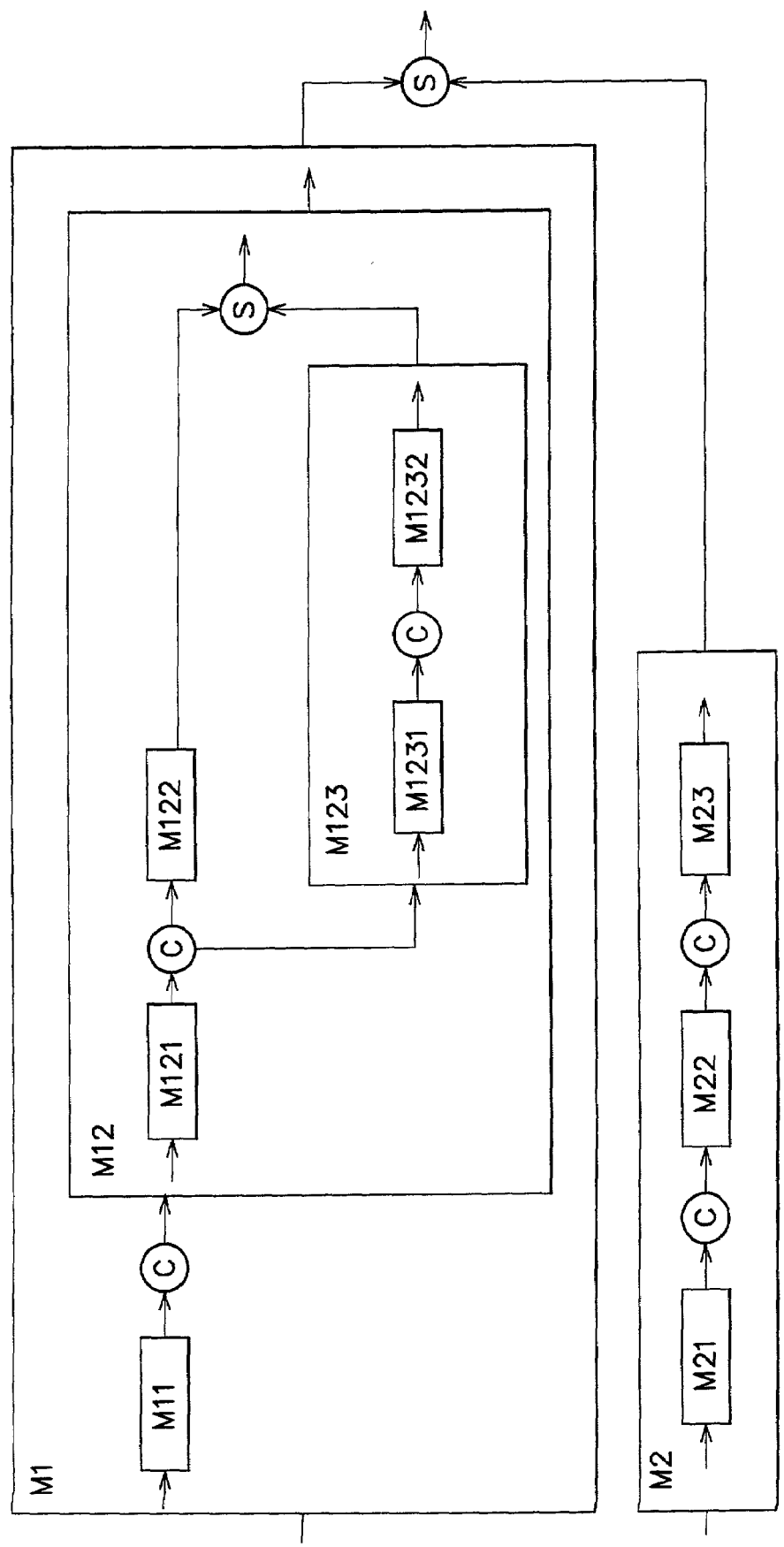
FIG. 4 is a block diagram showing different types of system architecture.

Low maintenance cost: The system architecture (sometimes referred to as a flow diagram or flow chart) reveals the design sequences between the modules which is defined in terms of the (FR/DP) or (DP/PV) relationship. FIG. 3 shows several different junction types through which modules may be connected, these junctions representing relationships between modules. This figure is determined by the design matrix. Once a software is design finished, it is much easier to follow changes during the development and maintenance processes. Because the developer or manager knows how the software modules interact and which module should be checked if a change is made, maintenance cost is reduced. FIG. 4 shows an example system architecture.

Reduce extensive debugging and testing: Because a programmer does not directly code first, debugging and testing is minimized. In particular, the axiomatic design method forces a programmer to develop a design prior to coding the design. Detailed information for the design is defined during the design process. Therefore, software coding is straightforward. If there is something wrong with the software code, a designer or programmer analyzes and revises the design document which represents and determines the specific code. Also, the developed software can be tested with the FRs information step by step, because the FRs each represent specific software requirements.

Provides clear documentation: Axiomatic design requires determining the FRs, DPs, PVs and design matrix prior to coding. According to one aspect of the invention, descriptions have a same format and contain notes such as keywords, comments and the like. According to another embodiment of the invention, a design document is automatically defined by a software production system based upon the actual design that allows communication between designers, managers, and developers. Automatic documentation for software is beneficial, because documentation is standardized among programmers and more time may be devoted to development in lieu of writing software documentation.

Guarantees extensibility of the software: As discussed, conventional software systems are generally coupled systems having feedback. Thus, it is typically difficult to extend the previously-developed software because, in a system having feedback, a change in one module may have an adverse affect on the operation of another system. In most cases, new software that entirely replaces the previously-developed software is needed to incorporate new features. To resolve coupling in systems, the relationship between each individual feature should be checked and this checking requires detailed information regarding the system. Currently, there are no methods for revealing this coupling in current software designs.

Analysis of a system is currently performed manually by designers or programmers' intuition (referred to as ad-hoc design).

Axiomatic design provides design tools such as tools for creating a design matrix and system architecture. By using these axiomatic design tools, creating or extending a software system is straightforward. For example, to extend an existing system, the following steps are typically performed: add the required feature for the extension in terms of FR/DP or DP/PV, check the relation using the design matrix and determine if any modules are impacted by the change and adjust the program accordingly. If a designer determines an uncoupled or decoupled design using these axiomatic design tools, the extension is automatically verified.

Reduces development costs of software: High costs are associated with long software development, and debugging time, the need for maintenance, and uncertain reliability. In general, software development is a labor-intensive business. Because every single development process in the software development life cycle is conducted clearly and sequentially, delays drastically affect the overall development cycle. By implementing axiomatic design principles, designers and managers can determine the state of the development process and can estimate the next step rather than treating software as a block box. This knowledge provides designers and managers more opportunities to reduce development cost.

The goals of software engineering should be twofold: first algorithmic efficiency should be enhanced so as to reduce execution time. Second, productivity should be enhanced so as to reduce coding, extension, and maintenance effort. As computer hardware rapidly evolves and the need for large-scale software systems grows, productivity is increasingly more important in software engineering. The so-called "software crisis" is closely tied to productivity of software development [R. S. Pressman, Software Engineering, A Practitioner's Approach, 4$^{th}$ ed., New York: McGraw Hill, 1997].

Several design methodologies for software systems have been proposed in the past. Two decades ago, structured methods, such as structured design and structured analysis, were most commonly used [T. DeMarco, Structural Analysis and System Specification, New Jersey: Prentice Hall, 1979]. Structured methods focus on only the process and generally follows a top-down approach. Therefore, another concept (referred to as a data structure) used to represent data was introduced. As the need for productive software systems has increased, the object-oriented method has become the basic programming tool which follows a bottom-up design approach [B. J. Cox, Object-Oriented Programming, Reading, Mass., Addison-Wesley, 1986]. Object-oriented programming emphasizes the need to design software right during the early stages of software development and emphasizes the importance of modularity of objects that include process and data together. However, even with object-oriented methods, there are many problems that intelligent software programmers face in developing and maintaining software over its life-cycle. Although there are several reasons for these difficulties, the main reason is that the current software design methodology does not provide any criterion by which a developer can create good software a priori. Modularity alone does not assure good software, since even a set of independent modules can couple software functions.

The axiomatic design (AD) approach has been used primarily for design of mechanical systems and has been proposed for software design in particular [S. J. Kim, N. P. Suh, and S. K. Kim, "Design of software systems based on axiomatic design," Annals of the CIRP, Vol. 40, No. 1, pp. 165-170, 1991]. In axiomatic design, a scientific approach is used for the design process that had previously been conducted heuristically or in an ad-hoc manner. The design process begins with the definition of functional requirements (FRs). The axiomatic design process is generally described as the mapping between functional and physical domains and also between the physical and process domains. During the mapping process, two axioms—the Independence Axiom and the Information Axiom—must be satisfied. The design task includes satisfying a set of specified FRs of the functional domain by mapping FRs to design parameters (DPs) in the physical domain as shown in FIG. 1. FRs and DPs are decomposed through zigzagging until the design goals can be implemented. These mapping and zigzagging processes assist designers to generate successful designs, as software design is approached in an organized and deterministic manner. Also, axiomatic design principles can be applied to many system design problems. Further, because axiomatic design principles are mathematically-based and described using common engineering terms, the design principles are relatively easy for engineers to understand.

The AD approach or framework has been successfully applied to software design. However, according to one aspect of the invention, axiomatic design theory is applied to object-oriented design methods to create a software system in a systematic and productive manner. The basic idea used for the design and development of software systems is similar to that used for hardware components and other systems, and thus the integration of software and hardware design is a straightforward exercise for the software developer.

There are similarities between the AD framework and the object-oriented method which can be used to relate the two. For example, the concept of "inheritance and aggregation" in the object-oriented method is similar to the "tree structure" in the AD framework. Also, an "association" in the object-oriented method represents a part of the concept embedded in the "design matrix" of the AD framework. There are several differences, however, between the AD framework and current object-oriented software design methodologies. These differences become apparent as details of axiomatic design and object-oriented method are compared. Simply stated, the object-oriented method deals only with the DPs (implementation details) and not the FRs (function requirements of the system) of axiomatic design, and thus it is difficult to verify that the software design is good a priori. Another difference is that the AD framework implements a top-down approach to create a complete hierarchy of FRs and DPs by a zigzagging process between the domains until lowest level FRs and DPs (i.e., leaves) are created, whereas the object-oriented method can be completed by a bottom-up approach. Axiomatic design principles allow a programmer to use both methods to realize a software system. The AD framework supports both benefits from structured methods and object-oriented methods and provides criteria for design decision making in order to create quality software systems.

Introduction

The development of a software system based on axiomatic design and object oriented programming technique is described. According to one aspect of the invention, axiomatic design of object-oriented software systems provides a major new paradigm shift in the field of software engineering. This new method combines the power of axiomatic design with a popular software programming methodology referred to in the art as the object-oriented programming technique (OOT). One goal of this method is to make software development processes a subject of science rather than an ad-hoc art, thus reducing and/or eliminating the need for debugging and extensive software changes.

In software engineering, it is well known that software should be developed or written with independent modules. However, conventional module used in typical software does not meet the rigid definition of a module used in axiomatic design. In particular, these modules are defined as Equation (2). Also, collections of conventional modules are generally coupled. Furthermore, the decomposition of software is often performed in the heads of the programmers based on their experience; programmers do not explicitly define FRs, perform mapping or zigzagging to define a system, nor do they write down design equations related to that system. Therefore, the use of independent modules themselves does not generate uncoupled software design. To create quality software, the relationship between the modules should be designed to make them work independently and explicitly. These shortcomings can be overcome by designing software first based on axiomatic design principles.

$$M_i = \sum_{j=1}^{j=i} \frac{\partial FR_i}{\partial DP_j} \frac{\partial DP_j}{\partial DP_i} \quad (2)$$

In particular, the AD framework disclosed herein ensures that the modules are correctly defined and located in the right place, and in the right order. A "V model" concept was recently introduced to improve the quality in mechanical system [B. El-Haik, "The Integration of Axiomatic Design in the Engineering Design Process", 11$^{th}$ Annual RMSL Workshop, May 12, Detroit, U.S.A, 1999]. Because the idea of V-models may be adapted for software production, a modified version of the "V model for software" is disclosed here which adapts the idea of using object-oriented software design within the AD framework.

Figure 5:
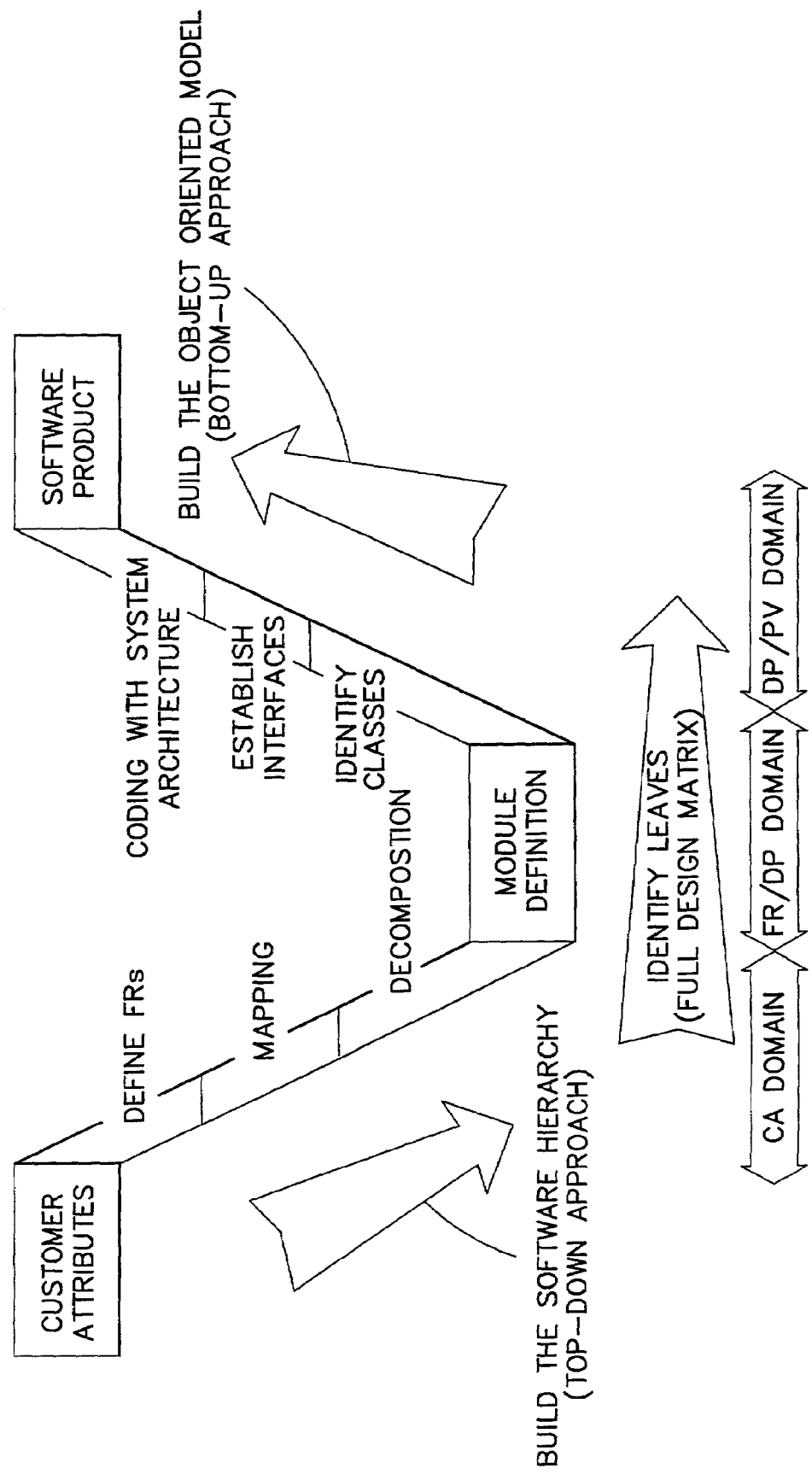
FIG. 5 is a block diagram showing an axiomatic design process for designing object-oriented software according to one embodiment of the invention.

The V-model process as applied to object-oriented programming includes three general steps. First, the process designs the software system based on axiomatic design, i.e., decomposition of FRs, DPs and PVs, the design matrix, and the modules as defined by axiomatic design. Second, the process represents the software design using a full design matrix table and a flow diagram, which provide the well-organized structure for software development. Third, the process builds the software system based on the flow diagram and DP/PV relation using object-oriented concepts. This axiomatic approach enhances software productivity because it provides a roadmap for designers and developers of the software system and eliminates functional coupling between elements. FIG. 5 schematically represents the process, which will be explained in more detail later in this section.

Definition of Terminology for Object-Oriented Software Systems

One of the difficulties associated with learning Object-Oriented techniques (OOT) is the definition of key words that describe object-oriented methods. For example, Table 1 depicts the plurality of key words used to describe the same concepts in object-oriented programming. In this section, OOT is described by using the keywords used in OOT and equivalent terms are shown below with respect to Table 1 below:

TABLE 1

Several Definitions for the class structure

| Developed by | Class | Association | Generalization | Aggregation |
|---|---|---|---|---|
| Booch | Class | Has | Inherits | Containing |
| Coad | Class & Object | Instance Connection | Gen-Spec | Part-Whole |
| Jacobson | Object | Acquaintance Association | Inherits | Consist of |
| Odell | Object Type | Relationship | Subtype | Composition |
| Rumbaugh | Class | Association | Generalization | Aggregation |
| Shlaer/Mellor | Object | Relationship | Subtype | N/A |

Figure 6:
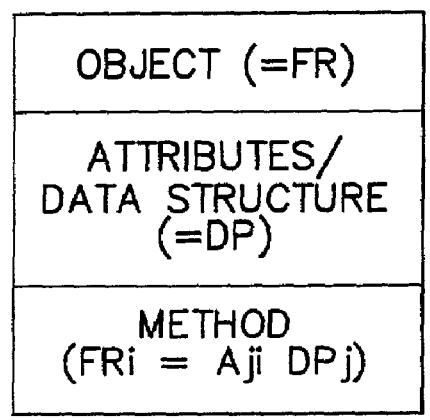
FIG. 6 is a block diagram showing an object representation in terms of functional requirements according to one embodiment of the invention.

Object-oriented methodology (OOM) is generally a conceptual process that is independent of any programming language until a final code creation stage. OOM is a formal method of creating a software structure and abstraction, helping designers to express and communicate abstract concepts. The fundamental construct for the object-oriented method is the object, which, according to one embodiment of the invention, is equivalent to FRs. Object-oriented design decomposes a system into objects. Objects "encapsulate" both data, and methods in a single entity. According to one embodiment, data are equivalent to DPs and methods are equivalent to relationships between FRs and DPs, i.e., a module. An object retains certain information on how to perform certain operations, using the input provided by the data and the method imbedded in the object. In terms of axiomatic design, this is equivalent to saying that an object is [FRi=Aij DPj]. A graphical representation of an object is shown in FIG. 6.

Object-oriented design generally uses four definitions to describe its operations: identity, classification, polymorphism and relationship. Identity means that data—equivalent to DPs in one embodiment—are incorporated into specific objects. Objects are equivalent to an FR—with a specified [FRi=Aij DPj] relationship—of axiomatic design, where DPs are data or input and Aij is a method or a relationship.

In axiomatic design, the design equation explicitly identifies the relationship between FRs and DPs. The term classification means that objects with the same data structure (attributes) and behavior (operations or methods) are grouped into a class. The object is typically represented as an instance of specific class in programming languages. Therefore, all objects are instances of some classes. A class represents a template for several objects and describes how these objects are structured internally. Objects of the same class have the same definition both for their operations and for their information structure.

Figure 7:
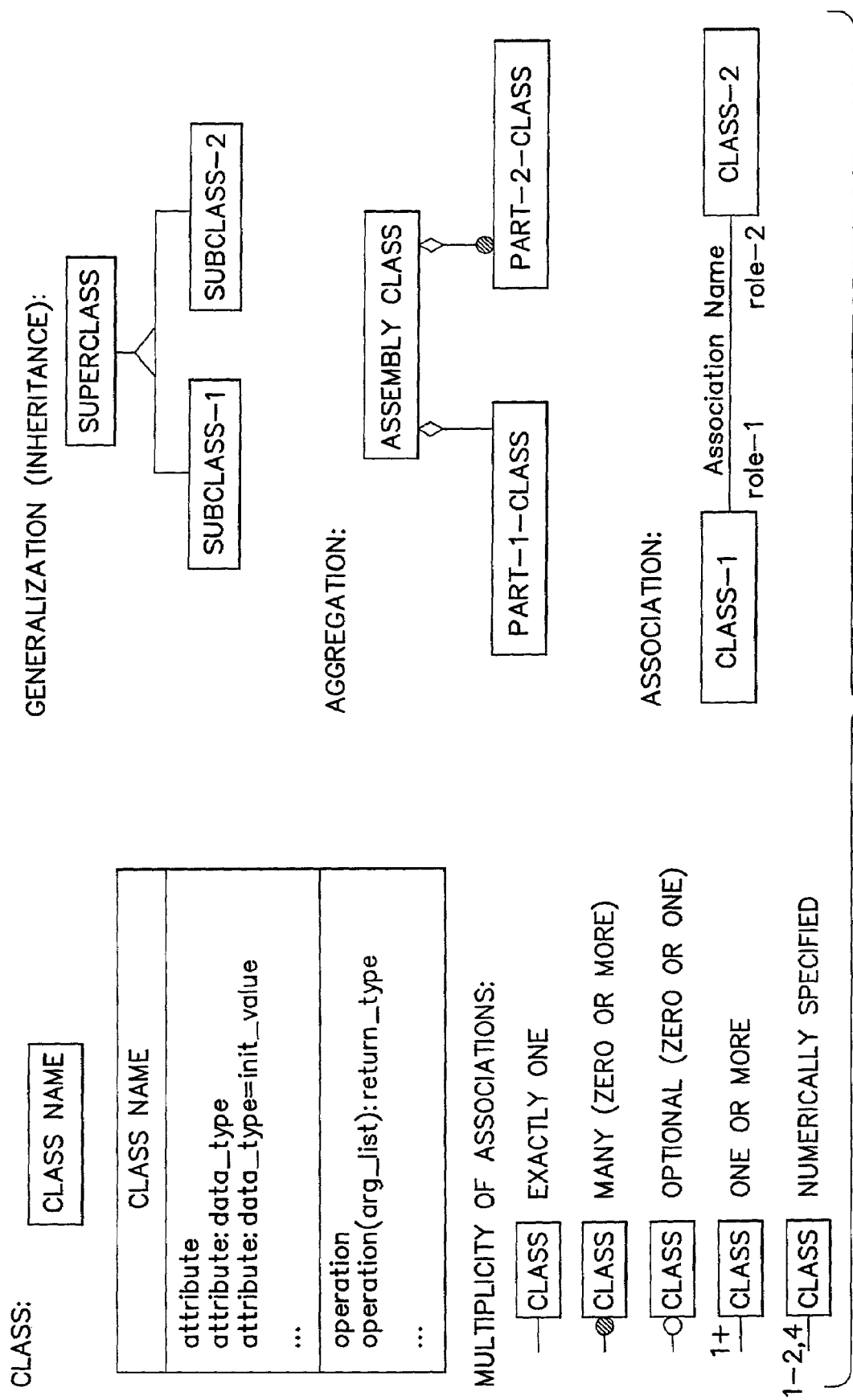
FIG. 7 is a block diagram illustrating Rumbaugh's object model notation.

The term polymorphism means that the same operation may behave differently on different classes and therefore, two or more classes of objects respond to a received message each in its own way. A move operation, for example, may behave differently on Window and Chess Piece classes of a game program. The term, relationship describes the interactions between objects or classes. These interactions can be of the following types as shown in FIG. 7. FIG. 7 is a block diagram illustrating J. Rumbaugh's well-known object model notation [J. Rumbaugh, M. Blaha, W. Premerlani, F. Eddy, and W. Lorensen, Object-Oriented Modeling and Design, New Jersey: Prentice Hall, 1991].

Relationships between objects and classes are established by means of Links and associations [J. Rumbaugh, M. Blaha, W. Premerlani, F. Eddy, and W. Lorensen, Object-Oriented Modeling and Design, New Jersey: Prentice Hall, 1991] [G.

Booch, Object-Oriented Analysis and Design with Applications, 2$^{nd}$ ed., California: The Benjamin/Cummings Publishing Company, Inc., 1994]. A link is a physical or conceptual connection between objects. An association represents a group of bi-directional links with common structure and common semantics. Aggregation refers to the "part-whole" or "a-part-of" relationship in which objects representing the components of an object that represents the entire assembly. Sharing similarities between classes while preserving their differences is encapsulated in generalization and inheritance. Inheritance allows the conception of a new class of objects as a refinement of another and abstraction of the similarities between classes. Generalization defines the relationship between a class and one or more refined versions of it. A superclass is the class being refined and a subclass is a class that inherits behavior from another class, which is a refined version of the superclass. Attributes and operations common to a group of subclasses are attached to the superclass and shared by each subclass, which inherits the features of its superclass. Generalization and inheritance are typically transitive across an arbitrary number of levels.

The following software design sequence describes the object-oriented technique based on these concepts:
1. Define the problem or task.
2. Identify objects and their attributes and input data.
3. Identify operations that may be applied to objects.
4. Establish interfaces by showing the relationship between objects and operations.
5. Repeat steps 1, 2, 3, and 4.

Figure 8:
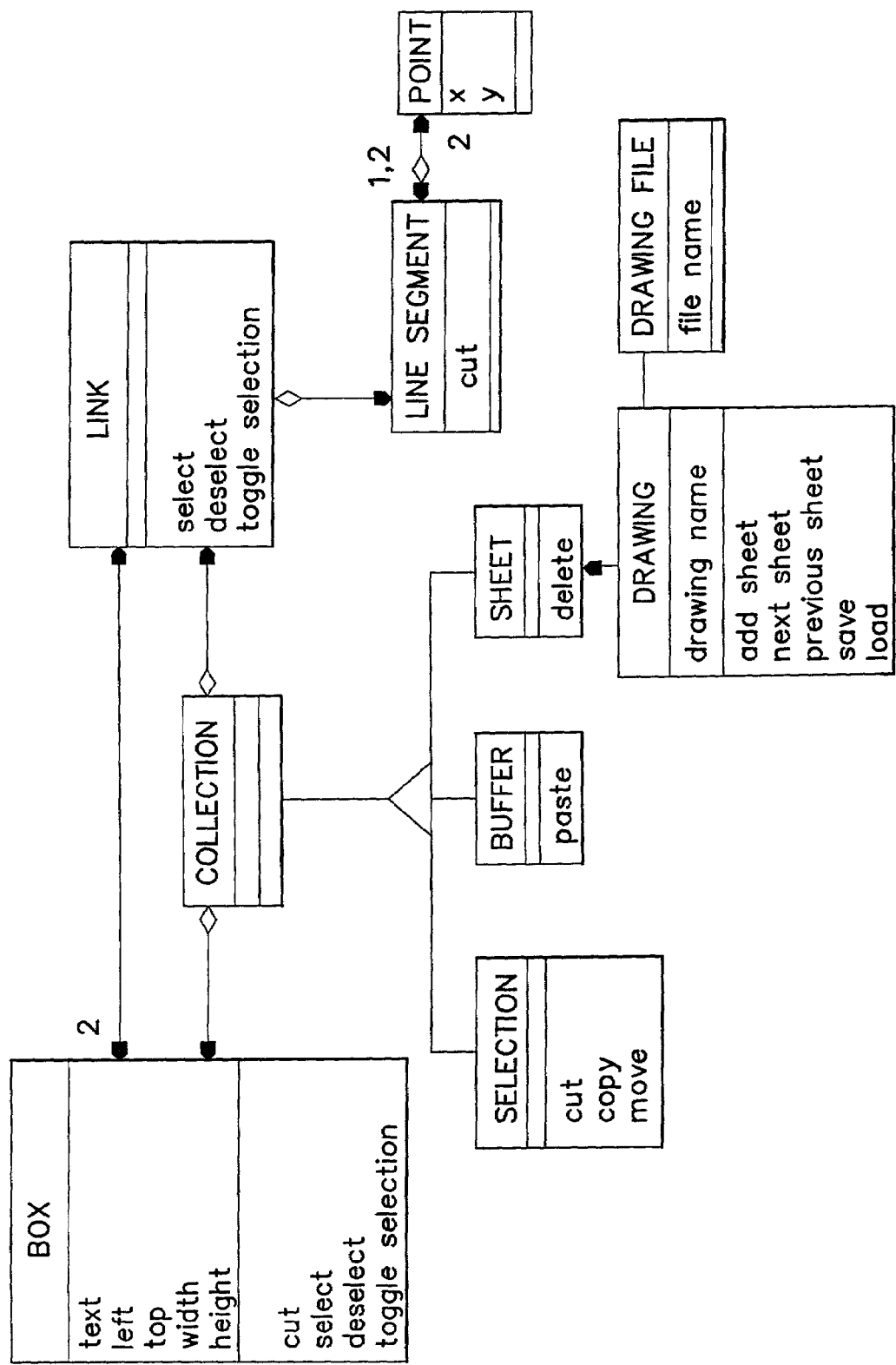
FIG. 8 is a block diagram of an example of an object-oriented diagram according to one embodiment of the invention.

Steps 2 and 3 are summarized collectively as steps related to object-oriented class definition. These steps are commonly referred to as modeling or analysis. Step 4, usually referred to as the design step, utilizes diagrams such as a data flow diagram and an Entity-Relation (ER) diagram to realize the relationships. As shown in FIG. 8, an object diagram is generated when all these design steps are finished. At this stage, it is difficult to determine whether the design represented by an object diagram is good because no criterion exists in terms of design verification; this is a shortcoming of conventional OOT.

An example of an object diagram is described below with respect to FIG. 8, wherein the numbers indicate the number of associations [Rumbaugh, 1991]:
  a. Each box is a class or an object. The top section of the box (e.g., Box in the left top box of the figure) is the name of the class, the middle section of the box (e.g., text in the figure) describes the attributes of the class, and the bottom section of the box (e.g., cut) defines the operations of the class.
  b. An object is represented as an instance of specific class (e.g., Object Box is an instance of Box class). However, sometimes each box in FIG. 8 may be called as an object.
  c. Object Link has two relationships with the attributes of object Box.
  d. Object Collection is an aggregation of the attribute of Box and the operation of Link with many relationships. That is, object Collection can have many Box and Link objects.
  e. Object Collection is the superclass of subclasses Selection, Buffer and Sheet.
  f. Object Drawing, which has a relationship with object Drawing file, can have many Sheet objects.
  g. Object Link is an aggregation of object Line segment, which in turn is an aggregation of object Point. That is, object Line segment is a part of object Link with many relationships.

Modified Object-Oriented Method Incorporating Axiomatic Design Principles

The following describes a method for modifying object-oriented design methods to incorporate axiomatic design principles in accordance with various embodiments of the invention. All examples merely illustrate inventive concepts, and the spirit and scope of the invention should not be limited thereto.

Figure 9:
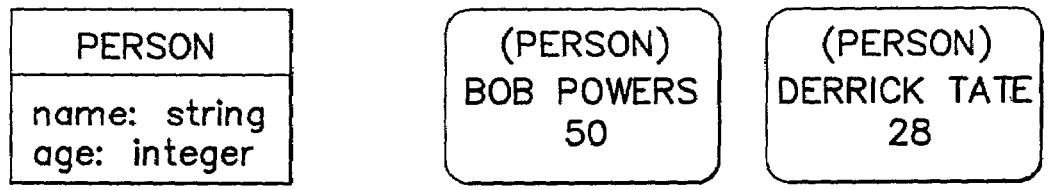
FIG. 9 is a block diagram of an example object class and instance according to one embodiment of the invention.

In object-oriented systems, there are two types of object diagrams: class diagram and instance diagram. A class diagram is a schema, pattern, or template for describing many possible instances of data. A class diagram describes object classes. An instance diagram describes how a particular set of objects relates to each other. An instance diagram describes object instances. FIG. 9 is a block diagram showing an example object class and instance diagram. In particular, a person class may be defined having a name (string) and an age (integer). An instance of the Person class, namely "Bob Powers" or "Derrick Tate" are instantiations of the Person class. These instantiations include values for the names and ages of each person.

An object is linked to other objects through messages, which require an object to perform certain functions by executing a method (i.e., algorithm). The object performs the function using the internal operations that may not be apparent to other objects—equivalent to the elements of the design matrix that link specific FRs to specific DPs.

Figure 27:
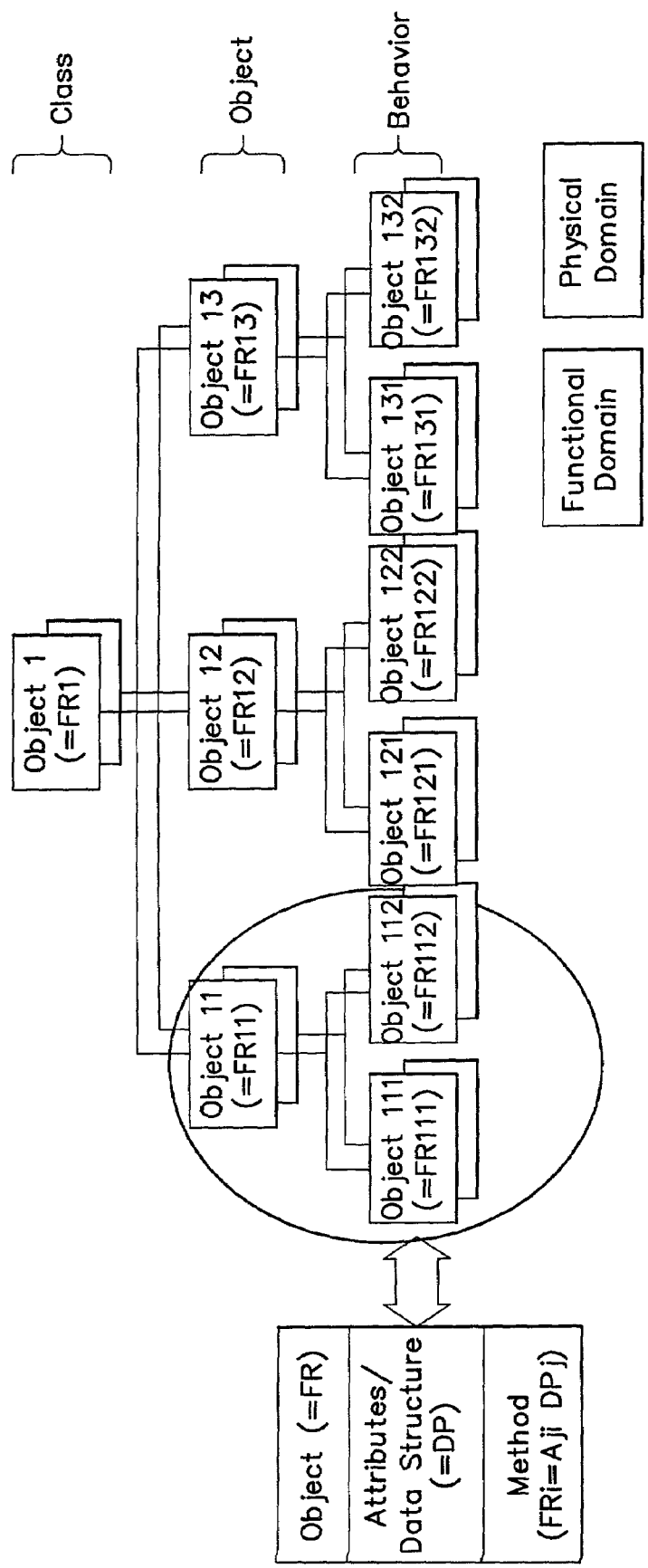
FIG. 27 is a block diagram of an example class representation according to one embodiment of the invention.

An "Object" may have several activities depending on how they structured and sometimes these activities are called "Behavior". According to one embodiment of the invention, behavior is a special case of FR. The relationship between FRs and "Class", "Objects" and "Behavior" may be described in terms of the design hierarchy as shown in FIG. 27. The highest FR among the three layers of decomposed FRs is "Class", the children FRs of "class FR" is "Object" which may represent aggregation or generalization, and the grandchildren FRs of "class FR" are "Behavior". If there is no items for "Object" for the second level, it is possible to treat the grandchildren FRs as children FRs.

The distinction between "Super Class", "Class", "Object" and "Behavior" is necessary in Object-Oriented Technique (OOT) to deal with FRs at successive layers of a system design. In OOT, the Class represents an abstraction of Objects and thus, is positioned one level higher than an Object in the FR hierarchy. Similarly, the Object is one level higher than Behavior in the FR hierarchy. The use of these keywords, while necessary in OOT, adds unnecessary complexity when the results of axiomatic design is to be combined with OOT. Therefore, the use of these keywords in OOT will be modified to describe axiomatic design principles.

One key word "Object" is used hereinafter to represent all three levels of FRs, i.e., Class, Object, and Behavior. "Objects with indices" is used in place of these three keywords. For example, Class may be called Object i to present FRi, Object is denoted as "Object ij" to represent the next level FRs, FRij, and Behavior—the third level FRs—is denoted as Object ijk. Thus, Object i, Object ij, and Object ijk are equivalent to FRi, FRij, and FRijk, which are FRs at three successive levels of the FR hierarchy.

To summarize, the equivalence between the terminology of axiomatic design and those of OOT according to one embodiment of the invention may be stated as:
  A FR can represent an Object.
  DP can be data or input for the Object, i.e., FR.
  The product of a module of the design matrix and DP can be a method, i.e., FR=A*DP.

Different levels of FRs are represented as Objects with indices.

Basics of Axiomatic Design of Object-Oriented Software Systems

An exemplary axiomatic design process for designing object-oriented software systems is shown in FIG. 5. The process includes the following steps:

i. Define FRs of the Software System

The first step in designing a software system is to determine the customer attributes in the customer domain that the software system must satisfy. Then, the functional requirements (FRs) of the software in the functional domain and constraints (Cs) are established to satisfy the customer needs. FRs must satisfy the customer needs with fidelity.

ii. Mapping between the Domains and the Independence of Software Functions

The next step in axiomatic design is to map these FRs of the functional domain into the physical domain by identifying the design parameters (DPs). DPs are the "how's" of the design that satisfy specific FRs. DPs are chosen to be consistent with the constraints. During the mapping process, the design must satisfy the Independence Axiom, which requires that functional independence be maintained throughout the development of an uncoupled or decoupled design. A design matrix is used for this evaluation.

iii. Decomposition of {FRs}, {DPs}, and {PVs}

Figure 10:
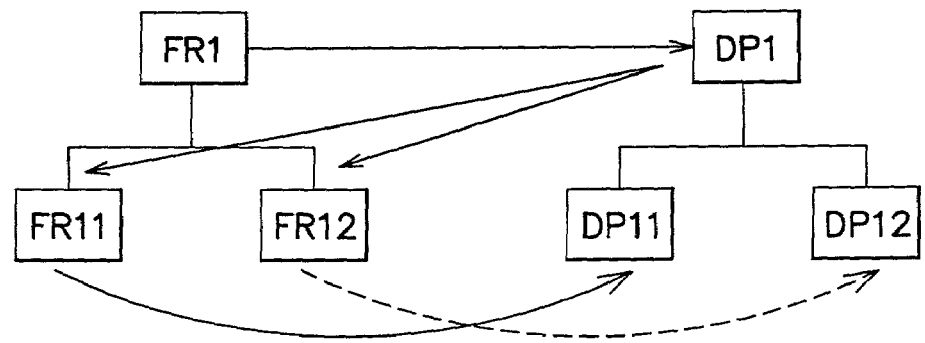
FIG. 10 is a block diagram showing transitions between functional and physical domains according to one embodiment of the invention.

The FRs, DPs, and PVs are decomposed until the design can be implemented without further decomposition. These hierarchies of {FRs}, {DPs}, {PVs} and the corresponding matrices represent the system architecture. The decomposition of these vectors generally are not done by remaining in a single domain, but are done through zigzagging between domains. This zigzagging concept is shown in FIG. 10. From FR1 in the functional domain, the designers develop DP1 in the physical domain. Then, the designers return to the functional domain to generate FR11 and FR12 that collectively satisfy the highest level FR1 and the corresponding DP1. Then the designers move to the physical domain to determine DP11 and DP12, which satisfy FR11 and FR12, respectively. This process continues until the FRs can be satisfied without further decomposition. Each terminal FR and DP (those which are not further decomposed) is called a "leaf" in the tree structure.

As software is designed, the PVs are described in terms of programming terminology such as packages, classes, attributes, methods and so on. Although object-oriented programming languages apply, this method may be applied to any kind of programming language. According to one embodiment of the invention, the relationship between DPs and PVs is exactly same for the software system. Therefore, the relation for FRs and PVs is straightforward. As a result, the PV hierarchy shows the programming structure.

Figure 11:
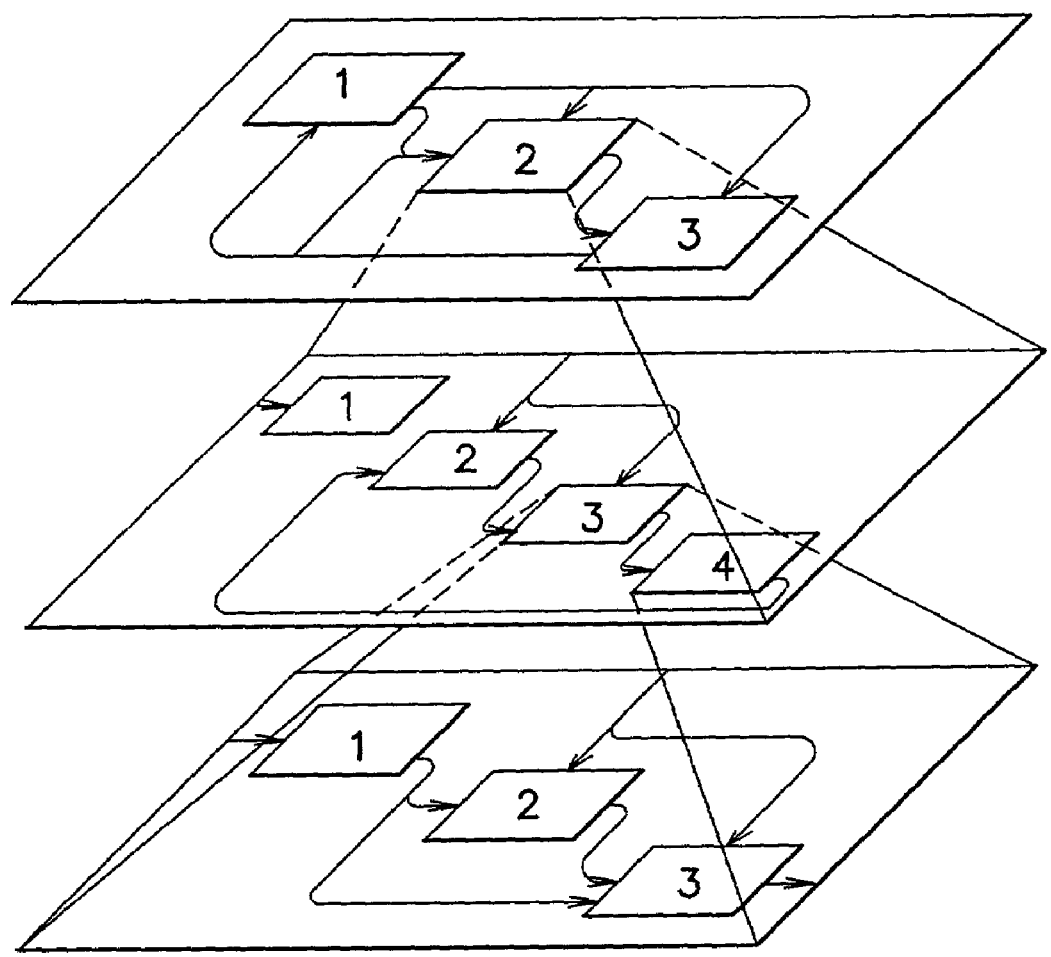
FIG. 11 is a block diagram showing a Structured Analysis and Design Technique (SADT) diagram.

The software design methodology which was favored in mid '70s and '80s, uses similar decomposition with the top-down approach. As shown in FIG. 11, Structured Analysis and Design Technique (SADT) is a well-known example of this approach. However, SADT is only conducted in the physical domain from an axiomatic design viewpoint and the process is decomposed without consideration of data. Because of this non-zigzagging process, there is no guarantee of functionality or productivity. Therefore previous methods faded away as the requirement for productive software system increased and object-oriented methods were introduced.

iv. Definition of Modules—Full Design Matrix

One of the most important features of the AD framework is the design matrix, which provides the relationships between the FRs and DPs. The design matrix provides two important bases in creating software. One important basis is that each element in the design matrix can be a method (or operation) in terms of the object-oriented method. The other basis is that each row in the design matrix represents a module to satisfy a specific FR as defined by Equation (2). In most cases, the off-diagonal terms in the design matrix are more important then the diagonal terms since most of the coupling comes from these off-diagonal terms. However, it is possible to avoid coupling with a proper sequence of change if the design matrix is triangular. An off-diagonal term can be represented as a message transfer (or function call) in the software system. FIG. 12 illustrates these concepts of relating FRs and DPs in a design matrix, and representing a module by an element of the design matrix.

Figure 13:
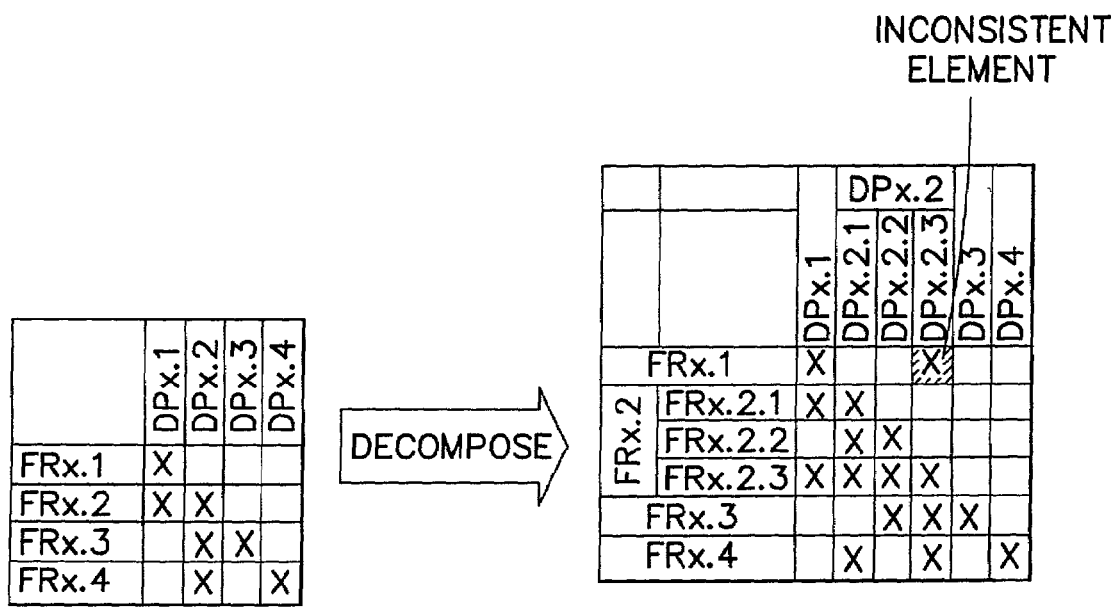
FIG. 13 is a block diagram showing a design matrix implementation and consistency check according to one embodiment of the invention.

As illustrated in FIG. 13, it is important to construct the full design matrix based on the leaf information in the software system. In the example shown in FIG. 13, a decomposition of FRx.2 reveals a relationship between DPx.2.3 and FRx.1, while before decomposition, no relationship was identified. Advantages of this full design matrix include refining the module information precisely and checking the consistency between the hierarchy levels. Consistency can be defined as an activity in which the designers check the layers of the design hierarchy against each other to make sure that the layers are consistent with one another [D. F. Baldwin, "Microcelluar Polymer Processing and the Design of a Continuous Sheet Processing System," Doctoral Thesis, Massachusetts Institute of Technology, U.S.A, 1994] [ D. Tate, "A Roadmap for Decomposition: Activities, Theories, and Tools for System Design," Doctoral Thesis, Massachusetts Institute of Technology, U.S.A, 1999]. If an off-diagonal term is shown in a different location which is not shown in a higher level, the designer should reconsider the relationship again to correct this inconsistency. The FRs, DPs, design matrices, and Cs should all be checked.

v. Identify Classes—Objects, Attributes, and Operations

Because all the DPs in the design hierarchy are selected to satisfy FRs, it is relatively easy to identify the objects. The leaf is the lowest level object in a given decomposition branch, but all leaf-level objects may not be at the same level if they belong to different decomposition branches. Once the objects are defined, the attributes (or data)—DPs—and operations (or methods)—products of module times DPs—for the object should be defined to construct the object model. This activity should use the full design matrix table.

The following example illustrates an example process of designing an object-oriented system using axiomatic design principles.

EXAMPLE

Software Design for a Simple Line Drawing Program Problem

Design a software program that can draw a straight line. Translate the resulting axiomatic design into object-oriented methods.

Solution:

The highest level FRs may be stated as,

FR1: Define line element

FR2: Detect the drawing location

FR3: Draw the line element through the window

The corresponding DPs are selected as,
DP1: Line characteristic
DP2: Mouse click information
DP3: GUI for the drawing
The design matrix may be written as, $$\begin{Bmatrix} FR1 \\ FR2 \\ FR3 \end{Bmatrix} = \begin{bmatrix} A11 & 0 & 0 \\ 0 & A22 & 0 \\ A31 & A32 & A33 \end{bmatrix} \begin{Bmatrix} DP1 \\ DP2 \\ DP3 \end{Bmatrix} \quad (a)$$

The FRs and DPs may be decomposed as:
Second Level for FR1
FR11: Define start
FR12: Define end
DP11: Start point
DP12: End point
The design matrix may be written as, $$\begin{Bmatrix} FR11 \\ FR12 \end{Bmatrix} = \begin{bmatrix} a & 0 \\ 0 & b \end{bmatrix} \begin{Bmatrix} DP11 \\ DP12 \end{Bmatrix} \quad (b)$$

Second Level for FR2
FR21: Detect mouse push
FR22: Detect mouse release
DP21: Event for push
DP22: Event for release
The design matrix may be written as, $$\begin{Bmatrix} FR21 \\ FR22 \end{Bmatrix} = \begin{bmatrix} c & 0 \\ 0 & d \end{bmatrix} \begin{Bmatrix} DP21 \\ DP22 \end{Bmatrix} \quad (c)$$

Second Level for FR3
FR31: Prepare the drawing environment
FR32: Draw the line
DP31: Window type
DP32: Graphics Information
The design matrix may be written as, $$\begin{Bmatrix} FR31 \\ FR32 \end{Bmatrix} = \begin{bmatrix} e & 0 \\ f & g \end{bmatrix} \begin{Bmatrix} DP31 \\ DP32 \end{Bmatrix} \quad (d)$$

The above design can be expressed in OOT format as shown below in Table (2):

The top box of the four tiered object box in Table 2 is for the name of the Object for FRs. The second boxes are for the second level FRs (in OOT, was called Behavior), i.e., FR11, FR12, FR21, etc. The "data", which are DP11 and DP12 and so on, are in the third tier boxes. The fourth tier boxes are for methods (or operations), which are a*DP11, b*DP12 and so on. We can keep the parent level relationships (i.e., FR1-A11-DP 1, FR2-A22-DP2 and FR3-A33-DP3) in a library for future reuse; this assures reusability since each one of these relation reveals the fundamental object structure.

Figure 14:
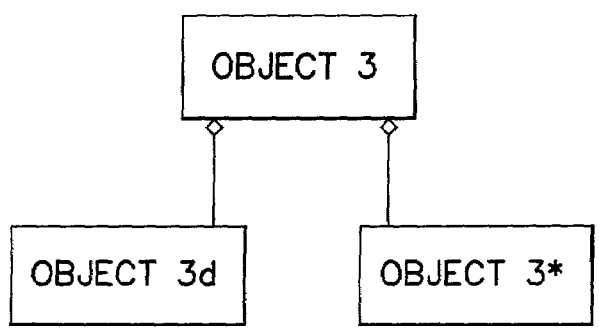
FIG. 14 is a block diagram showing an example object-oriented technique (OOT) diagram according to one embodiment of the invention.

The sets (FR1-A11-DP1), (FR2-A22-DP2) and (FR3-A33-DP3) are named as Object 1$d$ for FR1, Object 2$d$ for FR2 and Object 3$d$ for FR3, respectively. The character "d" is added to the object number to denote the fact that they represent only the diagonal element. The off-diagonal terms are then processed. This processing can be done if we call (FR3-A31-DP1/FR3-A32-DP2) as Object 3* for FR3*. The asterisk sign is used to denote the off-diagonal elements. Then, FR3 is "Object 3 for FR3", which is an "aggregate" of Object 3$d$ for the diagonal element of FR3 and Object 3* for FR3*. These relationships can be represented in terms of the OOT notation as shown in FIG. 14.

Figure 15:
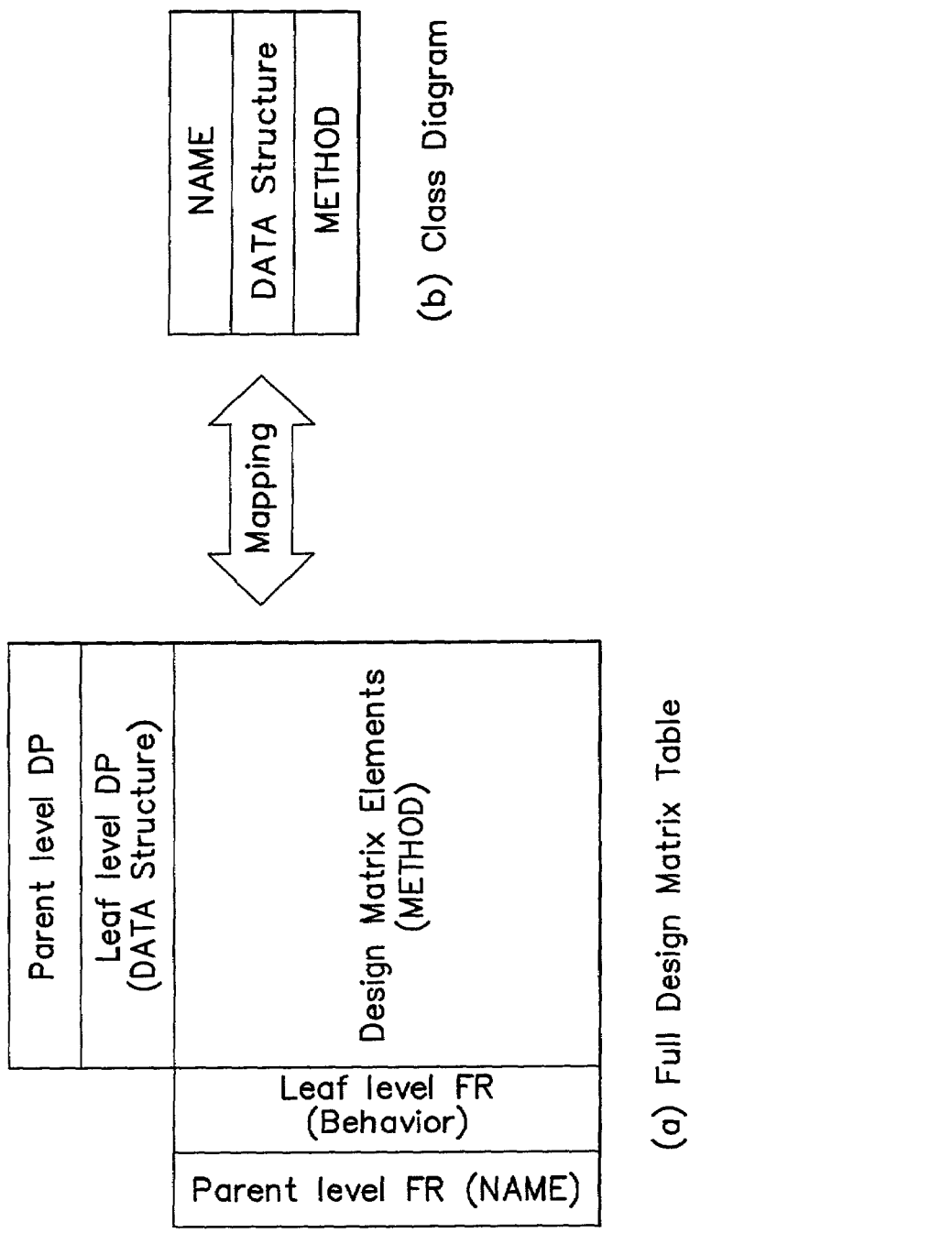
FIG. 15 is a block diagram showing a relation between a design matrix and an object-oriented class diagram according to one embodiment of the invention.
Figure 16:
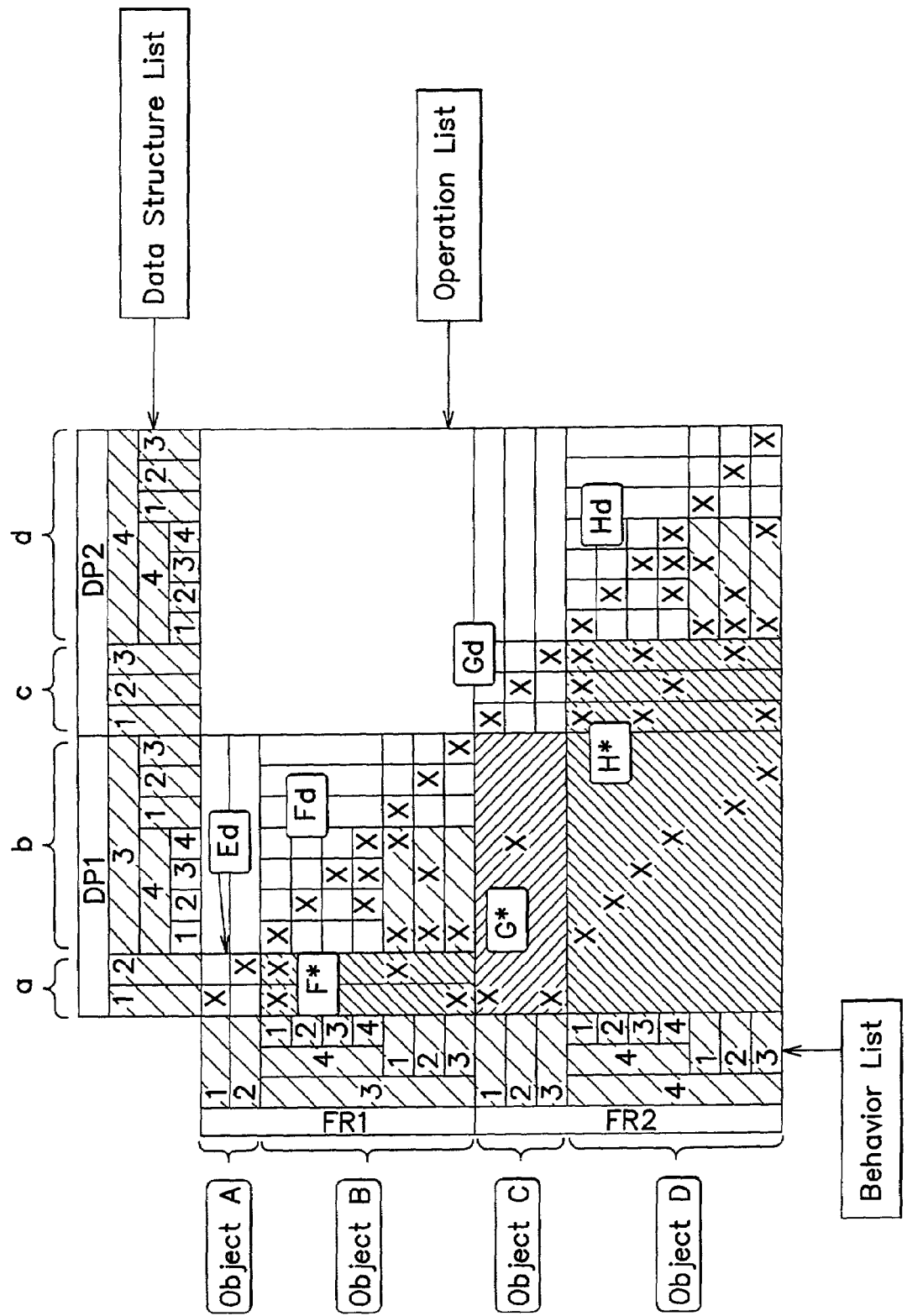
FIG. 16 is a block diagram showing more detailed relations between a design matrix and an object-oriented class diagram according to one embodiment of the invention.
Figure 17:
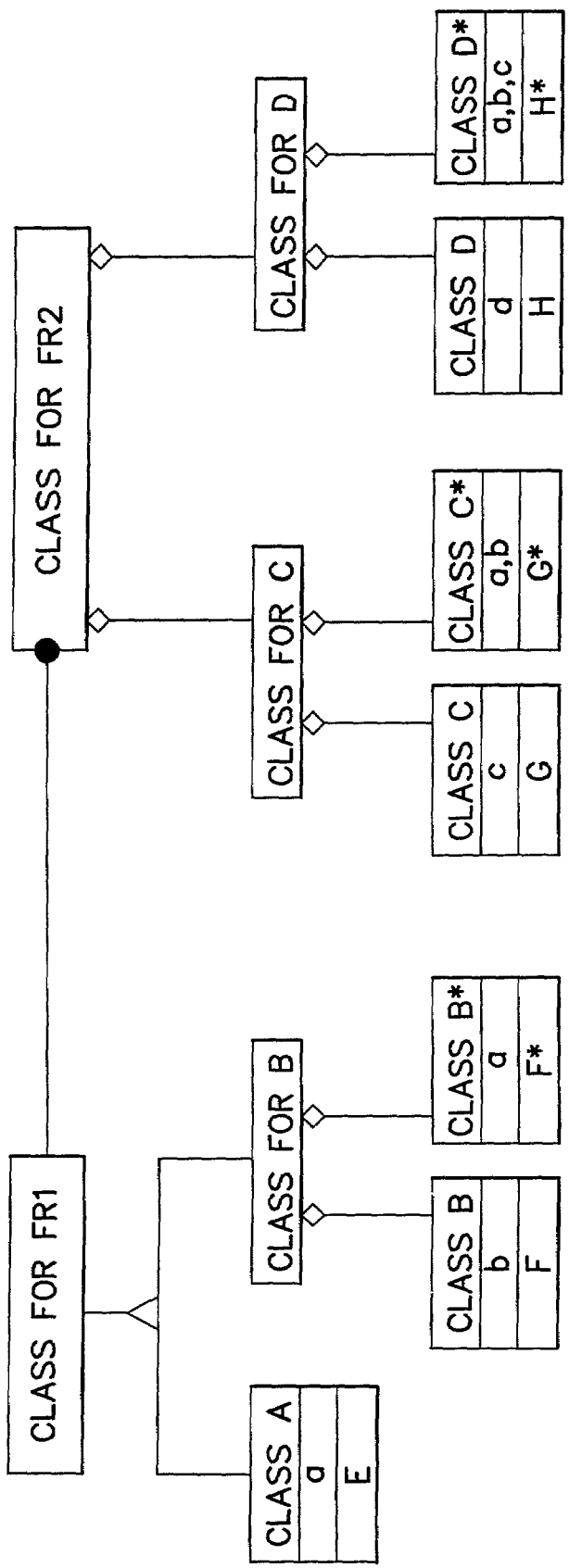
FIG. 17 is a block diagram for the design matrix shown in FIG. 16.

The full design matrix with FRs and DPs can be translated into the OOT structure as shown in FIG. 15. FIG. 16 shows a more detailed correspondence between the full design matrix and the OOT diagram. This translation is illustrated further in FIG. 17 which shows a block diagram of an object oriented system according to the full design matrix shown in FIG. 16. In the example case, wherein the FRs are equivalent to objects, and the DPs are equivalent to data.

vi. Establish Interfaces by Showing the Relationships Between Objects and Operations Most efforts are focused on this step in the object-oriented method since the relationship is the key feature. However, it lacks information about functional relationships since the relationship is only represented as lines between objects (or classes) as shown in FIG. 17. To overcome this lack of information, the axiomatic design methodology provided herein utilizes the off-diagonal element in the design matrix as well as the diagonal elements at all levels. A design matrix element represents a link or association relationship between different FR branches that have totally different behavior. All these concepts are illustrated in FIG. 17 which shows the object-oriented structure corresponding to the design matrix shown in FIG. 16.

One of the advantages of the AD framework is that it represents the inter-relationships among modules in the design hierarchy. To represent the properties of junctions at each level of decomposition, a "Module-Junction Structure

TABLE 2

| | Two Different Levels of Objects | | | | | |
|---|---|---|---|---|---|---|
| | Object 1 (for FR1) | | Object 2 (for FR2) | | Object 3 for (FR3) | |
| Second Level Objects (Behavior in OOT) | Object 11 (for FR11): Define start | Object 12 (for FR12:) Define end | Object 21 (for FR21): Detect mouse push | Object 22 (for FR22): Detect mouse release | Object 31 (for FR31): Prepare the drawing environment | Object 32 (for FR32:) Draw the line |
| Attribute or Data | DP11: Start point | DP12: End point | DP21: Event for push | DP22: Event for release | DP31: Window type | DP32: Graphics Information |
| Operation or Method | a*DP11 | b*DP12 | c*DP21 | d*DP22 | e*DP31 | f*DP31 + g*DP32 |

Diagram" is defined [S. J. Kim, N. P. Suh, and S. K. Kim, "Design of software systems based on axiomatic design," Annals of the CIRP, Vol. 40, No. 1, pp. 165-170, 1991 {also Robotics & Computer-Integrated Manufacturing, 3:149-162, 1992}]. Based on the AD framework, a "modular design" may not necessarily be a good design, because these modules must be properly arranged and must satisfy the Independence Axiom. In a complex design, this can only be performed if modules are defined consistent with Equation (2).

Figure 18:
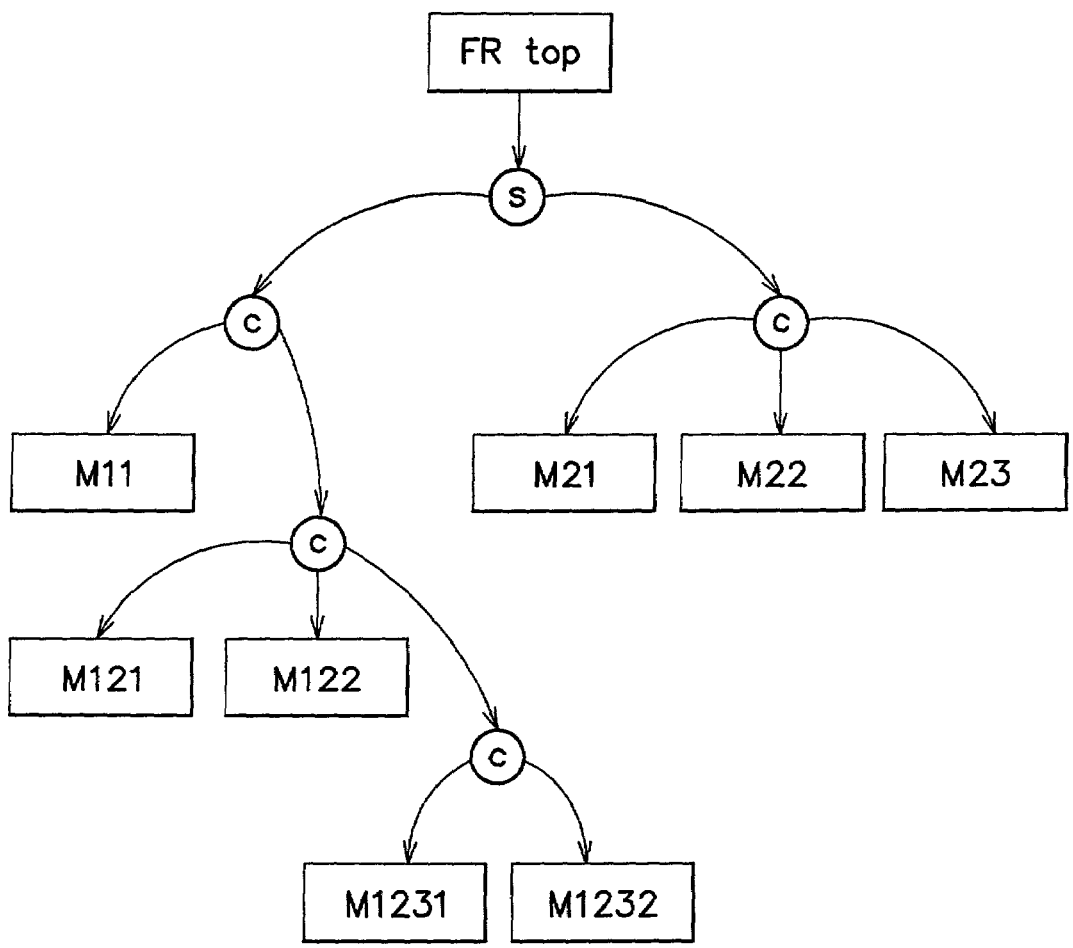
FIG. 18 is a block diagram of a module-junction diagram according to one embodiment of the invention.

To represent the relationships between modules, symbols in circles are used as shown in FIG. 18. For an uncoupled design, S in the circle is used to represent a simple summation of FRs. C in the circle indicates that DPs and modules must be controlled in a sequence as suggested by the design matrix for a decoupled design. F in the circle is used to indicate that the design is coupled, indicating that it requires feedback and violates the Independence Axiom.

The module-junction structure diagram is shown in FIG. 18 for the design given by Equation (3) shown below. It should be noted that the higher-level modules are obtained by combining lower-level modules. For example, by combining modules M121, M122, and M123 with a control junction (C), we obtain the next higher-level module M12. Then, M11 and M12 are combined to obtain M1 using a control junction (C) again. M1 and M2, although not shown since they are not leaves, are simply summed as indicated by symbol S.

$$\begin{Bmatrix} FR1 \\ FR2 \end{Bmatrix} = \begin{bmatrix} X & 0 \\ 0 & X \end{bmatrix} \begin{Bmatrix} DP1 \\ DP2 \end{Bmatrix} \quad (3)$$

$$\begin{Bmatrix} FR11 \\ FR12 \end{Bmatrix} = \begin{bmatrix} X & 0 \\ X & X \end{bmatrix} \begin{Bmatrix} DP11 \\ DP12 \end{Bmatrix}$$

$$\begin{Bmatrix} FR21 \\ FR22 \\ FR23 \end{Bmatrix} = \begin{bmatrix} X & 0 & 0 \\ X & X & 0 \\ 0 & X & X \end{bmatrix} \begin{Bmatrix} DP21 \\ DP22 \\ DP23 \end{Bmatrix}$$

$$\begin{Bmatrix} FR121 \\ FR122 \\ FR123 \end{Bmatrix} = \begin{bmatrix} X & 0 & 0 \\ X & X & 0 \\ X & 0 & X \end{bmatrix} \begin{Bmatrix} DP121 \\ DP122 \\ DP123 \end{Bmatrix}$$

$$\begin{Bmatrix} FR1231 \\ FR1232 \end{Bmatrix} = \begin{bmatrix} X & 0 \\ X & X \end{bmatrix} \begin{Bmatrix} DP1231 \\ DP1232 \end{Bmatrix}$$

vii. Construct the System Architecture of the Software System

When the AD framework is used, the entire process can be clearly shown by a flow chart that represents the system architecture. The symbols used in the flow chart is illustrated for uncoupled, decoupled and coupled designs in FIG. 3. FIG. 4 shows the final flow diagram for the design represented by Equation (3). In particular, FIG. 4 shows how the system represented by Equation (3) can be structured using the modules. The sequence of software development begins at the lowest level, which is defined as the leaves. To achieve the highest-level FRs, which are the final outputs of the software, the development of the system begins from the inner-most modules shown in the flow chart that represent the lowest-level leaves. Then, the next higher level modules are developed (i.e., next inner-most box) following the sequence indicated by the system architecture; that is, a developer develops from the inner most boxes to the outer most boxes. In summary, the software system can be developed in the following sequence:

a. Construct the core functions using diagonal elements of the design matrix.
b. Create a module for each leaf FR, following the sequence given in the flow chart that represents the system architecture.
c. Combine the modules to generate the software system, following the module junction diagram.

When this procedure is followed, the software developer can reduce the coding time because the logical process reduces the software construction into a routine operation. The process also guarantees a minimal effort for maintenance and extension in the event that they are required in the future.

The right side of the V-model shown in FIG. 5 may be used for any software design methodologies. However, the Object-Oriented method is used in most commercial software products, which typically use the C++ or JAVA programming languages. The right side of the V-model can be replaced by SADT, but now SADT has been replaced by OOT.

Software Design Database

In accordance with one aspect of the invention, a software design database is provided that is used to store aspects of a software design implementing axiomatic design principles. One or more of the features of the design database provide the following:

Search by design parameters (DPs) information (including description, keyword, comments, categories and so on) among all the possible DPs.

Provide several results which has functional requirements (FRs), design parameters (DPs), process variables (PVs) and design matrix with the design hierarchy.

Provide graphical representation for the selected design hierarchy in terms of Unified Modeling Language (UML). The graphical representation could be, for example, a Class diagram, Activity diagram, Flow diagram, Package diagram, etc.

Axiomatic Design theory encourages designers to find out the proper design parameters (DPs) which makes uncoupled or decoupled effect for desired set of functional requirements (FRs). However, sometimes it is difficult to determine proper DPs in case of beginner or even expert designer. To avoid these difficulties, it is useful to support the DPs candidate through a design database so that the design might get an idea of their specific FR/DP relationships. Software systems usually have some common functions named as "common libraries" between the software products. These common features are stored into each programmer's computer as several files. Therefore it is kind of a measuring scheme for the programmer's skill such that the programmer has many common libraries or not. If this kind of library stored into the database system and provided to the entire software designer, it is really useful to shorten the software design and development life cycle as well as improve reusability.

Improve Reusability: As discussed above, one of the key issues to use the axiomatic design concept according to one embodiment of the invention includes selecting proper DPs to make an uncoupled or decoupled design. Based on the axiomatic design, only one DP should be assigned for specific FRs among all the other alternatives. If a DP has enough information such as child level design structure, the designer does not need to further decompose that level since all the necessary design hierarchy is by though the child level. Therefore, the usage of database system, which includes DP information with a pre-proven design hierarchy, improves the reusability of the software system. A common library function is an example of the database content for the software system according to one embodiment of the invention. Ideally, the result of each individual software development project can be stored as design database and each level DPs may be referred at any time for the different project.

Low maintenance cost: As discussed, the information stored into the design database is pre-proven, which means each level of the design hierarchy should be uncoupled or decoupled in terms of its axiomatic design. As long as this condition is satisfied, the usage of pre-proven design database does not require debugging or testing for the given DPs. The only required work to implement this design database as a DP includes checking the inconsistency between a level which has DPs from the design database and its child level and test the connection [D. F. Baldwin, "Microcelluar Polymer Processing and the Design of a Continuos Sheet Processing System," Doctoral Thesis, Massachusetts Institute of Technology, U.S.A, 1994] [D. Tate, "A Roadmap for Decomposition: Activities, Theories, and Tools for System Design," Doctoral Thesis, Massachusetts Institute of Technology, U.S.A, 1999]. Therefore the usage of design database reduces the amount work to do and assures the low maintenance cost.

Low development cost of software: Using the pre-proven design reduces development time, debugging, and testing time. These time savings reduce development costs of software.

To meet these ends, an efficient query as well as well defined database structure should be implemented. Current search engine requires words or/and phrases and combination strategy between the words such as AND/OR combination. These kinds of query provide ambiguous results due to the lack of query information and the database structure. For example, Internet search engines such as Yahoo, Altavista and the like do not allow a user to determine answers to queries in a single step. Therefore, a user must try another effort to determine proper information through reviewing the results.

To overcome these ambiguities, a knowledge-based approach may be used. For instance, Invention Machine software from Invention Machine Corporation (IMC) may be implemented along with the software design system. The Invention Machine System [http://www.inventionmachine.com] provides organizations with easy access to a large knowledge-base 3-D animated scientific effects and technical examples. The Invention Machine System also captures in-house technical knowledge and expertise, and improves the way technical knowledge is shared across the engineering enterprise, and conducts a competitive analysis by searching the U.S. and Japanese Patent Office database and comparing patent trends using a powerful charting feature. Therefore, the system suggests technical alternatives using predefined database upon the designers request but the system is not involved in the designing of software.

The software design database according to various embodiments of the invention includes several fields such as descriptions, keywords, comments, categories and the like. The design database may include source code, object code, or any intermediary file format which describes the software system. According to one embodiment, the software design database contains source code in separate file system so that the designer can access it. As many as the specific design cases added into this database, it can represent more specific design suggestions. According to one embodiment, information providing an index of the database is provided. This index information allows a programmer to obtain proper information for the DPs candidate for the specific FRs of software design.

Design Database

In this section, the development and implementation of software design database is presented. This database design may also be used for other types of design cases.

A database is generally defined as an integrated collection of persistent data representing the information of interest for various programs that compose the computerized information system of on organization [A. Siberschats, H. F. Korth, and S. Sudarshan, Database System Concepts, $3^{rd}$ Edition, McGraw Hill, 1998].

The software design database according to one embodiment of the invention includes two different pieces. One piece is the database itself to store detailed design specifications. The other piece is a file system having directory structure to contain the real source code based on the design specification. The database can be located on any kind of computer or computers connected through a communications network, or alternatively may be located on a single computer system.

Figure 19:
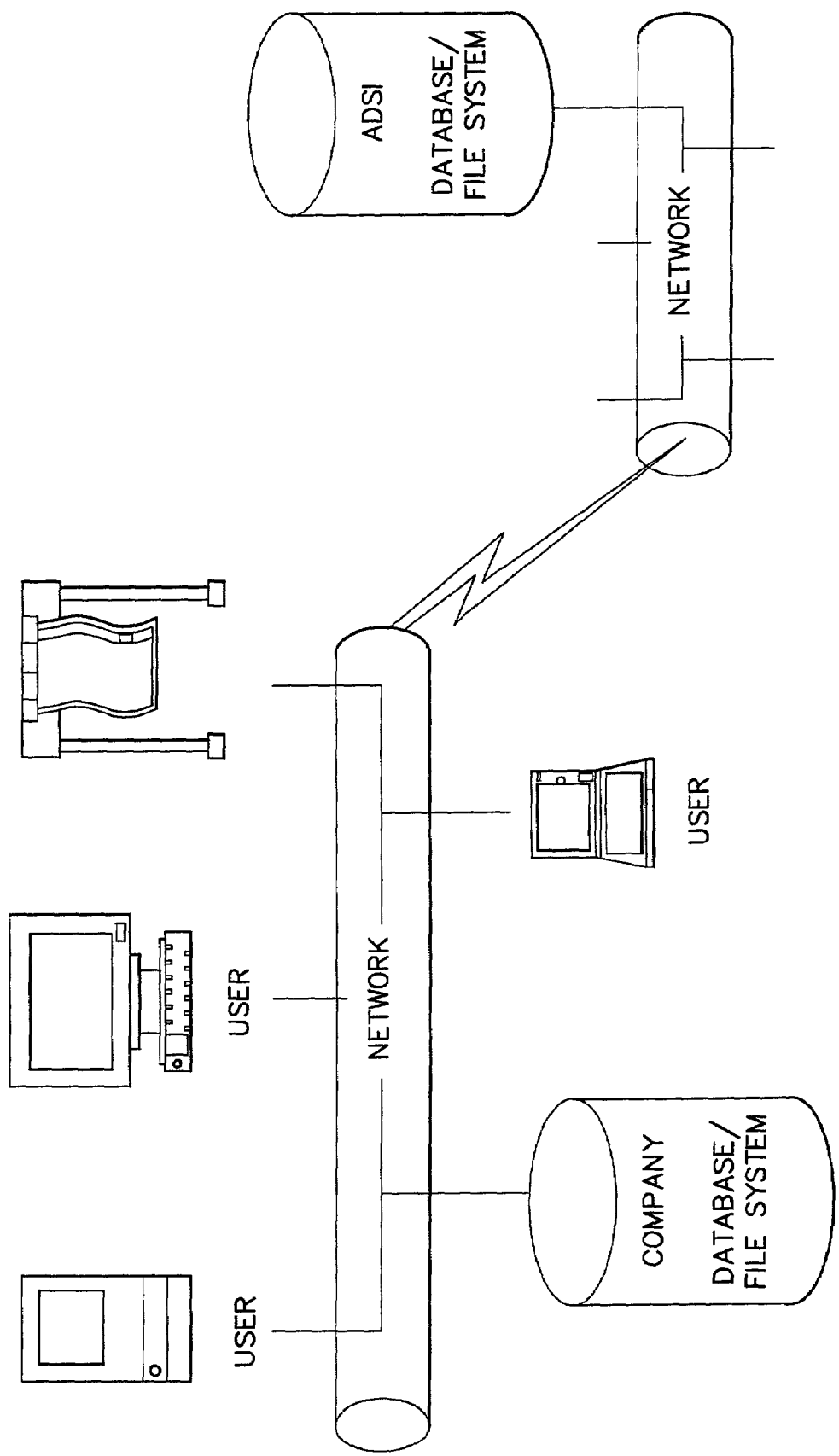
FIG. 19 is a block diagram of an exemplary environment used for database design according to one embodiment of the invention.

The design database according to one embodiment of the invention may be implemented in the database environment as shown in FIG. 19. The database located at the Company stores system designs used locally by the Company. Alternatively, the database located in the ADSI can have general design solutions. The ADSI provides several kinds of design solutions for the software design based on the programming environment. If the design solution is in the public domain, any software designer can use it freely. However, if the design solution is not published, the ADSI charges to use those design solutions.

Data Model for the Software Design Database

Figure 20A:
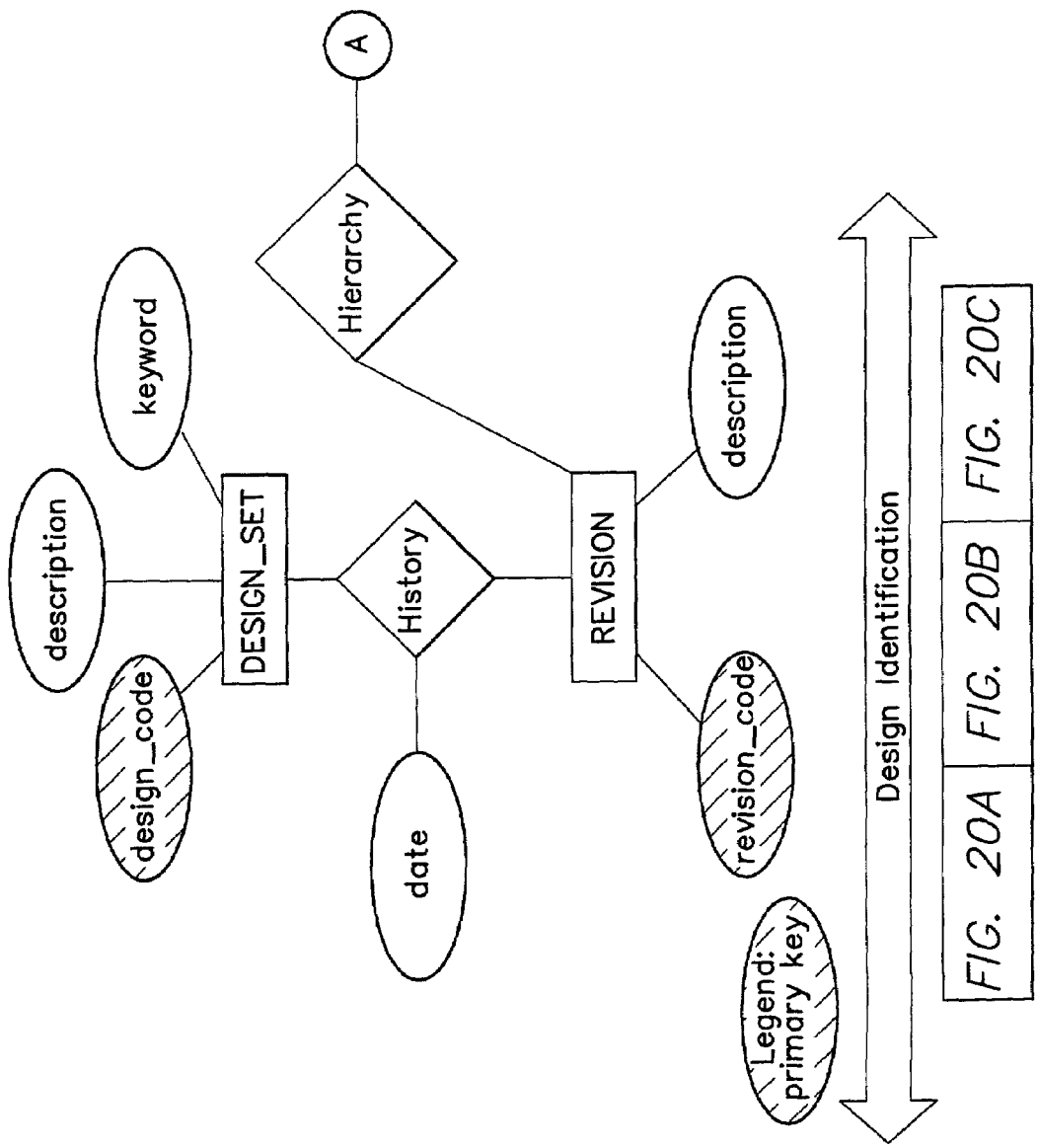
FIG. 20 is a block diagram of an Entity-Relation (ER) diagram according to one embodiment of the invention.
Figure 20B:
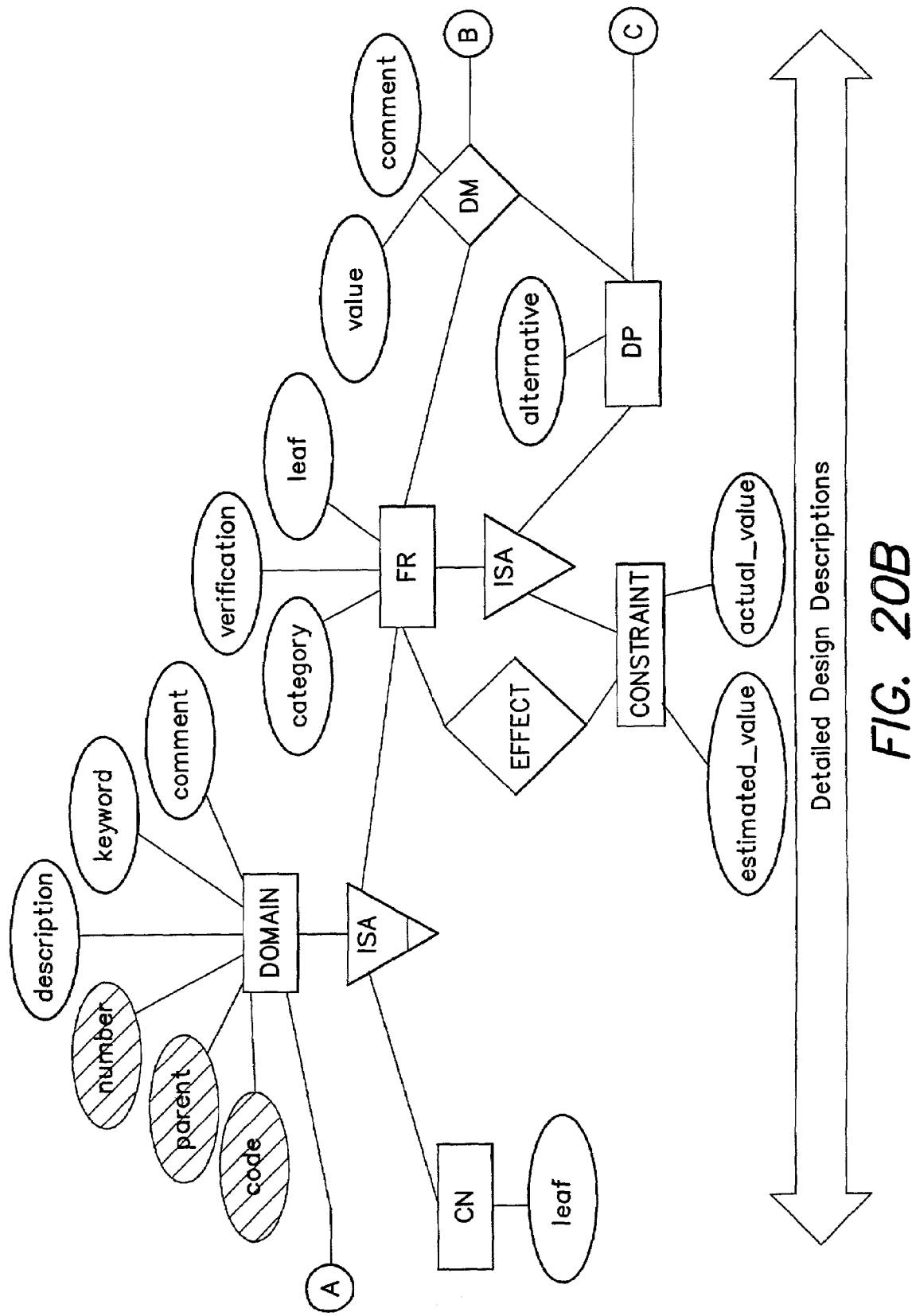
Figure 20C:
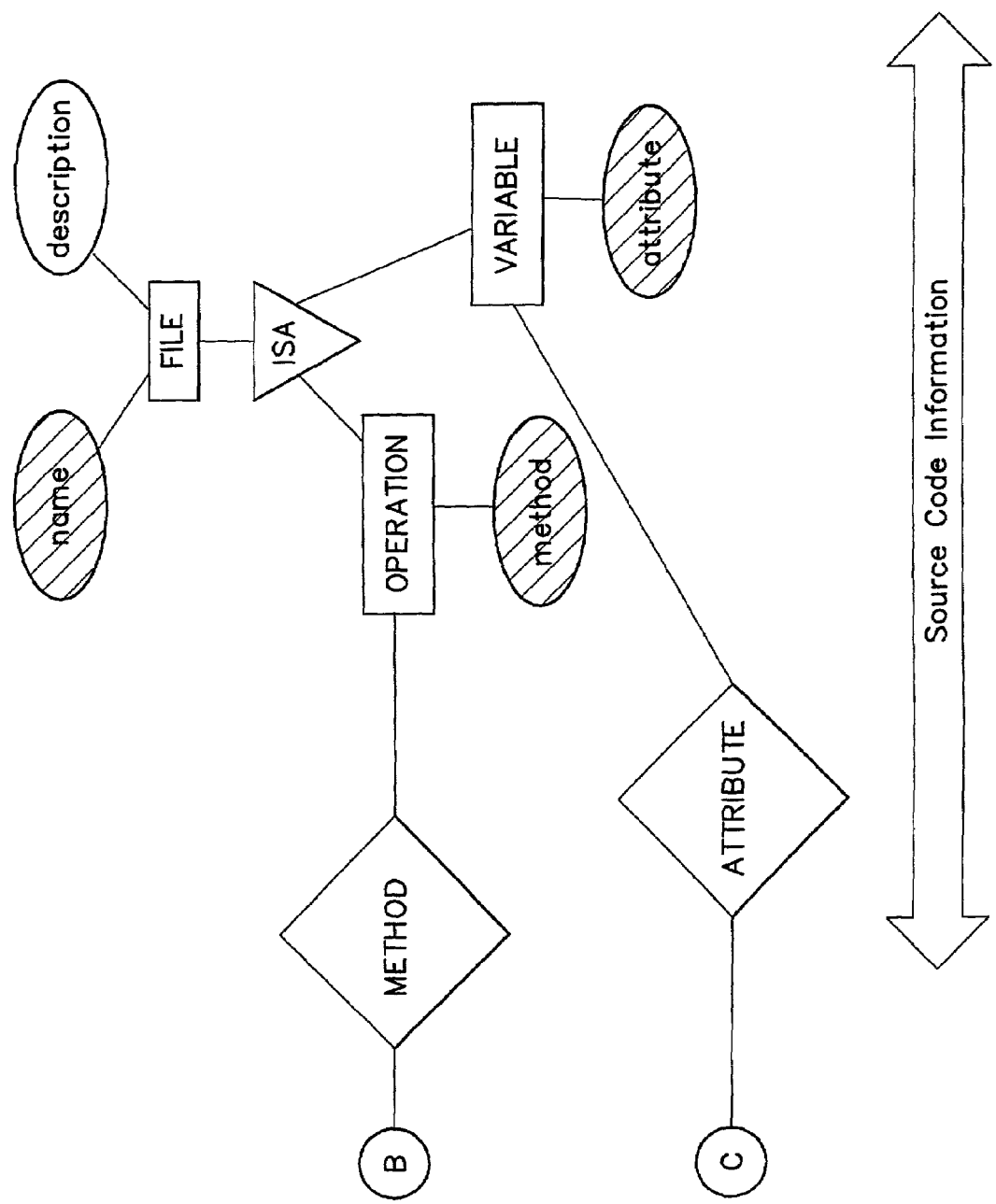

The data model represented this section is based on Entity-Relationship model (ER model). FIG. 20 shows an Entity-Relationship (ER) diagram for the database shown in FIG. 19. The file system that is a part of the operating system may be used to implement various embodiments of the invention.

The database generally includes three major parts for storing design information. The first part represents the design identification. The second part shows the detailed design descriptions, and the third part is designed to store the source code information. Code for the design is stored into the file system, and is identified by name field in the FILE table. Detailed database tables that store such design information according to various embodiments of the invention appear below in Tables 3-16.

TABLE 3

Database Table List

| No | Table ID | Table Description |
|---|---|---|
| 1 | DESIGN_SET | Setup the design identification |
| 2 | HISTORY | Relate between DESIGN_SET and REVISION |
| 3 | REVISION | Keep track the design changes |
| 4 | HIERARCHY | Relate between REVISION and DOMAIN |
| 5 | CN | Store customer needs (CNs) in customer domain |
| 6 | FR | Store functional requirements (FRs) in functional domain |
| 7 | DP | Store design parameters (DPs) in physical domain |
| 8 | CONSTRAINT | Store constraints information |
| 9 | EFFECT | Relate between CONSTRAINT and FR (FR/DP domain) |
| 10 | DM | Relate between FR and DP (FR/DP mapping) |
| 11 | OPERATION | Identify specific operation (i.e. method in the source file) |
| 12 | VARIABLE | Identify specific variable (i.e. attribute in the source file) |
| 13 | ATTRIBUTE | Relate between VARIABLE and DP |
| 14 | METHOD | Relate between OPERATION and DM |

According to one embodiment of the invention, all the attributes in those generalized tables are shown its specialized table. For example, OPERATION and VARIABLE tables have its generalized table attributes such as name and description in their record. FIG. 20 does not show the DP/PV relation because it is identical with the FR/DP relation.

TABLE 4

Detailed information for DESIGN_SET table

| Table ID | DESIGN_SET (Setup the design identification) |
|---|---|
| Unique Index | DESIGN CODE |

| No | Record ID | Type | Length | Status | Description |
|---|---|---|---|---|---|
| 1 | DESIGN_CODE | String | 10 | PK1 (PK = primary key) | Identify the design |
| 2 | DESCRIPTION | String | 80 | | Describe the design |
| 3 | KEYWORD | String | 40 | | Categorize the design |

TABLE 5

Detailed information for REVISION table

| Table ID | REVISION (Keep track the design changes) |
|---|---|
| Unique Index | REVISION_CODE |

| No | Record ID | Type | Length | Status | Description |
|---|---|---|---|---|---|
| 1 | REVISION_CODE | String | 10 | PK1 | Identify the design changes |
| 2 | DESCRIPTION | String | 80 | | Describe the changes |

TABLE 6

Detailed information for HISTORY table

| Table ID | HISTORY (Relate between DESIGN_SET and REVISION) |
|---|---|
| Unique Index | DESIGN_CODE + REVISION_CODE |

| No | Record ID | Type | Length | Status | Description |
|---|---|---|---|---|---|
| 1 | DESIGN_CODE | String | 10 | PK1 | Identify the design |
| 2 | REVISION_CODE | String | 10 | PK2 (second primary key) | Identify the design changes |
| 3 | DATE | String | 80 | | Specify the date for design changes |

TABLE 7

Detailed information for HIERARCHY table

| Table ID | HIERARCHY (Relate between REVISION and DOMAIN (e.g. CN/FR/DP/PV)) |
|---|---|
| Unique Index | REVISION_CODE + CODE + PARENT + NUMBER |

| No | Record ID | Type | Length | Status | Description |
|---|---|---|---|---|---|
| 1 | REVISION_CODE | String | 10 | PK1 | Identify the design changes |
| 2 | CODE | String | 20 | PK2 (second primary key) | Identify the domain description |
| 3 | PARENT | String | 20 | PK3 (third primary key) | Indicate the zigzagging source |
| 4 | NUMBER | String | 2 | PK4 (fourth primary key) | Indicate the hierarchy number |

TABLE 8

Detailed information for CN table

| Table ID | CN (Store customer needs (CNs) in customer domain) |
|---|---|
| Unique Index | CODE + PARENT + NUMBER |

| No | Record ID | Type | Length | Status | Description |
|---|---|---|---|---|---|
| 1 | CODE (DESIGN_CODE + REVISION_CODE + domain name) | String | 10 | PK1 | Identify the domain description |
| 2 | PARENT | String | 20 | PK2 | Indicate the zigzagging source |
| 3 | NUMBER | String | 2 | PK3 | Indicate the hierarchy number |
| 4 | DESCRIPTION | String | 80 | | Represent the customer need description |
| 5 | KEYWORD | String | 40 | | Represent the keyword for the customer need |
| 6 | COMMENT | String | 300 | | Represent the comment for the customer need |
| 7 | LEAF | Boolean | 1 | | Indicate the leaf/hierarchy |

TABLE 9

Detailed information for FR table

| Table ID | FR (Store functional requirements (FRs) in functional domain) |
| Unique Index | CODE + PARENT + NUMBER |

| No | Record ID | Type | Length | Status | Description |
|---|---|---|---|---|---|
| 1 | CODE | String | 10 | PK1 | Identify the domain description |
| 2 | PARENT | String | 20 | PK2 | Indicate the zigzagging source |
| 3 | NUMBER | String | 2 | PK3 | Indicate the hierarchy number |
| 4 | DESCRIPTION | String | 80 | | Represent the FR description |
| 5 | KEYWORD | String | 40 | | Represent the keyword for the FR |
| 6 | COMMENT | String | 300 | | Represent the comment for the FR |
| 7 | CATEGORY | String | 20 | | Represent the FR category |
| 8 | VERIFICATION | String | 5 | | Represent the FR verification spec |
| 9 | LEAF | Boolean | 1 | | Indicate the leaf/hierarchy |

TABLE 10

Detailed information for DP table

| Table ID | DP (Store design parameters (DPs) in physical domain) |
| Unique Index | CODE + PARENT + NUMBER + ALTERNATIVE |

| No | Record ID | Type | Length | Status | Description |
|---|---|---|---|---|---|
| 1 | CODE | String | 10 | PK1 | Identify the domain description |
| 2 | PARENT | String | 20 | PK2 | Indicate the zigzagging source |
| 3 | NUMBER | String | 2 | PK3 | Indicate the hierarchy number |
| 4 | ALTERNATIVE | String | 2 | PK4 | Indicate alternative status |
| 5 | DESCRIPTION | String | 80 | | Represent the DP description |
| 6 | KEYWORD | String | 40 | | Represent the keyword for the DP |
| 7 | COMMENT | String | 300 | | Represent the comment for the DP |
| 8 | CATEGORY | String | 20 | | Represent the DP category |
| 8 | VERIFICATION | String | 5 | | Represent the DP verification spec |
| 10 | LEAF | Boolean | 1 | | Indicate the leaf/hierarchy |

TABLE 11

Detailed information for CONSTRAINT table

| Table ID | CONSTRAINT (Store constraint information) |
| Unique Index | CODE + PARENT + NUMBER |

| No | Record ID | Type | Length | Status | Description |
|---|---|---|---|---|---|
| 1 | CODE | String | 10 | PK1 | Identify the domain description |
| 2 | PARENT | String | 20 | PK2 | Indicate the zigzagging source |
| 3 | NUMBER | String | 2 | PK3 | Indicate the hierarchy number |
| 4 | DESCRIPTION | String | 80 | | Represent the Constraint description |
| 5 | KEYWORD | String | 40 | | Represent the keyword for the Constraint |
| 6 | COMMENT | String | 300 | | Represent the comment for the Constraint |
| 7 | CATEGORY | String | 20 | | Represent the Constraint category |
| 8 | VERIFICATION | String | 5 | | Represent the Constraint verification spec |
| 9 | INITIAL_VALUE | String | 10 | | Estimated value for budget |
| 10 | ACTUAL_VALUE | String | 10 | | Actual value for budget |
| 11 | LEAF | Boolean | 1 | | Indicate the leaf/hierarchy |

TABLE 12

Detailed information for EFFECT table

| Table ID Unique Index | EFFECT (Relate between CONSTRAINT and FR (FR/DP domain)) CODE1 + CODE2 | | | |
|---|---|---|---|---|
| No Record ID | Type | Length | Status | Description |
| 1 CODE1 (For FR/DP mapping CODE1: CODE in FR table + PARENT in FR table + NUMBER in FR table) | String | 10 | PK1 | Identify the domain description |
| 2 CODE2 (For FR/DP mapping CODE2: CODE in CONSTRAINT table + PARENT in CONSTRAINT table + NUMBER in CONSTRAINT table + DOMAIN in CONSTRAINT table) | String | 20 | PK2 | Indicate the zigzagging source |

TABLE 13

Detailed information for DM table

| Table ID Unique Index | DM (Relate between FR and DP (FR/DP mapping)) CODE1 + CODE2 | | | |
|---|---|---|---|---|
| No Record ID | Type | Length | Status | Description |
| 1 CODE1 | String | 10 | PK1 | Identify the row for design matrix element |
| 2 CODE2 (For FR/DP mapping CODE2: CODE in DP table + PARENT in DP table + NUMBER in DP table + ALTERNATIVE in DP table) | String | 10 | PK2 | Identify the column for design matrix element |
| 3 VALUE | String | 40 | | Represent the effect between FR/DP |
| 4 COMMENT | String | 300 | | Represent the comment for the element |

TABLE 14

Detailed information for OPERATION table

| Table ID Unique Index | Identify specific operation (i.e. method in the source file) NAME + ATTRIBUTE | | | |
|---|---|---|---|---|
| No Record ID | Type | Length | Status | Description |
| 1 NAME | String | 10 | PK1 | Identify the source code |
| 2 METHOD | String | 20 | PK2 | Indicate operation within the source code |
| 3 DESCRIPTION | String | 80 | | Represent the description |

TABLE 15

Detailed information for VARIABLE table

| Table ID Unique Index | Identify specific variable (i.e. attribute in the source file) NAME + METHOD | | | |
|---|---|---|---|---|
| No Record ID | Type | Length | Status | Description |
| 1 NAME | String | 10 | PK1 | Identify the source code |
| 2 ATTRIBUTE | String | 20 | PK2 | Indicate data within the source code |
| 3 DESCRIPTION | String | 80 | | Represent the description |

TABLE 16

Detailed information for ATTRIBUTE table

| Table ID Unique Index | Relate between VARIABLE and DP NAME + ATTRIBUTE + CODE2 | | | |
|---|---|---|---|---|
| No Record ID | Type | Length | Status | Description |
| 1 NAME | String | 10 | PK1 | Identify the source code |
| 2 ATTRIBUTE | String | 20 | PK2 | Indicate data within the source code |
| 2 CODE2 | String | 10 | PK3 | Identify the column for design matrix element |

TABLE 17

Detailed information for METHOD table

| Table ID<br>Unique Index | | | Relate between OPERATION and DM<br>NAME + METHOD + CODE1 + CODE2 | |
|---|---|---|---|---|
| No Record ID | Type | Length | Status | Description |
| 1 NAME | String | 10 | PK1 | Identify the source code |
| 2 METHOD | String | 20 | PK2 | Indicate operation within the source code |
| 3 CODE1 | String | 10 | PK3 | Identify the row for design matrix element |
| 4 CODE2 | String | 10 | PK4 | Identify the column for design matrix element |

Realization of a Software Design Database

A) Database Construction

To access a design database system, the structure for the design database may be pre-defined within the database system, and the users to access the database must be assigned properly. A database manager usually performs these steps at the beginning of the database design. However, a software production system may generate the database structure and assign users automatically. If a commercial database system (e.g. Microsoft Access, Oracle, DB2 and the like) supporting the Structured Query Language (SQL), the database system can create the database structure supporting software design. SQL has several command syntaxes to contact the database. Examples for these SQL commands include:

Table Creation

```
create table table_name (record_name_1, record_type(record_length),
              recore_name_2, record_type(record_length),
                ...
              recore_name_n, record_type(record_length));
```

User Creation
create user user_name identified by password;

B) Data Handling

SQL has several commands to access a database. These commands are summarized as:
INSERT: Stores a new data set
UPDATE: Modifies an existing data set
DELETE: Erases an existing data set
FETCH: Inquires the data set which matches the given condition A software designer can manipulate the design database using these commands and the software system may provide standard interfaces between designers and the software database.

Database Implementation

Figure 21:
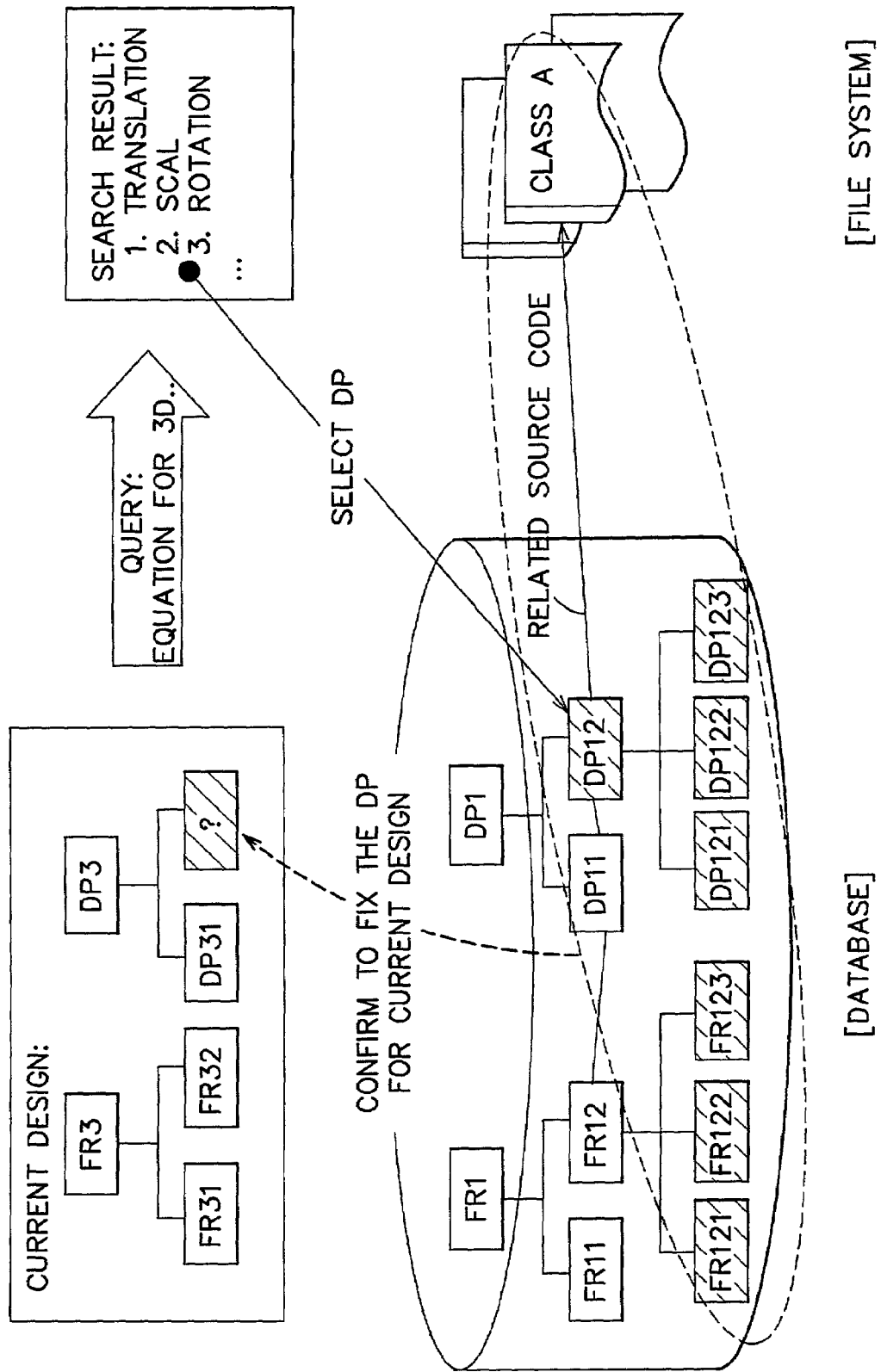
FIG. 21 is a block diagram showing a search for design parameters according to one embodiment of the invention.

A database implementation is shown in FIG. 21. Whenever the user provides a query, the database system searches the design database and determines matched information based on the provided query. If the database system can determine the required DP information, it will provide the result(s) within a scrollable list table as shown. Therefore, the user can navigate the suggested search result to determine a proper DP to use. If he/she decides to select one of the suggestions, the database system adds the selected design hierarchy into the current design specification. In this way, the software designer may improve the reusability, reduce maintenance cost and reduce the development cost of software. Detailed actions performed by the database according to various embodiments of the invention are as follows:

A) Query

According to one embodiment of the invention, the database system includes a graphical user interface that allows a user to search through the software design database. The interface has several fields listed below:

Input: search string
Options:
  For multiple string search:
    AND: find data which includes all the search string
    OR: find data which includes at least one search string
  For domain:
    FR: find DP data with corresponds FR information
    DP: find DP data directly
    DM: find DP data which has the same string within the design matrix
    All: find DP data with all cases listed above
  For layer:
    Package: find DP data located at the higher level in the design hierarchy (in case of the designer wants to get the whole packages which include several class files)
    Class: find DP data located at the middle level in the design hierarchy (in case of the designer wants to get a specific class files)
    Method: find DP data located at the lower level in the design hierarchy (in case of the designer wants to obtain the detailed methods which includes specific algorithms)
  For field:
    description: find the search string in description field
    keyword: find the search string in keyword field
    comment: find the search string in comment field
    category: find the search string in category field
    all: find the search string in all field B) Search Result As a user selects one of the search results, a user can access detailed information so that he/she can obtain more information regarding how the design works. During this navigation process, the user can decide which suggested design fits into their design. To provide the proper information, the database system provides information to the user in three different formats such as:

Hierarchy and descriptions for each level including FR/DP/PV and design matrix
Graphical representation with UML (discussed below in more detail)
Source code view C) Confirmation of Design Selection After the user makes a decision to use one of the design suggestions, the database system copies information associated with the design suggestion from the selected design and pastes into the current design. According to one embodiment, the database system may provide several guides to allow minor changes to fit into their design requirements.

Automatic Generation of Unified Modeling Language (UML)

According to one aspect of the invention, the software design system generates Unified Modeling Language diagrams based upon the axiomatic design. In particular, the software design system may perform the following:

Represent the UML using axiomatic design terminology such as FRs, DPs and design matrix Draw UML diagrams directly Generate data file to feed existing software (e.g. Rational Rose)

In the 1980s and early 1990s, object-oriented method was the fashionable technology which was going to solve the software crisis [R. S. Pressman, Software Engineering, A Practitioner's Approach, $4^{th}$ ed., New York: McGraw Hill, 1997]. There are several approaches have been introduced for the object-oriented method and three major authors (Rumbaugh, Booch and Jacobson) were spotlighted among these approaches. Recently, all these authors are agreed to combine their approaches and come up with a standard framework. As a result, the UML (Unified Modeling Language) has become a standard to develop object-oriented software programs [Rob Pooley and Perdita Stevens, Using UML—Software Engineering with Objects and Components, Addison-Wesley Longman, Inc., 1999] [Martin Fowler and Kendall Cott, UML Distilled, Addison-Wesley Longman, Inc., 1999] [Hans-Erik Eriksson and Magnus Penker, UML Toolkit, John Wiley & Sons, Inc. 1998]. UML is a visual language to represent the information in the models with graphical symbols and connections. Therefore, UML facilitates communication between project managers, programmers and designers by identifying complex relationships in object-oriented systems. Although UML represents software systems with standard symbols, the software design itself (the actual coding) remains for the designer's to complete.

Axiomatic design is useful design theory for the software design. Although most axiomatic design research is focused on mechanical systems, axiomatic design may be used to develop a software system and also support automatic code generation to assist the designer. Applying axiomatic design principles to object-oriented programming, and more specifically providing a system and method for generating UML diagrams provides the following advantages:

Reduces Modeling Effort: There are several commercially-available software packages provided to support creating system designs in UML. Each software package has their own interface to generate the UML, and in general, these packages function similar to a drawing editor. Users work within these interfaces interactively to design software systems. This interactive work often produces poor designs because design is trivialized by a drawing program—the required thought or time is not invested in design of the system. Further, UML and their editing programs alone do not provide criterion by which a design may be evaluated. By contrast, by implementing axiomatic design principles to design software, interactiveness between software modules may be reduced and quality of the software guaranteed if the design satisfies particular design axioms.

Maintain consistency: UML creation from axiomatic design provides a same interpretation between the two concepts. First, it provides a consistent viewpoint for the design (the result of axiomatic design), design representation (the UML) and the real source code. Second, this consistency helps the collaborative design and development environment for the software system.

Introduction

In this section, a relation between UML and axiomatic design according to one embodiment of the invention is presented. A key concept in UML is relationships between object-oriented classes. All representation in UML (for example, sequence diagram, activity diagram, and the like) is based on these relationships. This relationship concept is strongly matched with the design matrix in axiomatic design. Therefore, according to one embodiment of the invention, the design matrix information is expanded into a mapping result between domains.

Use Case Diagram

Definition: A use case is a description of how a system can be used (from an external actor's point of view). Use cases show the functionality of a system, and are described in terms of external actors, use cases, and the system being modeled. A use case should yield an observable result of value to a particular actor. A use-case diagram contains model elements for the system, the actors, and the use cases, and shows the different relationships such as generalization, association, and dependency between these elements.

Traditional software design methodologies including object-orientated methods usually define ambiguous functional requirements. Although a designer generally thinks about functionality during the design process, traditional design methods generally do not address functional requirements in any concrete detail. Further, there is another aspect to consider regarding the software design. The following question might be helpful to understand this aspect. "How does the designer define the functionality or functional requirement?" A customer's point of view is one of the required information to give an answer for this question. However, the information provided by the customer is also buried inside the software design as well. The use case diagram is therefore introduced to explain this customer's viewpoint.

Use cases were first introduced by Ivar Jacobson in the early 1990s, as development from the earlier idea of scenarios. Use cases represent the functionality of a system from a user's point of view by definition. The "user" means anything external to the system being developed which interacts with the system. A user might be a person, another information system, a hardware device, etc.

Axiomatic design provides a domain concept to explain the "what" and "how" relation between domains. For example, the mapping between customer domain and functional domain interprets the customer needs into functional requirements. Therefore, the customer needs in the customer domain is an excellent concept that may be used to represent the use case of a software system. Also, customer needs can have hierarchies like FRs and DPs. Because methods for constructing customer needs are various, customer needs having multiple hierarchies may be used to describe them.

Figure 22:
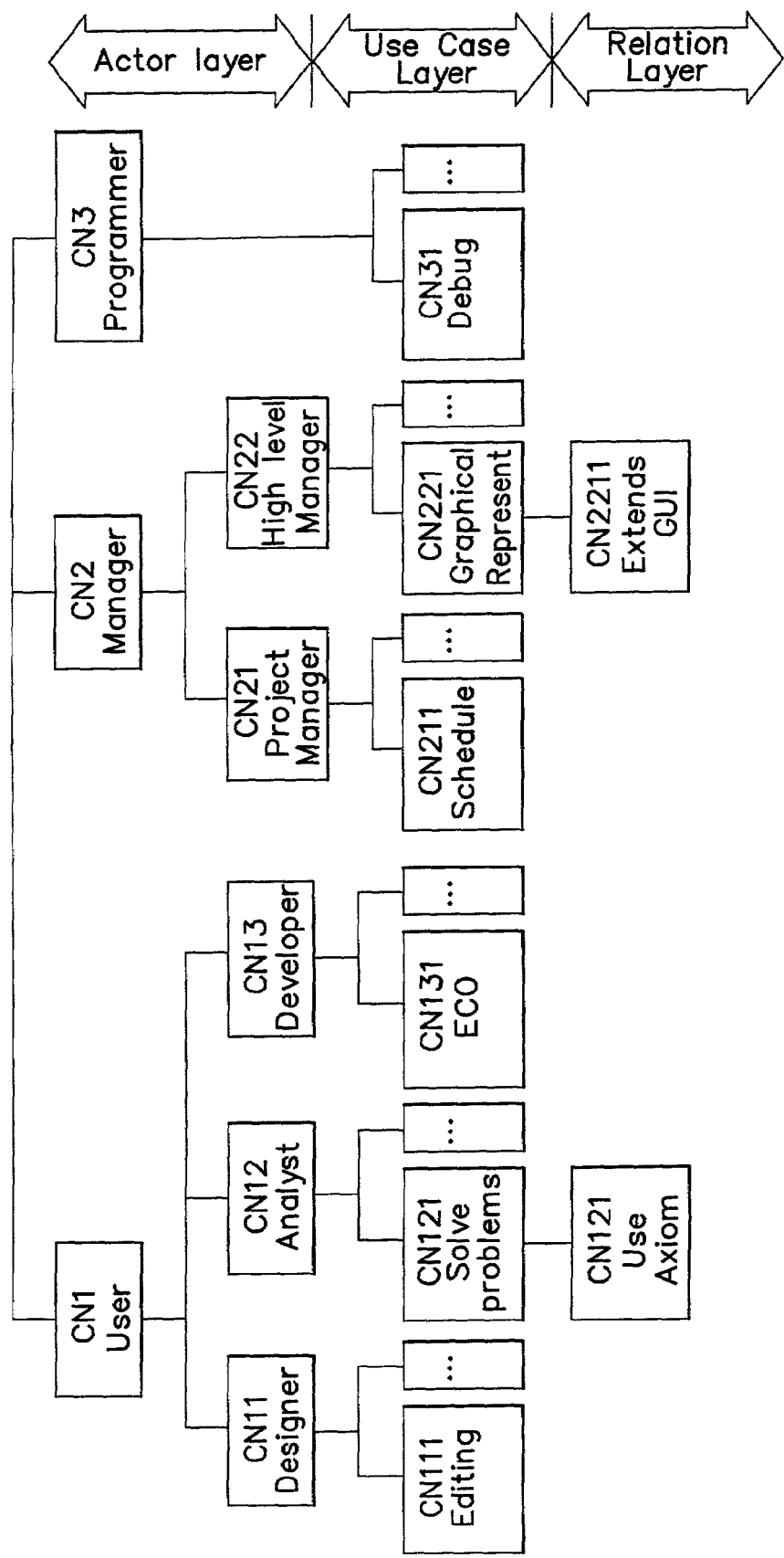
FIG. 22 is a customer needs diagram according to one embodiment of the invention.
Figure 23:
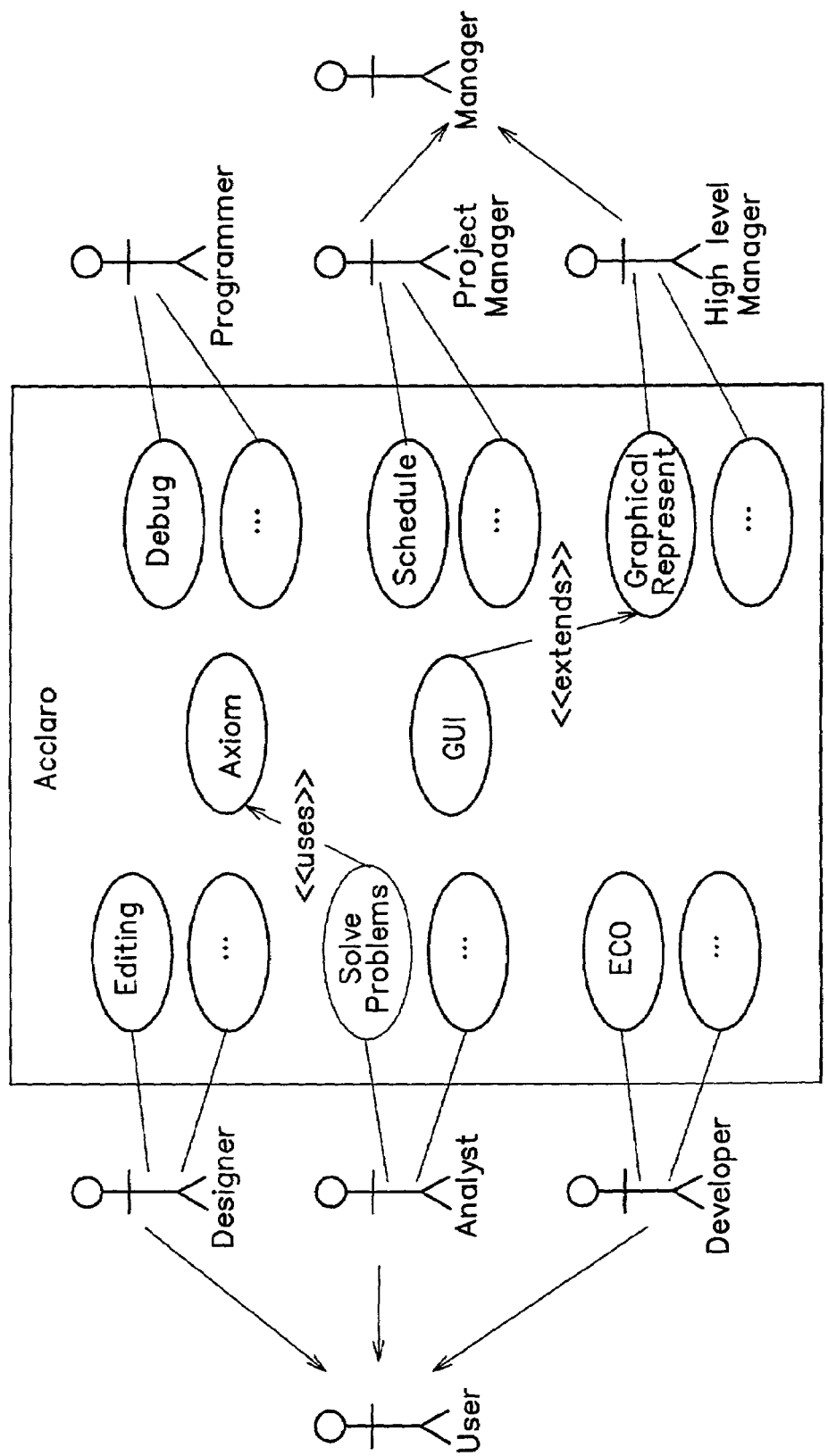
FIG. 23 is a use case diagram associated with the customer needs diagram of FIG. 22.

For example, three major hierarchy levels for software systems are used to fit into the use case concept. The first layer, called as actor layer, represents actors and can have multiple actors to represent different actor's viewpoint or relationship between actors. This layer may or may not have lower levels. The second layer describes customer needs that belongs to the actor's viewpoint and are referred to as the use case layer. This use case layer may or may not have lower levels to represent more detailed explanation. The third layer, referred to as a relation layer, describes the relationship between the customer needs in an intermediate layer. FIG. 22 shows a modified version of customer needs according to one embodiment of the invention, and is a use case diagram based on the customer needs hierarchy.

EXAMPLE

To provide a better understanding of the functional concepts, a simple drawing example is provided below, the simple drawing example being an extended version of the simple drawing example explained above:

Customer needs:
  Actor layer:
    CN1: User
  Use case layer:
    CN11: We need a software to draw a line or a rectangle or a circle at a time.
    CN12: The software should work with mouse using push, drag, and release.

Figure 24:
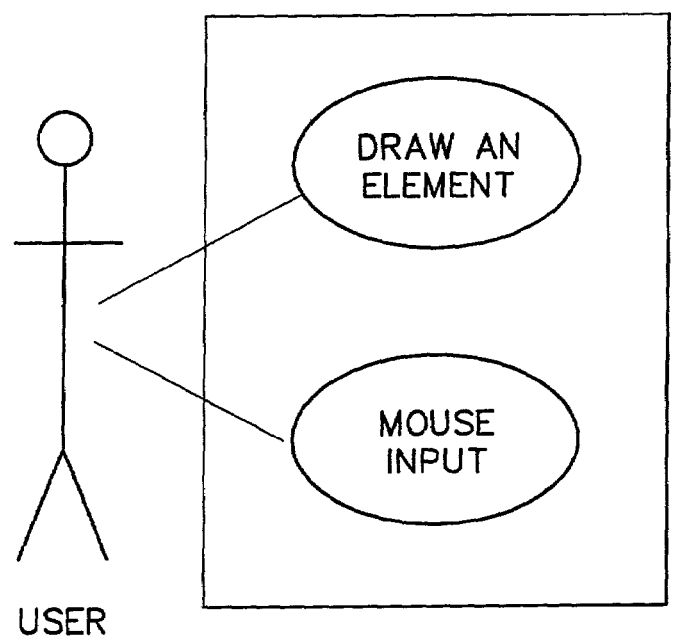
FIG. 24 is an example use case diagram according to one embodiment of the invention.

Use case diagram (as shown in FIG. 24):

Top level design:

|  | DP1: Element characteristics | DP2: GUI with window |
|---|---|---|
| FR1: Define element | A | 0 |
| FR2: Specify drawing environment | a | B |

Second level for FR1

|  | DP11: Line characteristic | DP12: Rectangle characteristic | DP13: Circle characteristic |
|---|---|---|---|
| FR11: Define line element | C | 0 | 0 |
| FR12: Define rectangle element | 0 | D | 0 |
| FR13: Define circle element | 0 | 0 | E |

Second level for FR2

|  | DP21: Radio buttons | DP22: Mouse click information | DP23: Drawing area (ie. Canvas) |
|---|---|---|---|
| FR21: Identify the drawing type | F | 0 | 0 |
| FR22: Detect drawing location | b | G | 0 |
| FR23: Draw the element | c | 0 | H |

Third level for FR11:

|  | DR111: Start point | DP112: End point |
|---|---|---|
| FR111: Define start | I | 0 |
| FR112: Define end | 0 | J |

Third level for FR12:

|  | DP121: Upper left point | DP122: Lower right point |
|---|---|---|
| FR121: Define upper left corner | K | 0 |
| FR122: Define lower right corner | 0 | L |

Third level for FR13:

|  | DP131: Center point | DP132: radius |
|---|---|---|
| FR131: Define center | M | 0 |
| FR132: Define radius | 0 | N |

Third level for FR21:

|  | DP211: Line button | DP212: Rectangle button | DP213: Circle button |
|---|---|---|---|
| FR211: Identify line | O | 0 | 0 |
| FR212: Identify rectangle | 0 | P | 0 |
| FR213: Identify circle | 0 | 0 | Q |

Third level for FR22:

|  | DP221: Event for push | DP222: Event for release |
|---|---|---|
| FR221: Detect mouse push | R | 0 |
| FR222: Detect mouse release | 0 | S |

Figure 25:
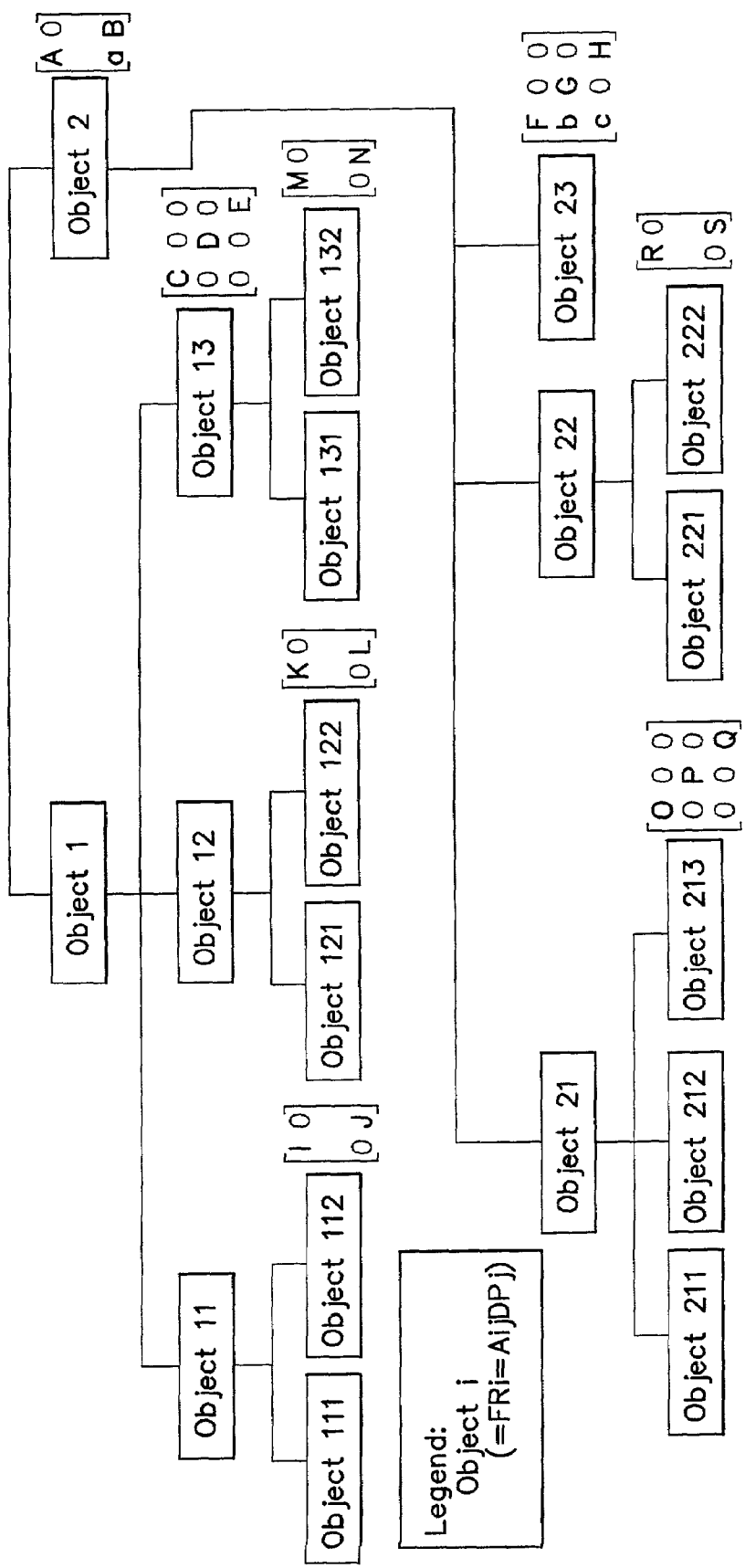
FIG. 25 is a block diagram of an example design hierarchy according to one embodiment of the invention.
Figure 26:
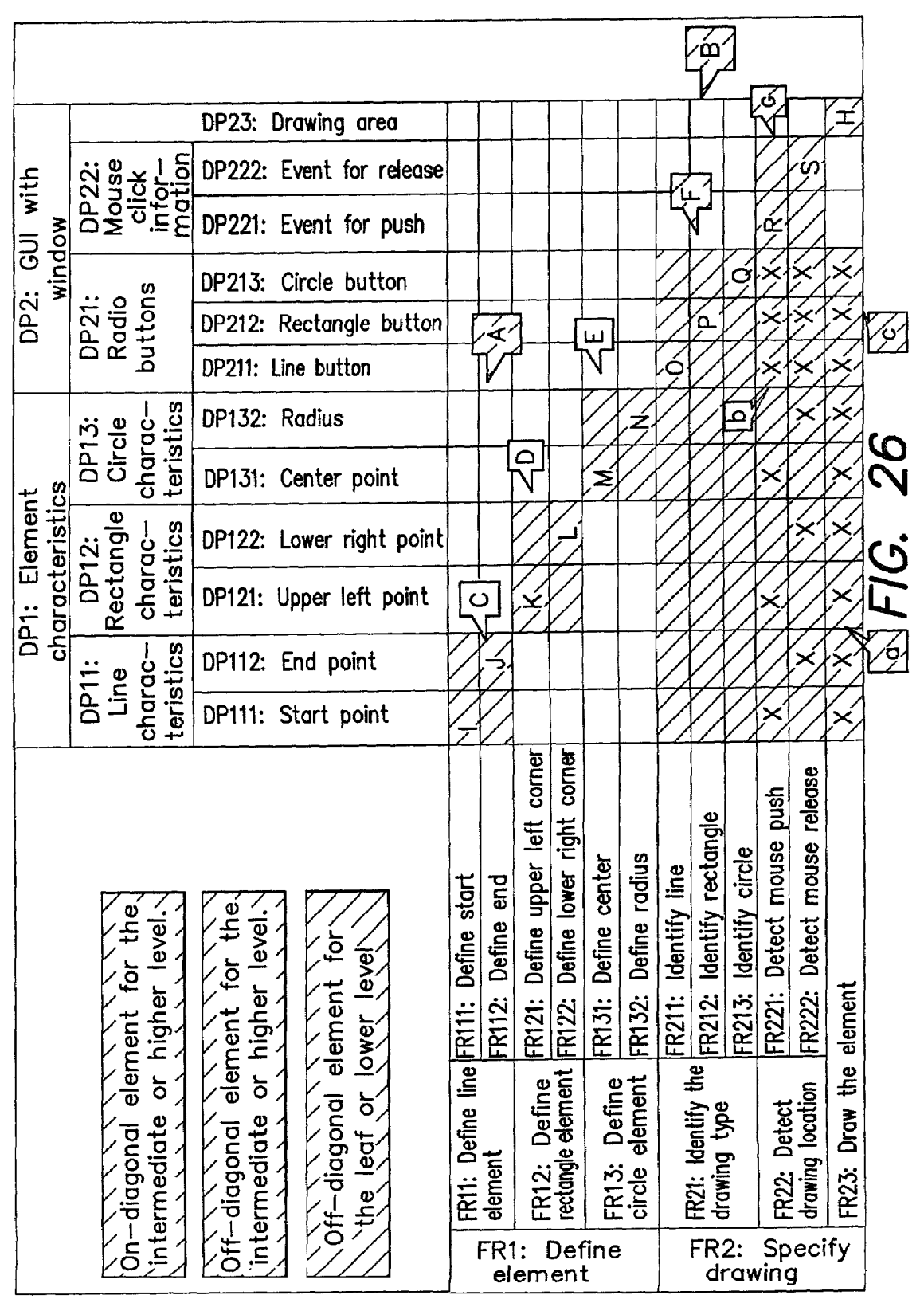

Design hierarchy (as shown in FIG. 25):
Full design matrix (as shown in FIG. 26):

Class

Definition: A class is a model element used to model entities, both intellectual and physical. A class is described with numbers that are attributes, operations, and relationships to other classes. The members are reflected in objects of the class. A class can be generalized and specialized; extension mechanisms may be attached to the class.

A class may have several behaviors for different activities and these behaviors usually are represented by one or more methods which actually manipulate the data (i.e. attributes) inside the class. This set of information can be represented by FRs, DPs and a design matrix and called as an object having indices. The behaviors should be located at the bottom of design hierarchy (i.e. leaf) because the behavior defines activity for a class. Therefore, at least one or two higher level FR/DP relations in the design hierarchy should be indicated as a class. Occasionally, an attribute inside a class is an instance of another class that indicates a part or an inner class. FIG. 25 illustrates the basis of class representation for the design hierarchy.

Based on the domain specification for the software design, the process domain represented by process variables (PVs) may define the specification for the source code. For example, the specification can be a package name, class name, method name, and the like. According to one embodiment of the invention, the design matrix relating DPs and PVs is always the same as FR and DP because the PV determines source code, and all the information within the source code are provided by the FR/DP relation. In this way, communication between the designer and the programmer can be guaranteed and maintained consistently. Therefore, these kinds of design decisions can be completed with this mapping.

Zigzagging between the two domains (i.e. physical domain and process domain) can be performed whenever the designer chooses. For example, zigzagging may be performed after the FR/DP mapping is finished at any level in the deign hierarchy. However, it is preferred that zigzagging is performed after the whole FR/DP mapping completes because the designer should think about the size of the entire software and number of class files. Further, it may be difficult to define the class specification during the design decomposition. Once one of the intermediate levels is determined as a class by a designer, further decomposition may not be necessary because the detailed design specifications such as attributes and methods are at a lower level in the FR/DP domain. Due to the limitation for the decomposition process which only focuses on the diagonal elements in the design matrix, FIG. 28 shows the class definition for the diagonal design matrix element in the example described above.

Figure 29A:
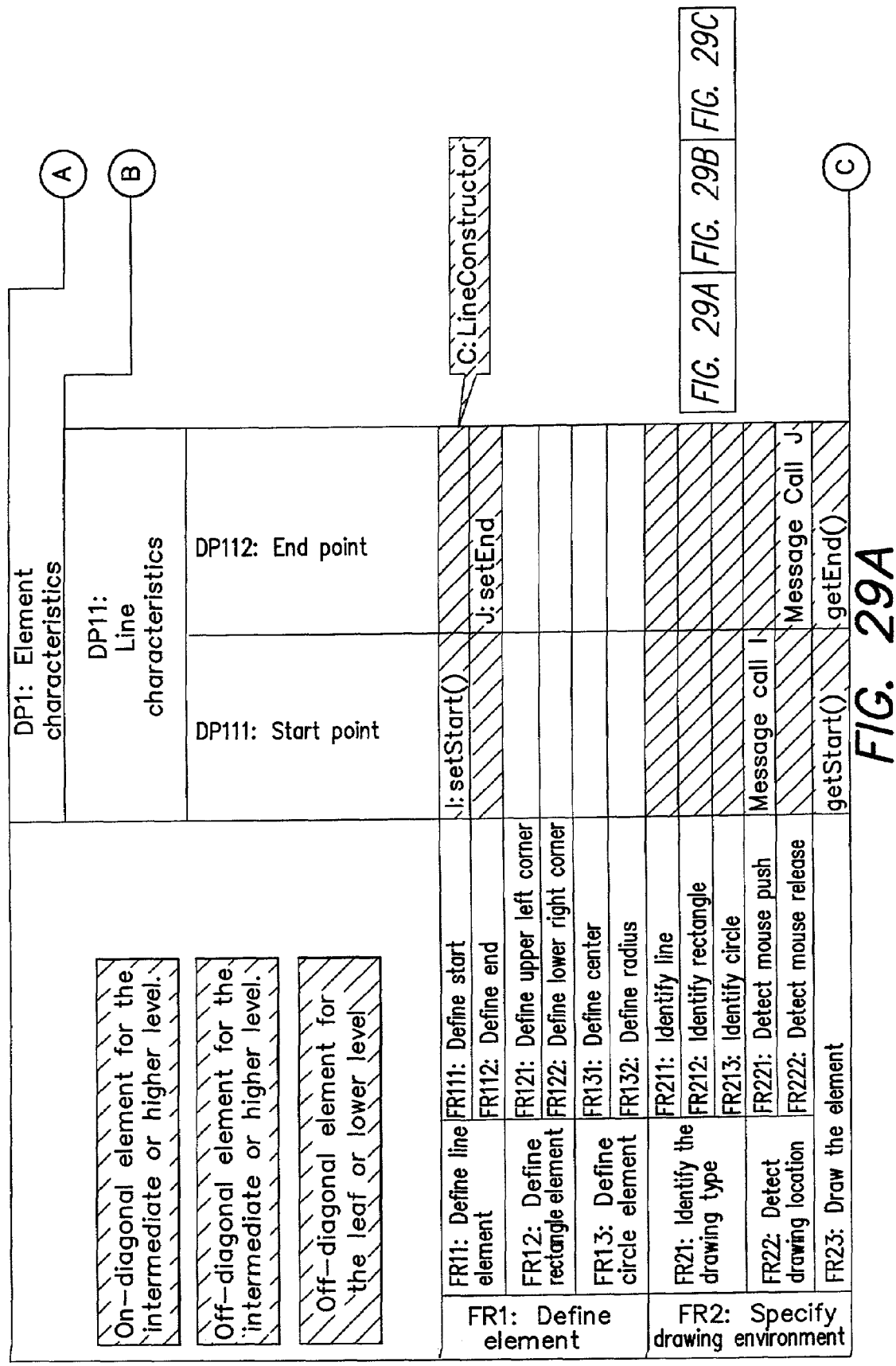
FIG. 29 is a block diagram of detailed method definitions associated with the example classes of FIG. 28.
Figure 29B:
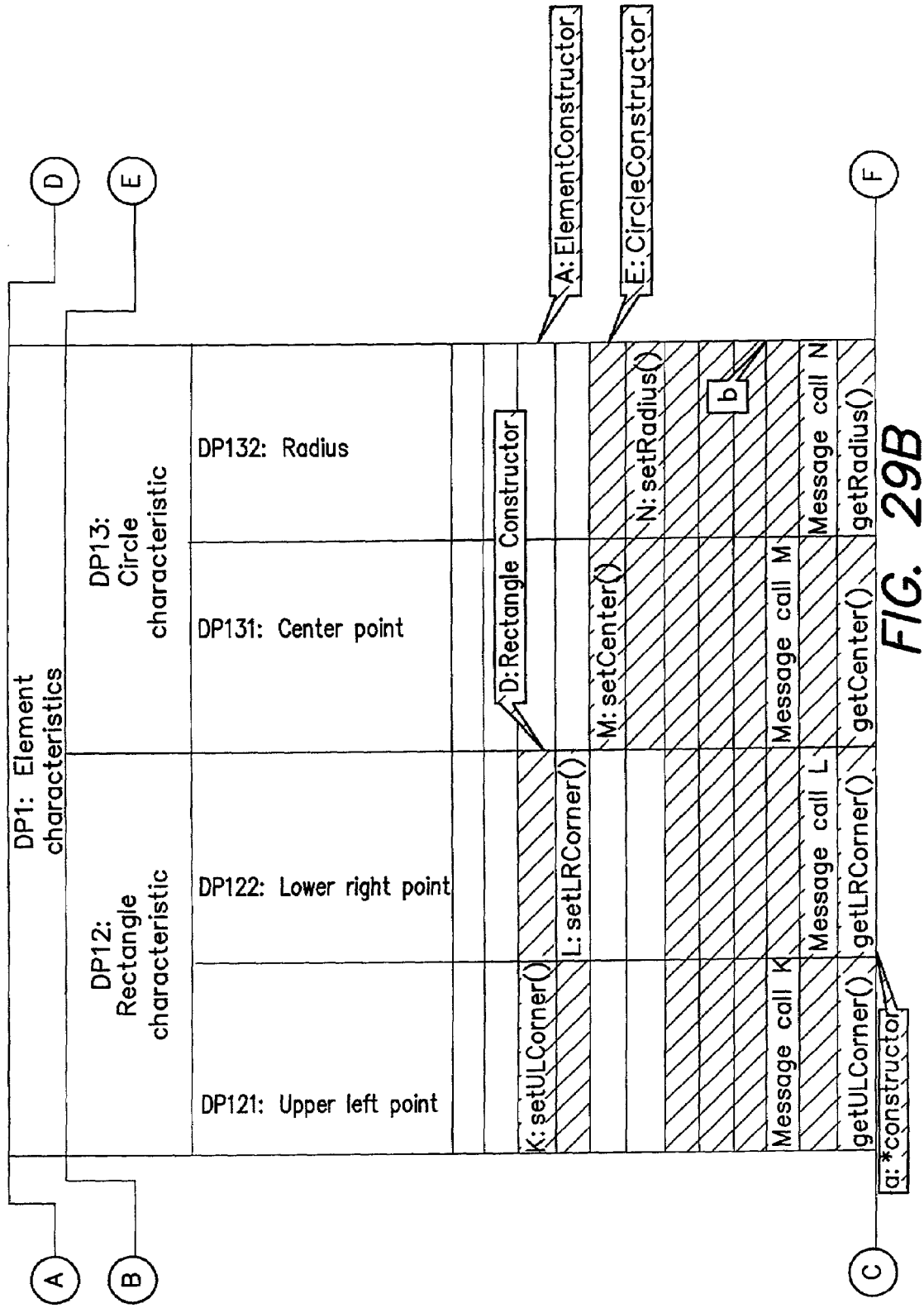
Figure 29C:
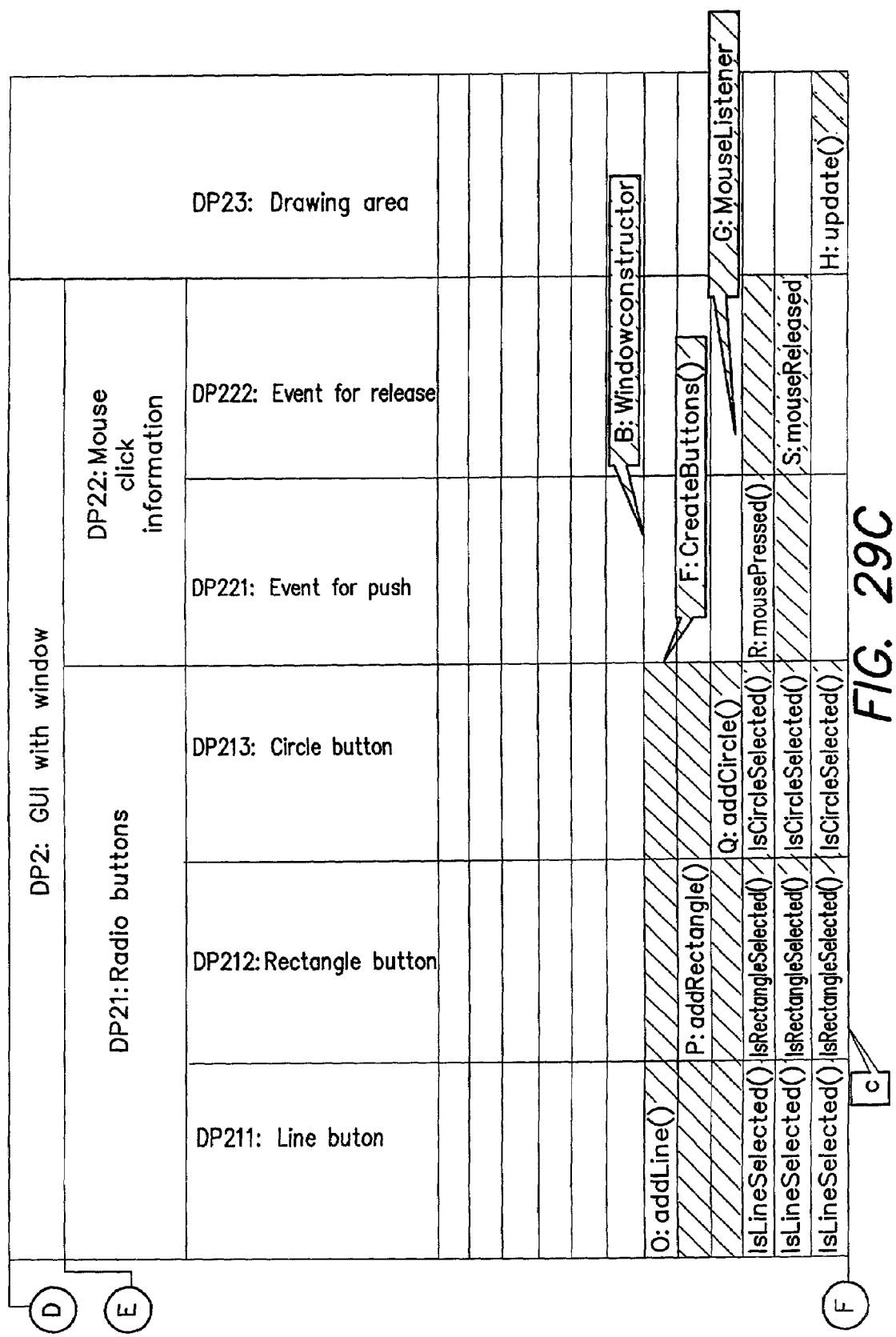

The final step is to define all the other classes (i.e. the off-diagonal design elements). The most common way to define the off-diagonal classes is to follow the class definition in the process domain. However, designers can categorize the off-diagonal terms in design matrix in their own way. Using the former definition, the example may have one off-diagonal class (i.e. object **1\*:FR2-a-DP1). The element b and c in the full design matrix do not require separate classes because these elements are located within the window_d class. FIG. 29 shows the detailed method definitions for the design matrix elements and FIG. 30** represents the entire class definitions for the given example.

Relationships

Definition: A relationship is a semantic connection among model elements. A relationship is specialized to generalization, dependency, association, transition, and link.

The relationship can be categorized in two manners. The first is the macroscopic relation which includes generalization, association, aggregation and so on. The second is the microscopic relation to represent the message transfer between classes. In axiomatic design, the macroscopic relationship can be specified at the intermediate or higher level (for instance, class level in the FIG. 27) in the design hierarchy. On the other hand, the microscopic relationship is belongs to the leaf or one level above from the leaf level (i.e. object or behavior level in the FIG. 27).

A method for defining each one of the design matrix elements for the FR/WDP domain may be based on the following questions.

Does changing the DP affect the FR?
Does the design of the DP affect the way the FR is satisfied?
Does the choice of this DP affect that FR?
Can the DP be designed without affecting the FR?
Whenever the designer finishes to fill out the entire design matrix elements and determines the class for the process domain, the following questions can serve as the basis to fill out the design matrix for the DP/PV domain:

What kind of relation does this element indicate?
How many multiplicities are involved?
Does this relation have directions?
What kind of message should be transferred?

Figure 31A:
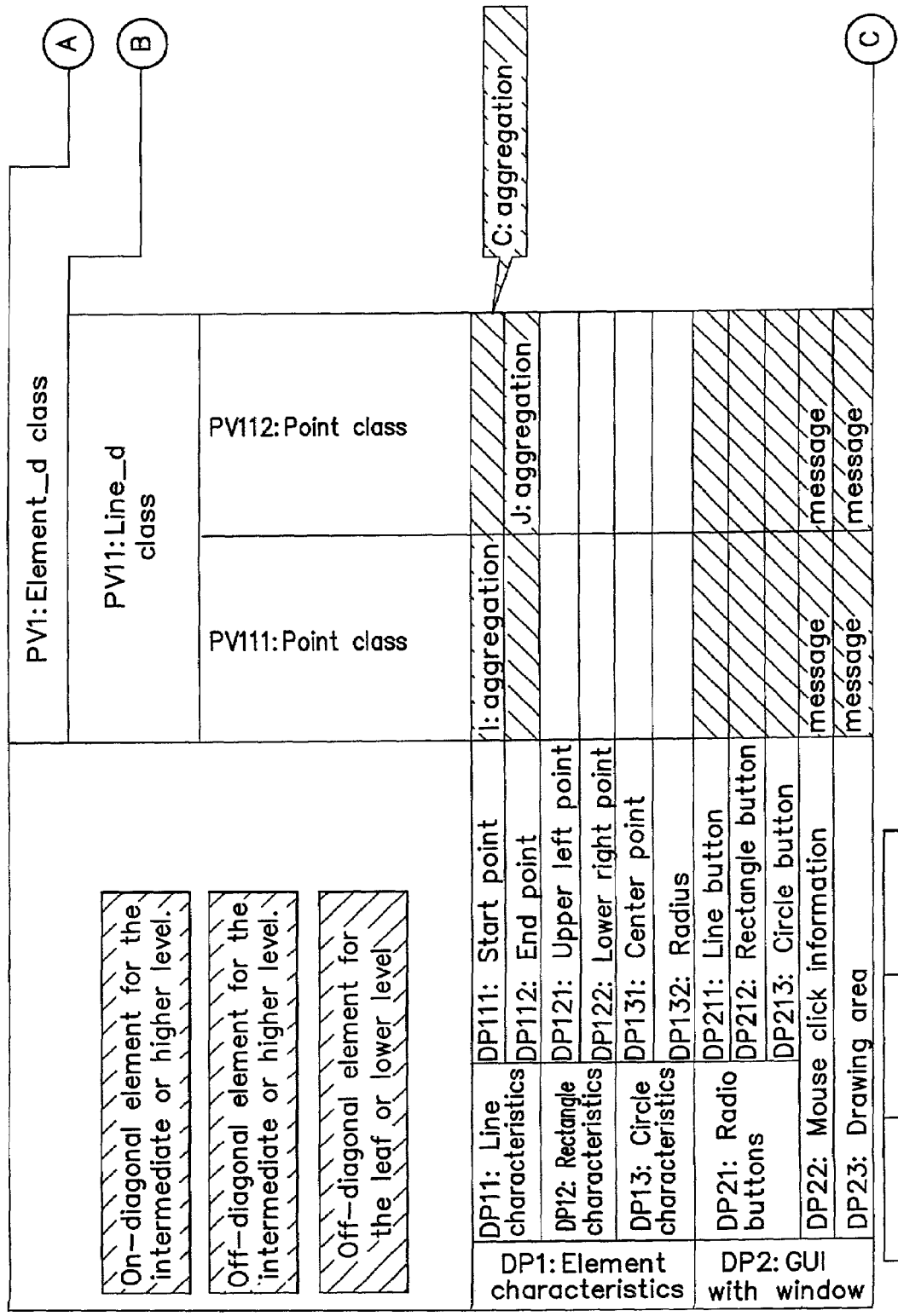
FIG. 31 is a chart showing relation definitions according to one embodiment of the invention.
Figure 31B:
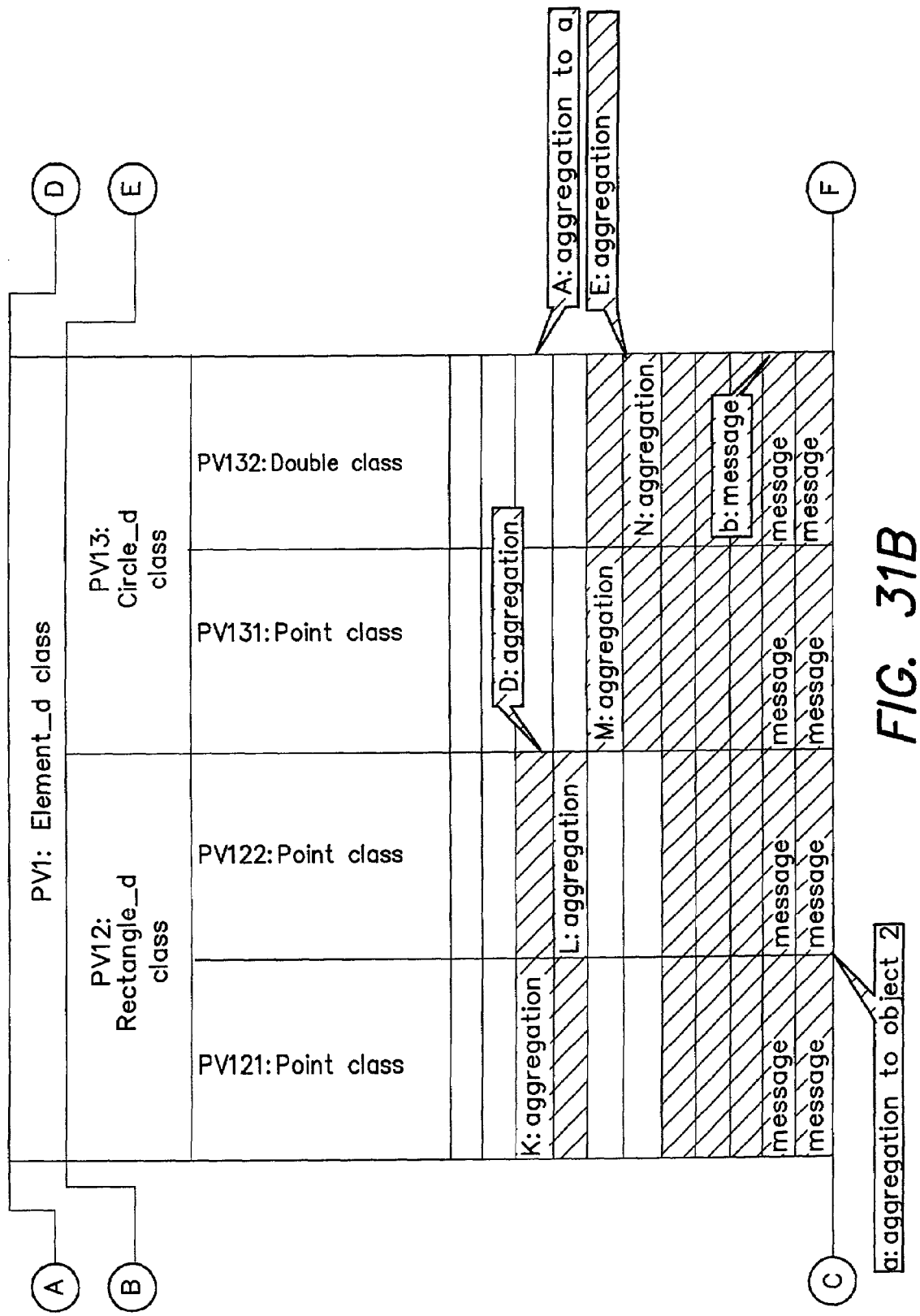
Figure 31C:
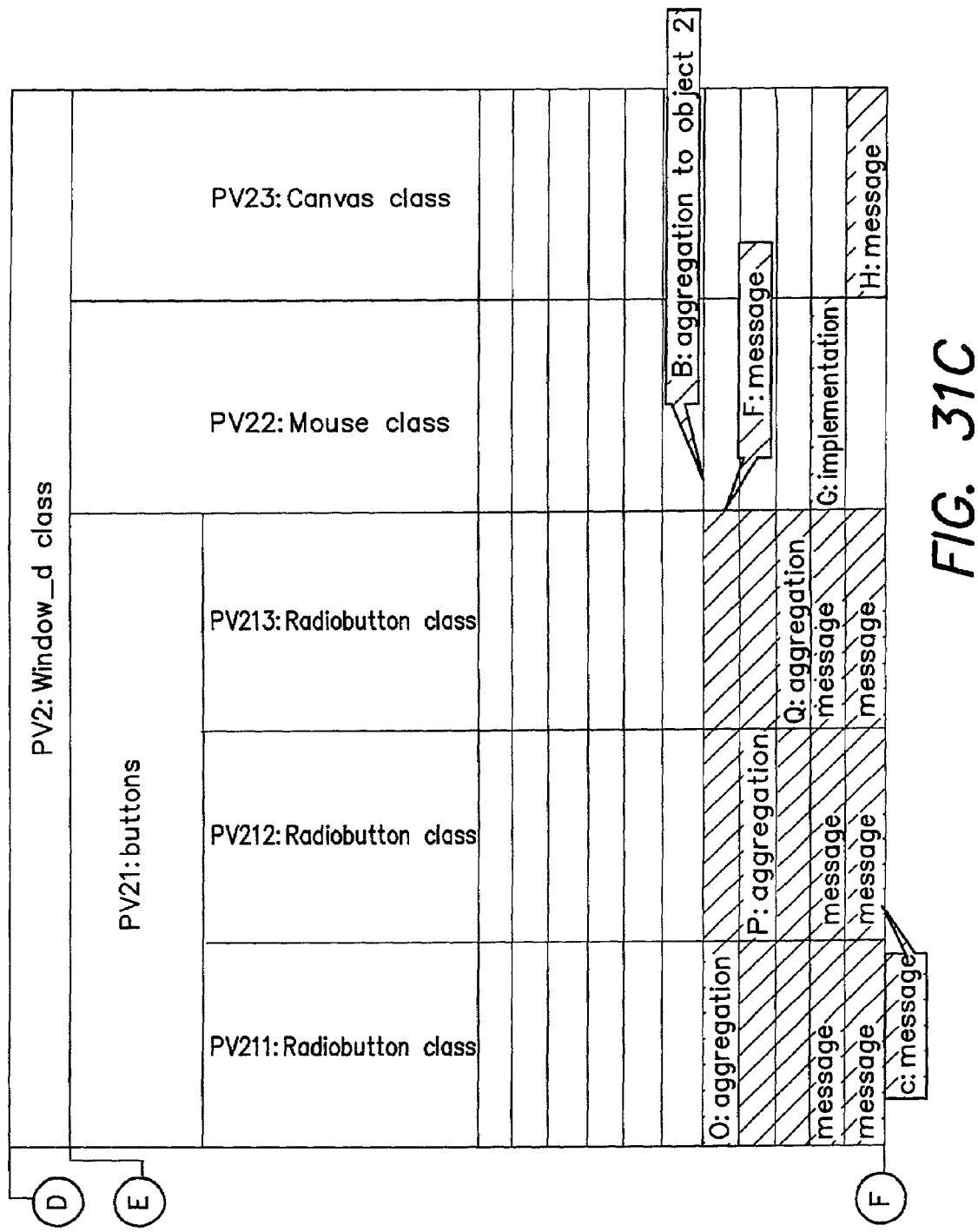

To answer these questions, decision making for the design process is performed. Also, it is the modeling process of software engineering. FIG. 31 represents these decision making processes for the example and shows that the designer wants to have aggregation relationships in this design.

Class Diagram

Definition: A class diagram shows a static structure with classes and their definitions and relationships.

Figure 32:
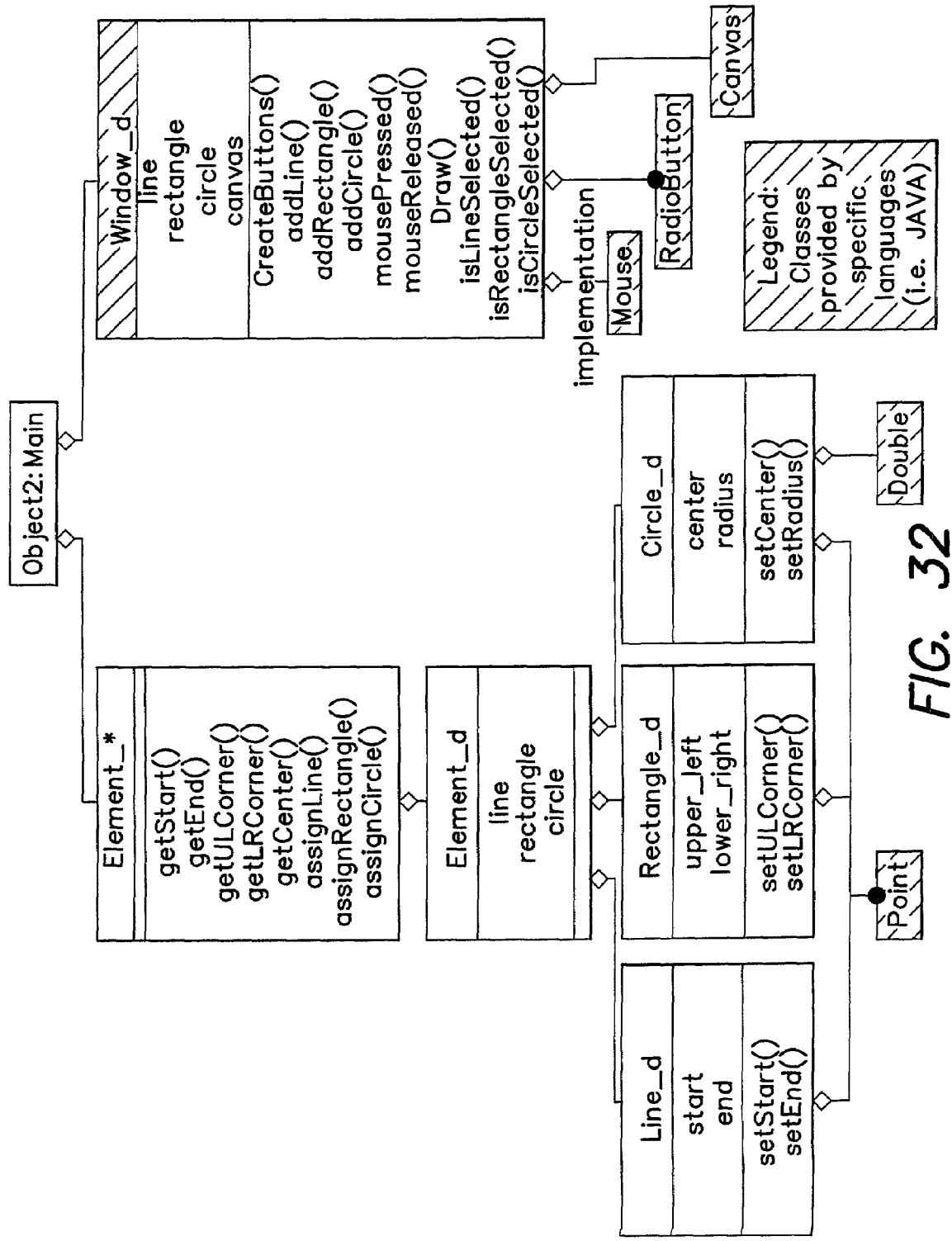
FIG. 32 is a class diagram according to one embodiment of the invention.

As the information for FR/DP design matrix, DP/PV design matrix, and PV class structure is combined, the class diagram can be generated automatically. One of the advantages of class diagram produced from axiomatic design is that the design "makes sense" to the designer, and this is important in terms of design viewpoint. Using the notation with "_d" for diagonal classes and "_*" for off-diagonal classes, the class diagram provides much more clear understanding of the design than that from object-orientated diagrams. FIG. 32 shows such a class diagram. The class diagram shown in FIG. 32 shows the macroscopic relations of objects generally. The microscopic relation can be shown with further diagrams described below.

Interaction Diagram

Definition: An interaction shows how the class/objects interact to perform a specific functionality. An interaction diagram is a generic term for sequence, and collaboration diagrams.

Interaction diagrams record in detail how objects interact to perform a task. In particular, the interaction diagrams isolate each individual task's behaviors using graphical representation and the interaction diagrams include a set of operations. A task can be represented as a functional requirement of the system. Axiomatic design determines a definition for a module, the definition being a more specific definition than that for the entire software system. The definition describes a particular task represented by the functional requirement. A module is defined mathematically in equation (4) as follows:

$$M_i = \sum_{j=1}^{j=i} \frac{\partial FR_i}{\partial DP_j} \frac{\partial DP_j}{\partial DP_i} \tag{4}$$

Figure 33A:
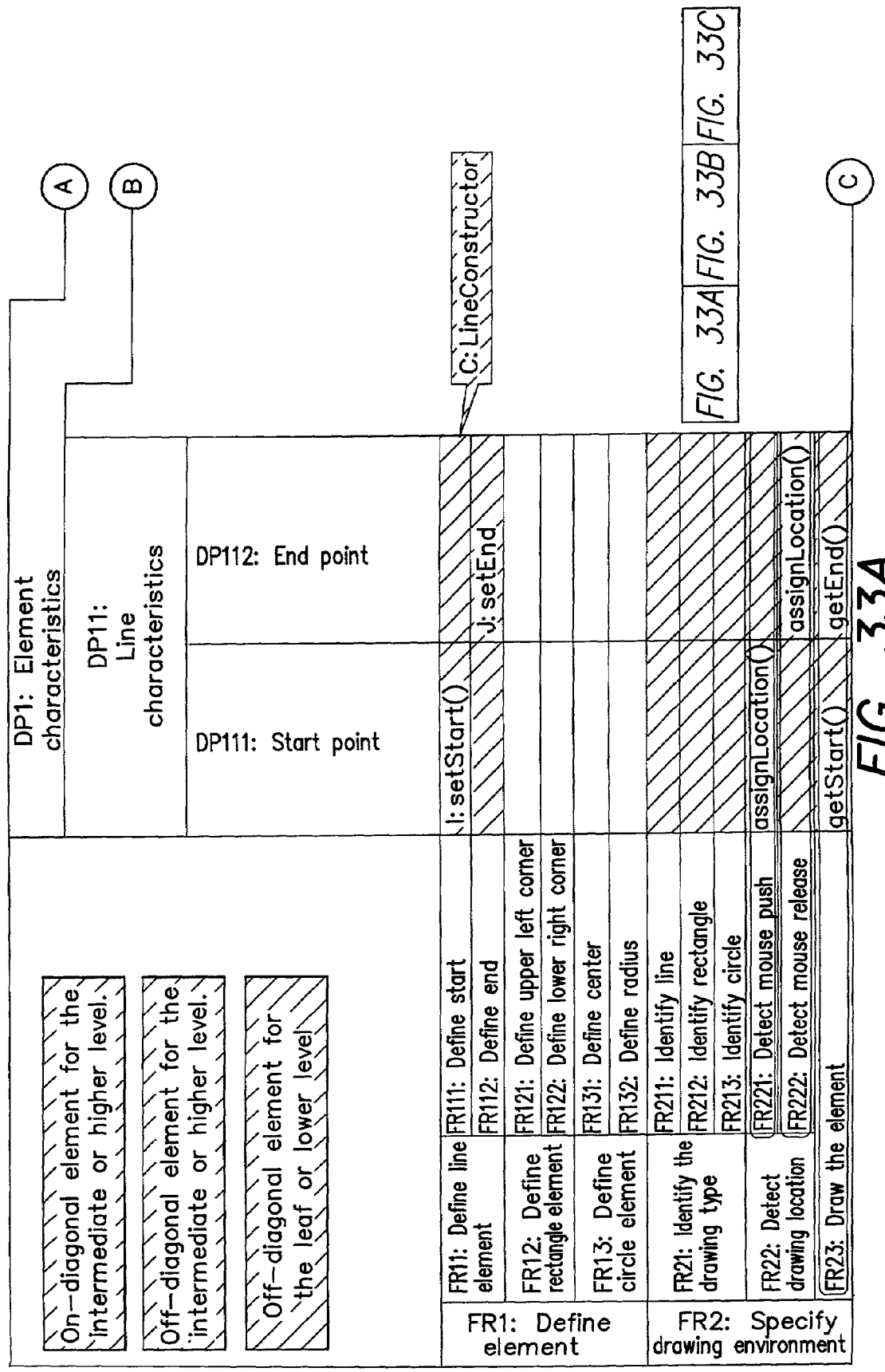
FIG. 33 is a chart showing an interaction definition according to one embodiment of the invention.
Figure 33B:
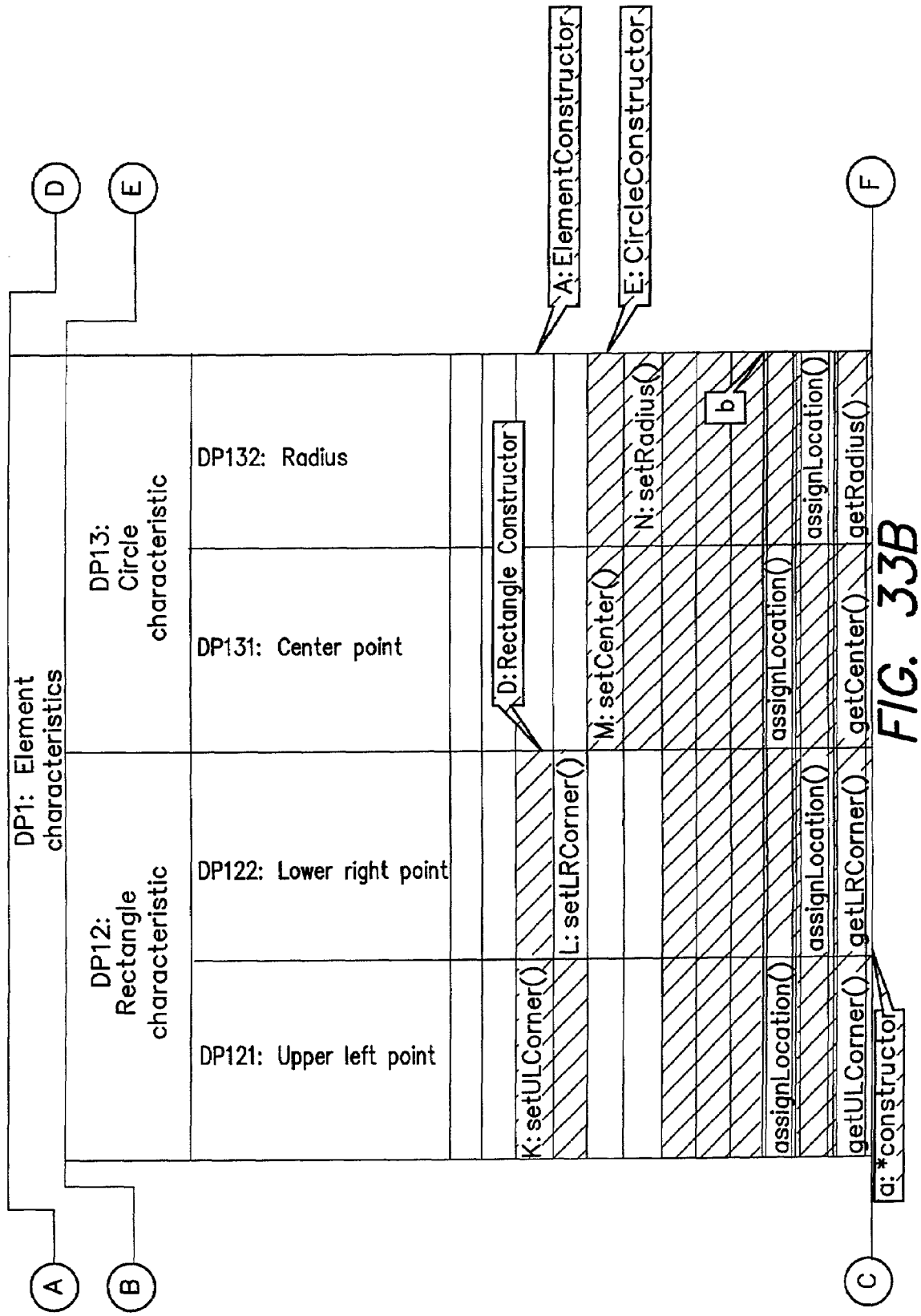
Figure 33C:
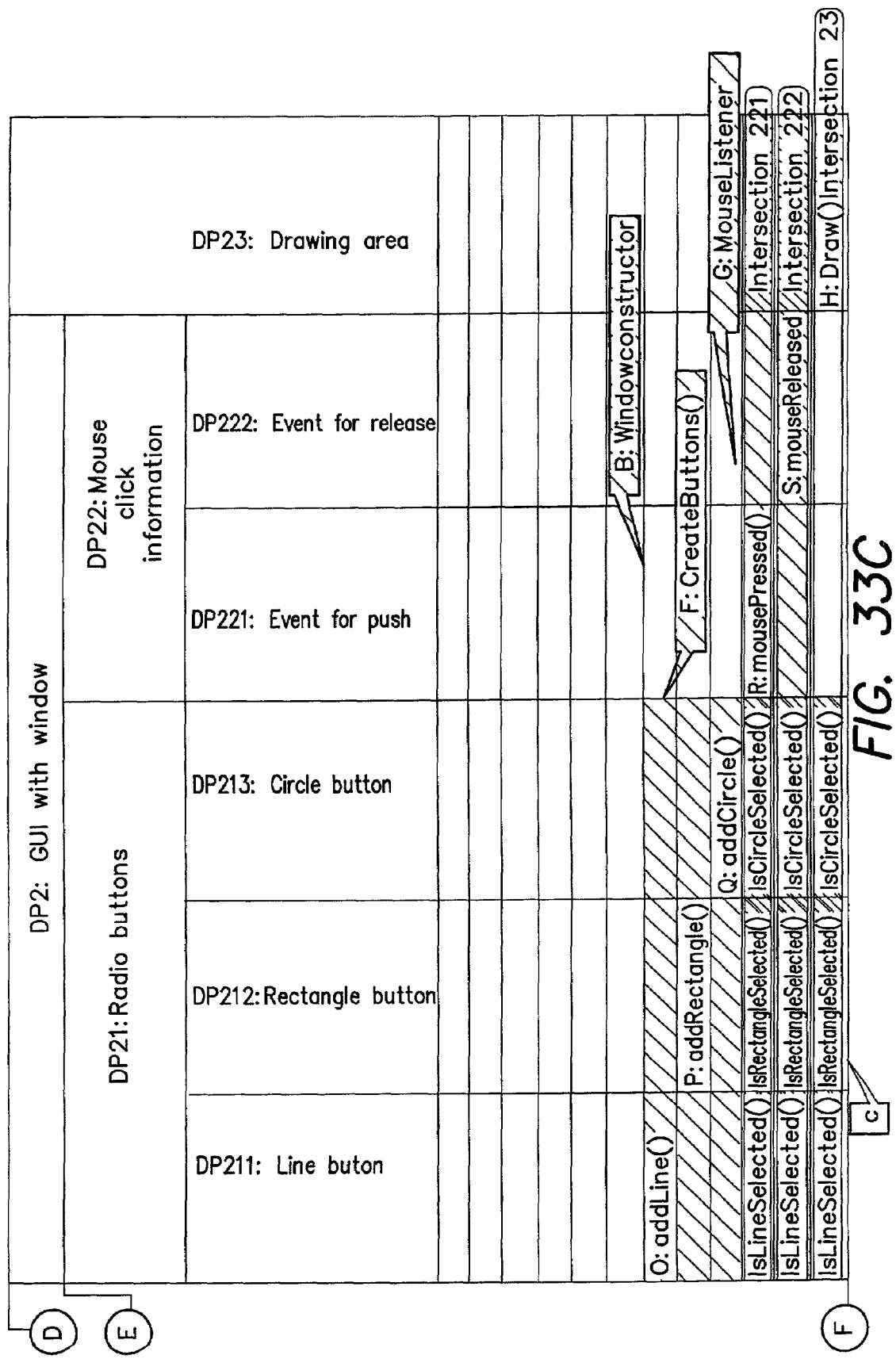

Therefore, interaction for a task can be defined as a sum of design matrix elements in a row and its corresponding DPs. The sequence of the interaction progresses from a right to a left direction because an element on a diagonal of the design matrix (referred to as an "on-diagonal" element) serves as the starting point for the corresponding FRs. If the task only has an associated on-diagonal design matrix element, interaction diagram does not need to be generated because there is no interactions with the other tasks. FIG. 33 shows the interaction definition for the example described above.

Collaboration Diagram

Definition: A collaboration describes how a set of objects interacts to perform some specific function. The collaboration diagram also describes both a context and an interaction. In particular, the context shows a set of objects involved in the collaboration along with links to each other. The interaction shows communication performed by objects in the collaboration. A collaboration diagram describes how objects interact, and focuses on the collaboration in space, which means that the relationships (links) between the objects are explicitly shown.

Figure 34:
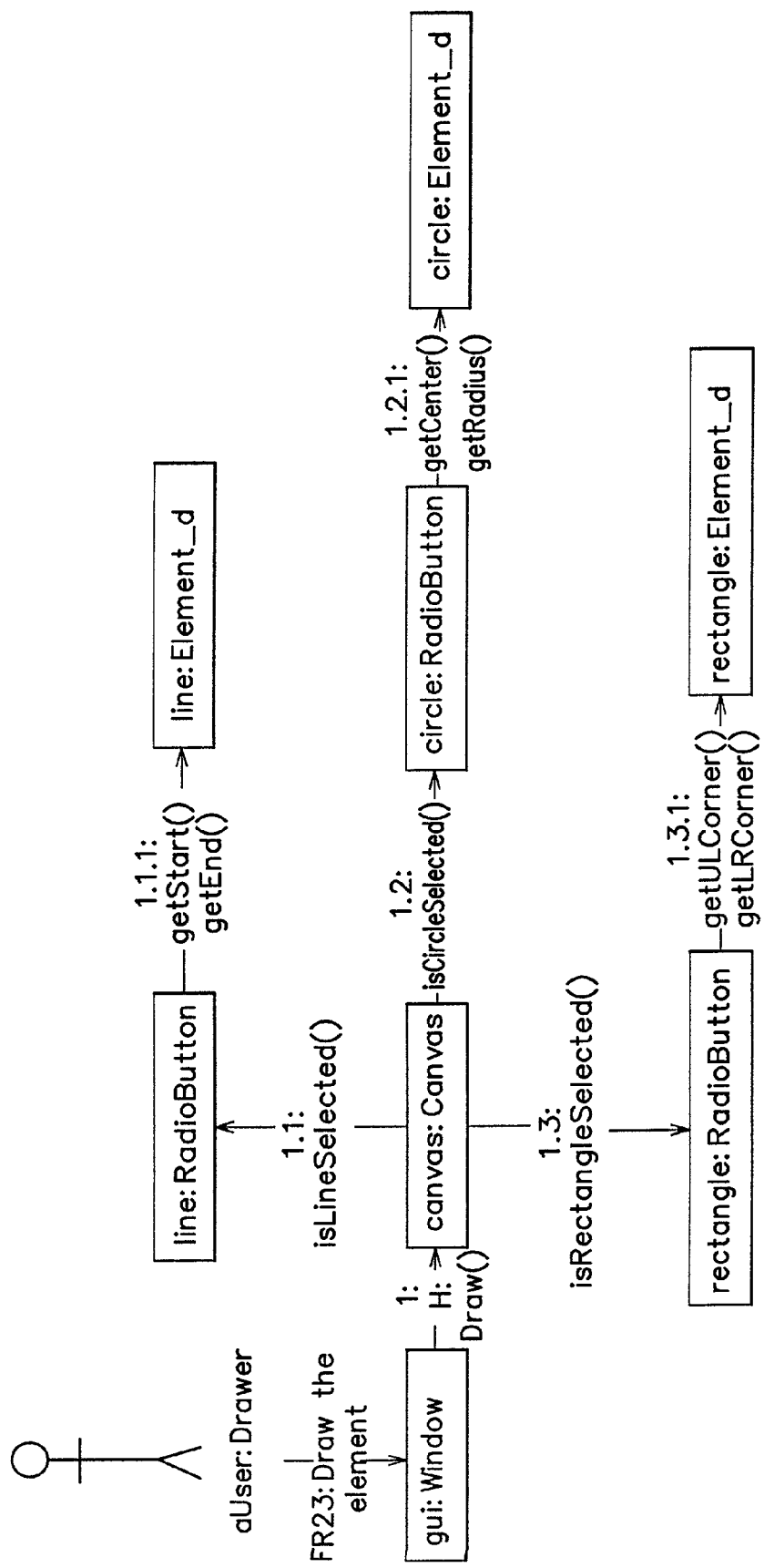
FIG. 34 shows an example collaboration diagram according to one embodiment of the invention.

With the definition of interaction, the collaboration diagram can be shown using FRs, DPs, and a design matrix. FIG. 34 illustrates the collaboration diagram based on FIG. 33 for task FR23.

Sequence Diagram

Definition: A sequence diagram describes how objects interact with each other. Sequence diagrams focus on time, meaning they display when messages are sent and received.

Figure 35:
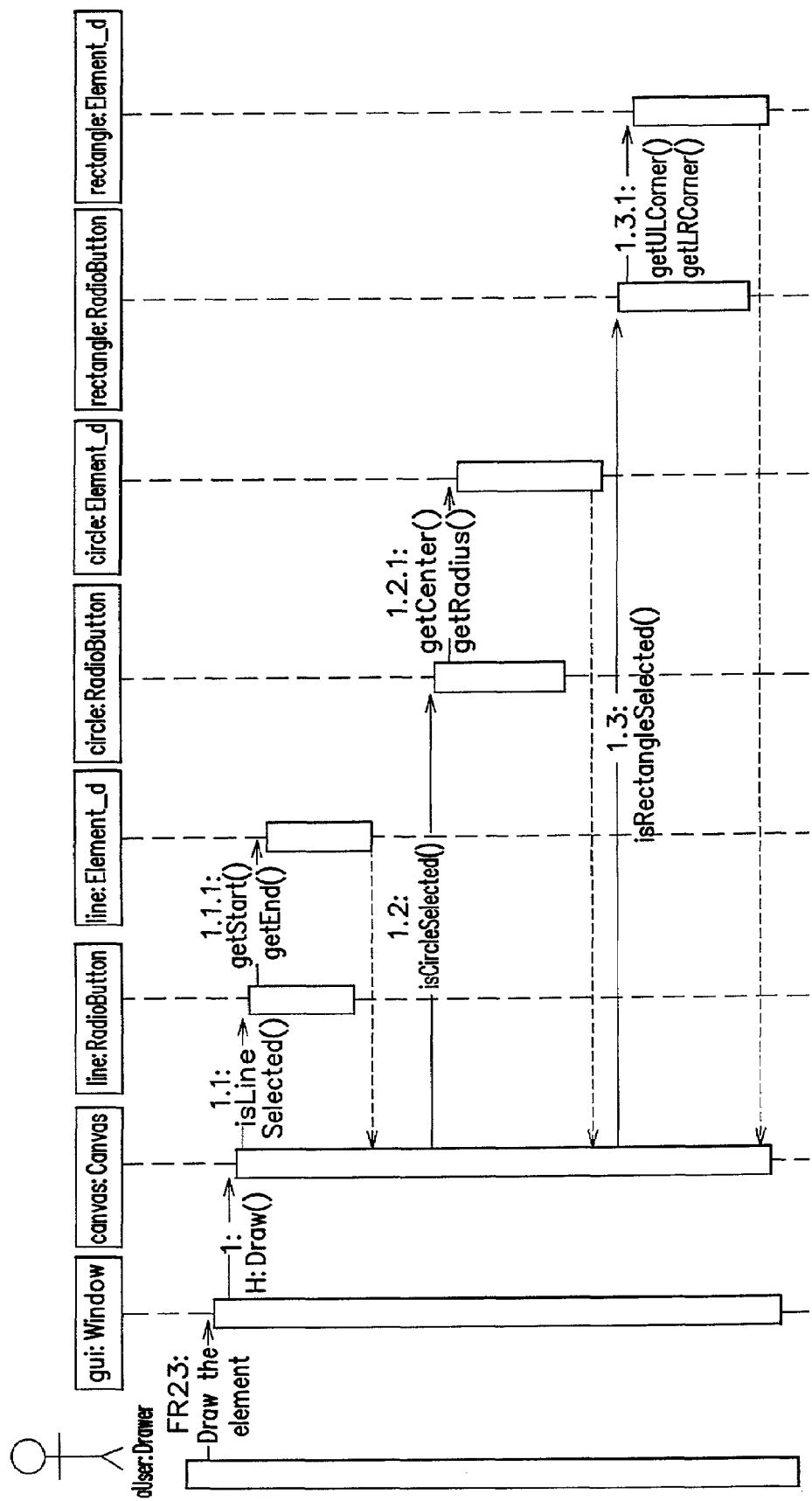
FIG. 35 is a sequence diagram according to one embodiment of the invention.

A sequence diagram may be shown with the definition of interaction. FIG. 35 shows one embodiment of a sequence diagram based on FIG. 33 for task FR23 in the example described above.

If these diagrams are too complicated, a designer can decompose these further. Therefore, these interaction diagrams can serve as a guide to further decomposition. For example, FR23 can be decomposed into FR231: Draw a line, FR232: Draw a rectangle, and FR233: Draw a circle. Thus, the collaboration diagram and sequence diagram is more concise (e.g. if a designer needs to see the interaction for "FR231: draw a line", the collaboration diagram and sequence diagram only shows the interaction with 1, 1.1, and 1.1.1 from the FIG. 34 and 35).

State Diagram

Definition: An object state is determined by its attribute values and links to other objects. A state is a result of previous activities in the object. A state diagram captures object life cycles (also the life cycles of subsystems and systems). The state diagram illustrates how events (messages, time, errors, and state) changes affect object states over time.

Information for object state changes may not be identifiable using axiomatic design. It needs another definition to represent correctly and the definition is not fixed in axiomatic design so far. Even though the state diagram is useful to understand the operation of the system, this diagram is not necessary often during the software development process.

Activity Diagram

Definition: An activity diagram shows interactions between entities, focusing on the work performed. The activity diagram displays a sequence of actions including alternative executions and objects involved in performing the work.

Figure 36:
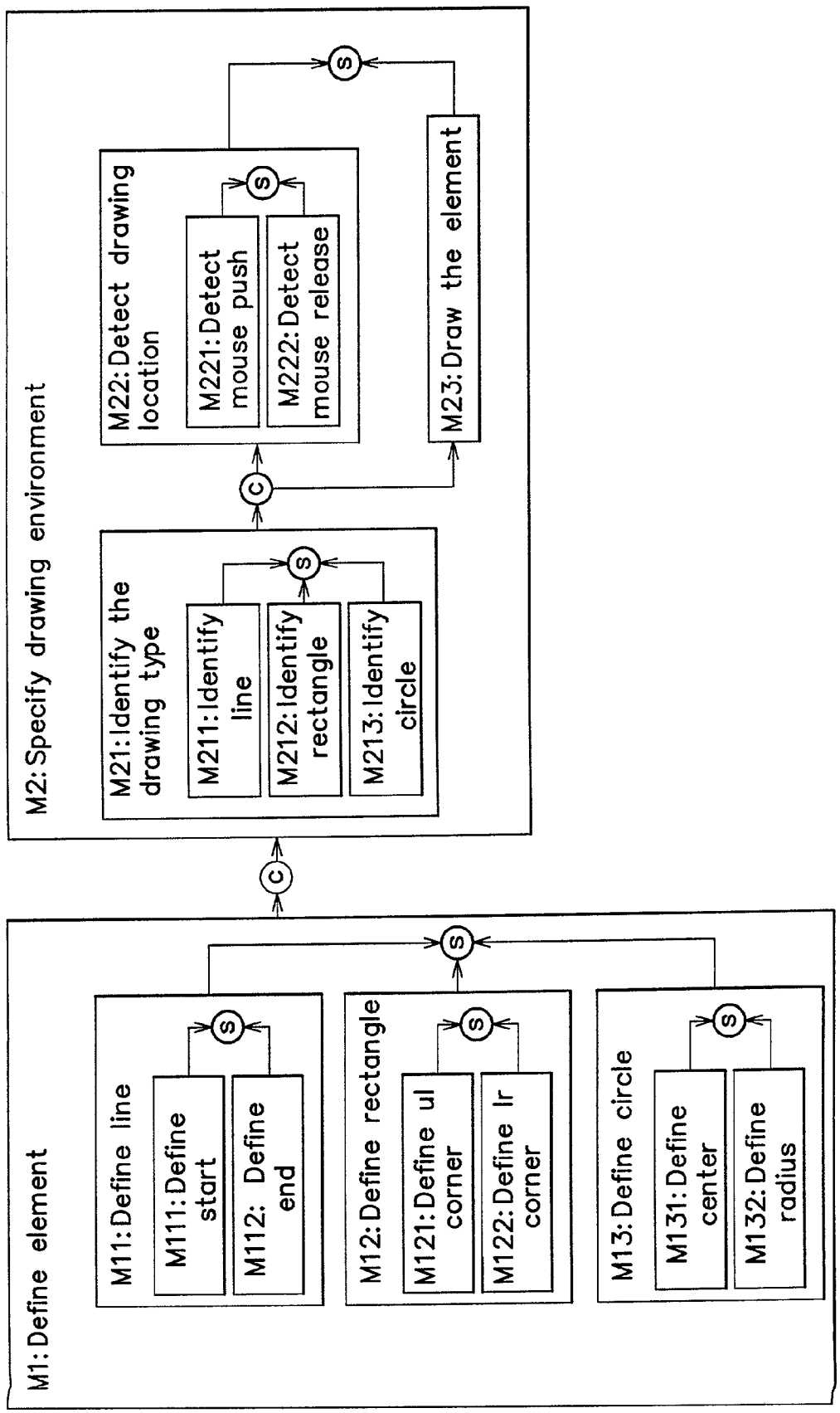
FIG. 36 is a block diagram of a system architecture flow according to one embodiment of the invention.
Figure 37:
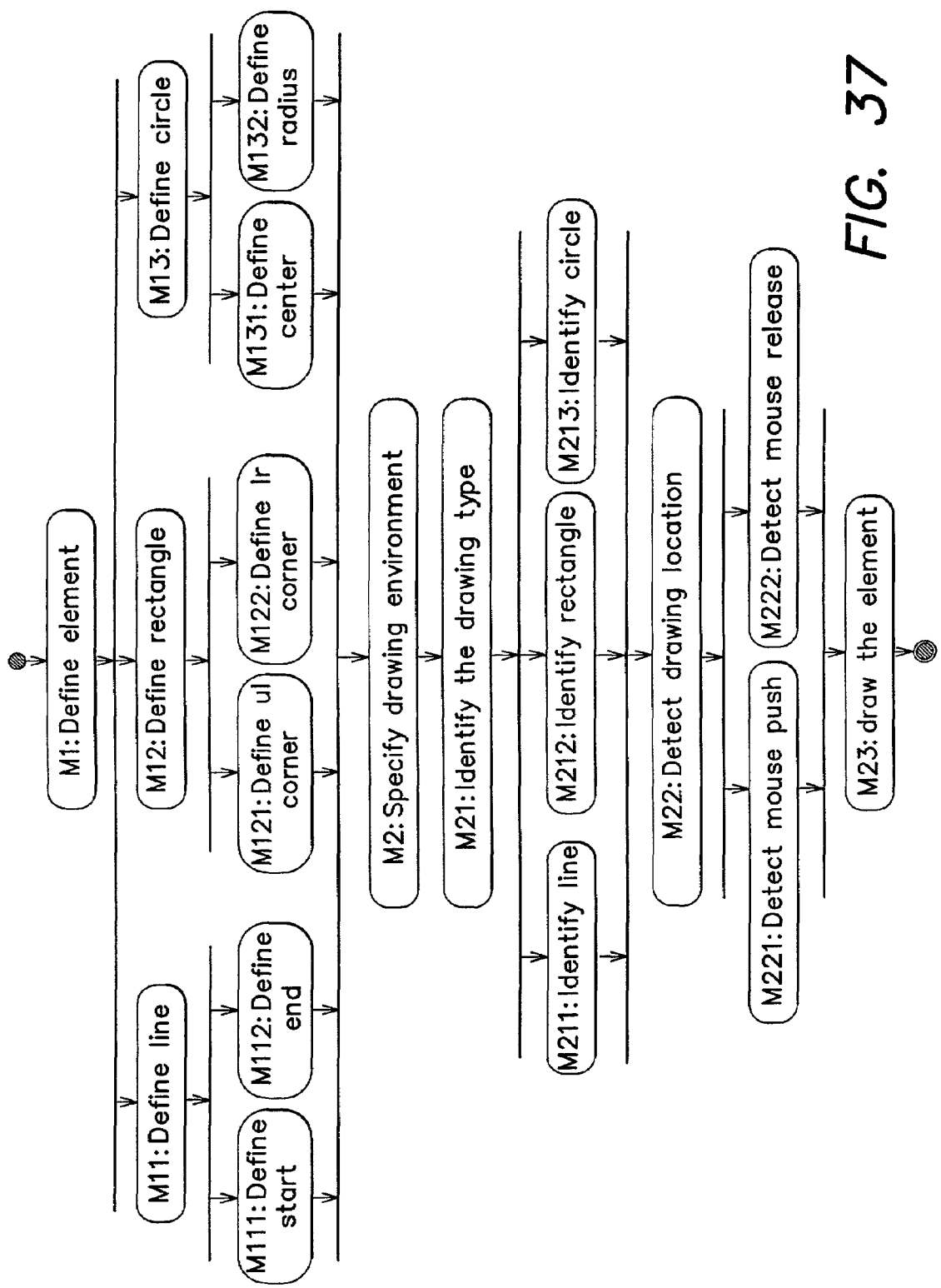
FIG. 37 is an activity diagram associated with the example according to one embodiment of the invention.

Activity diagrams record the dependencies between activities, such as which activities can occur in parallel and what activities must be completed before one or more other activities can start. In axiomatic design, these kinds of information can be represented by the design matrix. For instance, if a design is uncoupled, it can be represented with any kind of sequence (i.e., parallel activity) and if a design is decoupled, there is at least one sequence to follow. As a result, the flow chart (i.e., system architecture) is an excellent representation that may be used to show activities for the software system. A translation between flowchart and activity diagrams may be easily performed. In particular, the summation can be represented as synchronization bar and all the other activities can be connected with arrows. FIGS. 36 and 37 show one such translation.

Component Diagram

Definition: A component diagram describes software components (source, link, and executable) and their dependencies to each other, and represents the structure of the code. The components are distributed to nodes in a deployment diagram described below.

Figure 38:
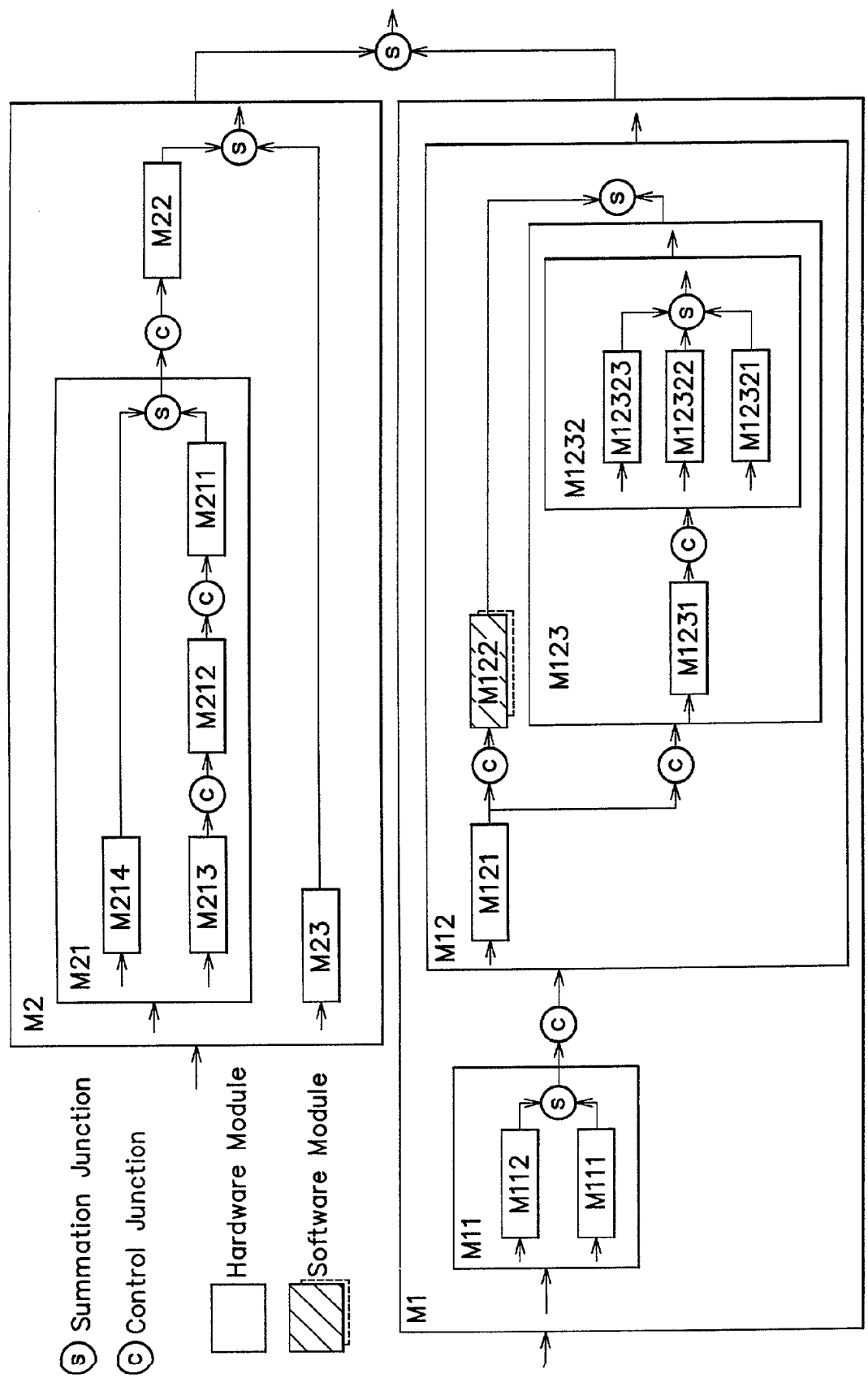
FIG. 38 is a block diagram of an alternative system architecture having different components.

A component defined in UML means 'a distributable piece of implementation of a system, including software code (source, binary or executable) but also including business documents, etc., in a human system [UML Notation Guide version 1.1, OMG ad/97-08-05 1997]. If the software system integrates with other hardware system or other different packages, the component diagram can be used to understand overall interfaces. FIG. 38 shows a component concept developed from axiomatic design elements.

Deployment Diagram

Definition: A deployment diagram shows the run-time architecture of processors, devices, and the software components that execute in the architecture. The deployment diagram is the ultimate physical description of the system topology, including the structure of hardware units of the system and the software that executes on each unit.

The deployment diagram is an extended version of the component diagram. Therefore, representation of the deployment diagram using the axiomatic design result is possible also.

UML Script Code Generation

Figure 39B:
FIG. 39 shows an example generated UML script according to one embodiment of the invention.

There are several methods to generate UML with axiomatic design. One method is to generate the required diagrams directly. The other is to generate a model data file which serves as an input data file for existing UML software packages such as Rational Rose design system. Further, according to another embodiment of the invention, the axiomatic design system may directly generate UML code. UML code is represented by script type formats defined by the document entitled OMG Unified Modeling Language Specifications, version 1-3, June 1999 (available at http://www.rational.com/uml/resources/documentation/index.jtmpl). Based on the UML documents described above and the UML specifications, the axiomatic design system can generate this UML script code. Further, Rational Rose design software also uses this script code format for their input/output data file. Therefore, the UML script code generation can be synchronized between the axiomatic design systems of the present invention and other design packages such as Rational Rose software. FIG. 39 shows an example of UML script code.

Automatic Code Generation

As discussed above, axiomatic design principles may be incorporated into a software design that, upon instruction of a user, creates software systems. According to one aspect of the invention, the software system automatically generates code based upon an axiomatic design. According to various embodiments of the invention, the software design may have one or more of the following properties:

In accordance with one embodiment, a system is provided that generates code skeletons in a target language and transfers the information from the axiomatic design into code in that language.

In accordance with one embodiment, a system and method produces code skeletons using axiomatic design terminology such as FRs, DPs and design matrix.

Writing down source code is one of the major items to be performed in the software development life cycle. This coding process is generally performed by a head programmer based on the modeling information which is the result of prior process. To reduce maintenance efforts, it is highly recommended to add a lot of comments, which describes modeling information, inside the source code between line by line or method by method. However, most programmers feel this work is cumbersome or time consuming. Generally, the code is further developed, less comments are inserted into the code due to apathy, increased familiarity with the code (by the programmers), or by rushed development during later stages. According to one aspect of the invention, information produced by the design process may be automatically translated into comments in the code. More specifically, as a designer proceeds through the axiomatic design, the designer produces rich information including data structure, function structure, relationships, and so forth. According to various embodiments of the invention, a software design system may be provided that performs one of more of the following:

Generate the entire source code skeletons using these rich information.

Reduce the coding time by automatically generating code and comments.

Provide consistency between design and source code.

Further, various embodiments of the invention provide one or more of the following advantages:

Reduce the coding effort: Automatic code skeleton generation provides more time to focus on algorithm development. It also provides a clear outline and instruction to assist the programmer in developing specific methods inside the code skeleton because the code skeleton reveals design comments such as design descriptions and comments associated with the design description.

Maintain consistency: The code skeleton can act as a bridge between the design and the actual source code by using the same description in software design. In one case, the programmer may use specific code generated by the design specification. Alternatively, the programmer might have the design information for the method that he/she is trying to make. Either way, the design process concludes with the actual code.

Several commercially-available software products have features to generate code skeletons. Some of these products use UML, especially class diagrams. Code skeletons produced by these products generally include class name, attributes, methods and brief comments. However, according to one embodiment of the invention, results of the axiomatic design process are used to generate code skeletons and comments.

Because the axiomatic design process requires detailed information, the code skeleton generated can have much more detailed descriptions than that which are traditionally provided by UML. It consists of class name, attributes, methods, detailed comments and the sequences to finish the actual algorithm.

Introduction

A code generation scheme according to one embodiment of the invention is disclosed below. To provide a better understanding, the following is based upon simple drawing example described above with respect to FIGS. 24-26.

Data Structures for Code Generation

The data structures used for code generation may be identical with the definitions described in the line drawing example above. Each one of the attributes inside the ER diagram represented in FIG. 20 is the inputs for code skeleton. The specific examples for these inputs are described in FIGS. 2 through 26 based on the line drawing example described above.

Figure 41B:
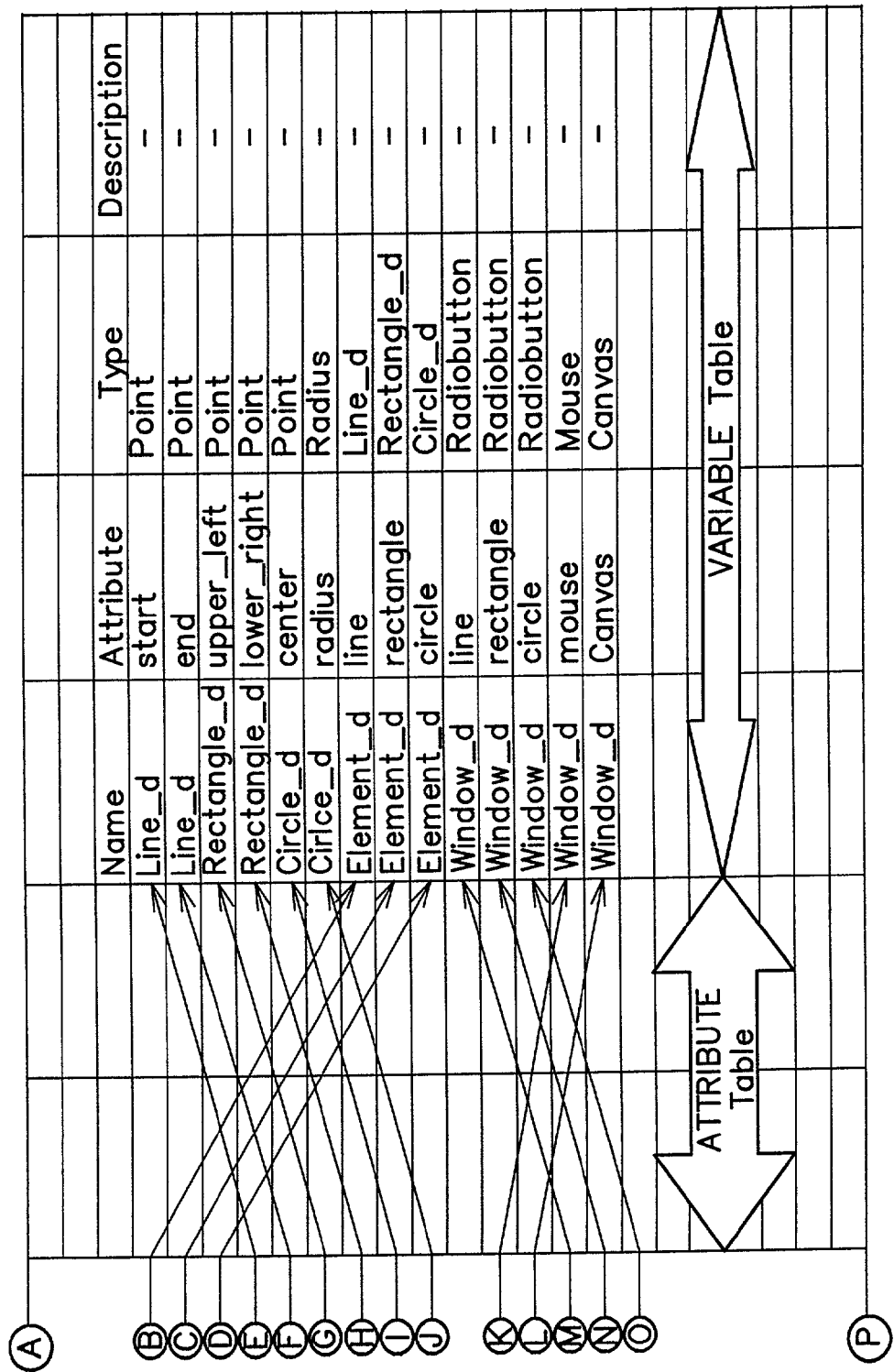
FIG. 41 is an example DP/VARIABLE table according to one embodiment of the invention.
Figure 42B:
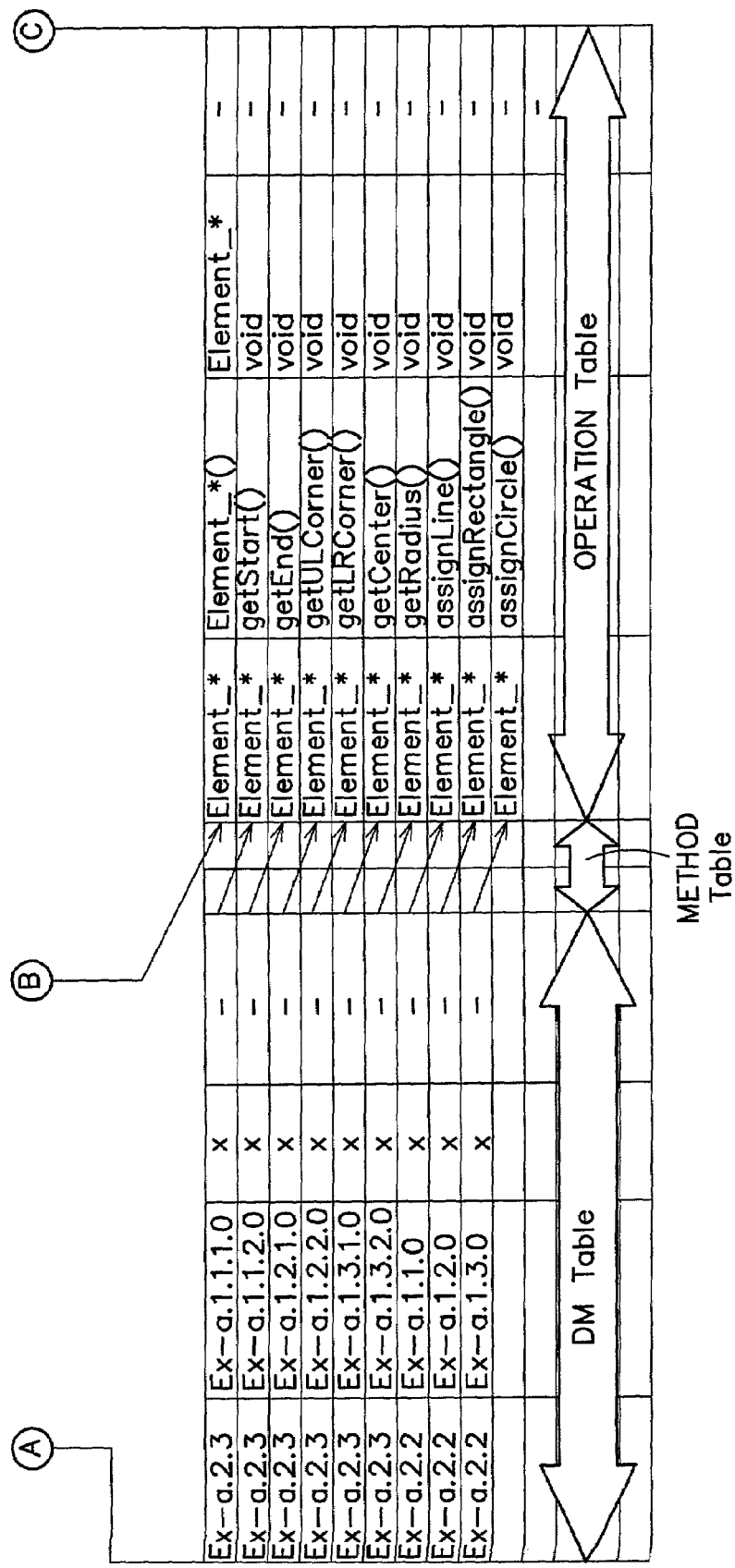
FIG. 42 is an example DM/OPERATION table according to one embodiment of the invention.

FIG. 40 shows a DP table based upon the line drawing example described above. FIG. 41 shows a DP/VARIABLE table and ATTRIBUTES relating the DP and VARIABLE tables for the example. FIG. 42 shows a table relating a DM table to an OPERATION table through a METHOD table. It should be understood that these tables are merely examples of a system design upon which code may be generated, and that other system designs may be used.

Code Skeleton

Every object-oriented programming language has similar structure such as class name, global attributes, a constructor and methods. The comments generally may be located anywhere inside the code. Therefore, a code skeleton that follows language structure and provides a clear, well documented structure may be used.

Figure 43A:
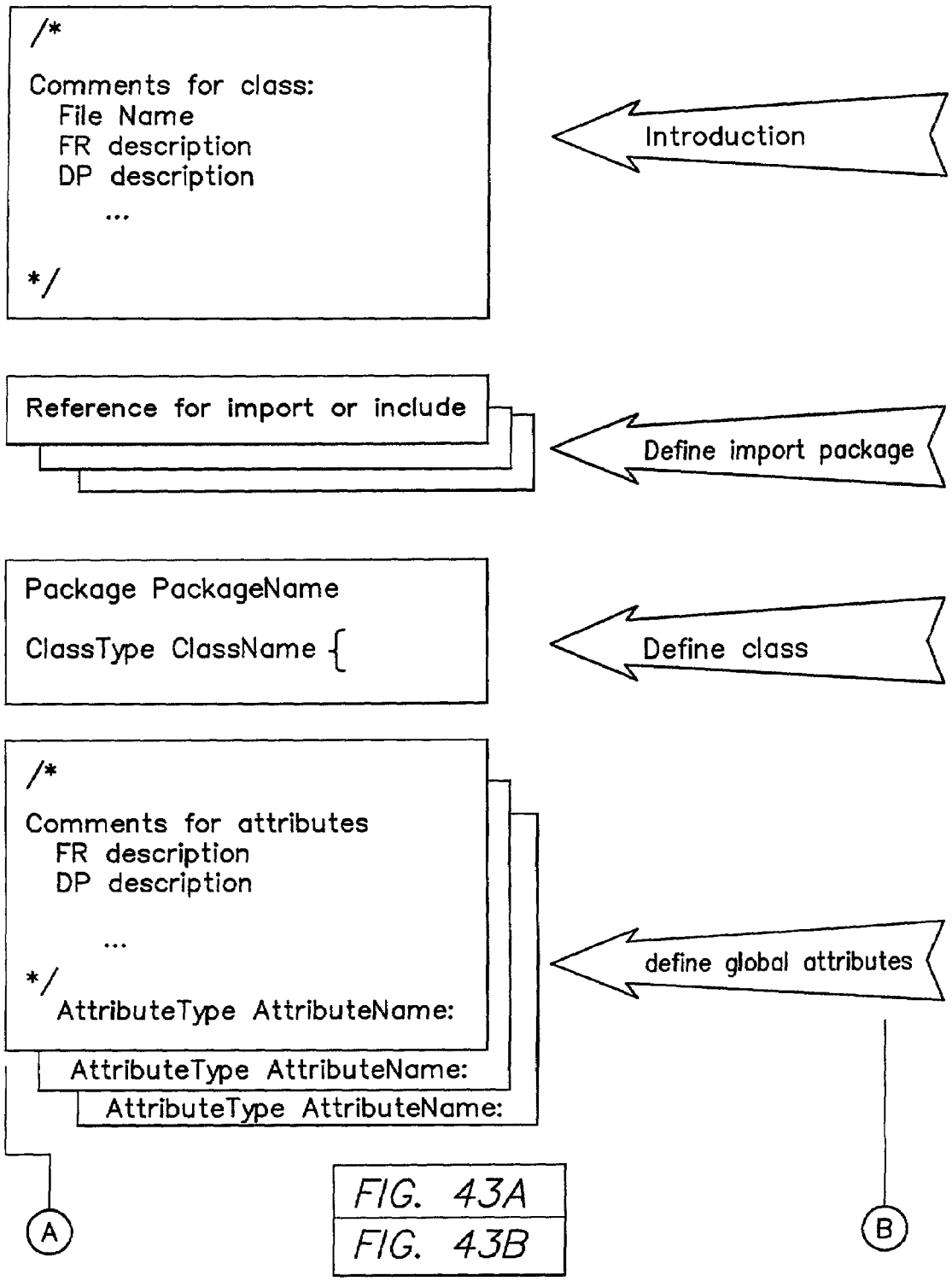
FIG. 43 is a block diagram of a standard code skeleton according to one embodiment of the invention.
Figure 43B:
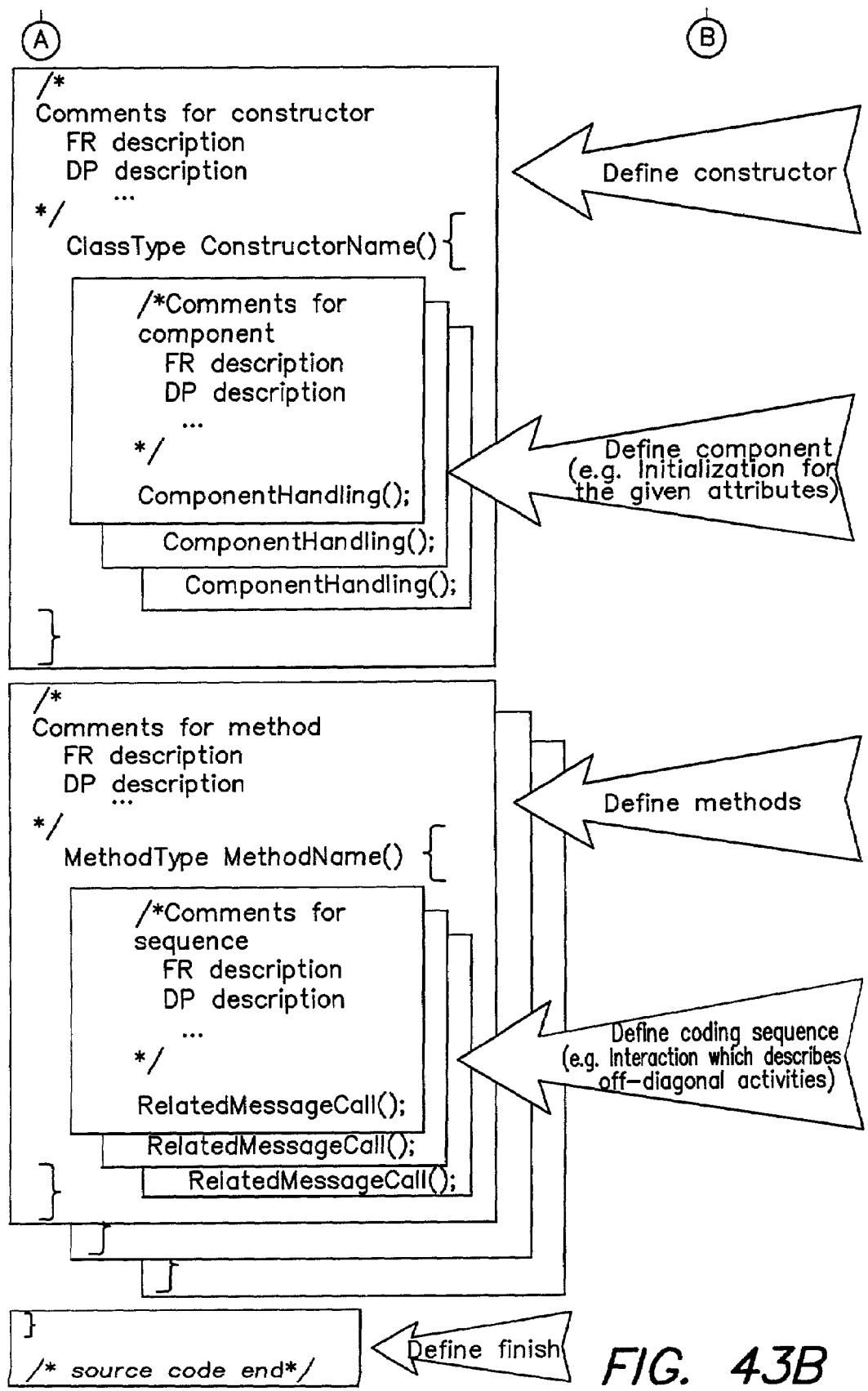

FIG. 43 shows a standard code skeleton generated according to one embodiment of the invention. In particular, FIG. 43 shows the process by which code is produced. In an "Introduction" area, comments for the classes may be inserted. Alternatively, comments may appear in various sections of the code. These comments may include, for example, descriptions of the FRs, DPs or any other information describing the code file or design. In "Define import package" area, other code to be included in a compilation of the code may be referenced. In a "Define class" area, packages and class types may be defined. Attribute types corresponding to the design may be commented on and defined in a "Define global attributes" area. In a "Define constructor" area, comments and constructors for the objects corresponding to the design are defined. Further, in a "Define methods" area, methods associated with objects of the design are defined. Within this "Define methods" area, coding sequences that reflect any interactions prescribed by off-diagonal elements of the design matrix are placed. In a "Define finish" area, proper end statements are placed according to programming language conventions.

Figure 44B:
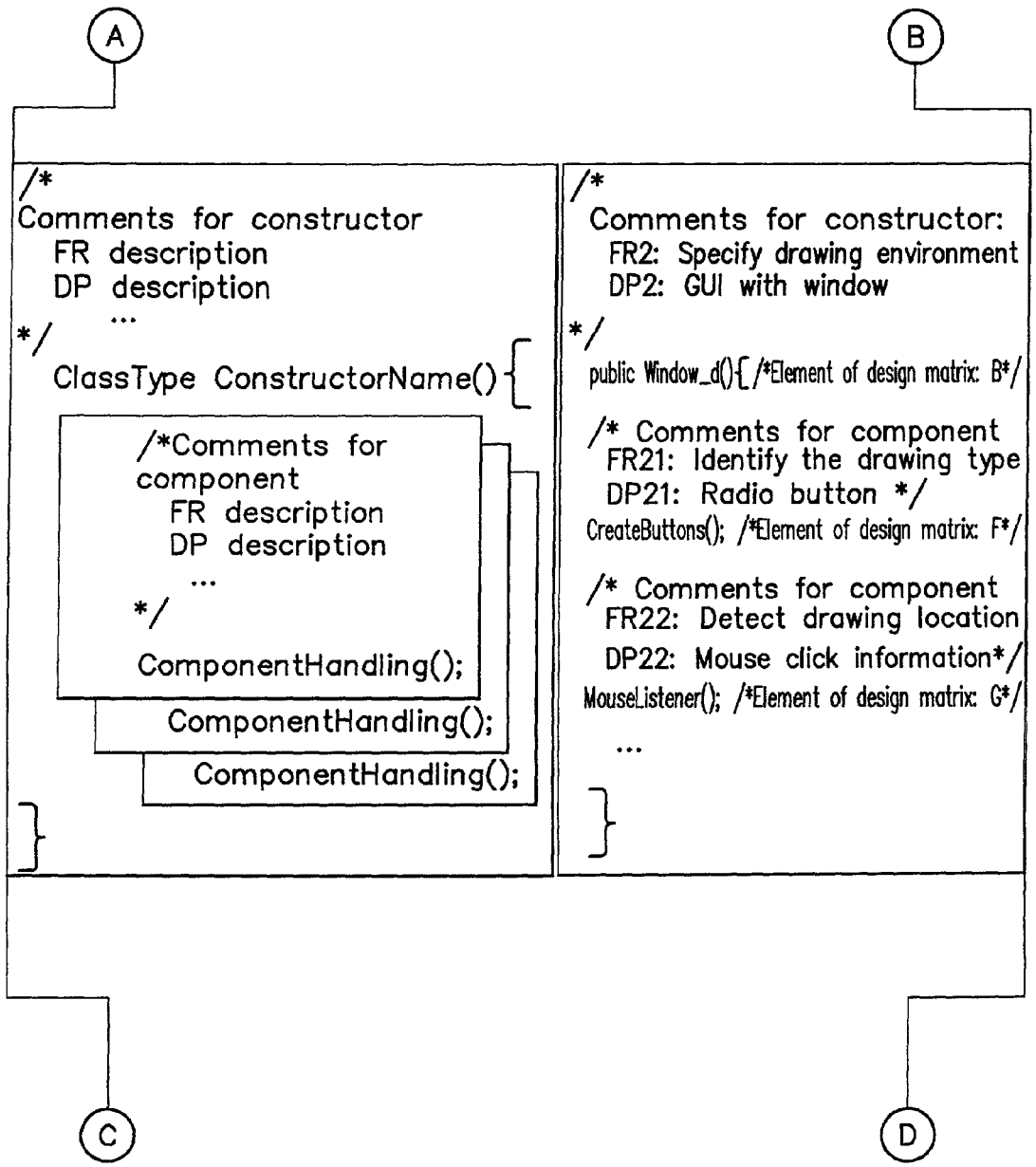
FIG. 44 is a block diagram of an example code skeleton produced according to one embodiment of the invention.
Figure 44C:
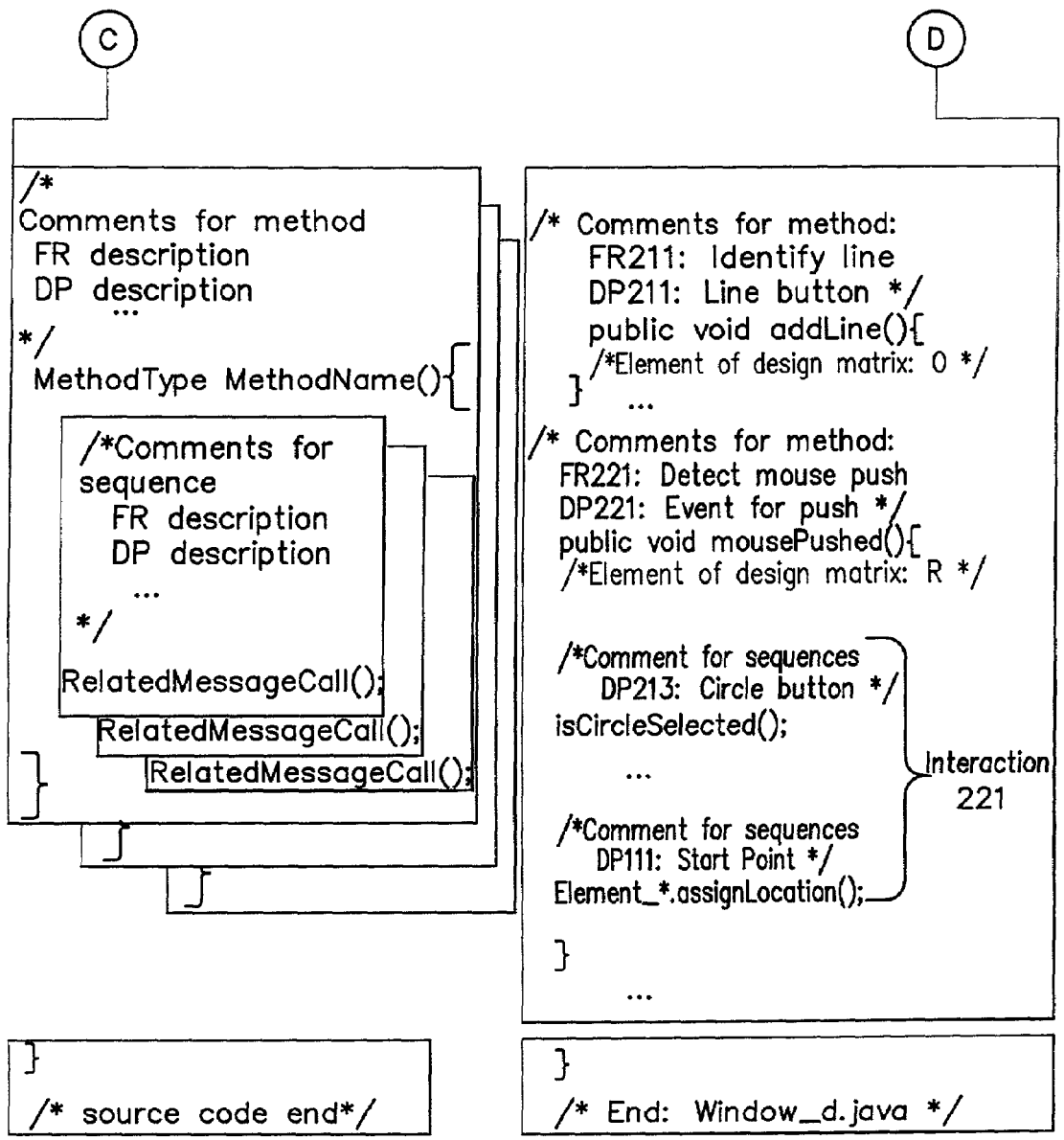
Figure 50:
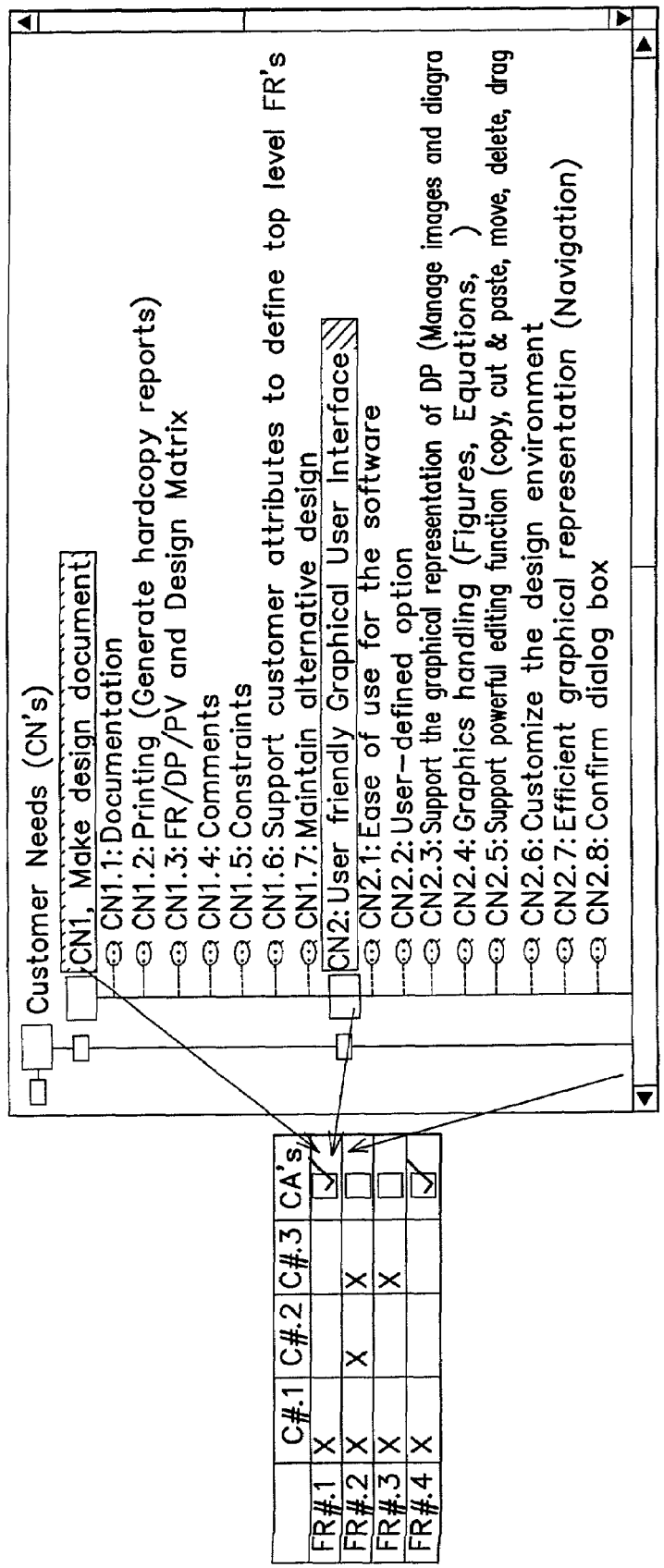
FIG. 50 shows a method for mapping CNs and FRs using tables and a tree display.
Figure 54A:
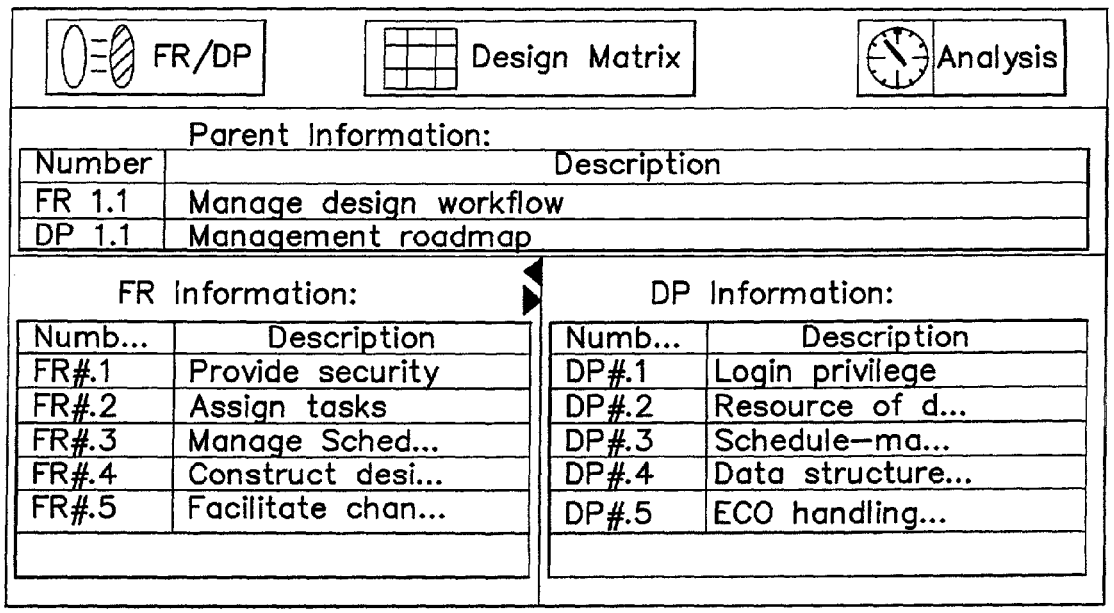
Figure 54B:
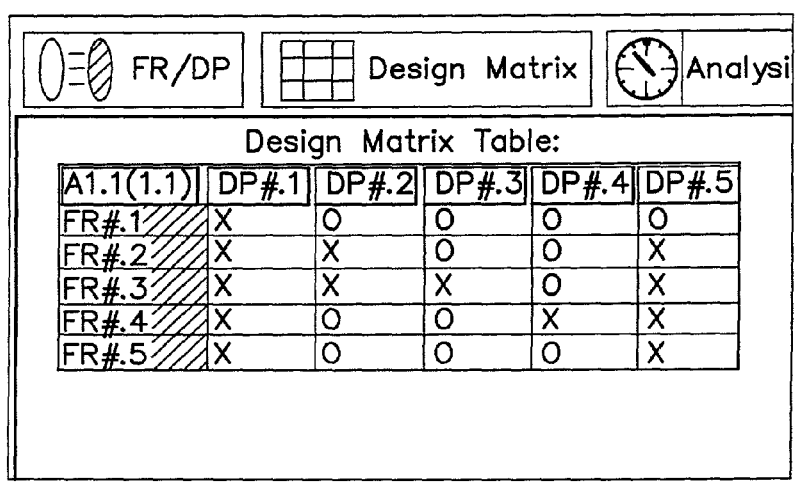

FIG. 44 shows an example code skeleton written in the Java programming language produced using the code skeleton and method described above with respect to FIG. 43. In particular, FIG. 44 shows a Java code skeleton based upon the line drawing example described above, for $FR2=a*DP1+B*DP2$. Of course, sections of the code are determined according to programming language conventions.

Because a code skeleton is produced that follows language conventions, provides a clear document structure, the programmer can spend more time to focus on the algorithmic viewpoint with this consistent code skeleton. One or more of the following may be included in a code skeleton in accordance with various embodiments of the invention:

Axiomatic design description: information that is collected about the design

Roadmap: strategy for recognizing the current activity being performed by the designers and relating this to the overall progress of the design Guidance: suggestions or questions-for-thought to assist the designers User interface: the layout and operation of the graphical user interface Options: the variety of choices for customizing the software Algorithms: the details of how a function or calculation is performed User Interface As discussed previously, design tasks can be represented as a mapping between domains. Designers map from requirements of what they want the design to do to solutions of how the design will achieve these requirements. As the design progresses, broad, high-level requirements are broken down, or decomposed, into smaller sub-requirements which are then satisfied by sub-solutions. As the designers select solutions, they use the two design axioms to evaluate whether the design is a quality design.

The benefits of a software tool for applying axiomatic design, as embodied in design software implementing axiomatic design principles, are many:

1. Designers can start with ill-defined customer needs and use the design software to document and organize these needs.
2. As designers develop concepts, they define requirements, develop additional concepts, and select solutions using the design software. The design software provides one or more of the following:
   (a). The design software captures the history of the project and the rationale for the decisions that were made.
   (b). An archive of solutions can be used to build a corporate knowledgebase and to transfer learning between parts of the organization.
   (c). Different solution alternatives can be evaluated and compared objectively.

3. The design software provides tools for systems engineering that capture and use the hierarchy of design information that naturally grows as the design progresses. The design software provides one or more of:
   (a). The design software captures constraints and their application throughout the design.
   (b). The design software lets managers check consistency between multiple sub-tasks.
   (c). As changes are considered or made during the design, the design software tracks the interrelationships between parts of the design to determine what else in the design is potentially affected.
4. The design software provides tools for project management.
   (a). The design software lets designers and managers assign resources (time, budget, and responsibility) to the project and to distribute them among the design tasks.
   (b). The design software tracks the use of the resources as the design progresses.
5. The design software enables robust design.
   (a). Tolerance design can be done in the design software. The designers can assign tolerances to components of the design to achieve the required functionality.
   (b). Data about as-produced variation in components can be used in conjunction with tolerances and desired functionality to calculate probability of success as described in axiomatic design using information content.

The design software using axiomatic design principles provides benefits for the company, managers, and designers. For the company, the design software provides greater profit, a competitive advantage over companies who do not use such design principles, and less risk in developing software. For the manager it provides effective resource assignment, effective change management, and institutional learning and knowledge transfer. For the designer, it provides focused creativity, better designs, and quick design completion.

Automate the design process: Designers follow several steps to design using axiomatic design. Programmers commonly refer to these systematic processes as a "roadmap" [Derrick Tate, "A roadmap for decomposition: Activities, Theories, and Tools for System Design," Ph.D. thesis, department of Mechanical Engineering, MIT, Cambridge, Mass., 1999]. The user interface of the software system according to various embodiments of the invention may be designed based upon these steps. Whenever a designer enters FR data into axiomatic design software, it queries for the corresponding DP information and manages the size of design matrix, design hierarchy automatically. Also, the axiomatic design system displays the next step to follow by checking the current status. This automation scheme assists users to follow the axiomatic design process.

Spread axiomatic design concepts among the programmers: To shift the design paradigm requires great effort because most programmers usually do not want to change from what they have learned to a new programming concept. There are several approaches to overcome this difficulty. One of the most effective ways is to use software which visualizes the overall system development concept.

Forces programmers to focus on the design: Design is a creative work which is performed by human thinking. The real power from axiomatic design concept is to allow the designer to think about their problem using a systematic approach. Design software according to various embodiments of the invention provide this thinking environment by asking several questions of the programmer in a step by step manner. These questions force designers to focus on their design so that they have more chance to create quality software.

Manage changes: As discussed, it is difficult to keep track of software changes manually. According to various aspects of the invention, a design software system is provided that manages the changes during the design process automatically.

Document the design with various formats: Designers might need several formats to explain their design. Even though the design data is the same, work needed to make the design document requires large amount of time if the designers need several different formats. This duplication activity can be enhanced with the software. Design software according to one embodiment provides several different data formats through which the designer may visualize the designed result in the form of printed documents, graphics images to be copied into different applications electronically and data file that feeds into other application programs. The system manipulates the same design data set and produces the required design document according to the needs of the designer.

User Interface

To provide better understanding of various user interfaces according to various embodiments of the invention, the following description is provided with respect to FIGS. 45-80.

1. Tables

Explain the domain mapping with table format: Axiomatic design forces users to maintain one-to-one mapping between domains. It is an intuitive user interface to have a table having several columns which represent each domain and rows for one to one mapping. This table interface covers the mapping between FR and DP or DP and PV and is shown in FIGS. 45A and 45B as alternative embodiments of such an interface.

Merged FR cell to explain the alternative choices for DPs: Designers usually think of several choices to satisfy a specific FR. These choices can be explained as alternatives. Seeing all the possible choices at once with corresponding FR provides more useful environment for a designer. FIGS. 46A and 46B show several embodiments of an interface showing alternative design choices to a designer.

Display parent FR/DP information: To allow a designer to visually determine the parent FR/DP information during the decomposition provides a designer a greater change to create accurate sub-level FR/DP pairs and reduces the step for parent level inquiry. FIGS. 47A and 47B show several embodiments of an interface presenting such parent FR/DP information.

Display the parent node number with abbreviation: Using an abbreviation for parent number provides a simple interface and increases the space for data entry. Such an interface is shown in FIGS. 48A and 48B.

FR/Constraint mapping: Unlike a mapping between two different domains, the constraint determines boundaries for FRs. However, the one-to-one mapping is not valid for FR/Constraint relationships. Thus, it is more intuitive to show these FR/Constraint relations in a table. FIGS. 49A and 49B show various embodiments of an interface presenting FR/Constraint relationship information.

CN/FR mapping: The relation between FRs and CNs are usually vague. The CN explains broad needs and specific needs all together and can include multiple requirements within a sentence in most cases. Because of these characteristics, presenting a one-to-one mapping with FR is not possible. The interface shown in FIG. 50 displays mappings between CNs and FRs to the designer. According to one embodiment, this interface uses tables and tree displays and indicates as a check box for the mapping. Alternatively, the interface uses the same table format as that of the design matrix. For example, CNs are displayed in a first column and FRs are displayed in a first row of the table. Further, the interface may display multiple CN lists which are satisfied by a specific FR. It should be appreciated that any method for displaying CN and FR information may be used.

Budgeting for constraints: Some constraints are limited by certain parameter values. For instance, weight, cost and volume are constraints restricted by the target market, manufacturing environment and so on in mechanical systems. These constraints usually have operators such as less than, more than, equal to, etc. Design software according to one embodiment of the invention captures this information and allows the designer to compare the designed constraint and the real value of their product when the design is complete. FIG. 51 shows one such graphical representation.

Add additional column to display detailed information: It is also useful to display additional information to a designer such as comments, keywords, application links, etc. within the same table. FIGS. 52A-C show various embodiments of interfaces displaying detailed design information.

Nested (or full) design matrix table: In order to have more accurate design, designer should check the consistencies between levels in the design hierarchy. The nested design matrix table shown in FIG. 53 is a useful interface that allows a designer to check the relationships between different levels.

2. Layouts

Display the mapping and relationship at the same time: The layouts shown in FIGS. 54A-C reduces steps needed by a designer to compare the FR/DP information.

Figure 55A:
FIGS. 55A-B show alternative user interfaces indicating activity groups related to design according to one embodiment of the invention.
Figure 55B:

Display the sequence of design activity: As discussed above, there is a sequence to design software systems using axiomatic design principles. This roadmap sequence can be grouped as four different activities. In particular, a tabbed interface may be used to indicate these groups and control the tabs depending on the design situation. Examples of these tabbed interfaces are shown in FIGS. 55A-55B.

2.1 Components for Design Guide.

Figure 56:
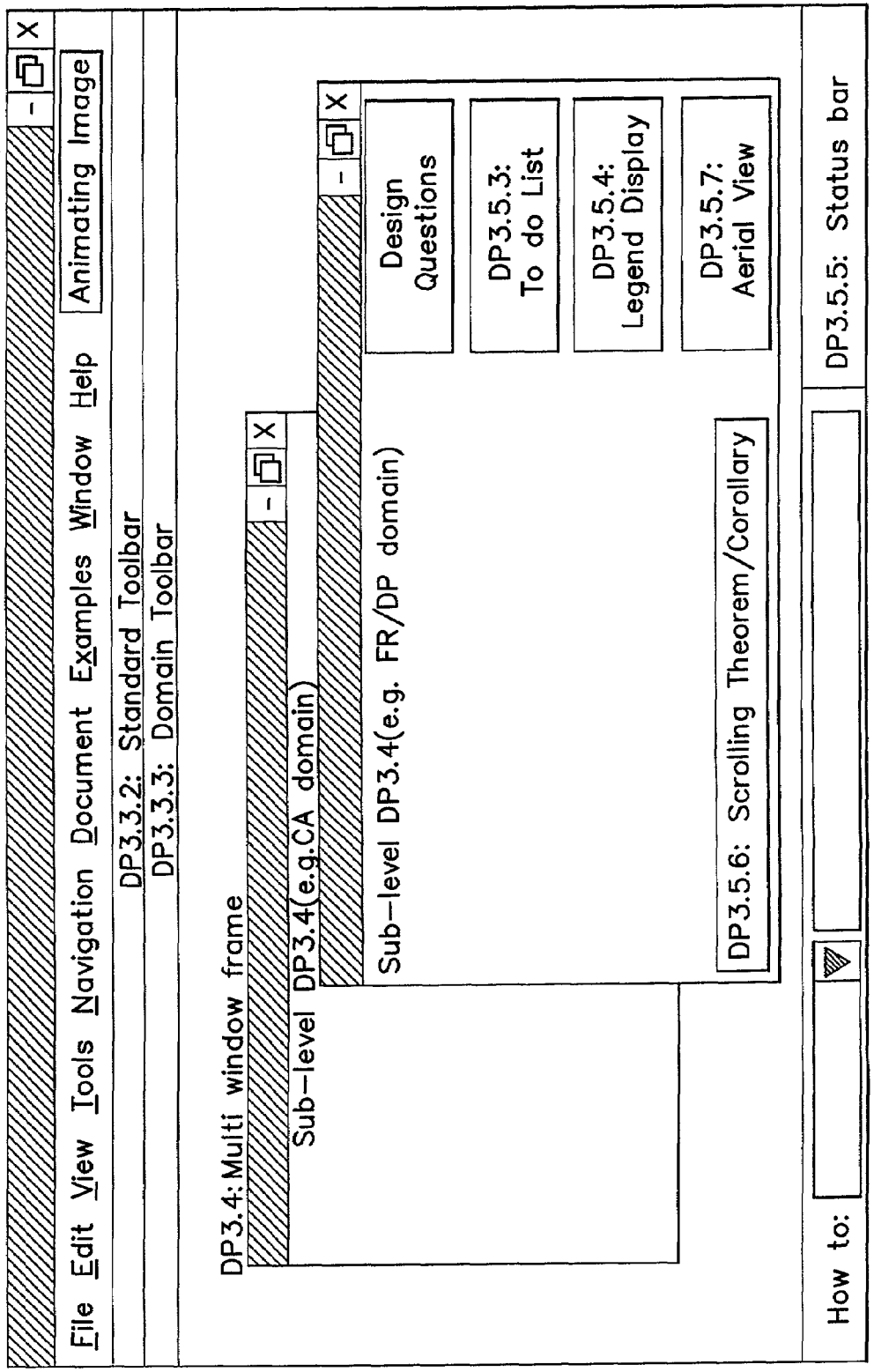
FIG. 56 shows an alternative user interface according to one embodiment of the invention.

Design question area: One of the best methods for implementing an axiomatic design is to prompt the designer with questions regarding the design at each step, because the axiomatic representation describes the thinking process systematically. FIG. 56 shows an interface that presents components that support a visualization of the human thinking process.

To do list area: The design software provides several lists to be checked based on the design roadmap.

Legend indication area: Several conditions such as design status, alternative/redundant DPs, and the like are indicated to provide clear information.

Aerial view area: In the case of a large designs, it is useful to indicate a focused location of the design by showing an overall picture of the entire hierarchy displaying nodes as small boxes.

Scrolling theorems, corollaries linked to active tab: Theorems and corollaries may be added to refine several cases. They can be categorized depending on the design activity. A scrolling component may be included that reminds the user of the rules of axiomatic design.

"How to" combo box: Interfaces such as context-sensitive help allow users to obtain help regarding the use of a software system. an example of such a question is "How can I do something that I want with this tool?" FAQ (Frequently Asked Questions) lists and tutorials are typical kinds of solutions that satisfy this requirement. The design software may include a component to provide a proper answer for this question. We have a bunch of resources from our customer in terms of these questions.

3. Buttons/Menus/Icons

Figure 57:
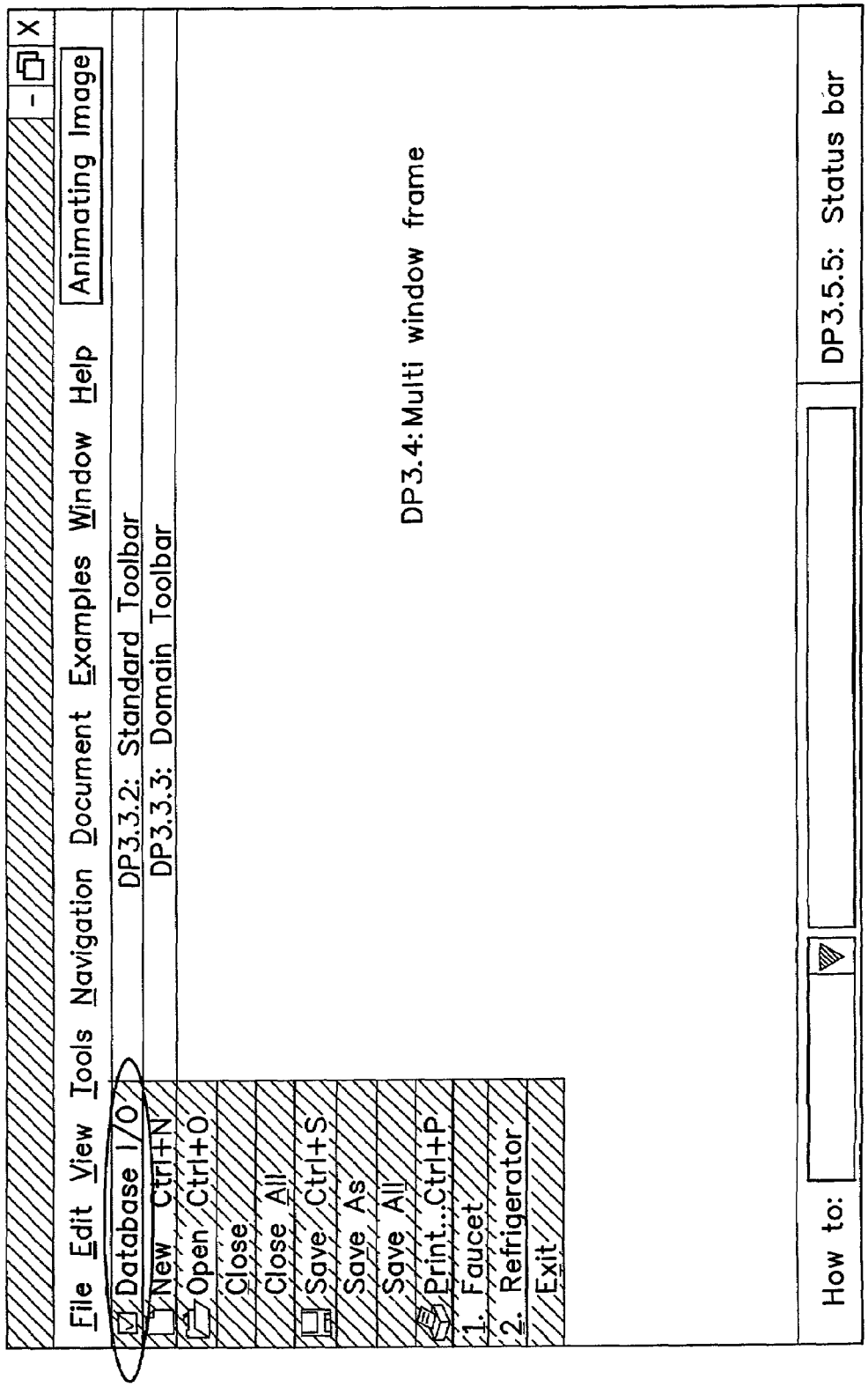
FIG. 57 shows one alternative embodiment of a user interface.
Figure 59:
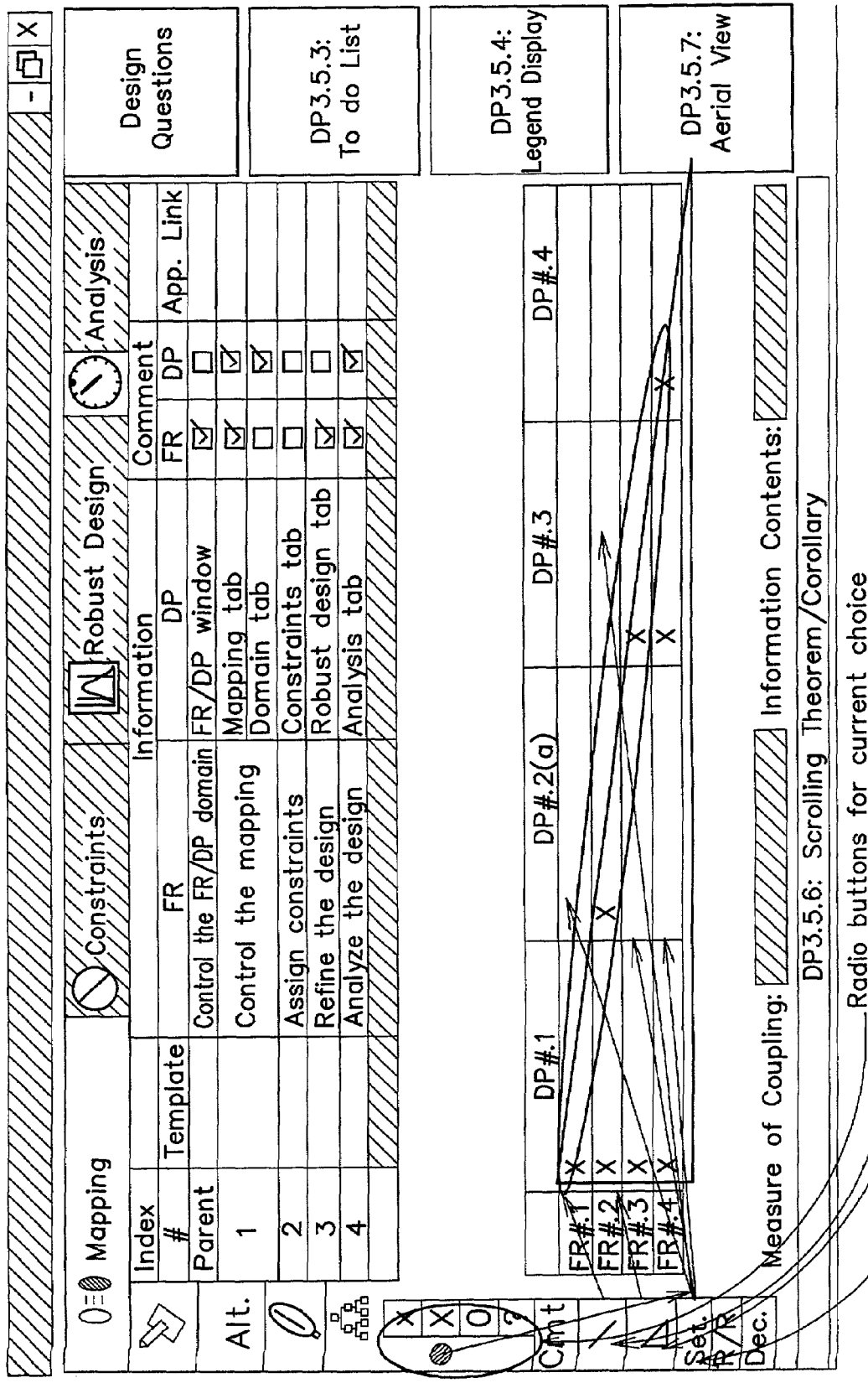
FIG. 59 shows a user interface including control buttons used to populate a design matrix according to one embodiment of the invention.
Figure 60A:
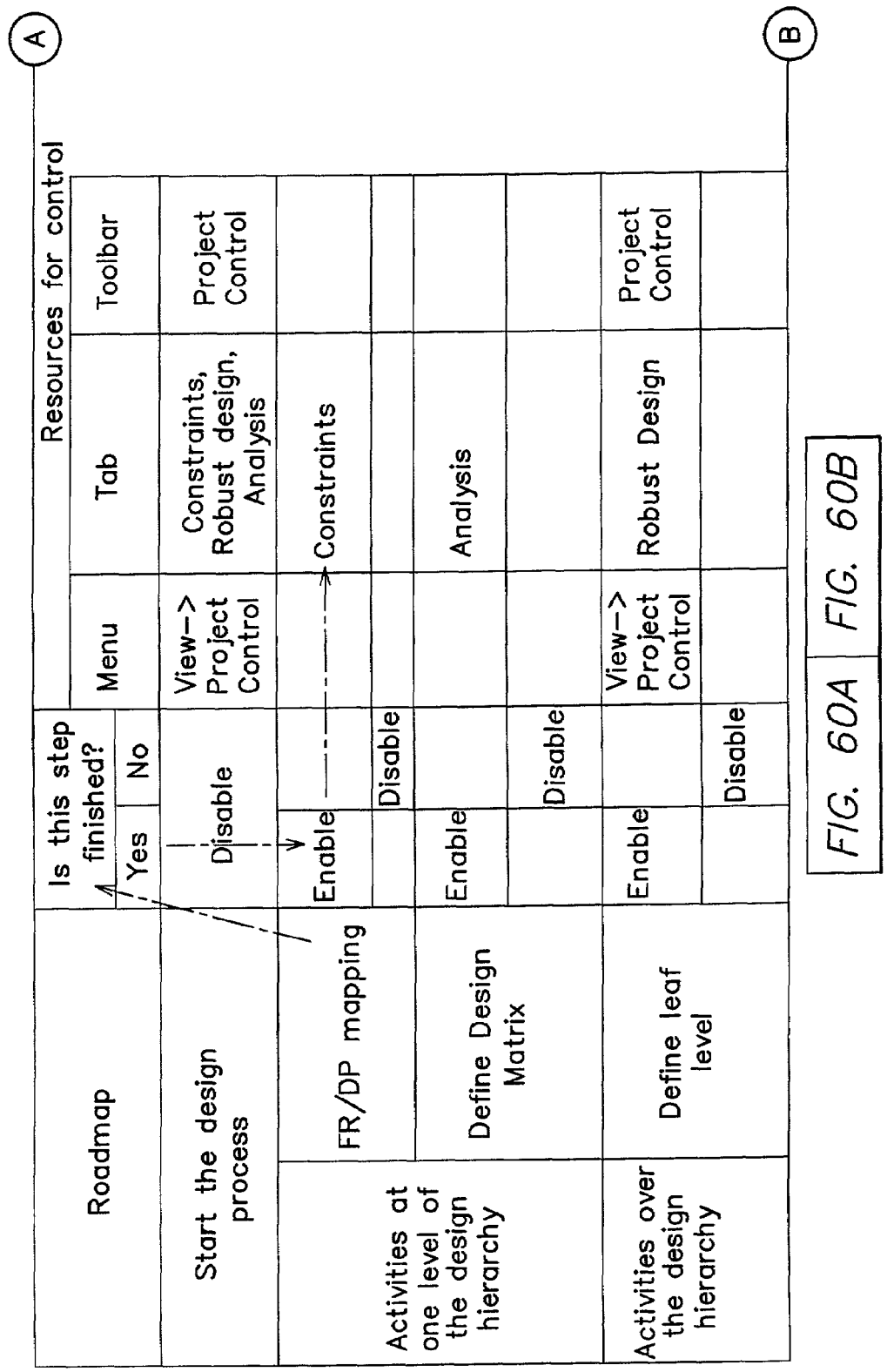
FIG. 60 shows a table showing how menus, tabs, and buttons are controlled by a road map.
Figure 60B:
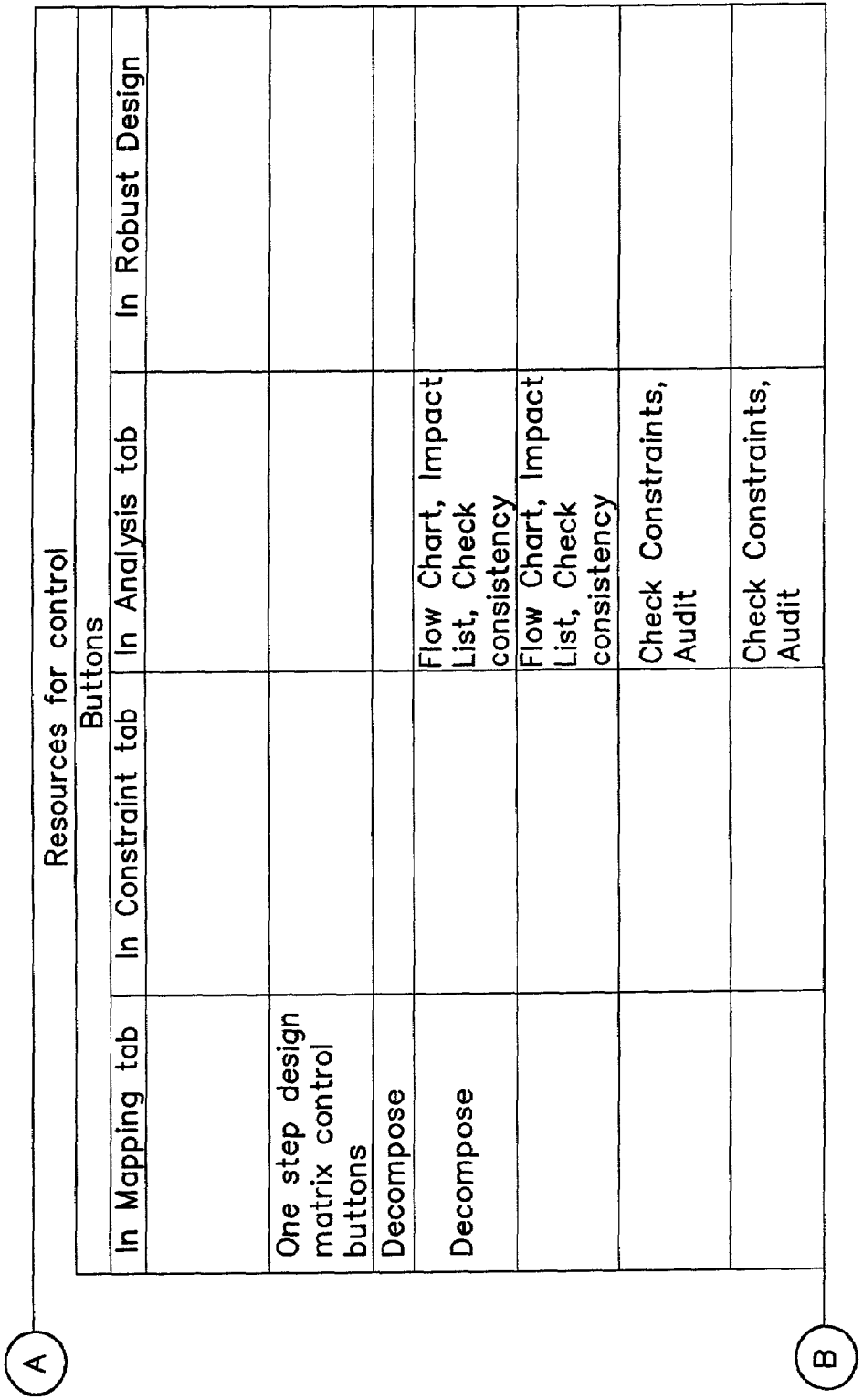

Database I/O toggle menu in file menu: A software design system may include two different data store mechanisms. One may be file I/O for all users (i.e. single and/or multi-user). The other may be the database I/O only for multi-user design cases. To indicate these two different storage functions, a software design system may include a toggle menu. Once the user toggles on this menu, the entire data is sent to the database. Otherwise, the data is stored as a separate text file. As a result, the database function is user-friendly and steps required to be executed by a user in the storing process is minimized. FIG. 57 shows an embodiment of an interface having such a toggle control.

Alternative DP toggle button in the FR/DP or DP/PV handling window: To reduce steps to add design data, an automation scheme may be provided to add alternative data. The alternative DP is usually entered upon the user's request. Once the user toggles on an Alternative DP button as shown in the interface of FIG. 58, the system automatically adds one more blank row for the alternative DP based on the automation scheme. Thus, the system reduces data adding steps.

One step design matrix control buttons: To populate the design matrix with data generally requires iterative work by the designer. To reduce this iteration, the design software may include a set of controls that when activated, the system fills out the design matrix with specific patterns. For example, these controls may include:

Radio buttons for current choice: The design matrix element is filled out with a toggled item defined by a user.

Make diagonal button: Activation of this button makes the design matrix a diagonal matrix automatically.

Make triangular button: Activation of this button makes the design matrix a triangular matrix automatically.

Set button: Activation of this button fills the design matrix with a choice of radio button for the current selection. If a user selects multiple cells, the system fills out those selected cells. Otherwise, the system fills out every undefined design matrix cell. These controls are shown in more detail in FIG. 59.

4. Automation

Automatic menu/tab/button control to represent the roadmap: Optimally, a designer should follow several steps in order to apply axiomatic design principals. These steps can be represented in the software with conditional checks. The table displayed in FIG. 60 explains how menus, tabs, and buttons may be controlled by the roadmap.

Figure 61:
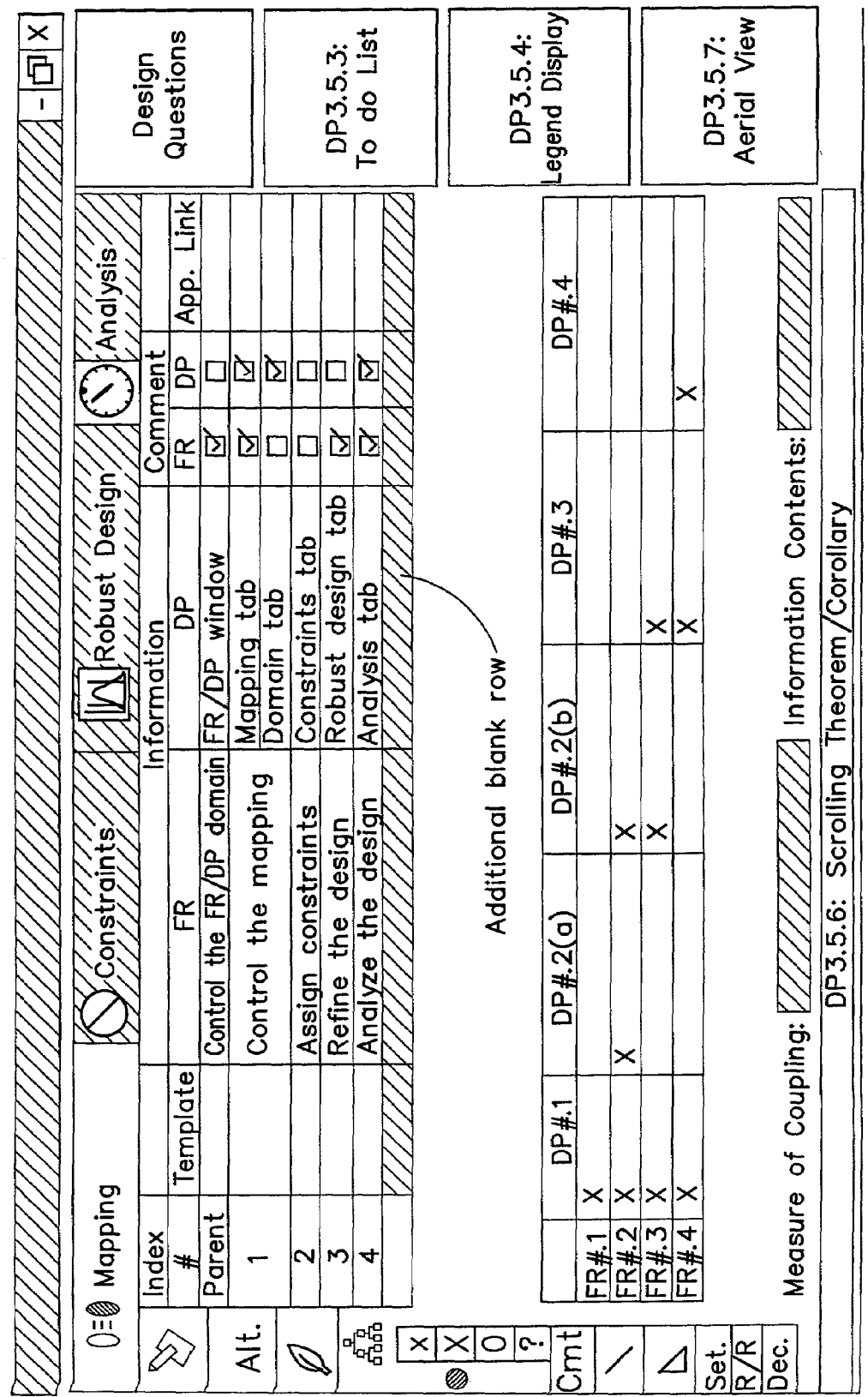
FIG. 61 shows an alternative user interface according to one embodiment of the invention.

Automatic blank row display to prepare data entry: Design software according to one embodiment of the invention may include add buttons to enter the data such as CN, FR, DP, Constraints, and the like. Whenever a user pushes an add button, a separate dialog box pops up for data input. Alternatively, the system use a Microsoft Excel-type table-handling scheme for data entry and may automate this procedure by adding a blank row under the data input table automatically as shown in FIG. 61. Also, there may be an option to add a row for alternative DPs as well.

Figure 62:
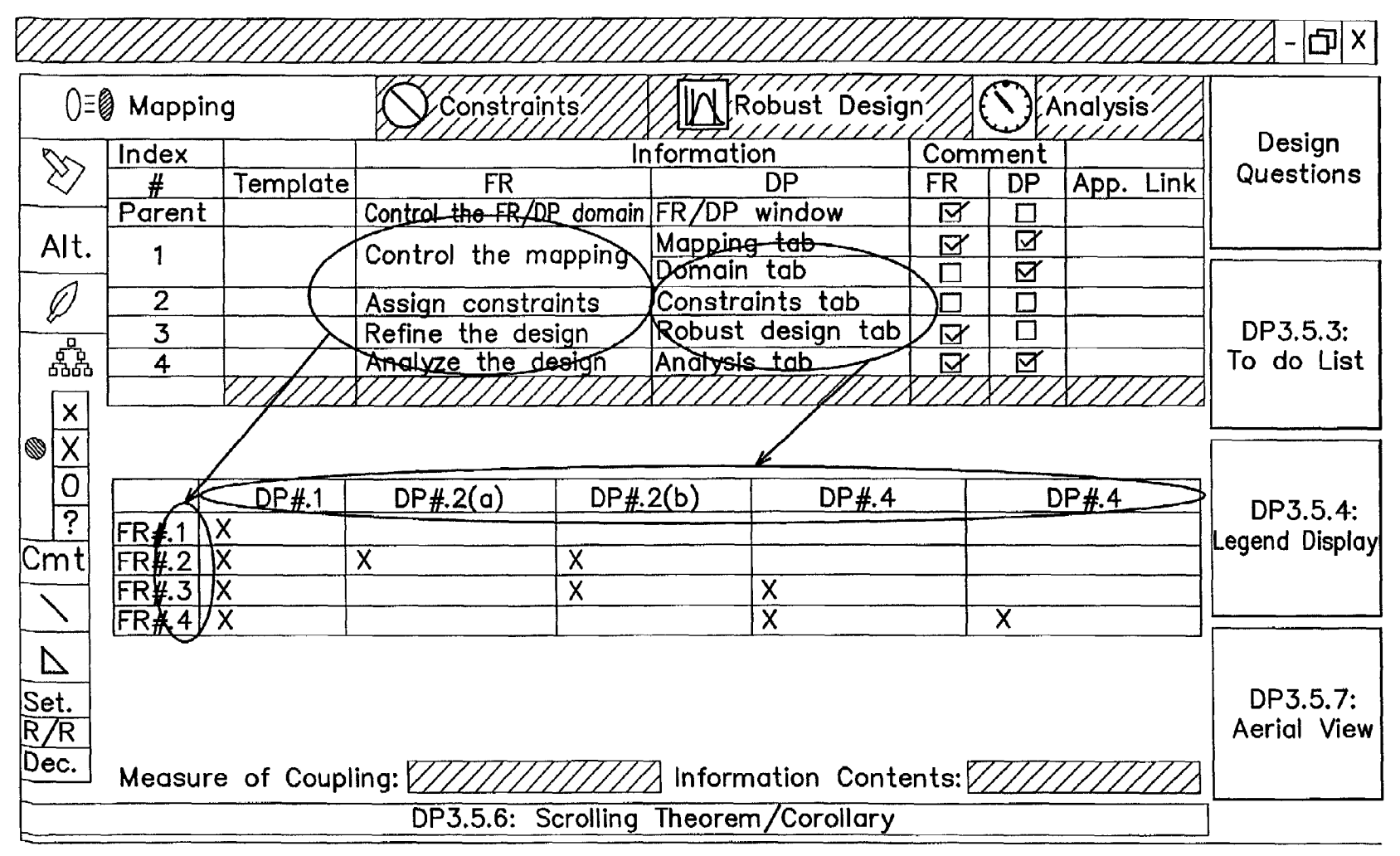

Live resizing the design matrix: The size of the design matrix is highly correlated with the number of FRs and DPs. According to one embodiment of the invention, the design software controls the size of design matrix automatically based on the number of FRs and DPs as shown in FIG. 62.

Automatic numbering control: Because of the design hierarchy, axiomatic design uses numbers to indicate different nodes, levels and so forth. According to one embodiment of the invention, the design software controls this numbering scheme automatically. In particular, the software controls the numbers when a user adds/deletes specific data. Also, the software renumbers all the child level numbers when the user changes a node location.

5. Navigation

Figure 63A:
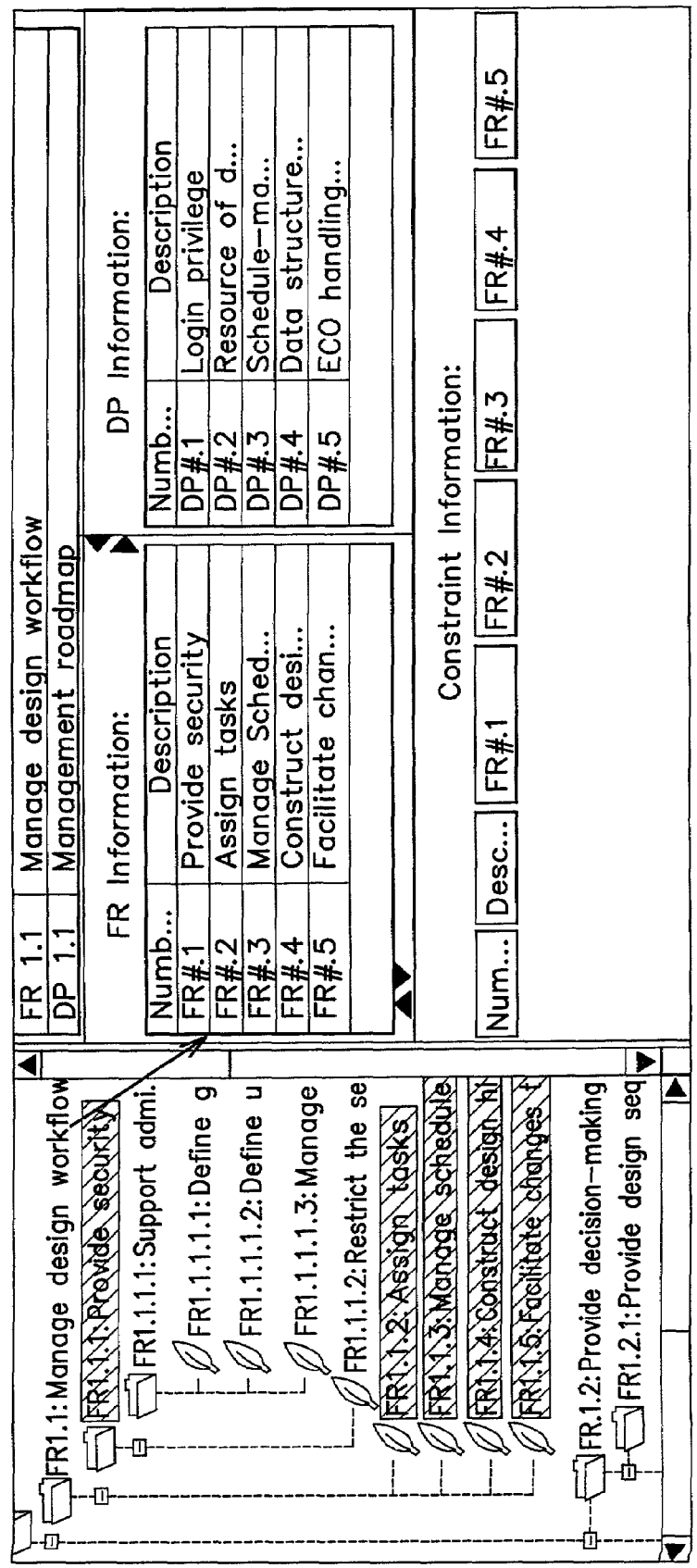
FIGS. 63A-B show alternative user interface according to one embodiment of the invention.

Navigate with design tree: To navigate within the design hierarchy, the design software may use the design tree (i.e. CN tree, FR tree). When a user clicks one of the nodes in the design hierarchy tree, focused node information is displayed in an associated table area as shown in FIG. 63A. The system may also include a DP tree, PV tree for navigation in the same manner.

Figure 63B:
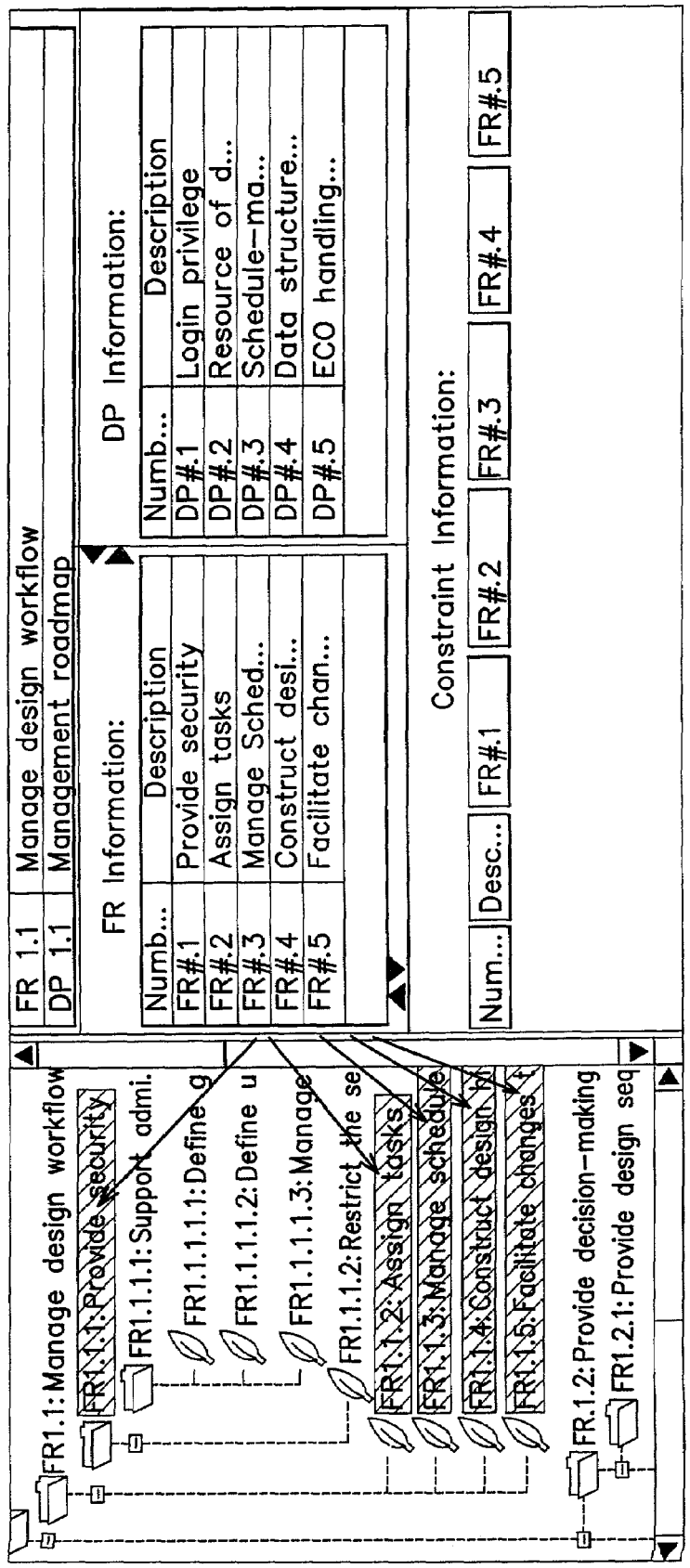

Highlight the focused node in the design tree: It may be useful to highlight focused node information in the design tree as shown in FIG. 63B. This highlighting feature provides visual feeling to the user of where the focus is located.

Figure 64:
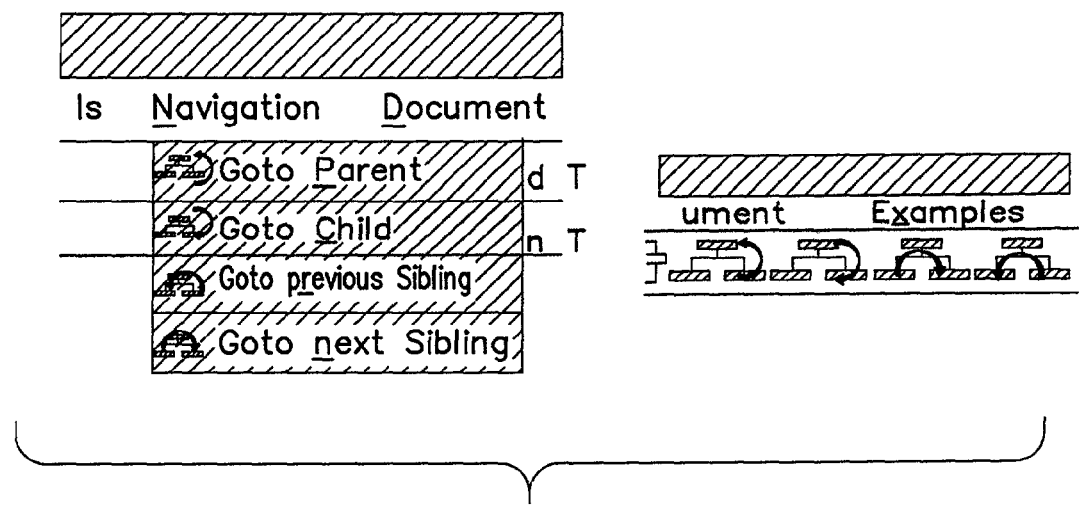
FIG. 64 show alternative user interfaces that allow one step navigation between adjacent hierarchy levels of a design according to one embodiment of the invention.

One step navigation between adjacent level: The design software system may include a navigation feature between adjacent levels of the design hierarchy as shown in FIG. 64. Users can compare the differences between parent and child easily using this navigation feature.

Options Adjustment

Figure 65B:
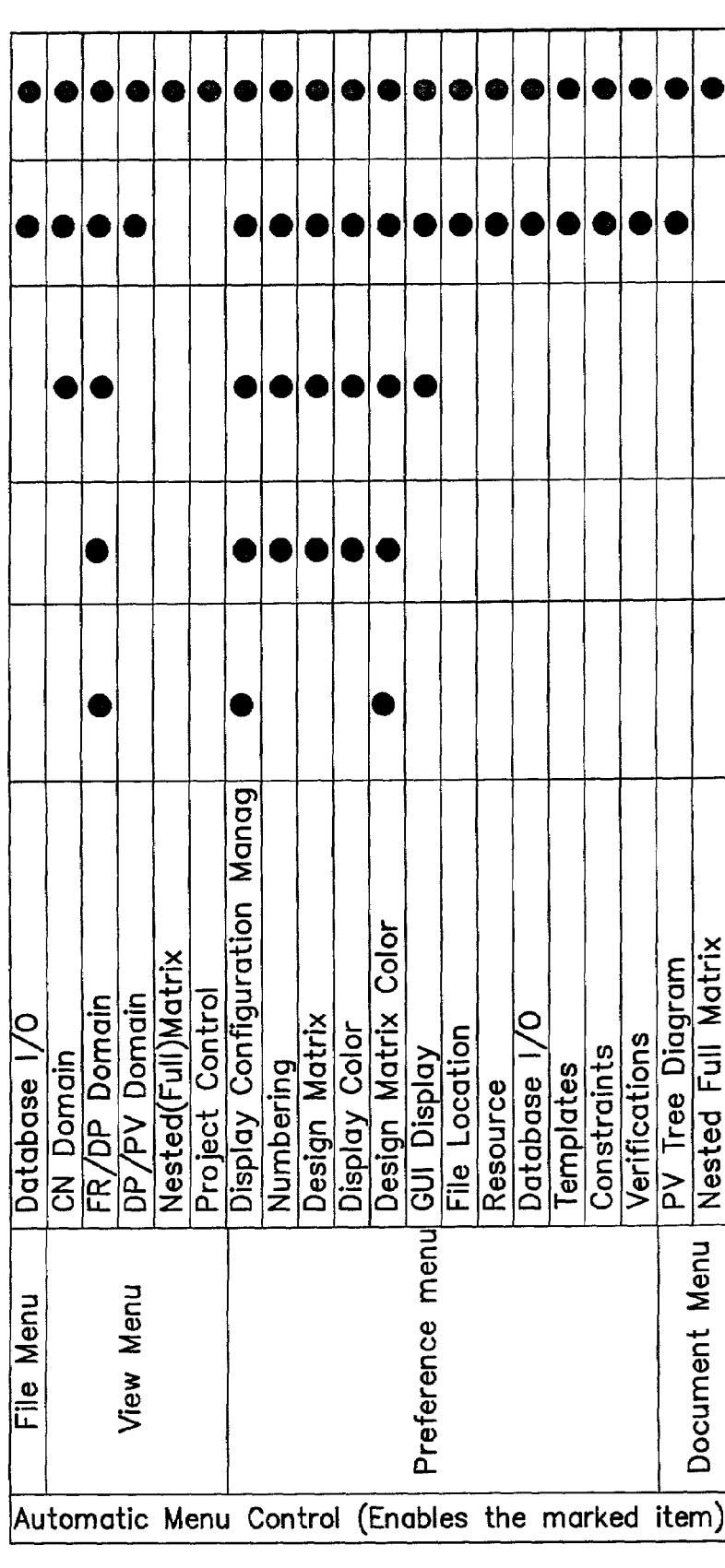
FIG. 65 shows an adjustment of options based on user experience level according to one embodiment of the invention.
Figure 65C:
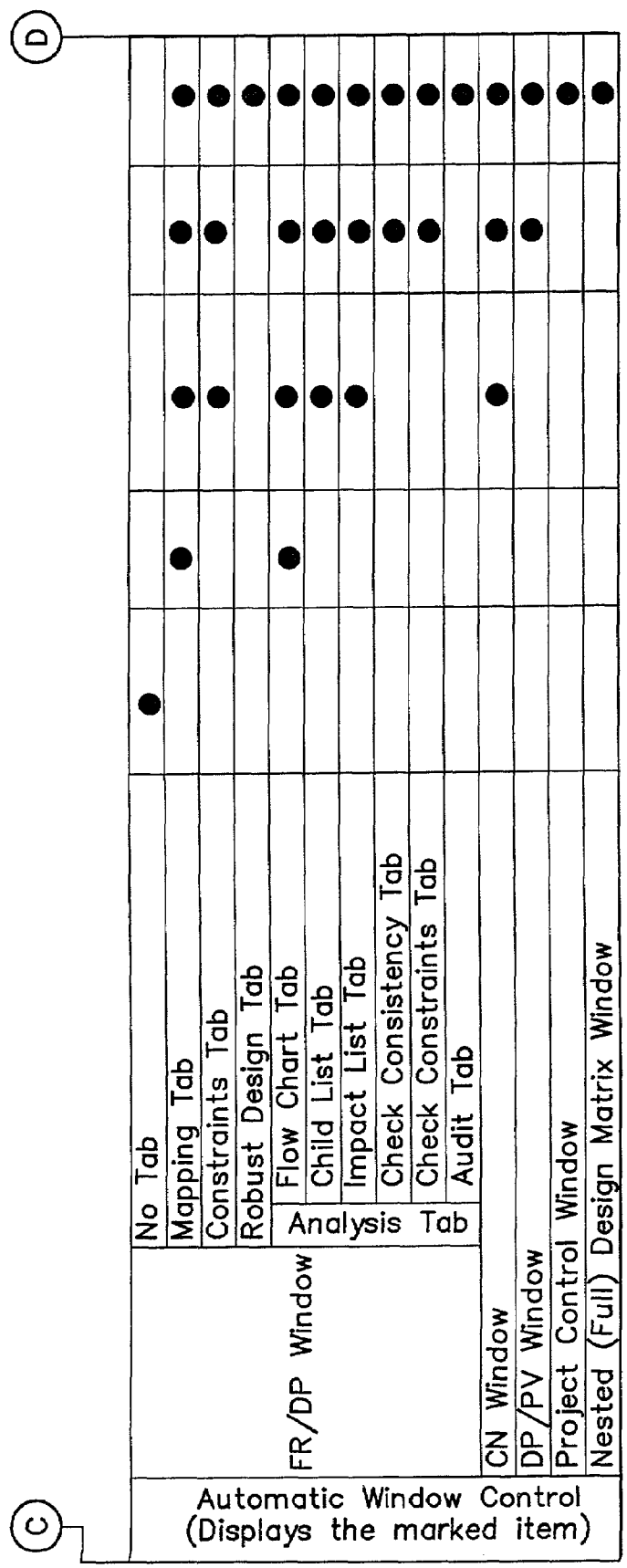

Display configuration control/management by level adjustment: Like other design methodologies, a designer, who is trying to use the axiomatic design concept, needs preliminary training. There are several steps to learn the axiomatic design concept. Most of these learning processes were done conveniently in the form of lectures in universities and companies. However, if a software tool supports or represents these learning steps precisely, it is going to be a huge benefit. Therefore, the design software may be adjusted in terms of the user experience level, which represents the knowledge level for the axiomatic design methodology. The table shown in FIG. 65 shows how the design software may configure the user interface for a specific user experience level. The black dot means available features for specific levels. The gray dot means enabled graphical interfaces for corresponding levels. Also, users are allowed to turn on and off certain features within the level so that they can customize the software for their own environment.

Numbering scheme: This option allows setup numbers for the nodes and hierarchies by user. The table shown in FIG. 66 shows one of a possible set of numbers.

Figure 67A:
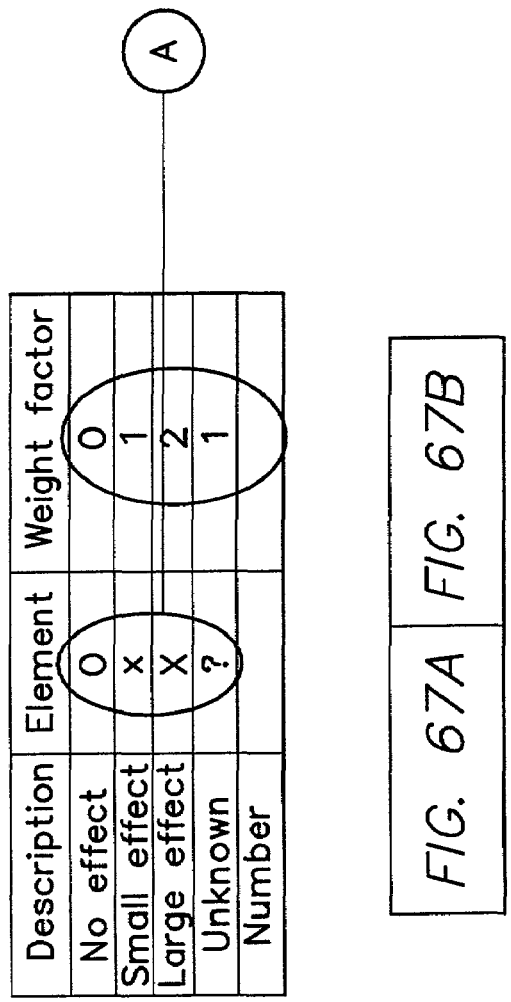
FIG. 67 shows an alternative user interface that allows users to adjust elements of a design matrix more precisely.
Figure 67B:
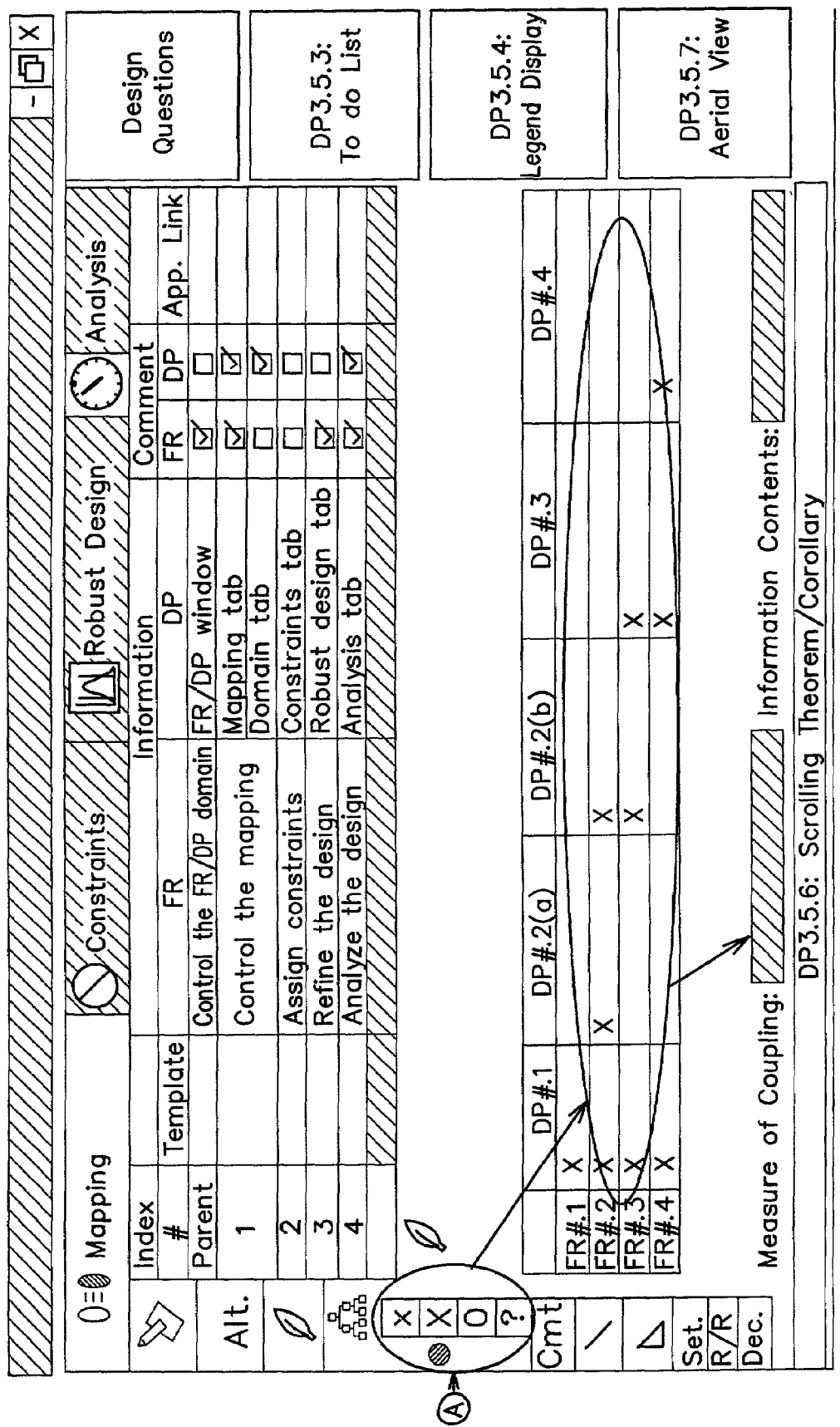

Design matrix setup: The elements of the design matrix usually include two items. An 'X' means there is a relation between FR and DP and an 'O' item means not. Some designers may want to adjust these elements more precisely. Therefore, the design software may provide freedom to the user to specify alternate design matrix elements as shown in FIG. 67. This adjustment may be reflected in the graphical interface as shown. There is also a concept dealing with the measure of coupling in a system [Nam P. Suh, The Principle of Design, 1990, Chapter 4]. The reangularity and semangularity shows the degree of coupling of the design.

Legend setting: It is important to distinguish among different types of information. The purpose of legends is to visualize the differences between data types immediately. In one embodiment, the design software uses color coding for the legends (not shown). Color-coding is also useful for graphics. As shown in FIG. 68, an interface through which the user may adjust the legend is shown.

Application Links (or File Location): According to one embodiment of the invention, the design software is a complementary design tool that integrates with a company's design environment. There are many commercially-available software tools for design (for example, CAD, FEM, QFD, TRIZ and the line. To cooperate with these tools, the design software may include functions to interface with these other software tools. Thus, designers can use their own tools while deploying the axiomatic design concept using application links to the software design system. Acclaro software keeps track the file I/O for the linked applications so that the designer can manage all the information while operating the linked applications.

Information Options Adjustment

Figure 69:
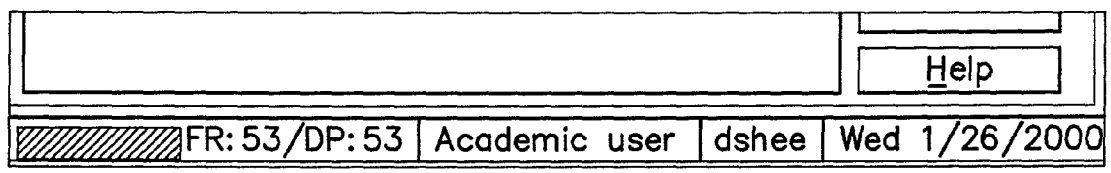
FIG. 69 shows an alternative user interface which indicates a size of the design.
Figure 70:
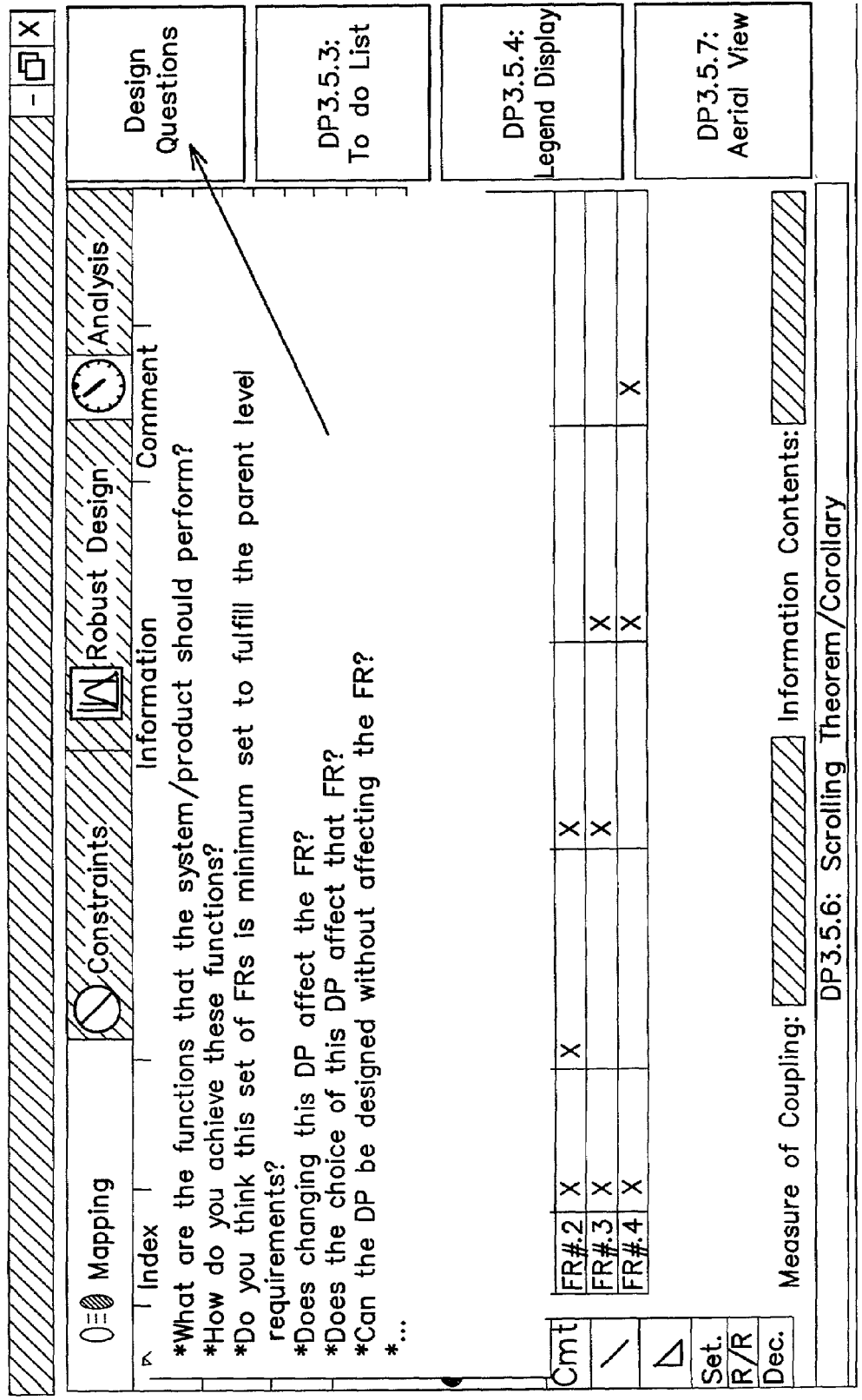
FIG. 70 shows an example of a live question list according to one embodiment of the invention.

Real time update for the total number of FR & DP display: It is useful for a designer to know how large the design in terms of the total number of FRs and DPs; an interface such as that shown in FIG. 69 provides such design information.

Live question list: As discussed, axiomatic design is a kind of thinking process. This process can be standardized and represented inside the design software system. In particular, the design software may ask to user a number of questions to guide this thinking process. Examples are discussed below with respect to FIGS. 70-71.

Figure 71:
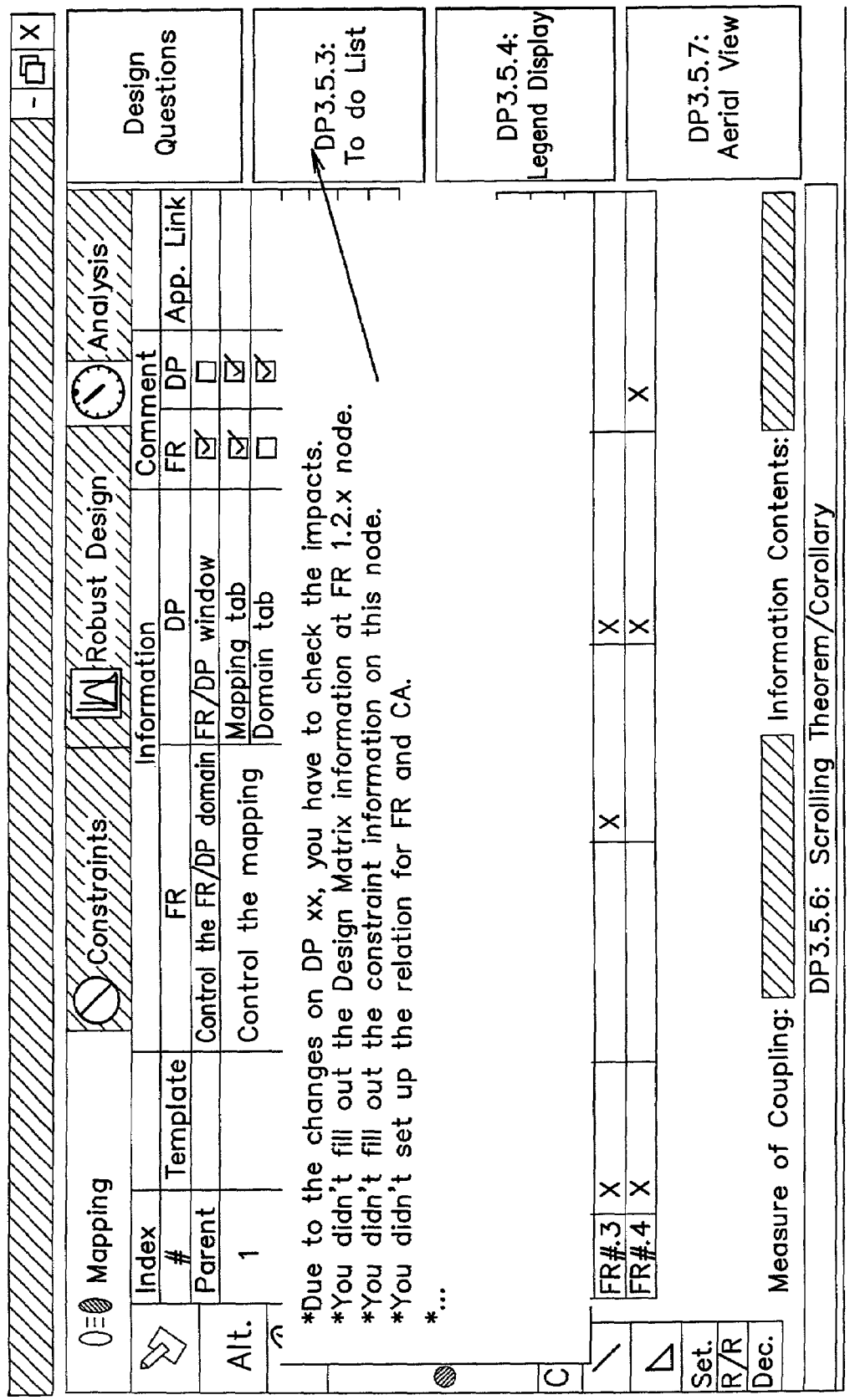
FIG. 71 shows a live to do list according to one embodiment of the invention.
Figure 76A:
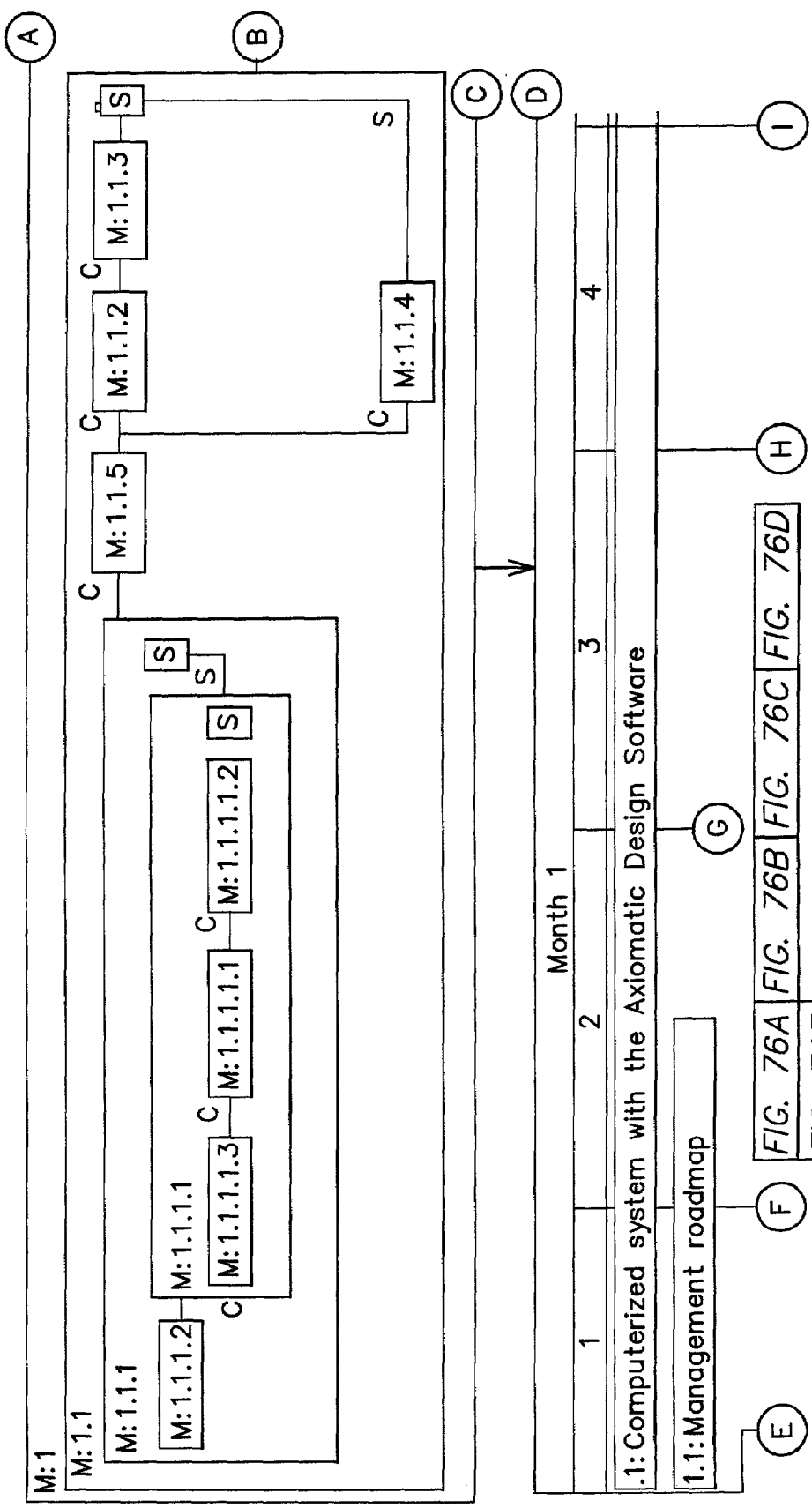
FIG. 76 shows an example Gantt chart derived from the flowchart shown in FIG. 75.
Figure 76B:
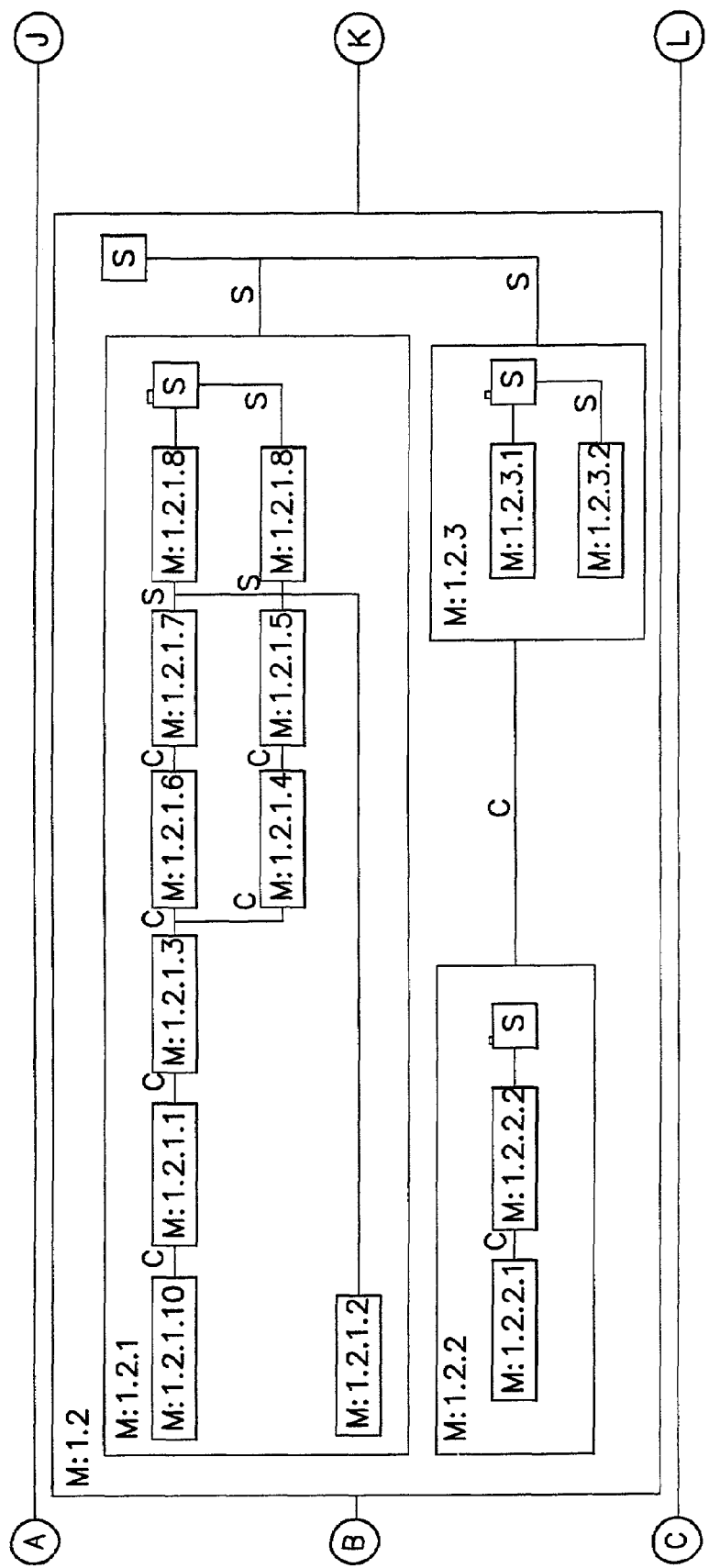
Figure 76C:
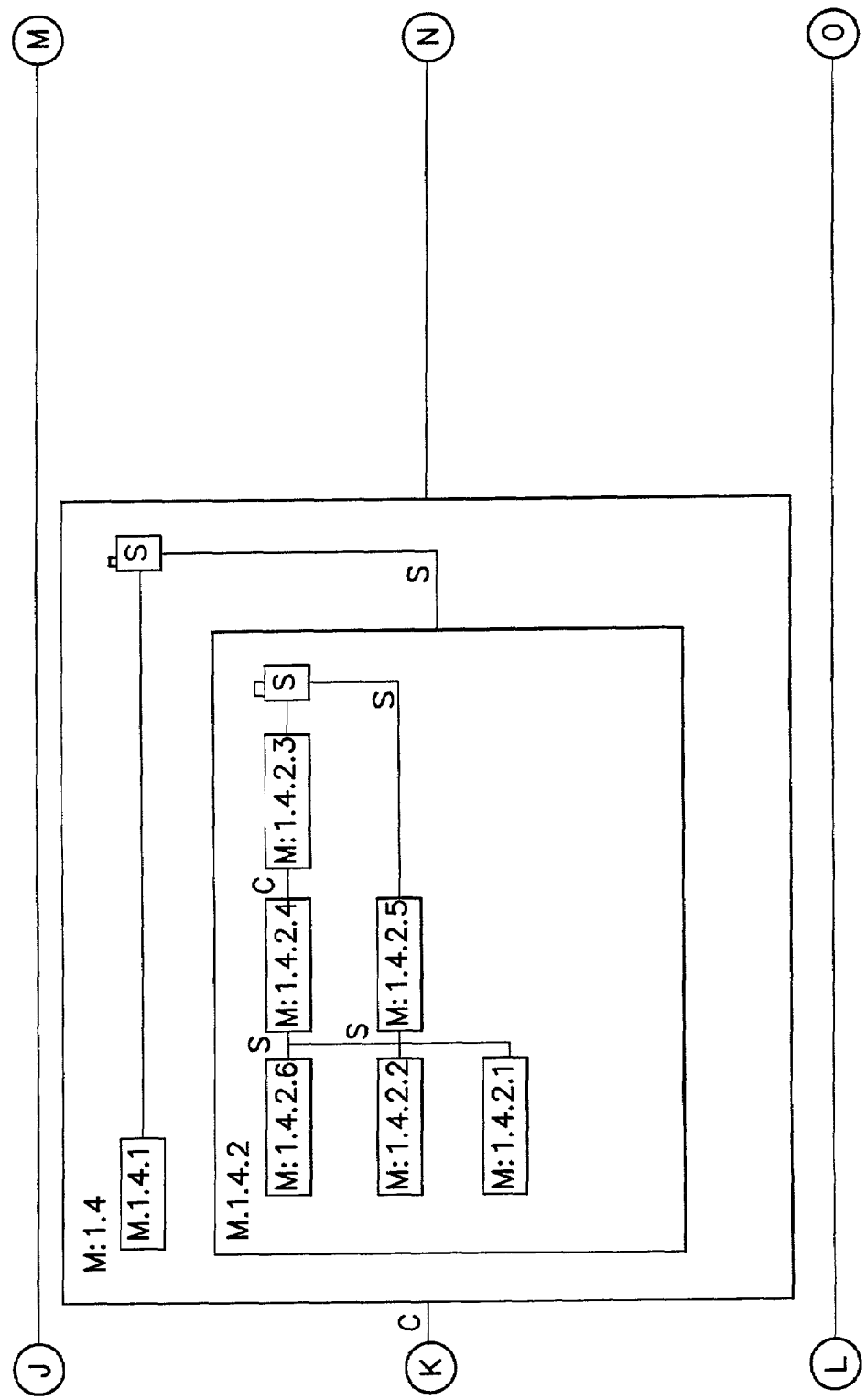
Figure 76D:
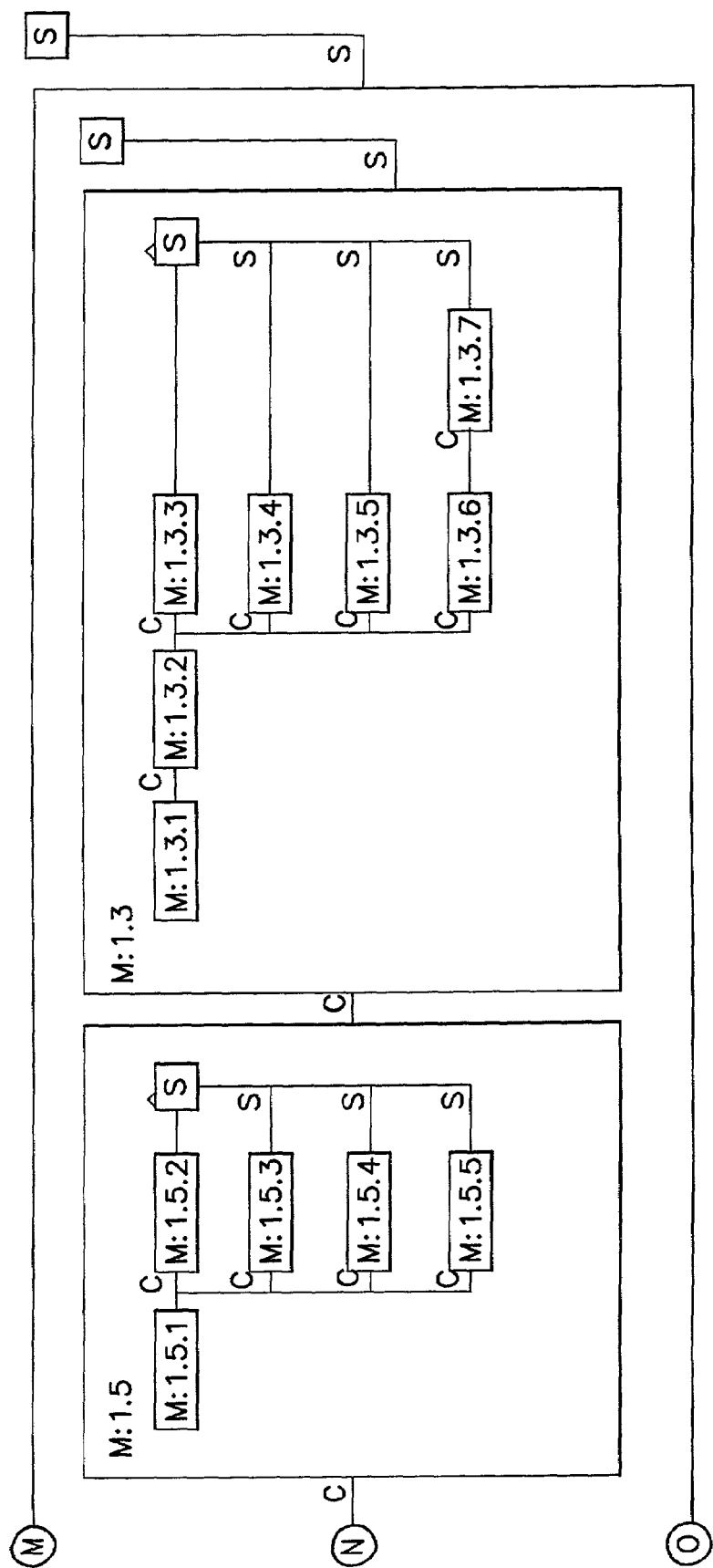
Figure 76E:
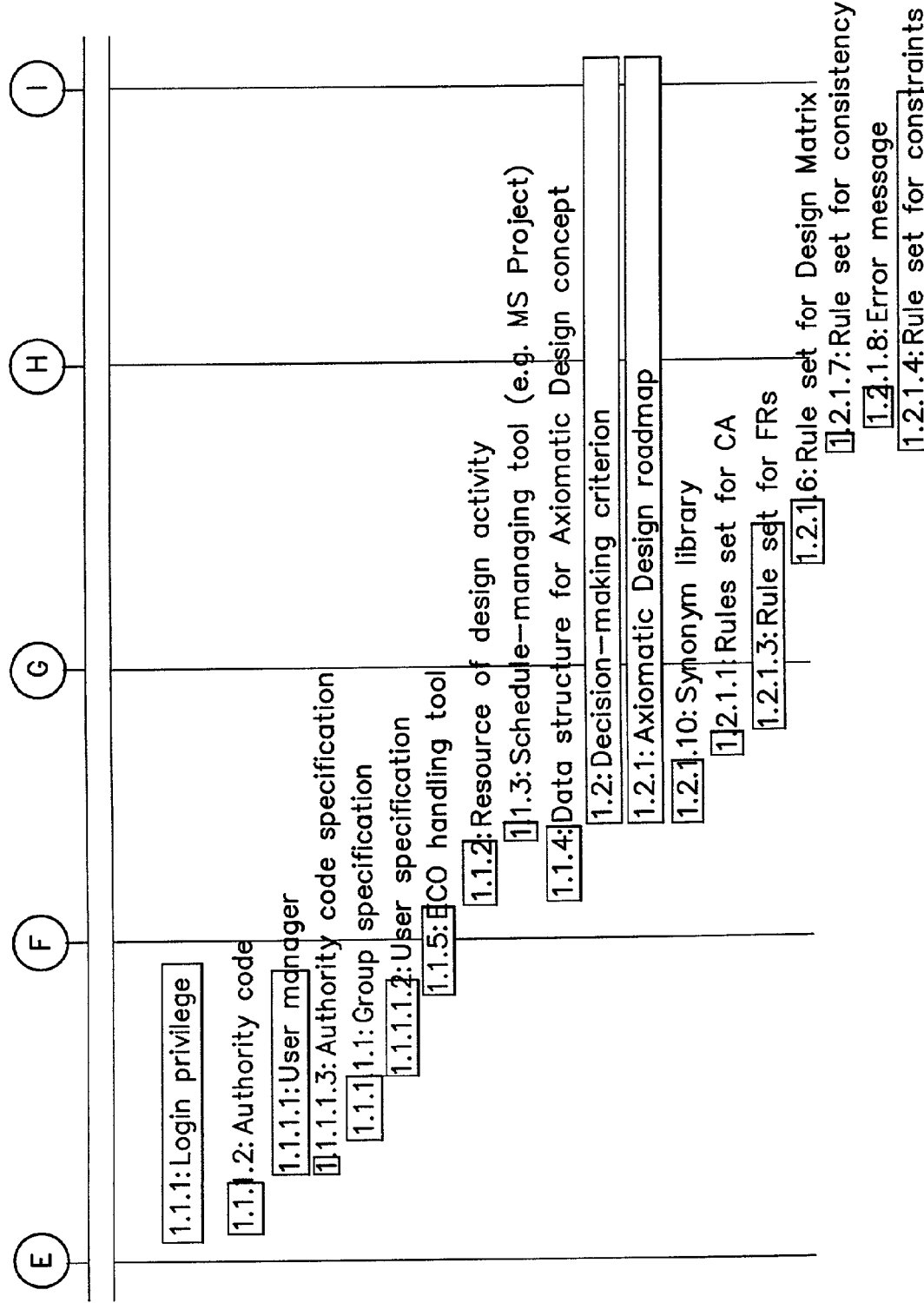
Figure 76F:
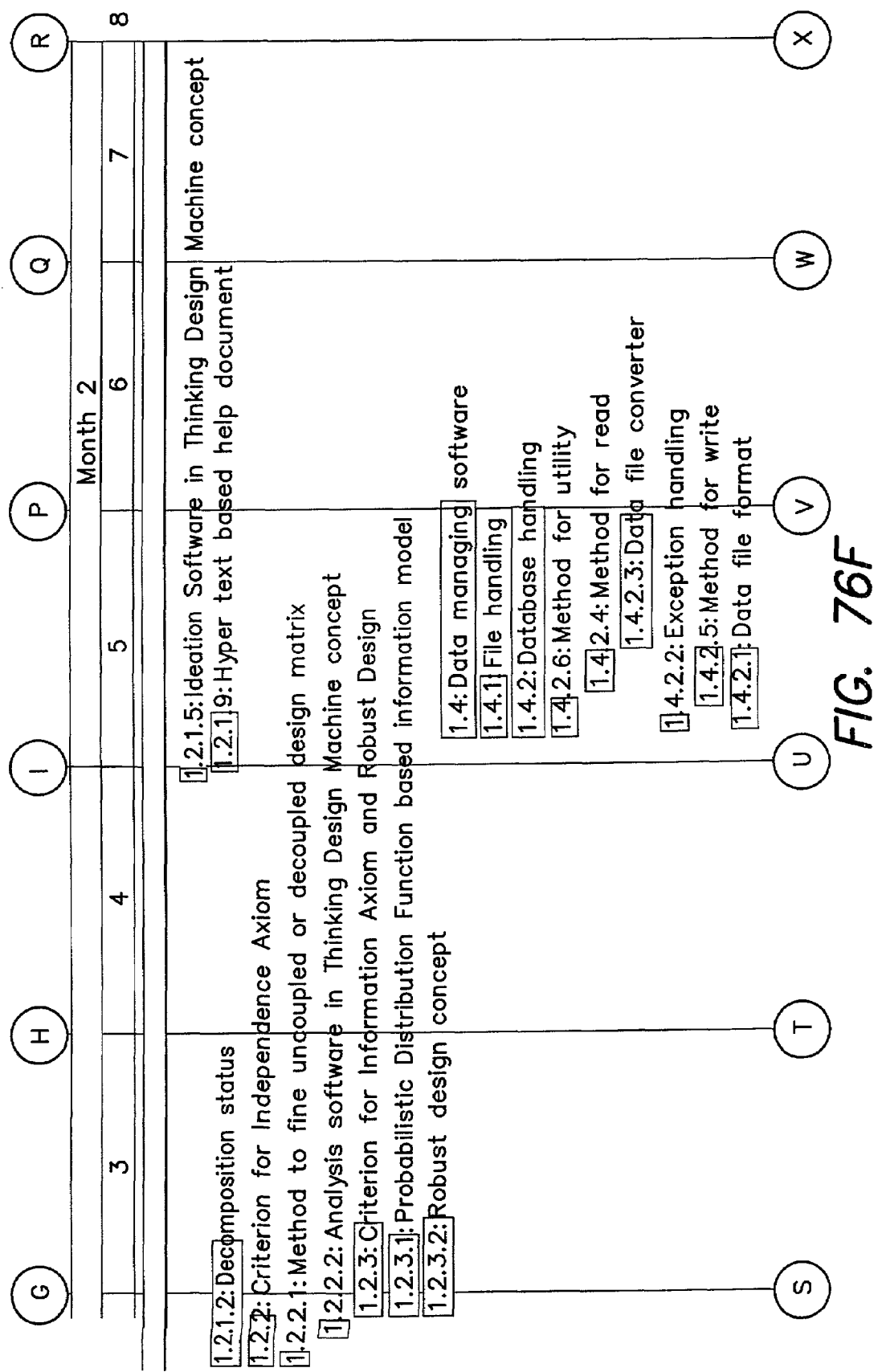
Figure 76G:
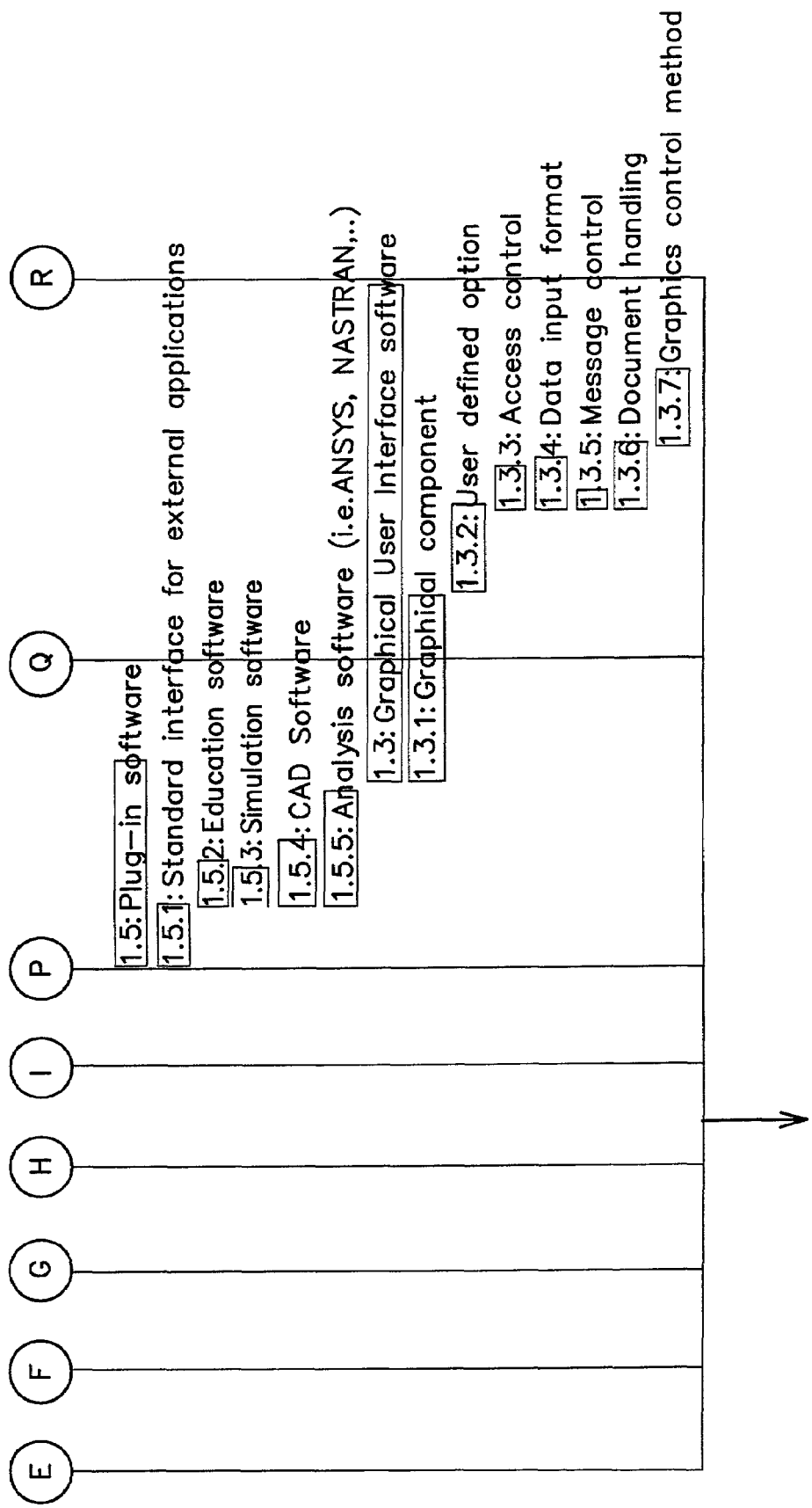
Figure 77A:
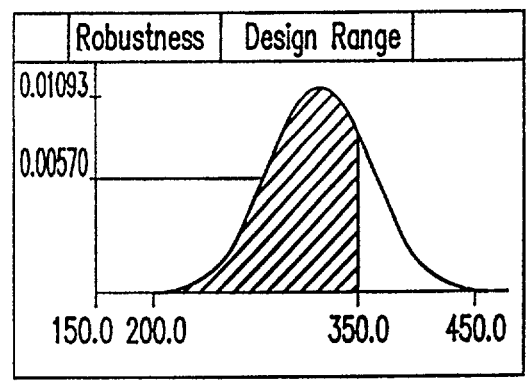
FIGS. 77A-D show probability density functions according to one embodiment of the invention.
Figure 77B:
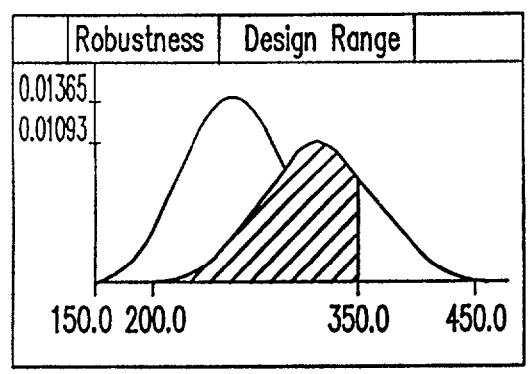
Figure 77C:
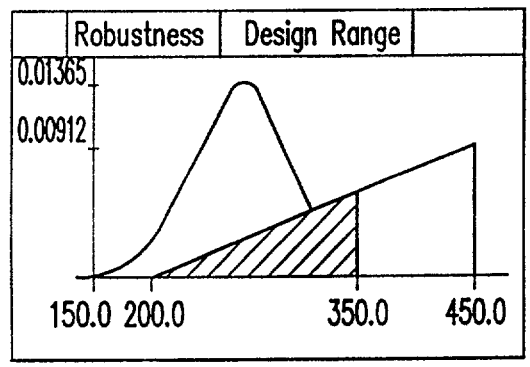
Figure 77D:
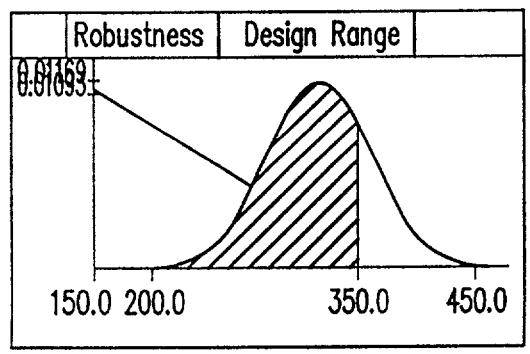

Live to do list: Designers should check a number of items prior to finishing the design. For example, if they change a specific DP, they have to check the entire downstream impacts to ensure the changes are allowable. Also, if the user did not fill out the required information in the design (i.e. hierarchies), the users may be prompted to finish the insufficient information as shown in FIG. 71.

Figure 72:
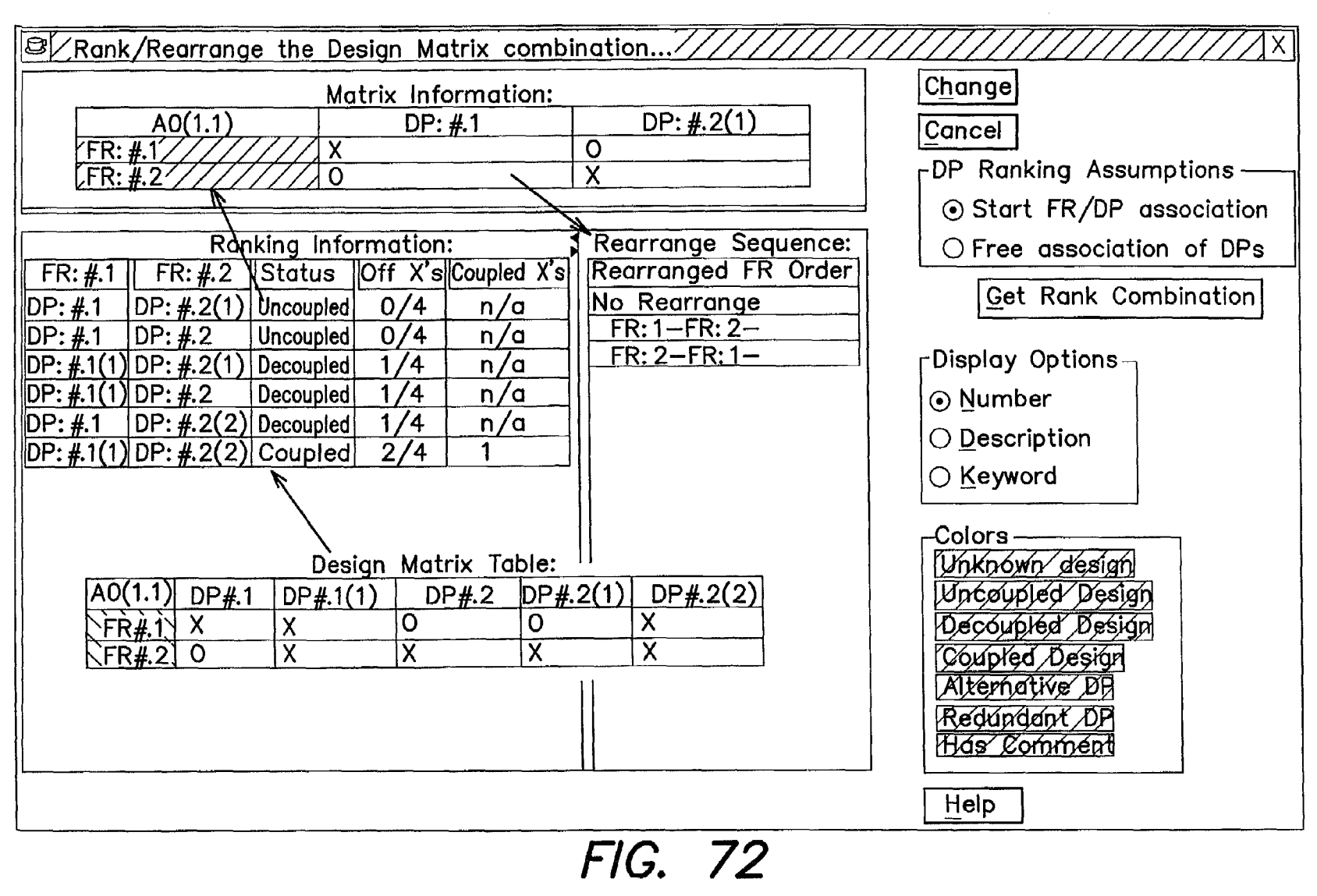

Ranking with strong FR-DP association: A key part of an axiomatic design is the design matrix because it contains a majority of design information. According to one embodiment of the invention, the design software system sets of DPs, distinguishing the best DPs among the alternatives. To suggest the better solution sets, the ranking information should include a set of FRs to be satisfied, design status, number of off-diagonal X's, number of coupled X's and measure of coupling. Designers can choose a better set of DPs using this information. The strong FR-DP association means that the FRs and corresponding DPs stick together. For example, DP 1 is selected to fulfill the FR 1, DP 2 is for FR 2, and so forth. As shown in FIG. 72, FR-DP pairs having strong associations have no alternative DPs.

Ranking with free association of DPs: Unlike the strong association, designers might face a situation that they could not specify the DPs for a specific FR although they know the available DPs set and relations with the FRs set. The design software system may search the possible combinations that satisfy the independence axiom to locate the best matching DP.

Rearrange sequence: The rearranged information (i.e. design sequences) provide possible combinations to construct the design. For example, if a designer has 5×5 design matrix, the total number of sequence combinations is 5! (=120 cases). However, the possible sequences are restricted by the pattern of design matrix (i.e. uncoupled, decoupled, coupled). According to one embodiment, the design software shows the possible sequences, which are displayed at the lower right side in FIG. 72.

Child list: Sometimes the child lists for specific nodes are useful to allow a designer to focus on the local problem. According to one embodiment of the invention shown in FIG. 73, the design software displays this information rather than using a FR and DP tree window to display the entire hierarchy information.

Impact list: If designers wish to change a specific DP, they should check the effect through the hierarchy to make sure the change is allowable. There is a sequence for evaluating this impact effect based on the pattern of the design matrix. To reduce this inspection time, the software design system may display the items to check due to the changes in the form of table and flow chart drawing as shown in FIG. 74.

Flow chart display: The flow chart, which is derived from the design matrix, visualizes the design order with graphics. The design software may calculate this information with design matrix information and display the flowchart as shown in FIG. 75.

Gantt Chart display: The flow chart can be easily converted into a Gantt Chart, if the time information (i.e. time duration for each module) is provided. According to one embodiment of the invention, the design software has an interface through which a user may enter these time durations and display the corresponding scheduling information visually as shown in FIG. 76.

Advice for decoupling: Axiomatic design software recommends a designer construct an uncoupled or decoupled design. When the designer creates a coupled design, however, there are certain ways to decouple the coupled design. These elements can be summarized as follows:
Check the off-diagonal element in the design matrix and ask if the designer can modify the corresponding DPs.
If the designer cannot modify the corresponding DPs, ask for alternatives for the corresponding FRs.
Otherwise, provide a suggestion to change the FR which could not be satisfied with the current DP set.

PDF (Probability Density Function) graph display for information axiom: Information content requires common area that explains overlapped region between system range and design range. According to one embodiment of the invention, the design software shows different distribution types such as uniform, normal, increasing and decreasing. When a designer enters required information to calculate the information content, the system draws the distribution shapes and fill out the common area automatically. FIGS. 77A-D show different types of PDFs discussed above.

Figure 78A:
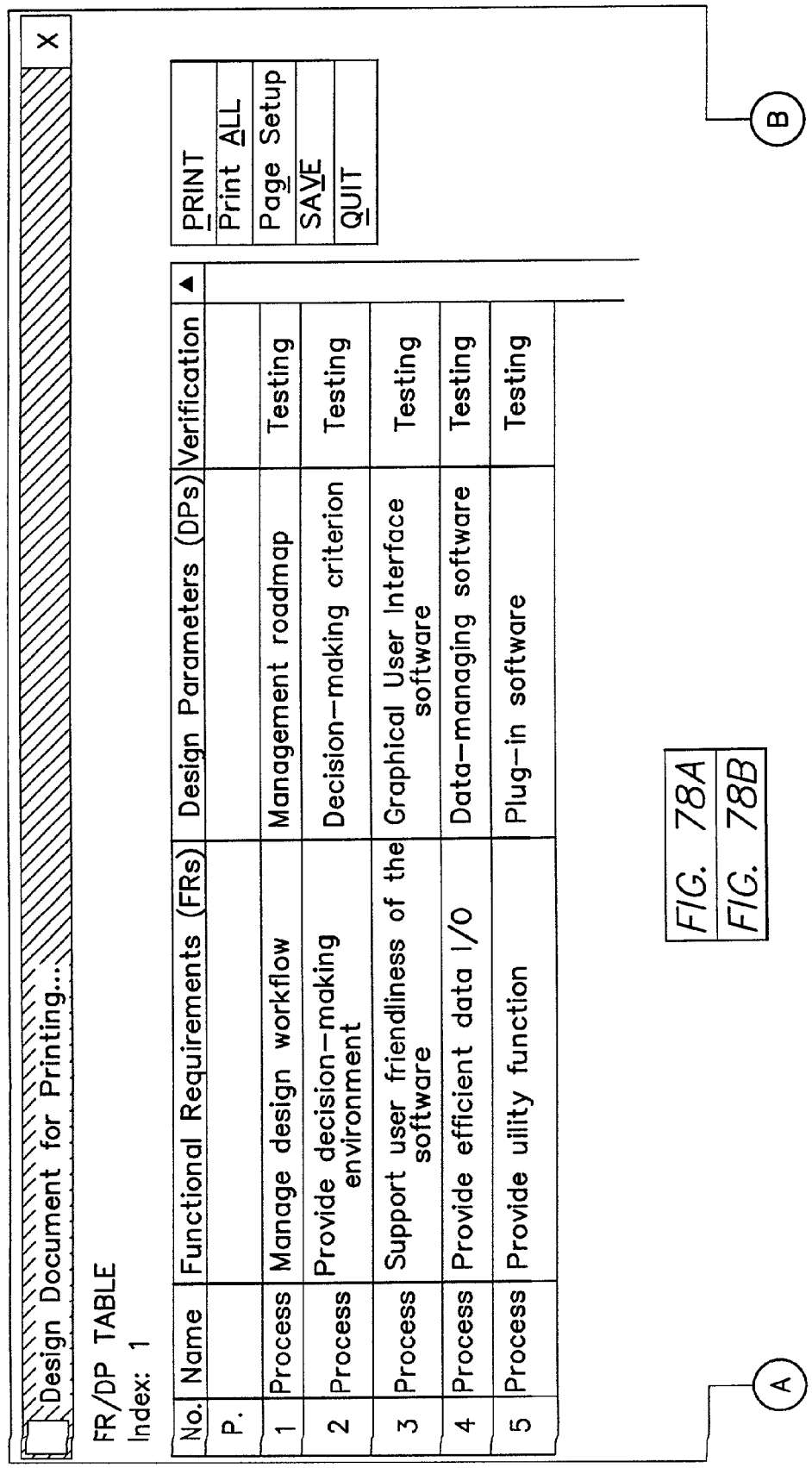
FIG. 78 shows a user interface displaying a design document derived from a design according to one embodiment of the invention.

Design documentation: One of the important features of software design is to document the design results. The system may generate, for example, a design document having a Hypertext Markup Language (HTML) format as shown in FIG. 78. HTML file format is well-known in the art of Internet publishing.

Figure 79A:
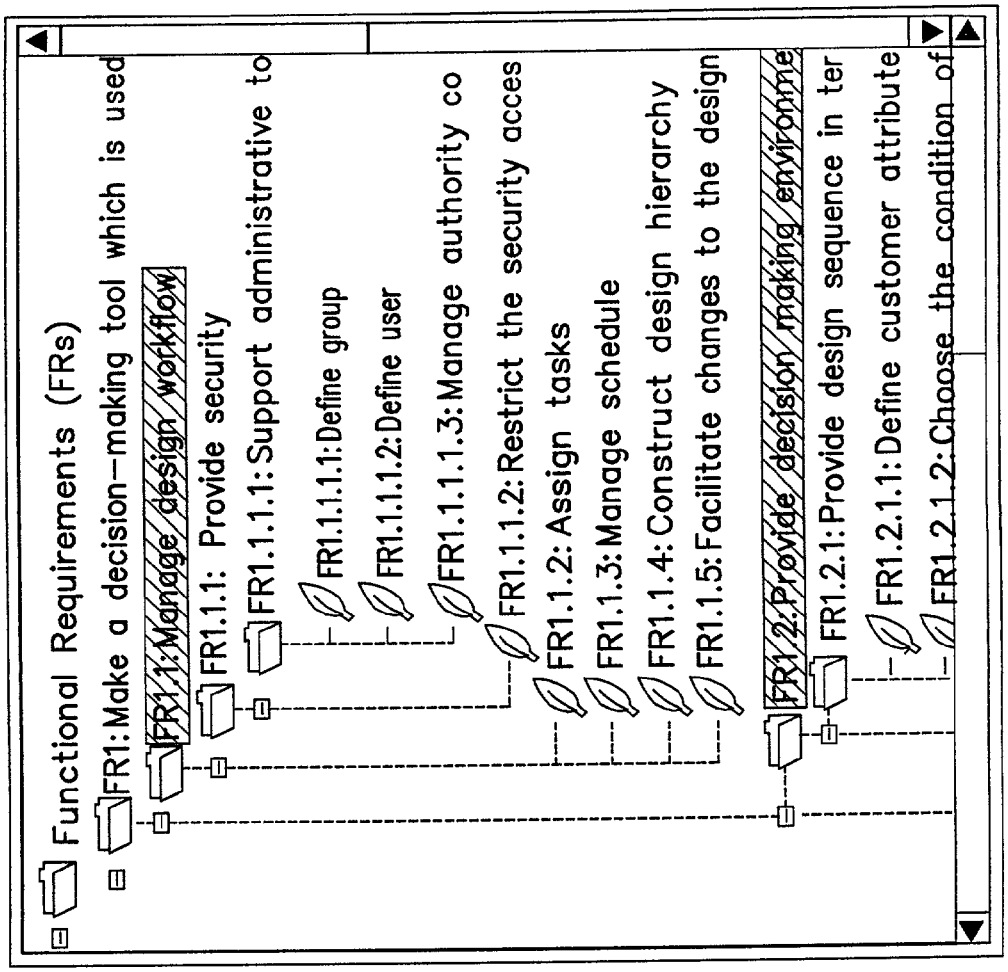
FIGS. 79A-B show horizontal and vertical type design trees, respectively.
Figure 79B:
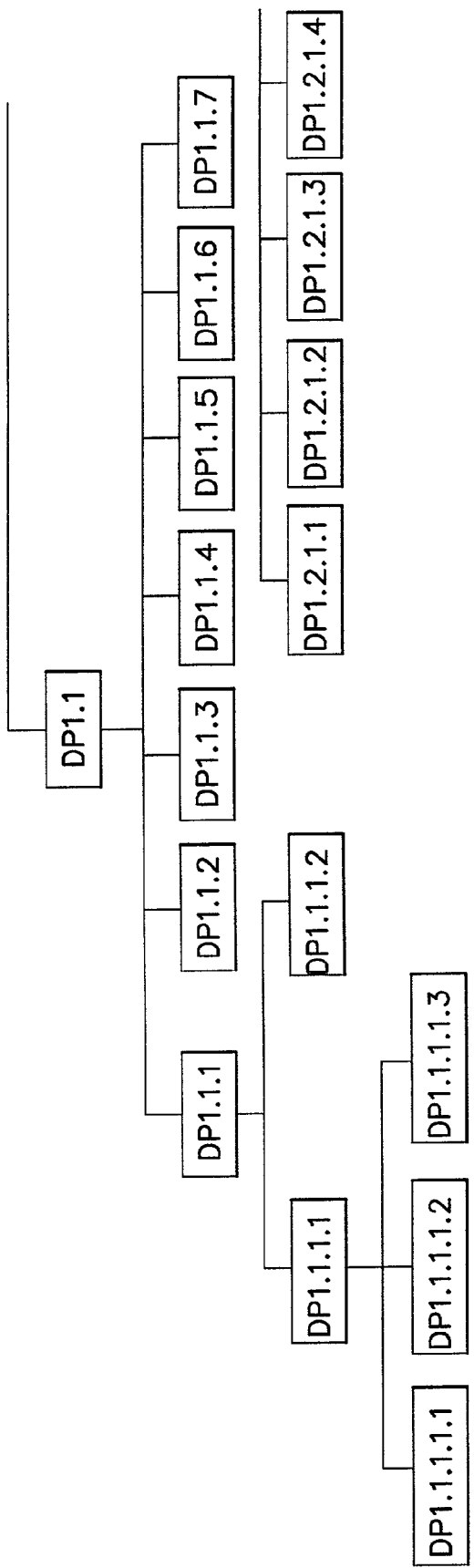

Design tree display for each domain: Two types of tree contents are available to show CA/FR/DP/PV design trees. One is vertical type and the other is horizontal type. Because both types have advantages, two different types of interfaces may be provided to support users as shown in FIGS. 79A-B.

One step access for embedded examples: Simple examples may be embedded in the design software to assist the user. Users can load these examples by selecting one of the menu items under an example main menu, for example.

Drawing transfer using system clipboard: Some users may want to paste specific drawings, which are generated by the software design system, into their own documents such as journal papers, proposals, reports and so on. The software may include a function to copy the drawings into system clipboards so that users can paste the images into their applications.

Figure 80:
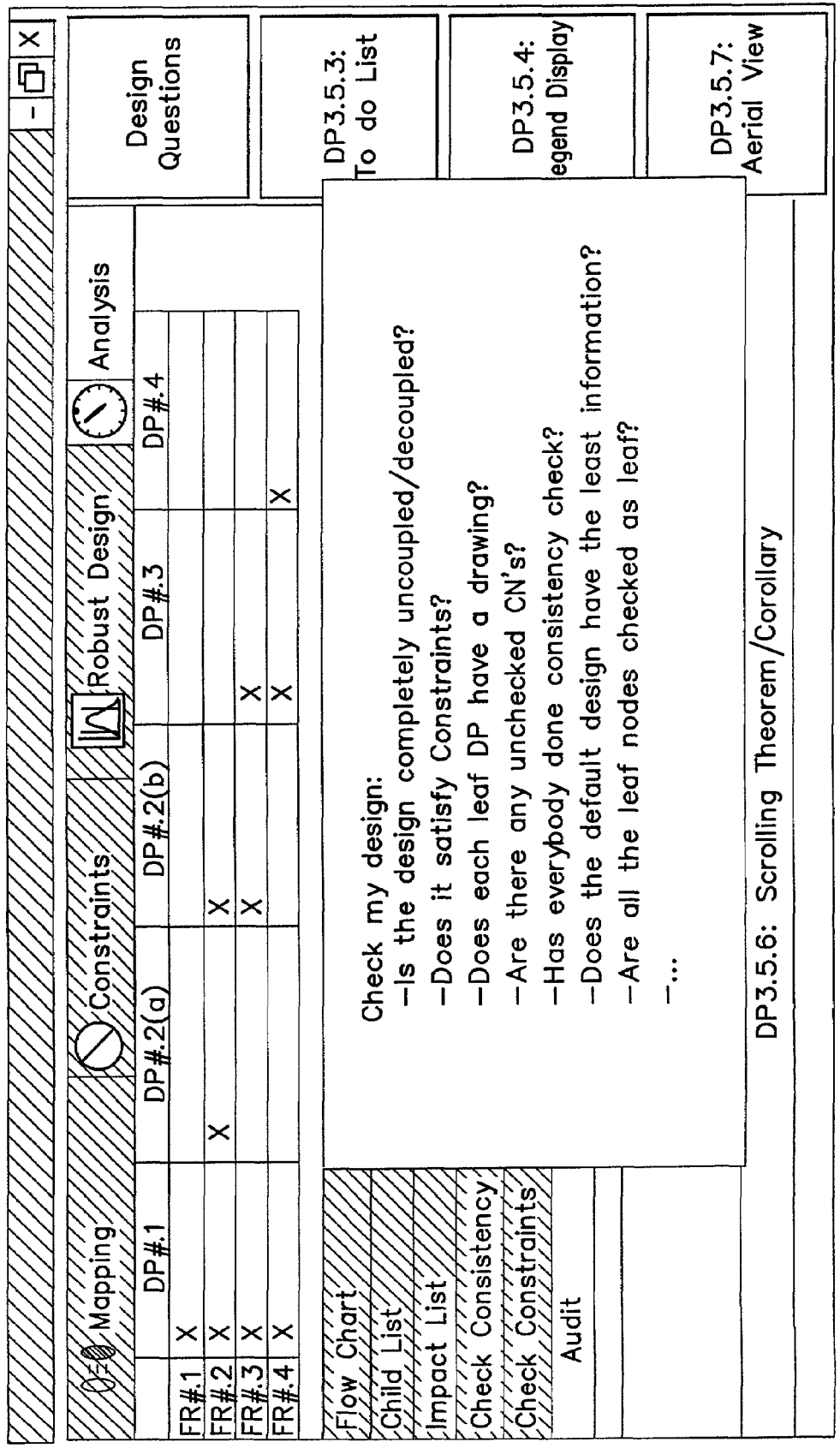
FIG. 80 shows a user interface that indicates a completeness of a design according to one embodiment of the invention.

Audit: After a designer has finished the design, they might want to know the completeness of their design. An audit function examines the design and shows if there is missing information. Such an interface that identifies missing information is shown in FIG. 80.

Design Matrix Interpretation and Manipulation

The design system may include many procedures for manipulating and/or evaluating a design using the design matrix. As discussed, the design matrix includes a great deal of information regarding the system design that may be adapted to provide additional information to a user, for example, such as project organization and system description information including flowcharts, impact lists, Gantt charts, and other information. Algorithms or methods used to extract and use such information from the design matrix may be provided. More particularly, algorithms that interpret or manipulate information in the design matrix. The following algorithms, among others, may be provided to interpret and/or manipulate design matrix data:

Algorithm to check the design status of entities of the design matrix

Algorithm to generate rearrangement sequences for the system design

Algorithm for ranking a design having a strong FR-DP association

Algorithm for ranking a design having a free association of DPs

Algorithm for generating a flowchart describing the system design

Algorithm for generating an impact list related to the system design

Algorithm for generating a Gantt chart related to the system design

Algorithm for computing a full design matrix from inconsistency data

Algorithm for displaying a full design matrix

Figure 81:
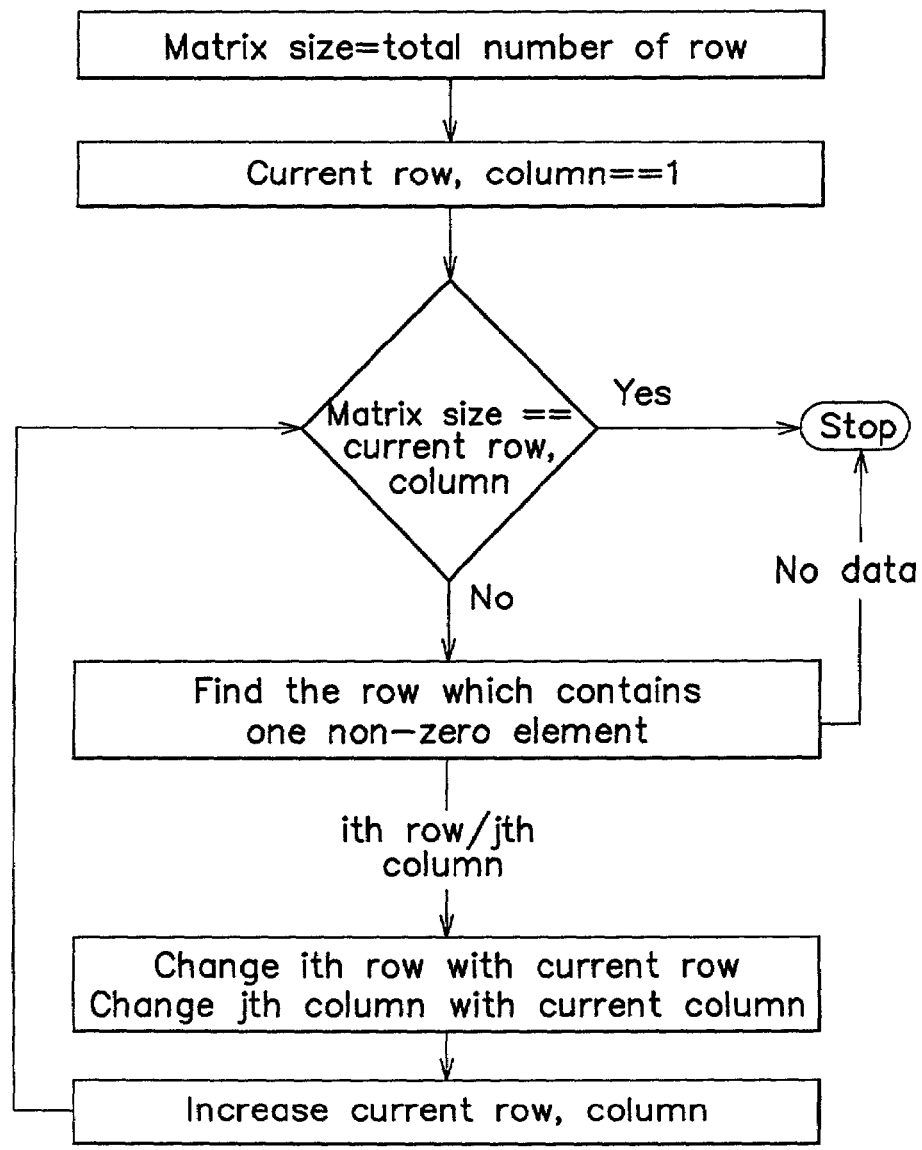
FIG. 81 shows one process used to manipulate a design matrix according to one embodiment of the invention.

The design matrix in the Axiomatic Design framework includes a great deal of information. It includes the design status, sequences for flowchart (or system architecture) schedule information and other information. As discussed above, the design matrix expresses the relationship between different domains (i.e., functional domain described by FR and physical domain described by DP). To interpret and manipulate this matrix, algorithms are provided that manipulate elements of the matrix. In the case of a design matrix having non-numeric information, algorithms are provided that manipulate elements having non-numerical characteristics. The basic algorithm to handle elements of the matrix is illustrated in a book entitled "The Principle of Design," by Nam P. Suh, Oxford University Press, 1990, pp. 383-385. This algorithm modifies the matrix format by changing the order of FRs and DPs to determine if the design matrix can be manipulated into triangular form to create a decoupled design. The algorithm as shown in FIG. 81 shows one algorithm according to one embodiment of the invention used to manipulate a design matrix.

According to one embodiment of the invention, a method is provided for changing the order of FRs and DPs. According to this embodiment, the following are performed:
  i) Find the row which contains one non-zero element. Rearrange the order of {FRs} and {DPs} by putting the row and the column which contain the non-zero element first (i.e. if $i^{th}$ row contains one non-zero element at $j^{th}$ column, then put $i^{th}$ component of {FR} first and put $j^{th}$ component of {DP} first.
  ii) Excluding the first row and column, find the row which contain one one-zero element. Rearrange the components of {FRs} and {DPs} by putting the row and the column which contains the non-zero element at the row and column second.
  iii) Repeat the procedure until there are no more sub-matrices to analyze.

Figure 82:
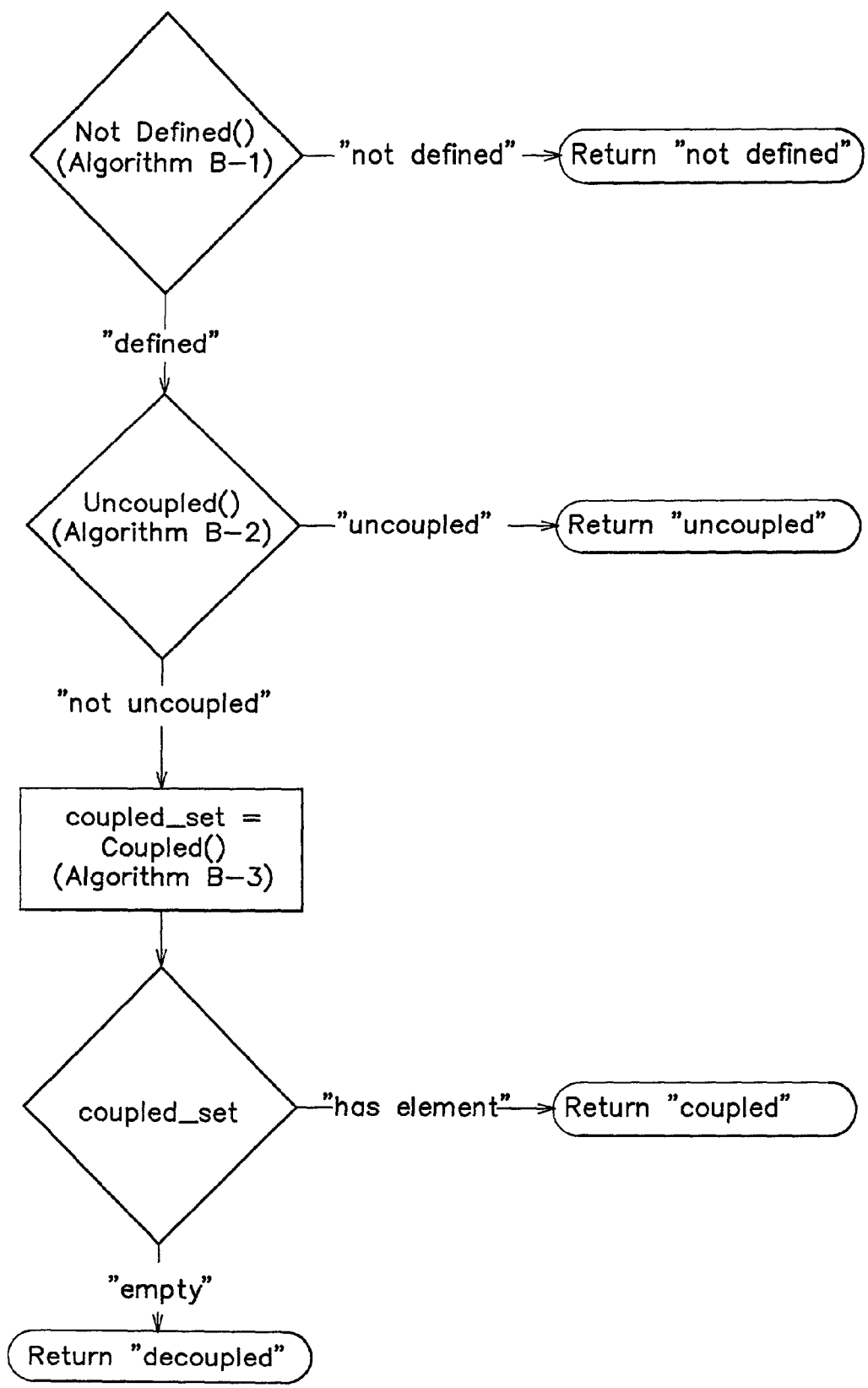
FIG. 82 shows one process that checks status of a design according to one embodiment of the invention.

Further, a method may be provided to check the status of the design as shown in FIG. 82. More particularly, a determination and indication of the state of the design (such as not defined, uncoupled, coupled, or other state) may be performed. The result of this determination may be indicated to a user of the design system. To determine whether various elements of the design are defined, a process may be performed wherein the elements are independently evaluated to determine whether they are defined. According to one aspect of the invention, an element is not defined when its element value is zero or is empty. It should be appreciated that other values may be used to indicate the element is not defined. One exemplary method for determining whether elements are defined is shown if FIG. 83 wherein each of the elements of the design matrix is evaluated using nested loops.

To determine whether the design is uncoupled, the value of each element of the design matrix may be evaluated. According to one embodiment of the invention as show in FIG. 84, if the value of any element is "X," then the design is not coupled. Otherwise, the design is uncoupled.

Figure 85:
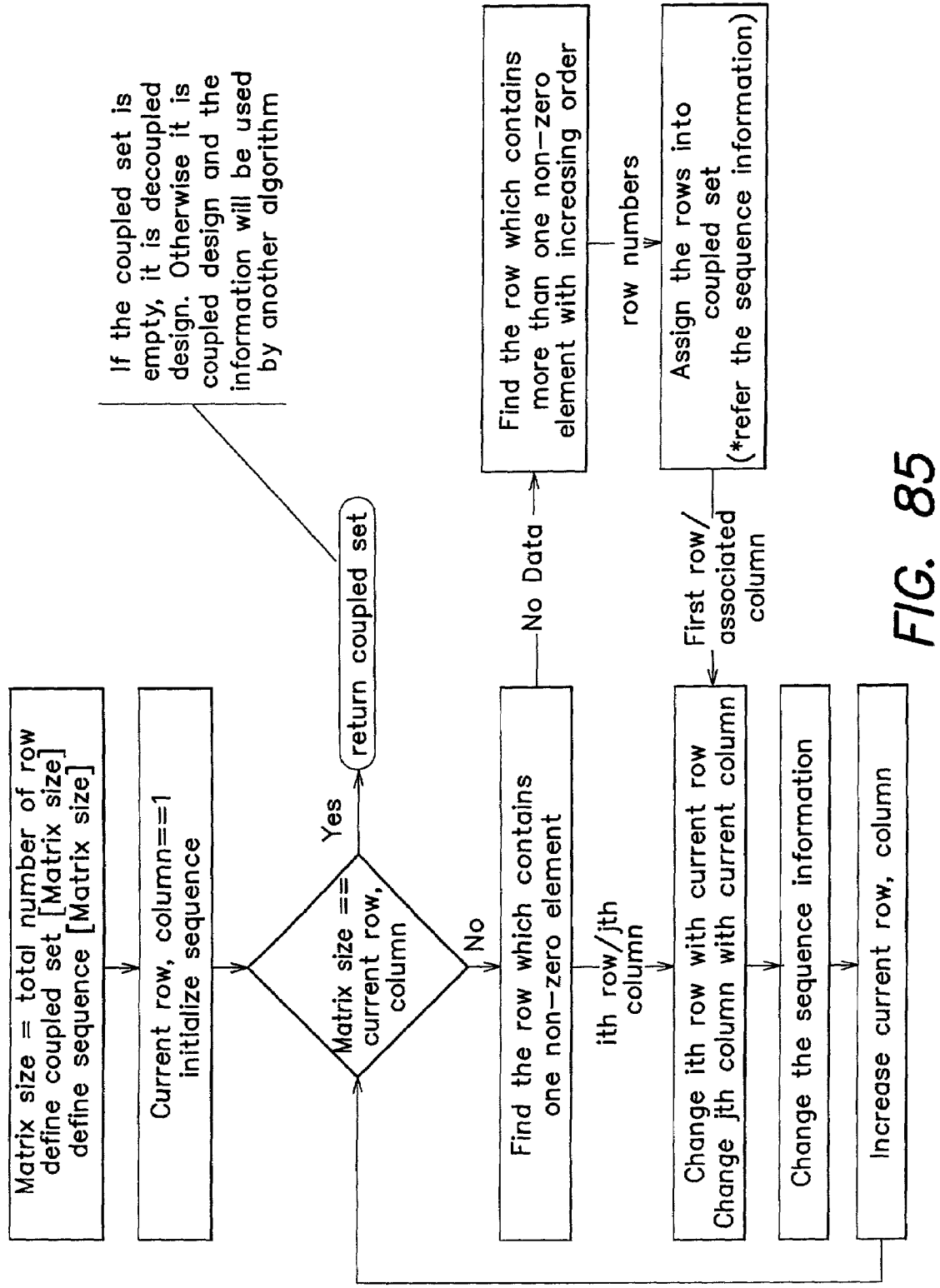
FIG. 85 shows one process that determines whether a design is coupled according to one embodiment of the invention.

FIG. 85 shows a method for determining whether a design is coupled. Coupling, as discussed above, can occur when the number of DPs is less than the number of FRs, or the FRs cannot be satisfied. The method may, for example, identify the coupled rows of the design matrix and assign those rows to a coupled set. If, after the design matrix is evaluated, the coupled set is empty, the design matrix represents a decoupled design. Otherwise, the design is coupled.

Figure 86:
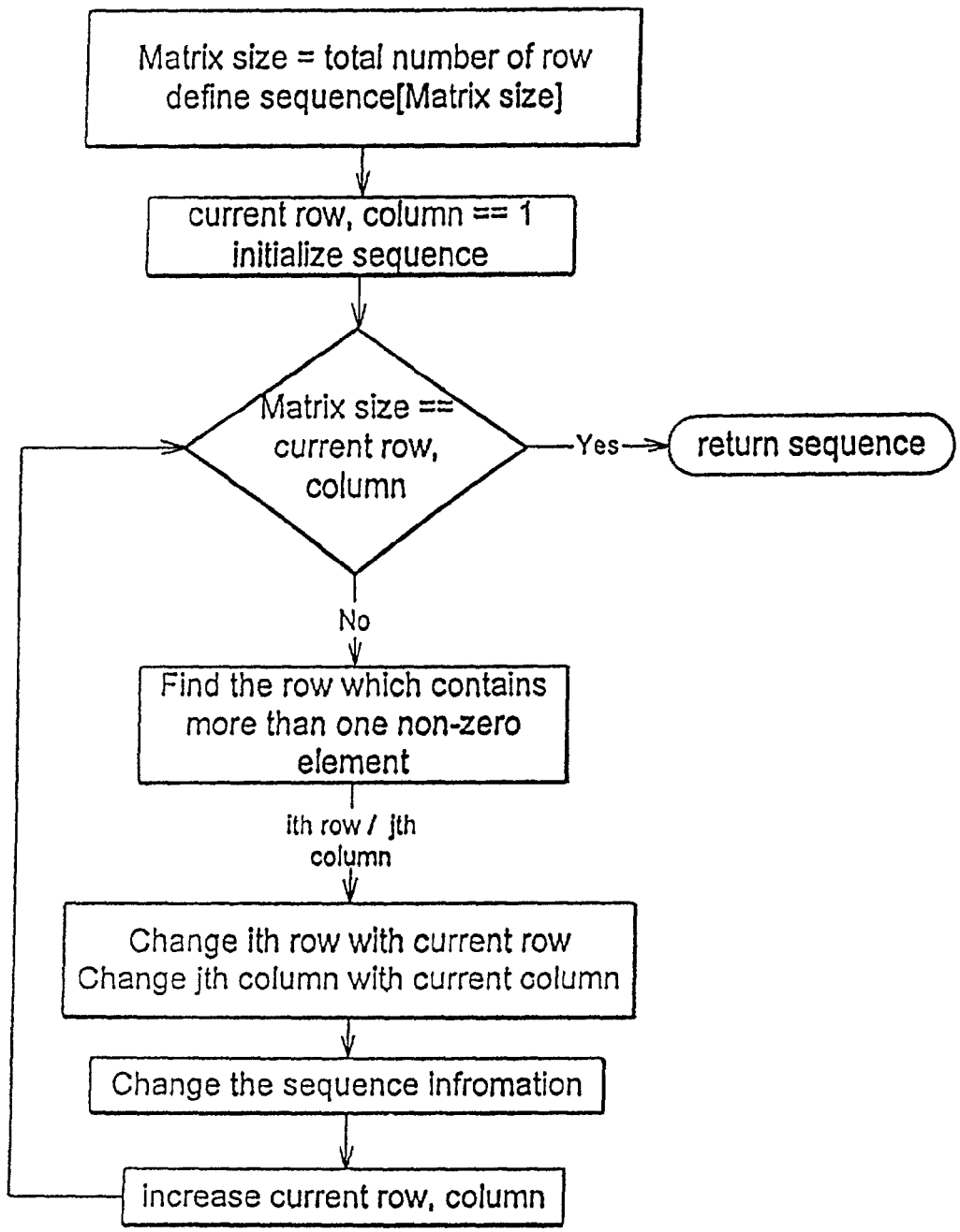
FIG. 86 shows one process that generates rearranged sequences of a design matrix according to one embodiment of the invention.

FIG. 86 shows a method for generating rearranged sequences of the design matrix according to one embodiment of the invention. In particular, the elements of the design matrix may be rearranged to modify the design matrix in triangular form which may be useful in evaluating or using the design.

Figures 87A, 87B:
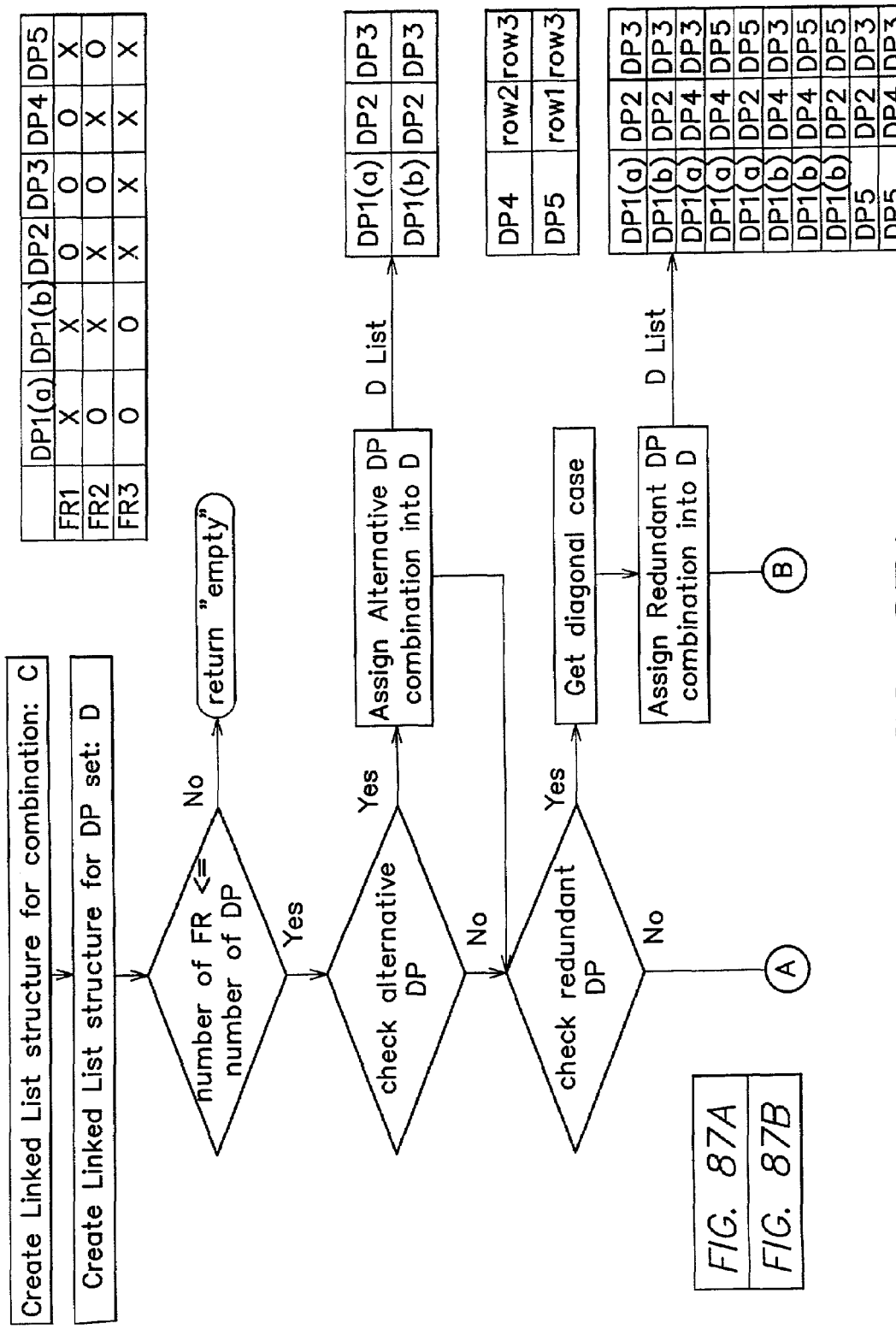
FIG. 87 shows a process that ranks alternative or redundant DPs according to one embodiment of the invention.
Figure 87B:
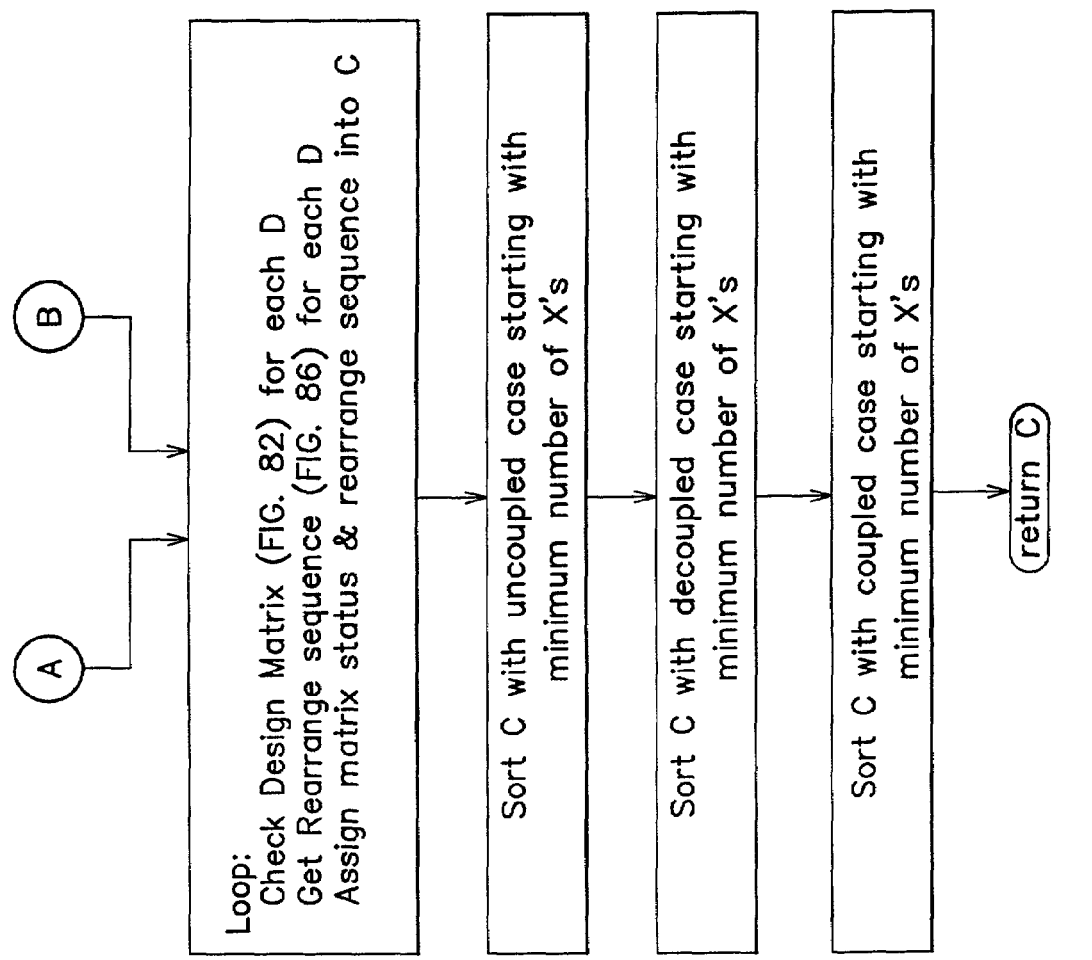

FIG. 87 shows a method for ranking alternative or redundant DPs. For instance, a designer may have alternative DPs or redundant DPs in which the system may be implemented. The algorithm shown in FIG. 87 describes how to rank the best combinations among these alternative or redundant DPs.

Figure 88A:
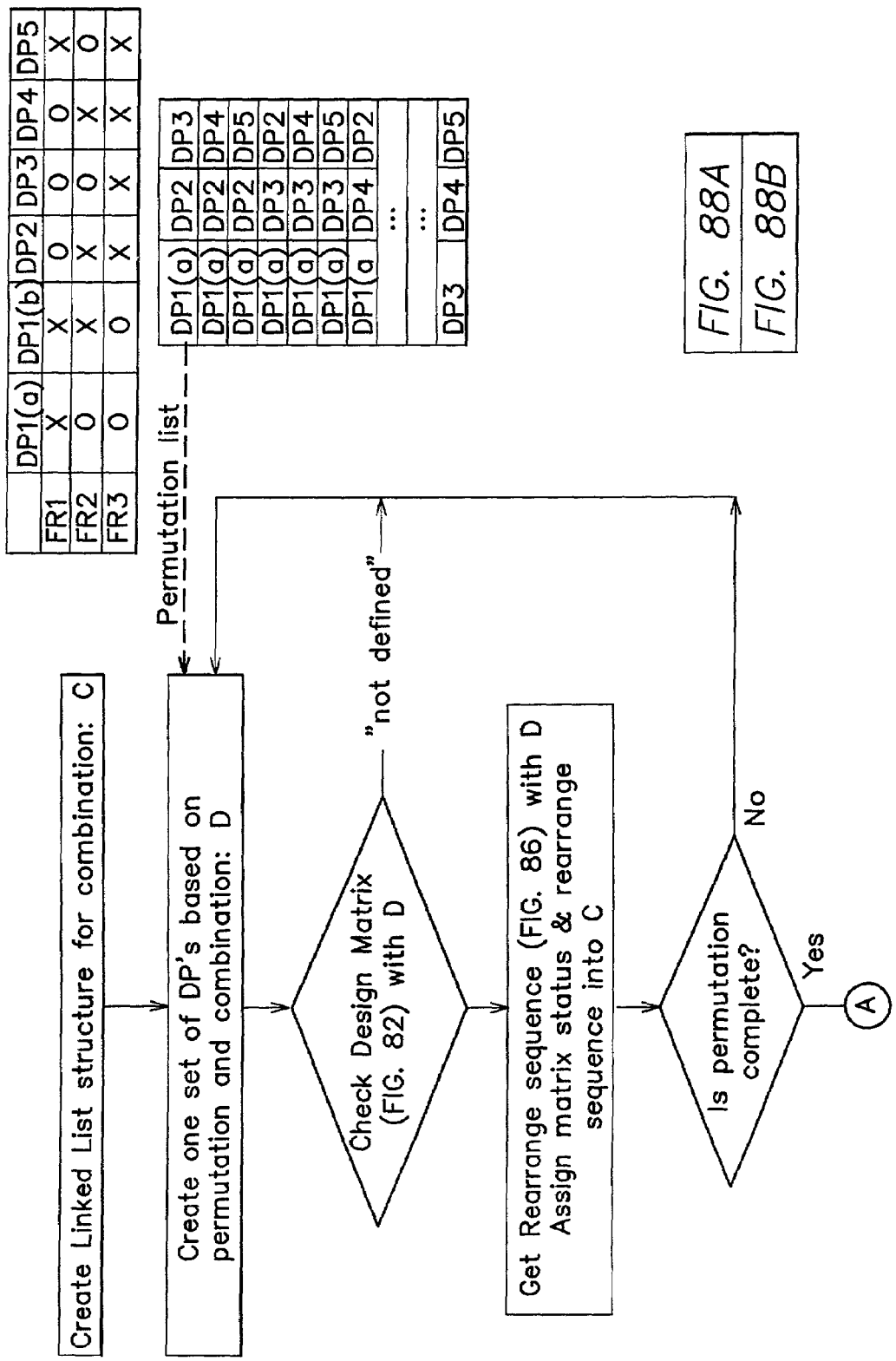
FIG. 88 shows a process that ranks all permutations of DPs according to one embodiment of the invention.
Figure 88B:
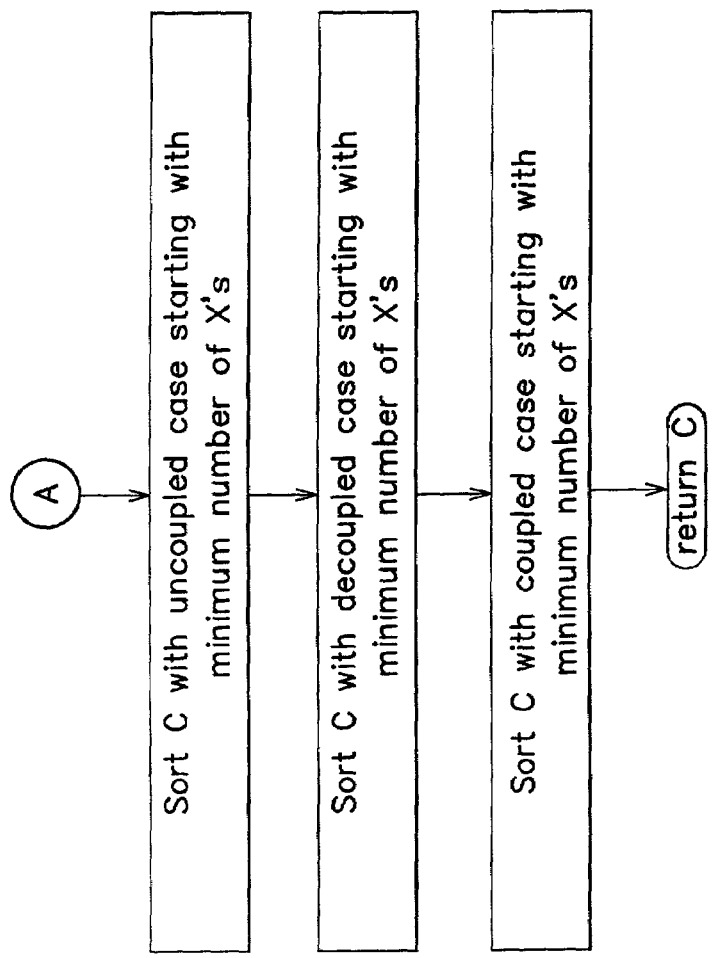

More particularly, the method shown in FIG. 87 ranks designs having a strong FR-DP association. This method collects the combinations among the alternatives and redundant DPs having a non-zero element in the diagonal element at the beginning of a row. FIG. 88 shows a method of ranking designs having free association of DPs. More particularly, this method shown in FIG. 88 finds all possible combinations of DPs that could form a basis of a design using permutation. It should be appreciated that any method for ranking alternative or redundant designs may be used.

Figure 89:
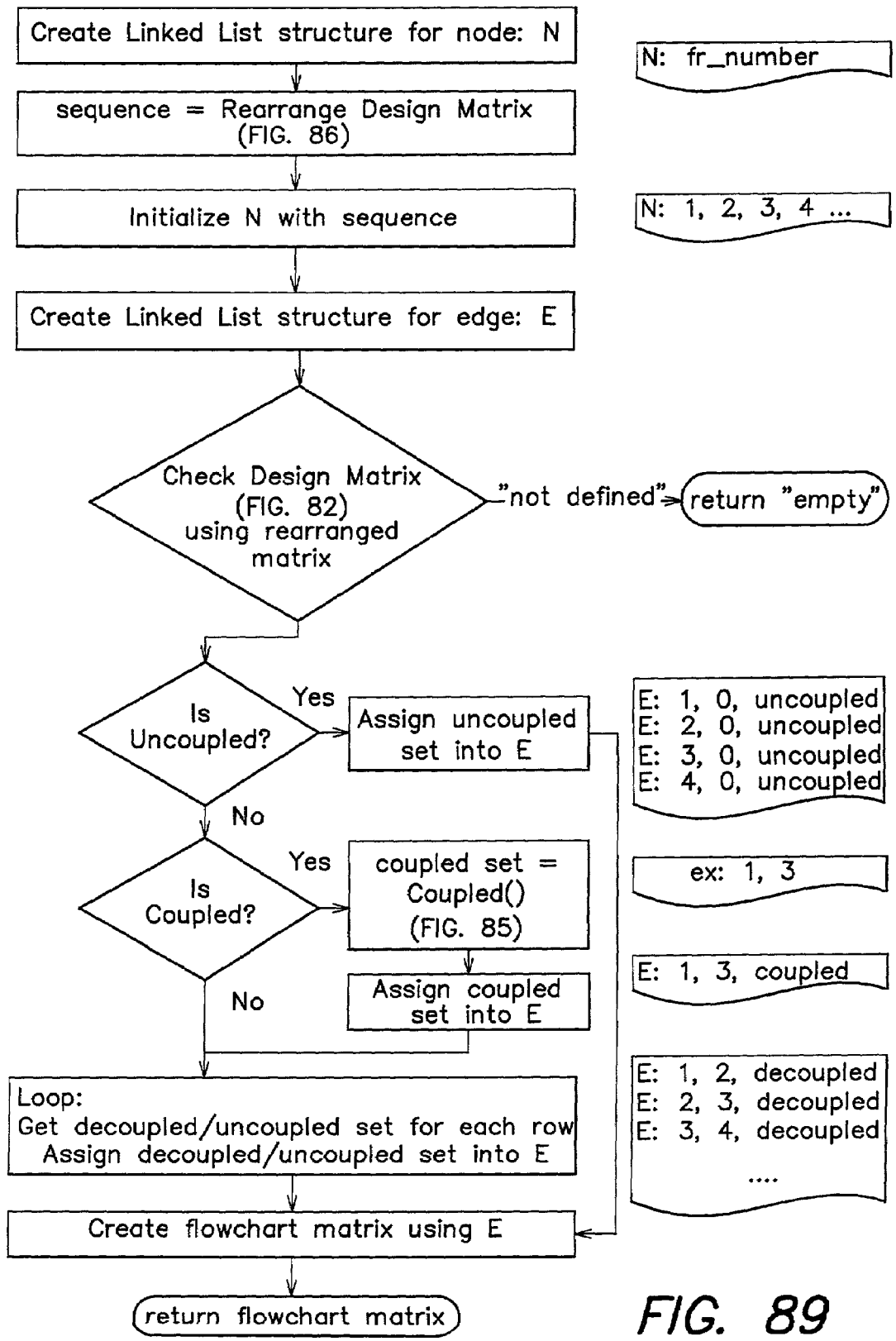
FIG. 89 shows a process that generates flowchart sequences based on design matrix information according to one embodiment of the invention.

As discussed above, flowcharts may be generated that graphically describe the system design represented by the design matrix. FIG. 89 shows one method for generating flowchart sequences based on design matrix information. The method uses design matrix information to generate an edge list that determines a flowchart matrix. The flowchart matrix can then be used to generate a flowchart. This flowchart graphically represents the architecture of the design. Because the method shown in FIG. 89 can be used for the entire design hierarchy at each level, the algorithm shown in FIG. 89 may be used to generate flowchart sequences for one level.

Figure 90:
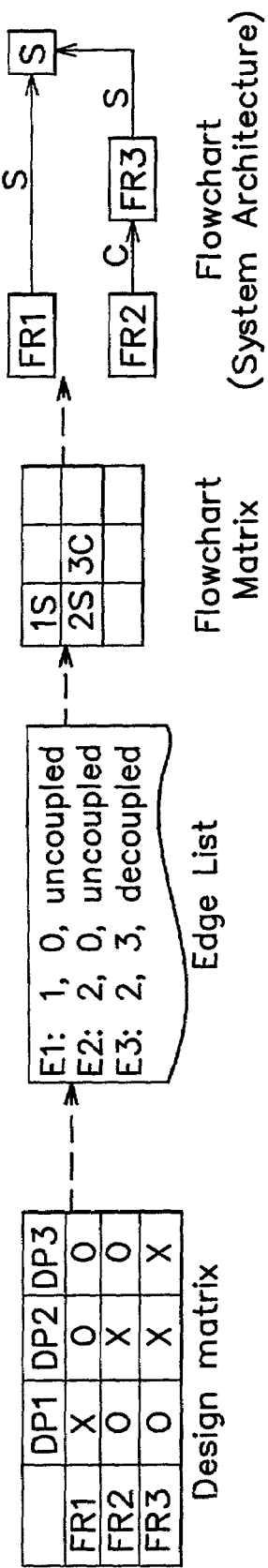
FIG. 90 shows one exemplary format of a flowchart matrix according to one embodiment of the invention.

FIG. 90 shows one exemplary format of a flowchart matrix according to one embodiment of the invention. In particular, the size of the flowchart matrix is the square of the number of FRs in the system: |FR number|X|FR number|. Each cell of the matrix may relate the following information: FR number (identification)+status of FR, wherein the type of status for an FR may be, for example, one of the following status types: F=coupled (feedback junction), C=decoupled (control junction), or S=uncoupled (summation junction). The information in the flowchart matrix is then used to generate a flowchart which can be used to generate other information, or the flowchart may be displayed to a user.

Figure 91:
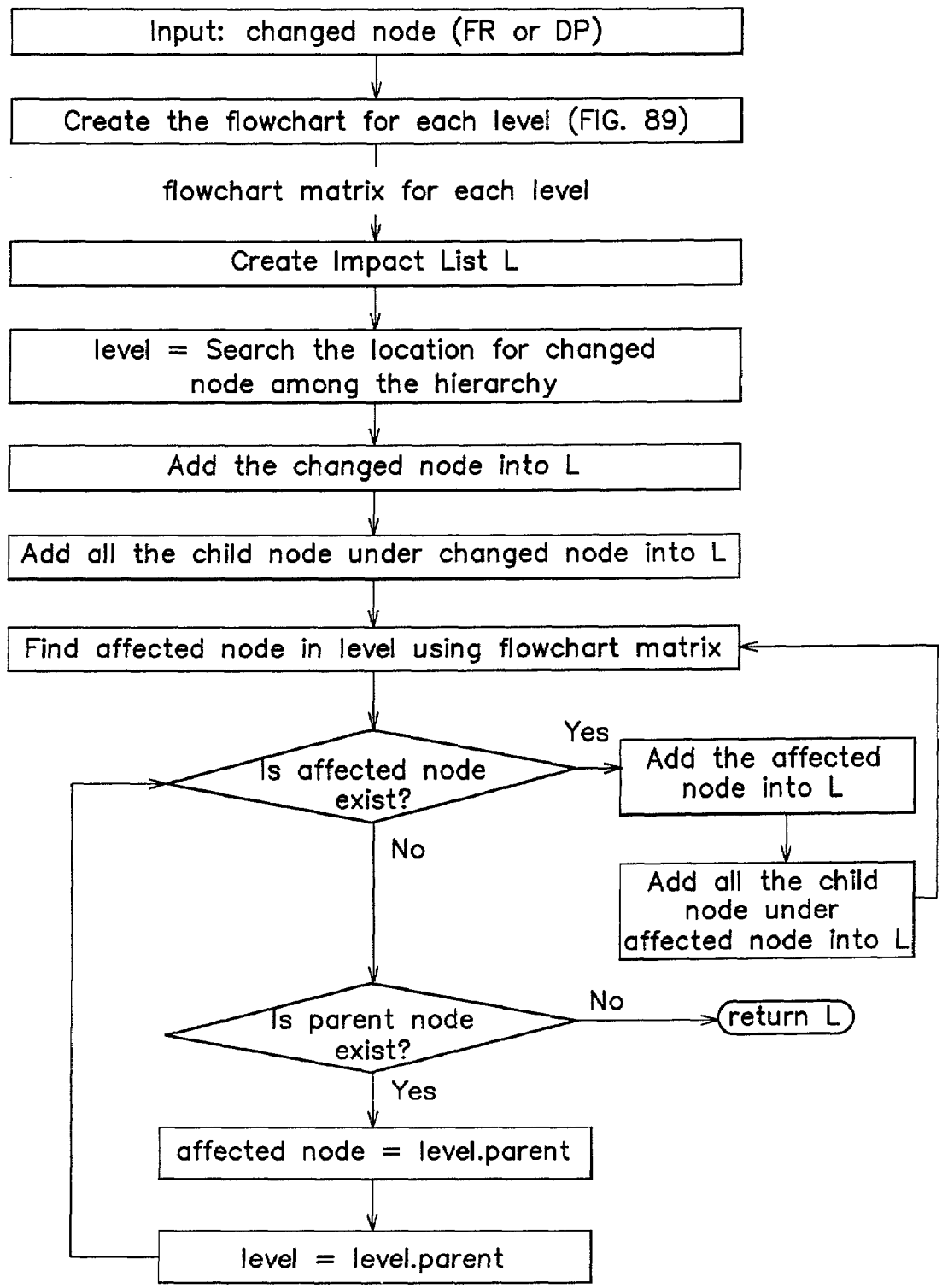
FIG. 91 shows a process for generating an impact list according to one embodiment of the invention.

FIG. 91 shows a method for generating an impact list. An impact list is a set of information that is affected by a change in the design hierarchy. Because the flow chart shows the whole design sequence based on the design matrix, the result of flowchart matrix described above with respect to FIGS. 89 and 90 may be used as input data for generating the impact list. The algorithm shown in FIG. 91 describes how to create the impact list based upon flowchart information.

Figure 92:
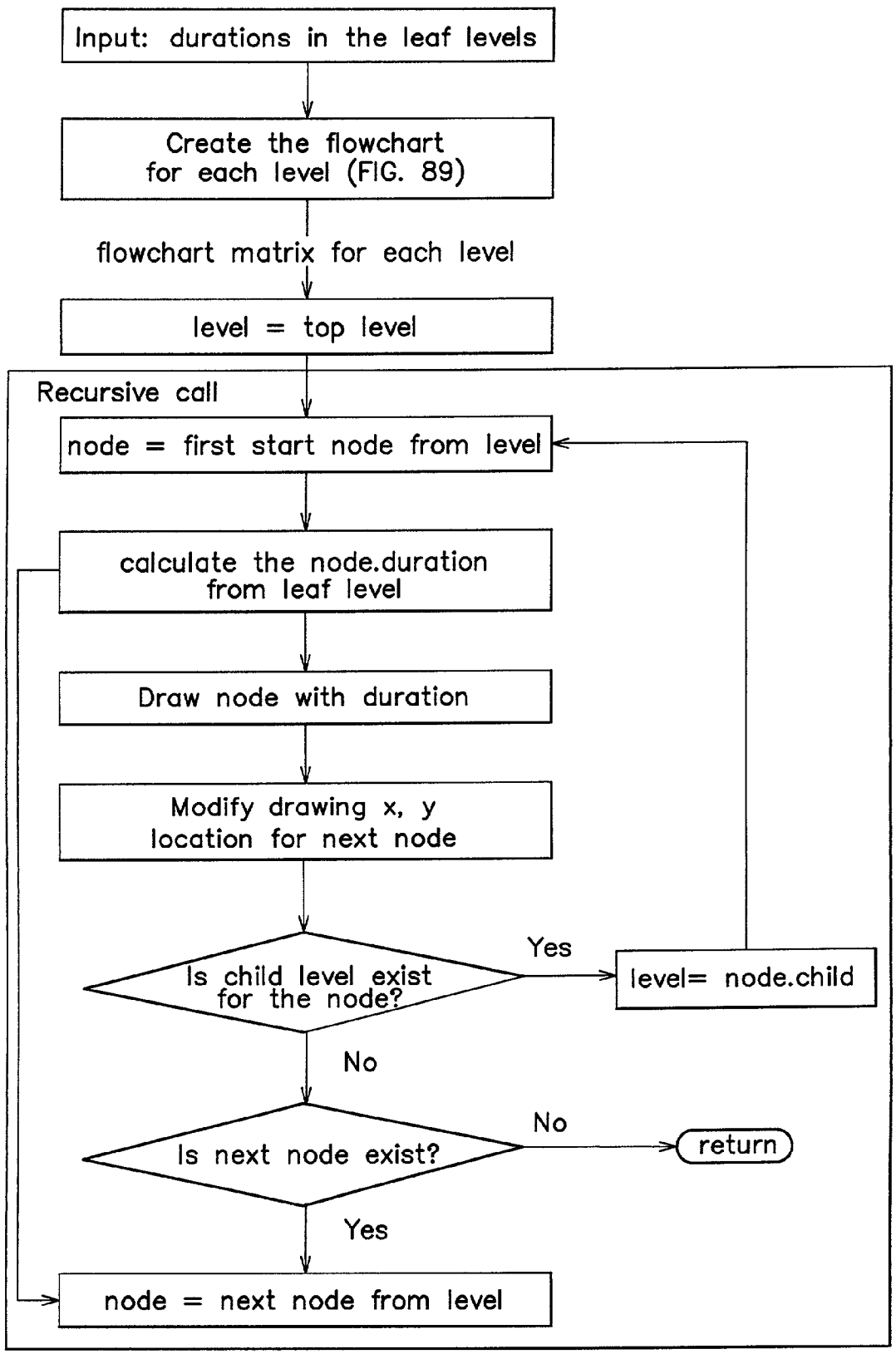
FIG. 92 shows a process for generating a Gantt chart according to one embodiment of the invention.

A Gantt chart is a flow chart showing duration information for each node of the flowchart. In particular, the well-known Gantt chart displays dependencies for one or more tasks for use in project planning. A Gantt chart, according to one embodiment of the invention, may also be used to indicate dependencies in creating DPs of a system design to more adequately plan a creation of the software system. The duration information should be provided in all the leaf level at least to enable a user to estimate how long it should take to create the software system. The algorithm shown in FIG. 92 describes how to create the Gantt chart using information from the flowchart matrix.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:
1. A method of designing a software system, comprising:
    defining a set of functional requirements that describe what the software system is to achieve;
    defining a set of design parameters, where each design parameter in the set satisfies at least one of the functional requirements;

decomposing the set of functional requirements and design parameters to create a hierarchy of functional requirements and a hierarchy of design parameters, wherein the hierarchy of functional requirements comprises at least one parent functional requirement at a top level in the hierarchy of functional requirements and is decomposed into at least two leaf functional requirements at a bottom level in the hierarchy of functional requirements, wherein the at least two leaf functional requirements collectively accomplish the at least one parent functional requirement, and wherein the hierarchy of design parameters comprises at least one parent design parameter at a top level in the hierarchy of design parameters and is decomposed into at least two leaf design parameters at a bottom level in the hierarchy of design parameters, wherein the at least two leaf functional requirements collectively describe the at least one parent design parameter;

defining a design matrix that comprises a plurality of rows, a plurality of columns, and a plurality of cells, each of which is formed by the intersection of one of the plurality of rows and one of the plurality of columns, wherein each of the plurality of rows corresponds to at least one of the leaf functional requirements, each column of the design matrix corresponds to at least one of the leaf design parameters, and each cell corresponds to the intersection of the leaf functional requirements and one of the leaf design parameters, and wherein a cell in the design matrix is marked with an indicator when its corresponding leaf design parameter satisfies its corresponding leaf functional requirement; and using the design matrix to define an object-oriented structure of the software system by performing acts of:
a) creating an object-oriented class that corresponds to a parent design parameter in the hierarchy of design parameters;
b) identifying attributes of the object-oriented class by representing the leaf design parameters of the parent design parameter as the attributes of the object-oriented class;
c) for each of the leaf design parameters identified in the act b), determining from the design matrix the leaf functional requirement that satisfies the design parameter; and
d) representing each leaf functional requirement determined in the act c) as a method of the object-oriented class, wherein the method for each leaf functional requirement is a method to perform the task defined by the leaf functional requirement.

2. The method of claim 1, wherein the act of defining the set of design parameters further comprises determining the set of design parameters by mapping the set of functional requirements into a physical implementation domain.

3. The method of claim 1, further comprising an act of determining if the design matrix is decoupled.

4. The method of claim 3, further comprising an act of, when it is determined that the design matrix is not decoupled, manipulating the design matrix into lower triangular form.

5. At least one computer readable medium encoded with instructions that, when executed on a computer system, perform a method of allowing a user to define a software system, the method comprising:

allowing the user to define a set of functional requirements that describe what the software system is to achieve;

allowing the user to define a set of design parameters, where each design parameter in the set satisfies at least one of the functional requirements;

allowing the user to decompose the set of functional requirements and design parameters to create a hierarchy of functional requirements and a hierarchy of design parameters, wherein the hierarchy of functional requirements comprises at least one parent functional requirement at a top level in the hierarchy of functional requirements and is capable of being decomposed into at least two leaf functional requirements at a bottom level in the hierarchy of functional requirements, wherein the at least two leaf functional requirements collectively accomplish the at least one parent functional requirement, and wherein the hierarchy of design parameters comprises at least one parent design parameter at a top level in the hierarchy of design parameters and is decomposed into at least two leaf design parameters at a bottom level in the hierarchy of design parameters, wherein the at least two leaf functional requirements collectively describe the at least one parent design parameter;

allowing the user to define a design matrix that comprises a plurality of rows, a plurality of columns, and a plurality of cells, each of which is formed by the intersection of one of the plurality of rows and one of the plurality of columns, wherein each of the plurality of rows corresponds to at least one of the leaf functional requirements, each column of the design matrix corresponds to at least one of the leaf design parameters, and each cell corresponds to the intersection of the leaf functional requirements and one of the leaf design parameters, and wherein a cell in the design matrix is marked with an indicator when its corresponding leaf design parameter satisfies its corresponding leaf functional requirement; and using the design matrix to define an object-oriented structure of the software system by performing acts of:
a) creating an object-oriented class that corresponds to a parent design parameter in the hierarchy of design parameters;
b) identifying attributes of the object-oriented class by representing the leaf design parameters of the parent design parameter as the attributes of the object-oriented class;
c) for each of the leaf design parameters identified in the act b), determining from the design matrix the leaf functional requirement that satisfies the design parameter; and
d) representing each leaf functional requirement determined in the act c) as a method of the object-oriented class, wherein the method for each leaf functional requirement is a method to perform the task defined by the leaf functional requirement.

6. The at least one computer readable medium of claim 5, wherein the act of allowing the user to define the set of design parameters further comprises allowing the user to map the set of functional requirements into a physical implementation domain to determine the set of design parameters.

* * * * *